US00RE50079E

(19) United States
(12) Reissued Patent
Orlowski

(10) Patent Number: US RE50,079 E
(45) Date of Reissued Patent: Aug. 13, 2024

(54) SYSTEM AND METHOD FOR ANALYZING HUMAN INTERACTION WITH ELECTRONIC DEVICES THAT ACCESS A COMPUTER SYSTEM THROUGH A NETWORK

(71) Applicant: COMCAST CABLE COMMUNICATIONS, LLC, Philadelphia, PA (US)

(72) Inventor: Robert Orlowski, Centennial, CO (US)

(73) Assignee: Comcast Cable Communications, LLC, Philadelphia, PA (US)

(21) Appl. No.: 14/608,929

(22) Filed: Jan. 29, 2015

Related U.S. Patent Documents

Reissue of:
(64) Patent No.: 8,365,212
Issued: Jan. 29, 2013
Appl. No.: 12/981,301
Filed: Dec. 29, 2010

(51) Int. Cl.
*H04H 60/33* (2008.01)
*H04N 7/16* (2011.01)

(52) U.S. Cl.
CPC ..... *H04H 60/33* (2013.01)

(58) Field of Classification Search
CPC ..... H04N 21/252; H04N 21/44222; H04N 21/6582; H04N 21/812; H04H 60/31; H04H 60/33; H04H 60/66; G06Q 30/0251

(Continued)

(56) References Cited

U.S. PATENT DOCUMENTS 5,374,951 A * 12/1994 Welsh ..... H04H 60/40 348/E7.031
5,790,935 A 8/1998 Payton
(Continued)

FOREIGN PATENT DOCUMENTS

CN 102236867 A 11/2011
EP 1995878 A2 11/2008
(Continued)

OTHER PUBLICATIONS

Response to European Search Report—EP 141838276—Dated Sep. 10, 2015.
Response to European Search Report—EP Appl. 14182927.5—submitted Sep. 4, 2015.
Response to EP Search Report—EP 14186382.9—Dated Sep. 29, 2015.
EP Office Action—EP App 14182921.5—Mailed Mar. 31, 2016.
Motorola, Inc., Solutions Paper, "Implementing Switched Digital Video Solutions" http://www.motorola.com/staticfiles/Business/Products/_Documents/_Static%20files/SDV%20Implementation%20Solutions%20paper%20-555998-001-a.pdf?localeId=33, Copyright 2008, p. 6 File: Motorola-SDV_Implementation_Solutions_paper_-555998-001-a.pdf.
(Continued)

*Primary Examiner* — Adam L Basehoar
(74) *Attorney, Agent, or Firm* — Banner & Witcoff, Ltd.

(57) ABSTRACT

A computer-implemented method of analyzing a series of events which may overlap but which can be characterized by various non-uniform starting times and varying durations such as the interactions of human beings with electronic devices that communicate with a computer system accessed through a network. The resulting metrics provide information useful for understanding human behavior; understanding various combinations of who uses the devices, when do they use the devices, and the purpose for which they use the devices; understanding resource consumption, and understanding device usage for the benefit of service providers. One embodiment teaches how to use set-top box channel tuning data to calculate metrics which provide detailed insight into who watches television, when they watch, and what they watch along with metrics needed to manage capacity in a Switched Digital Video system. Another embodiment relates to cell phone/personal communication device usage based on call detail records.

26 Claims, 69 Drawing Sheets

(58) Field of Classification Search
USPC ..... 725/1, 4, 9–21, 32, 34, 35, 42; 707/802–805, 821, 822, 825
See application file for complete search history.

(56) References Cited

U.S. PATENT DOCUMENTS 5,872,588 A * 2/1999 Aras ..... H04N 7/17354 348/E7.075
6,286,005 B1 * 9/2001 Cannon ..... G06Q 30/02 455/2.01
6,820,277 B1 11/2004 Eldering et al.
7,383,243 B2 * 6/2008 Conkwright et al. ..... 725/2
7,490,045 B1 * 2/2009 Flores et al. ..... 705/1.1
7,509,663 B2 3/2009 Maynard et al.
7,590,993 B1 * 9/2009 Hendricks et al. ..... 725/35
7,614,064 B2 11/2009 Zigmond
7,729,940 B2 * 6/2010 Harvey ..... G06Q 10/0639 705/14.41
7,930,391 B1 * 4/2011 Holt ..... G06Q 30/0255 705/14.53
8,001,561 B2 * 8/2011 Gibbs ..... G06F 17/30038 725/10
8,214,867 B2 * 7/2012 Hudspeth ..... 725/93
8,280,996 B2 10/2012 Lu et al.
8,351,645 B2 1/2013 Srinivasan
8,352,984 B2 1/2013 Gogoi et al.
8,365,212 B1 1/2013 Orlowski
8,365,213 B1 1/2013 Orlowski
8,453,173 B1 5/2013 Anderson et al.
8,548,991 B1 10/2013 Zamir et al.
8,694,396 B1 4/2014 Craner et al.
8,739,197 B1 5/2014 Pecjak et al.
8,745,647 B1 6/2014 Shin et al.
8,924,993 B1 12/2014 Niebles Duque et al.
8,949,873 B1 * 2/2015 Bayer ..... H04N 21/44222 725/14
8,959,540 B1 2/2015 Gargi et al.
9,277,275 B1 3/2016 Arini
9,794,360 B1 10/2017 Farhangi et al.
9,854,292 B1 12/2017 Matthews et al.
9,883,233 B1 1/2018 Barton
10,070,177 B1 9/2018 Gupta
10,779,042 B1 9/2020 Gupta et al.
11,240,539 B1 2/2022 Joshi et al.
11,265,602 B2 3/2022 Malhotra et al.
2002/0055854 A1 5/2002 Kurauchi et al.
2002/0059576 A1 5/2002 Feininger et al.
2002/0062393 A1 5/2002 Borger et al.
2002/0083451 A1 6/2002 Gill et al.
2002/0104083 A1 * 8/2002 Hendricks ..... H04N 21/2381 725/34
2002/0194196 A1 12/2002 Weinberg et al.
2003/0046696 A1 3/2003 Mizuno et al.
2003/0088715 A1 5/2003 Chaudhuri et al.
2003/0115585 A1 * 6/2003 Barsness ..... H04H 60/64 725/9
2003/0145323 A1 * 7/2003 Hendricks ..... H04H 20/10 725/34
2003/0172374 A1 * 9/2003 Vinson ..... G06Q 30/02 725/9
2003/0174160 A1 9/2003 Deutscher et al.
2003/0237095 A1 12/2003 Srinivas
2004/0019899 A1 1/2004 Pelletier
2004/0215698 A1 10/2004 Bertin
2004/0268226 A1 12/2004 McMullin
2005/0086110 A1 4/2005 Haley et al.
2005/0229199 A1 * 10/2005 Yabe ..... H04N 7/163 725/10
2005/0235307 A1 10/2005 Relan et al.
2005/0286860 A1 12/2005 Conklin
2006/0015891 A1 1/2006 Lazzaro et al.
2006/0075420 A1 4/2006 Ludvig et al.
2006/0075421 A1 4/2006 Roberts et al.
2006/0168609 A1 7/2006 Chen
2006/0184961 A1 8/2006 Lee et al.
2006/0198302 A1 * 9/2006 Sofman ..... H04L 65/80 370/229
2006/0223495 A1 * 10/2006 Cassett et al. ..... 455/405
2007/0067794 A1 3/2007 Russell et al.
2007/0074258 A1 * 3/2007 Wood et al. ..... 725/105
2007/0092204 A1 4/2007 Wagner et al.
2007/0124756 A1 * 5/2007 Covell ..... H04N 7/17318 725/18
2007/0157249 A1 7/2007 Cordray et al.
2007/0186228 A1 8/2007 Ramaswamy et al.
2007/0214483 A1 9/2007 Bou-Abboud
2007/0271300 A1 11/2007 Ramaswamy
2007/0283409 A1 12/2007 Golden
2007/0288950 A1 12/2007 Downey et al.
2008/0046912 A1 * 2/2008 Gemelos ..... H04N 21/4622 348/E7.071
2008/0077951 A1 * 3/2008 Maggio ..... H04H 60/32 725/9
2008/0127252 A1 * 5/2008 Eldering et al. ..... 725/34
2008/0300965 A1 12/2008 Doe
2009/0007171 A1 1/2009 Casey et al.
2009/0052864 A1 2/2009 Ohde
2009/0070798 A1 3/2009 Lee et al.
2009/0077577 A1 3/2009 Allegrezza
2009/0077579 A1 3/2009 Li et al.
2009/0094630 A1 4/2009 Brown
2009/0133047 A1 5/2009 Lee et al.
2009/0150224 A1 6/2009 Lu et al.
2009/0150814 A1 * 6/2009 Eyer et al. ..... 715/765
2009/0172725 A1 7/2009 Heilbron et al.
2009/0183210 A1 7/2009 Andrade
2009/0193460 A1 7/2009 Barnett
2009/0268905 A1 10/2009 Matsushima et al.
2009/0313232 A1 * 12/2009 Tinsley ..... G06Q 30/02
2009/0327208 A1 12/2009 Bittner et al.
2010/0043021 A1 2/2010 Torsiello et al.
2010/0088716 A1 4/2010 Ellanti et al.
2010/0145791 A1 6/2010 Canning
2010/0161492 A1 * 6/2010 Harvey ..... G06Q 10/0639 705/50
2010/0211439 A1 8/2010 Marci et al.
2010/0235852 A1 9/2010 Mears
2010/0251302 A1 * 9/2010 Chao ..... H04N 21/47 715/721
2010/0262986 A1 10/2010 Adimatyam et al.
2010/0330954 A1 * 12/2010 Manning Cassett et al. ..... 455/405
2011/0072448 A1 3/2011 Stiers et al.
2011/0110515 A1 5/2011 Tidwell et al.
2011/0126241 A1 5/2011 Beattie, Jr. et al.
2011/0145847 A1 6/2011 Barve et al.
2011/0289524 A1 * 11/2011 Toner ..... H04H 60/31 725/14
2011/0307913 A1 12/2011 Wang et al.
2011/0321077 A1 12/2011 Wang et al.
2012/0005527 A1 1/2012 Engel et al.
2012/0079518 A1 3/2012 Wan et al.
2012/0151511 A1 6/2012 Bernard et al.
2012/0191815 A1 7/2012 Tabbal et al.
2012/0222058 A1 8/2012 el Kaliouby et al.
2012/0240143 A1 9/2012 Mathews
2012/0260278 A1 10/2012 Lambert et al.
2012/0278161 A1 11/2012 Lazzaro
2012/0278828 A1 11/2012 Yazdani et al.
2012/0296909 A1 11/2012 Cao et al.
2012/0304210 A1 11/2012 Zaslavsky et al.
2012/0304211 A1 11/2012 Berezowski et al.
2013/0007789 A1 1/2013 Wang et al.
2013/0024901 A1 1/2013 Sharif-Ahmadi et al.
2013/0124309 A1 5/2013 Traasdahl et al.
2013/0145385 A1 6/2013 Aghajanyan et al.
2013/0198125 A1 8/2013 Oliver et al.
2013/0247081 A1 9/2013 Vinson et al.
2013/0283304 A1 10/2013 Wan et al.
2013/0346154 A1 12/2013 Holz et al.
2014/0075465 A1 3/2014 Petrovic et al.
2014/0109124 A1 4/2014 Morales et al.

(56) References Cited

U.S. PATENT DOCUMENTS

| | | | | |
|---|---|---|---|---|
| 2014/0123173 | A1* | 5/2014 | Mak | G06Q 30/0249 725/32 |
| 2014/0150005 | A1 | 5/2014 | Kalmes et al. | |
| 2014/0181019 | A1 | 6/2014 | Bajaria et al. | |
| 2014/0359649 | A1* | 12/2014 | Cronk | H04N 21/23109 725/14 |
| 2015/0113153 | A1 | 4/2015 | Lin | |
| 2015/0128162 | A1* | 5/2015 | Ionescu | H04N 21/6125 725/14 |
| 2016/0261655 | A1 | 9/2016 | Aggarwal et al. | |
| 2016/0314404 | A1 | 10/2016 | Carmichael et al. | |
| 2017/0289226 | A1 | 10/2017 | Deshpande et al. | |
| 2018/0007431 | A1 | 1/2018 | Sidhu et al. | |
| 2019/0378164 | A1 | 12/2019 | Eich et al. | |
| 2019/0379938 | A1 | 12/2019 | Salo et al. | |
| 2020/0296456 | A1 | 9/2020 | Yungster | |
| 2021/0058670 | A1 | 2/2021 | Benamrouche | |
| 2021/0158391 | A1 | 5/2021 | Sheppard et al. | |
| 2021/0240681 | A1 | 8/2021 | Algranati et al. | |
| 2022/0084052 | A1 | 3/2022 | Sheppard et al. | |
| 2022/0150581 | A1 | 5/2022 | Sidhu et al. | |
| 2022/0159326 | A1 | 5/2022 | Sheppard et al. | |
| 2022/0182722 | A1 | 6/2022 | Bolivar et al. | |
| 2022/0256219 | A1 | 8/2022 | Saafi | |
| 2022/0303618 | A1 | 9/2022 | Whitely et al. | |
| 2022/0383350 | A1 | 12/2022 | Keshavan et al. | |

FOREIGN PATENT DOCUMENTS

| | | | |
|---|---|---|---|
| WO | 2012162693 | A1 | 11/2012 |
| WO | 2013033123 | A2 | 3/2013 |

OTHER PUBLICATIONS

Strickland, Jonathan, "How Switched Digital Video Works", Nov. 20, 2007. HowStuffWorks.com. <http://electronics.howstuffworks.com/switched-digital-video.htm>, pp. 1-4 File: HowSwitchedDigitalVideoWorks.pdf.

Rentrak Corporation, Television, TV Essentials, Web source: http://www.rentrak.com/section/media/tv/linear.html, Feb. 1, 2011, p. 1.

Wayne Friedman, Rentrak's 'Stickiness' Mines TV Value On Granular Level , MediaPost, Jan. 27, 2010, p. 1 of attached file Web source: http://www.tvb.org/media/file/TVB_Measurement_Rentraks_Stickiness_Mines_TV_Value_on_Granular_Level_1-27-10.pdf File: Rentraks_Stickiness_Mines_TV_Value_on_Granular_Level_1-27-10.pdf.

Rentrak Corporation, Reaching Your Target Audience Using Viewership Segments, Rentrak Case Studies http://rentrak.com/downloads/Viewership_Segment_Case_Study.pdf, Oct. 18, 2013, p. 1-2 C-1-Rentrak-Viewership_Segment_Case_Study.pdf www.rentrak.com.

Rentrak Corporation, Reaching Your Target Audience Using Commercial Ratings and Pod Analysis Rentrak Case Studies, http://www.rentrak.com/downloads/Commercial_and_Pod_Analysis_Case_Study.pdf Oct. 18, 2013, p. 1-2, C-2-Rentrak-Commercial_and_Pod_Analysis_Case_Study.pdf www.rentrak.com.

Rentrak Corporation, Rentrak Overview: Exact Commercial Ratings® http://www.rentrak.com/downloads/Exact_Commercial_Ratings_Presentation.pdf, Jan. 22, 2013, p. 1-30 File: C-Rentrak-Exact_Commercial_Ratings_Presentation.pdf www.rentrak.com.

Tim Brooks, Stu Gray, Jim Dennison, "The State Of Set-Top Box Viewing Data as of Dec. 2009", STB Committee of the Council for Research Excellence. Research Report, Feb. 24, 2010, http://researchexcellence.com/stbstudy.php, pp. 1-9 File: A-STBCommitteeforResearchExcellenceSTBFINALREPORT_3_5_10.pdf.

FourthWall Media, Product information from web page, MassiveDataTM http://www.fourthwallmedia.tv, Oct. 18, 2013, p. 1 File: B-FourthWall-Media-MassiveData.pdf.

Cisco Systems, Inc., "Network Efficiency with Switched Digital", Web page: http://www.cisco.com/en/US/products/ps9258/index.html, accessed Oct. 13, 2014, 2 pages.

Cisco Systems, Inc., "Access Viewership Data, Monitor Performance", Web page: http://www.cisco.com/en/US/products/ps9122/index.html, accessed May 20, 2013, 1 page.

Extended European Search Report—EP 14183827.6—Mailing date: Oct. 23, 2014.

Extended European Search Report—EP 14182927.5—Mailing date: Dec. 16, 2014.

Welch T A: "A Technique for High-Performance Data Compression", Computer. IEEE. US, vol. 17. No. 6. Jun. 1, 1984 (Jun. 1, 1984), XP000673349.

Extended European Search Report, EP Application 14186382.9, Dated Feb. 4, 2015.

Konstantin Shvachko et al.: "The Hadoop Distributed File System", Mass Storage Systems and Technologies (MSST), 2010 IEEE 26th Symposium On, IEEE, Piscataway, NJ, USA, May 3, 2010 (May 3, 2010), pp. 1-10, XP031698650, ISBN: 978-1-4244-7152-2.

Anonymous: "Apache Hadoop", Sep. 5 2013 (Sep. 5 2013), XP055394634, Retrieved from the Internet: URL: https://en.wikipedia.org/w/index.php?title=Apache_Hadoop&oldid=571641303 [retrieved on Jul. 28, 2017].

Aug. 4, 2017—(EP) Office Action—App No. 14183827.6.

Mark Landler, Digital TV Converter Boxes to Expand Cable Offerings, 1996, The New York Times.

May 22, 2018—European Office Action—EP 14183827.6.

Mar. 22, 2019—EP Office Action—EP 14186382.9.

Jan. 12, 2021—Canadian Office Action—CA 2,860,802.

Jan. 13, 2021—Canadian Office Action—CA 2,861,861.

Nov. 10, 2020—CA Office Action—CA 2,864,621.

Nov. 6, 2020—EP Office Action—EP 14186382.9.

Jun. 23, 2021—Canadian Office Action—CA 2,864,621.

Jun. 22, 2021—European Office Action—EP 14186382.9.

Nov. 3, 2021—Canadian Office Action—CA 2,860,802.

Nov. 5, 2021—Canadian Office Action—CA 2,861,861.

Jan. 3, 2023—EP Office Action—EP App. No. 14186382.9.

Cisco Systems, Inc., "Channel Viewership Analyzer" Web page: http://www.cisco.com/en/US/prod/collateral/video/ps9119/ps9883/7016867.pdf pp. 1-2 File: CISCO-ChannelViewershipAnalyzer.pdf.

IneoQuest Technologies, Inc., "Switched Digital Video Solutions" http://www.ineoquest.com/switched-digital-video-solutions Dec. 28, 2010 pp. 1-2 File: IneoQuest-Switched-Digital-Video-Solutions.pdf.

Motorola, Inc. Solutions Paper "Implementing Switched Digital Video Solutions" http://www.motorola.com/staticfiles/Business/Products/_Documents/_Static%20files/SDV%20Implementation%20Solutions%20paper%20-555998-001-a.pdf?localeId=33 Copyright 2008.

Strickland, Jonathan, "How Switched Digital Video Works" Nov. 20, 2007. HowStuffWorks.com. <http://electronics.howstuffworks.com/switched-digital-video.htm> pp. 1-4.

Tim Brooks, STU Gray, Jim Dennison, "The State of Set-Top Box Viewing Data as of Dec. 2009" STB Committee of the Council for Research Excellence. Research Report Feb. 24, 2010.

Rentrak Corporation Television TV Essentials http://www.rentrak.com/section/media/tv/linear.html Feb. 1, 2011.

* cited by examiner

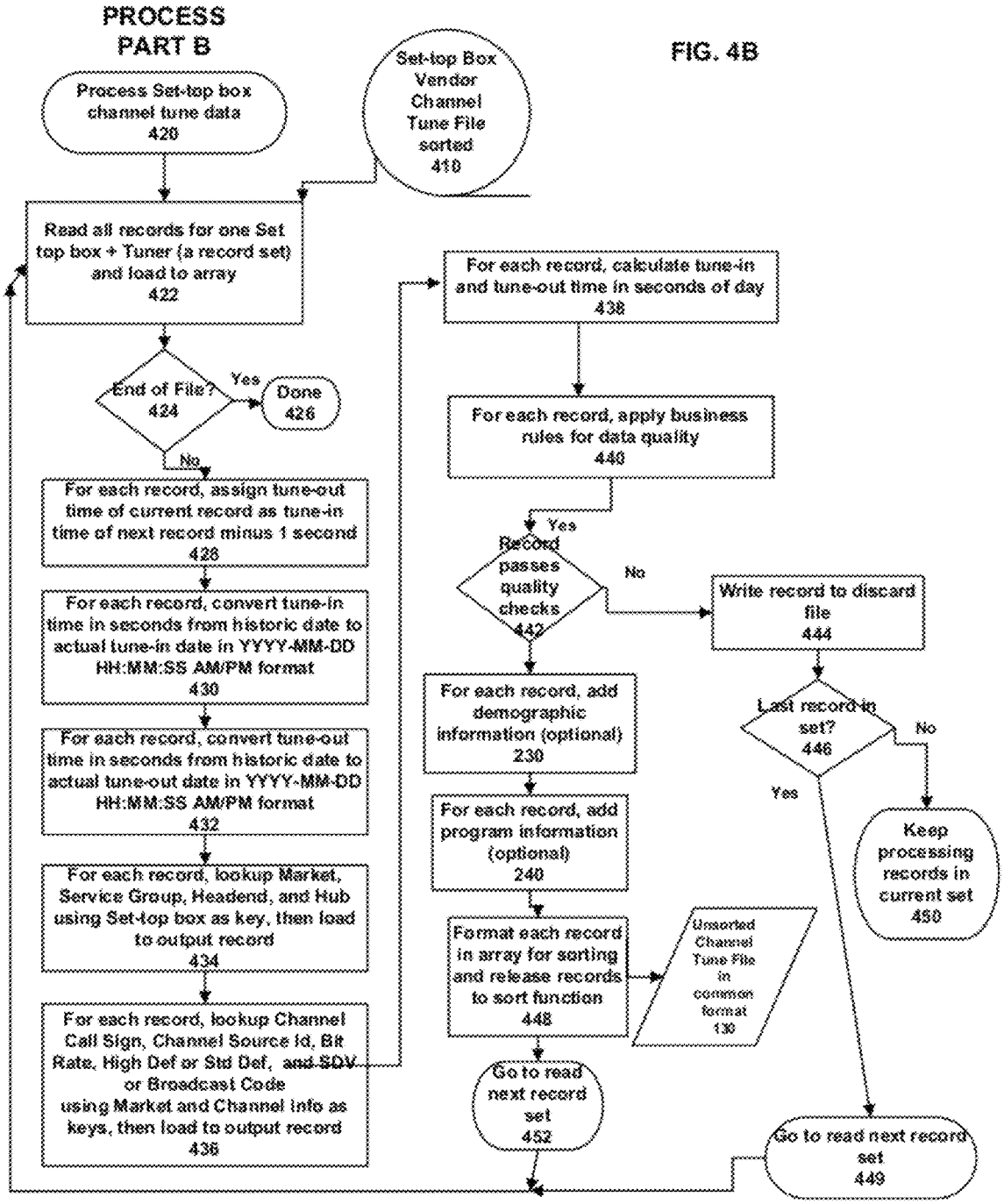
PROCESS
PART B
FIG. 4B
Process Set-top box channel tune data 420
Set-top Box Vendor Channel Tune File sorted 410
Read all records for one Set top box + Tuner (a record set) and load to array 422
End of File? 424
Yes
Done 426
No
For each record, assign tune-out time of current record as tune-in time of next record minus 1 second 428
For each record, convert tune-in time in seconds from historic date to actual tune-in date in YYYY-MM-DD HH:MM:SS AM/PM format 430
For each record, convert tune-out time in seconds from historic date to actual tune-out date in YYYY-MM-DD HH:MM:SS AM/PM format 432
For each record, lookup Market, Service Group, Headend, and Hub using Set-top box as key, then load to output record 434
For each record, lookup Channel Call Sign, Channel Source Id, Bit Rate, High Def or Std Def, ~~and SDV~~ or Broadcast Code using Market and Channel info as keys, then load to output record 436
For each record, calculate tune-in and tune-out time in seconds of day 438
For each record, apply business rules for data quality 440
Yes
Record passes quality checks 442
No
Write record to discard file 444
Last record in set? 446
No
Keep processing records in current set 450
Yes
For each record, add demographic information (optional) 230
For each record, add program information (optional) 240
Format each record in array for sorting and release records to sort function 448
Unsorted Channel Tune File in common format 130
Go to read next record set 452
Go to read next record set 449

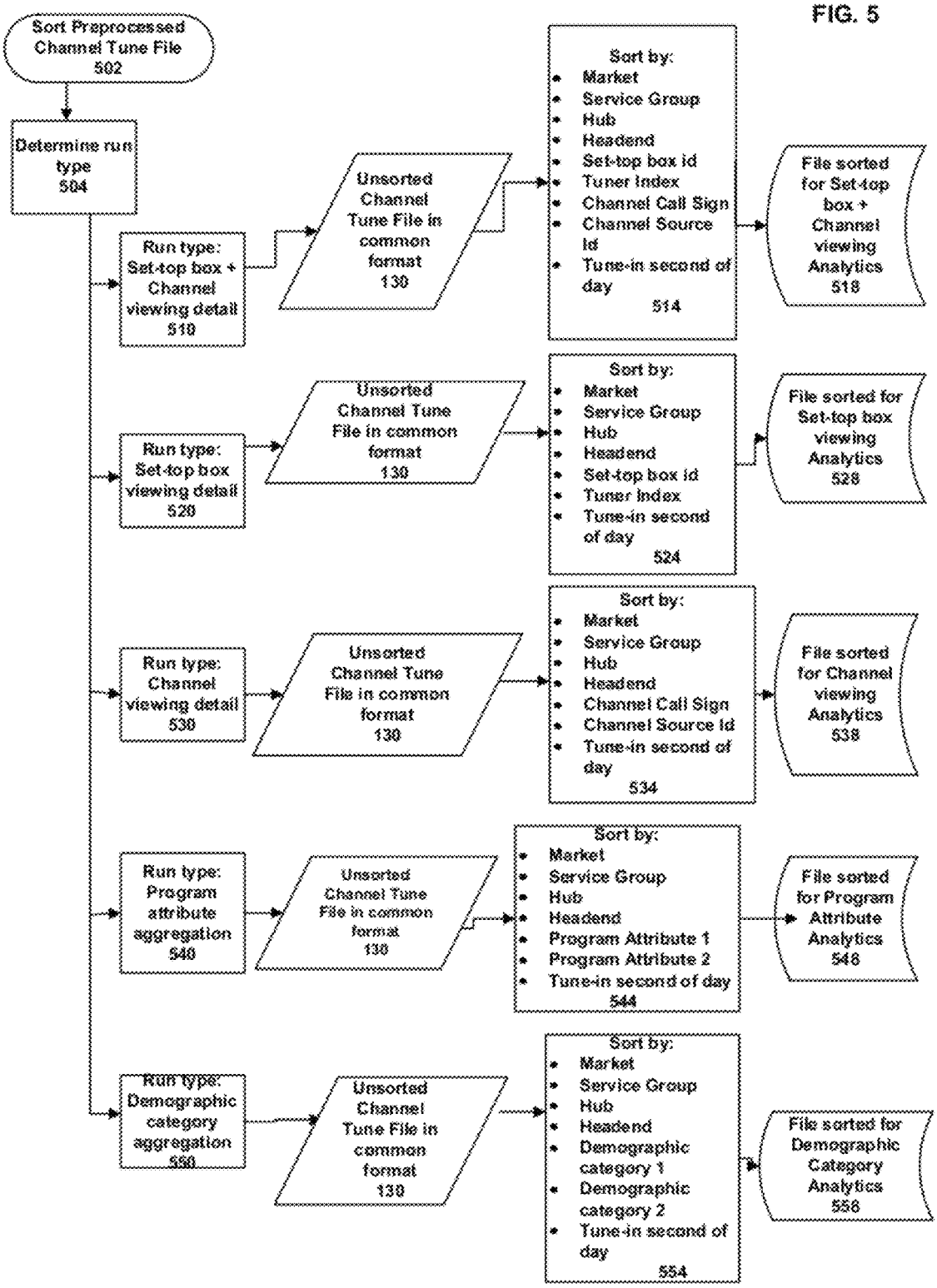
FIG. 5
Sort Preprocessed Channel Tune File 502
Determine run type 504
Run type: Set-top box + Channel viewing detail 510
Unsorted Channel Tune File in common format 130
Sort by: Market Service Group Hub Headend Set-top box id Tuner Index Channel Call Sign Channel Source Id Tune-in second of day 514
File sorted for Set-top box + Channel viewing Analytics 518
Run type: Set-top box viewing detail 520
Unsorted Channel Tune File in common format 130
Sort by: Market Service Group Hub Headend Set-top box id Tuner Index Tune-in second of day 524
File sorted for Set-top box viewing Analytics 528
Run type: Channel viewing detail 530
Unsorted Channel Tune File in common format 130
Sort by: Market Service Group Hub Headend Channel Call Sign Channel Source Id Tune-in second of day 534
File sorted for Channel viewing Analytics 538
Run type: Program attribute aggregation 540
Unsorted Channel Tune File in common format 130
Sort by: Market Service Group Hub Headend Program Attribute 1 Program Attribute 2 Tune-in second of day 544
File sorted for Program Attribute Analytics 548
Run type: Demographic category aggregation 550
Unsorted Channel Tune File in common format 130
Sort by: Market Service Group Hub Headend Demographic category 1 Demographic category 2 Tune-in second of day 554
File sorted for Demographic Category Analytics 558

FIG. 6B

```
MAIN-ROUTINE.
  INITIALIZE STB-CHANNEL-VIEWING-DETAIL table in memory.
  MOVE "N" TO CHANNEL-TUNE-FILE-EOF-FLAG
  PERFORM PROCESS-CHANNEL-TUNE-FILE
    UNTIL CHANNEL-TUNE-FILE-EOF-FLAG = "Y"
  END-PERFORM
  PERFORM ANALYTICS-PROCESSING
  PERFORM WRITE-RESULTS
STOP RUN


PROCESS-CHANNEL-TUNE-FILE.
  READ CHANNEL-TUNE-FILE
    AT END
      MOVE "Y" TO CHANNEL-TUNE-FILE-EOF-FLAG
    NOT AT END
      MOVE "N" TO CHANNEL-TUNE-RECORD-LOADED-TO-TABLE
      PERFORM VARYING TABLE-ROW-SUB FROM 1 BY 1 UNTIL
        CHANNEL-TUNE-RECORD-LOADED-TO-TABLE = "Y"

        IF STB-CHANNEL-VIEWING-DETAIL-KEY (TABLE-ROW-SUB)  = SPACE
          MOVE CHANNEL-TUNE-RECORD-KEY TO
            STB-CHANNEL-VIEWING-DETAIL-KEY(TABLE-ROW-SUB)
          DO MARK-CHANNEL-VIEWED-FLAG
        ELSE
          IF CHANNEL-TUNE-RECORD-KEY =
            STB-CHANNEL-VIEWING-DETAIL-KEY(TABLE-ROW-SUB)
            DO MARK-CHANNEL-VIEWED-FLAG
          END-IF
        END-IF
      END-PERFORM
    END-READ.


MARK-CHANNEL-VIEWED-FLAG.
  PERFORM VARYING SECONDS-SUB
    FROM TUNE-IN-SECOND-OF-DAY BY 1
    UNTIL SECONDS-SUB > TUNE-OUT-SECOND-OF-DAY
      MOVE 1 TO STB-CHAN-VIEWED-FLAG (TABLE-ROW-SUB, SECONDS-SUB)
  END-PERFORM.
  MOVE "Y" TO CHANNEL-TUNE-RECORD-LOADED-TO-TABLE.


ANALYTICS-PROCESSING.
  This routine does all the work needed to calculate the various metrics
  using the data that was loaded to the STB-CHANNEL-VIEWING-DETAIL table in
  memory.  See individual metrics for details.

WRITE-RESULTS.
  This routine does all the work needed to write the calculated metrics to
  appropriate data files.
```

FIG. 7B

```
MAIN-ROUTINE.
  INITIALIZE STB-VIEWING-DETAIL table in memory.
  MOVE "N" TO CHANNEL-TUNE-FILE-EOF-FLAG
  PERFORM PROCESS-CHANNEL-TUNE-FILE
    UNTIL CHANNEL-TUNE-FILE-EOF-FLAG = "Y"
  END-PERFORM
  PERFORM ANALYTICS-PROCESSING
  PERFORM WRITE-RESULTS
STOP RUN


PROCESS-CHANNEL-TUNE-FILE.
  READ CHANNEL-TUNE-FILE
    AT END
      MOVE "Y" TO CHANNEL-TUNE-FILE-EOF-FLAG
    NOT AT END
      MOVE "N" TO CHANNEL-TUNE-RECORD-LOADED-TO-TABLE
      PERFORM VARYING TABLE-ROW-SUB FROM 1 BY 1 UNTIL
        CHANNEL-TUNE-RECORD-LOADED-TO-TABLE = "Y"

        IF STB-VIEWING-DETAIL-KEY (TABLE-ROW-SUB)  = SPACE
          MOVE CHANNEL-TUNE-RECORD-KEY TO
            STB-VIEWING-DETAIL-KEY(TABLE-ROW-SUB)
          DO MARK-CHANNEL-VIEWED-FLAG
        ELSE
          IF CHANNEL-TUNE-RECORD-KEY =
            STB-VIEWING-DETAIL-KEY(TABLE-ROW-SUB)
            DO MARK-CHANNEL-VIEWED-FLAG
          END-IF
        END-IF
      END-PERFORM
    END-READ.


MARK-CHANNEL-VIEWED-FLAG.

  MOVE 1 TO STB-TUNE-IN-FLAG (STB-SUB, TUNE-IN-SECOND-OF-DAY )

  PERFORM VARYING SECONDS-SUB
    FROM TUNE-IN-SECOND-OF-DAY BY 1
    UNTIL SECONDS-SUB > TUNE-OUT-SECOND-OF-DAY
      MOVE 1 TO STB-VIEWED-FLAG (TABLE-ROW-SUB, SECONDS-SUB)
  END-PERFORM.
  MOVE "Y" TO CHANNEL-TUNE-RECORD-LOADED-TO-TABLE.


ANALYTICS-PROCESSING.
  This routine does all the work needed to calculate the various metrics
  using the data that was loaded to the STB-VIEWING-DETAIL table in
  memory.  See individual metrics for details.

WRITE-RESULTS.
  This routine does all the work needed to write the calculated metrics to
  appropriate data files.
```

FIG. 8B

```
MAIN-ROUTINE.
  INITIALIZE CHAN-VIEWING-DETAIL table in memory.
  MOVE "N" TO CHANNEL-TUNE-FILE-EOF-FLAG
  PERFORM PROCESS-CHANNEL-TUNE-FILE
    UNTIL CHANNEL-TUNE-FILE-EOF-FLAG = "Y"
  END-PERFORM
  PERFORM ANALYTICS-PROCESSING
  PERFORM WRITE-RESULTS
STOP RUN


PROCESS-CHANNEL-TUNE-FILE.
  READ CHANNEL-TUNE-FILE
    AT END
      MOVE "Y" TO CHANNEL-TUNE-FILE-EOF-FLAG
    NOT AT END
      MOVE "N" TO CHANNEL-TUNE-RECORD-LOADED-TO-TABLE
      PERFORM VARYING TABLE-ROW-SUB FROM 1 BY 1 UNTIL
        CHANNEL-TUNE-RECORD-LOADED-TO-TABLE = "Y"

        IF CHAN-VIEWING-DETAIL-KEY (TABLE-ROW-SUB)  = SPACE
          MOVE CHANNEL-TUNE-RECORD-KEY TO
            CHAN-VIEWING-DETAIL-KEY(TABLE-ROW-SUB)
          DO MARK-CHANNEL-VIEWED-FLAG
        ELSE
          IF CHANNEL-TUNE-RECORD-KEY =
            CHAN-VIEWING-DETAIL-KEY(TABLE-ROW-SUB)
            DO MARK-CHANNEL-VIEWED-FLAG
          END-IF
        END-IF
      END-PERFORM
    END-READ.


MARK-CHANNEL-VIEWED-FLAG.
  PERFORM VARYING SECONDS-SUB
    FROM TUNE-IN-SECOND-OF-DAY BY 1
    UNTIL SECONDS-SUB > TUNE-OUT-SECOND-OF-DAY
      ADD 1 TO CHAN-STB-VIEWED-CHANNEL-COUNT (TABLE-ROW-SUB, SECONDS-SUB)
  END-PERFORM.
  MOVE "Y" TO CHANNEL-TUNE-RECORD-LOADED-TO-TABLE.


ANALYTICS-PROCESSING.
  This routine does all the work needed to calculate the various metrics
  using the data that was loaded to the CHAN-VIEWING-DETAIL table in
  memory.  See individual metrics for details.

WRITE-RESULTS,
  This routine does all the work needed to write the calculated metrics to
  appropriate data files.
```

FIG. 9B

```
MAIN-ROUTINE.
  INITIALIZE DEMO-VIEWING-DETAIL table in memory.
  MOVE "N" TO CHANNEL-TUNE-FILE-EOF-FLAG
  PERFORM PROCESS-CHANNEL-TUNE-FILE
    UNTIL CHANNEL-TUNE-FILE-EOF-FLAG = "Y"
  END-PERFORM
  PERFORM ANALYTICS-PROCESSING
  PERFORM WRITE-RESULTS
STOP RUN


PROCESS-CHANNEL-TUNE-FILE.
  READ CHANNEL-TUNE-FILE
    AT END
      MOVE "Y" TO CHANNEL-TUNE-FILE-EOF-FLAG
    NOT AT END
      MOVE "N" TO CHANNEL-TUNE-RECORD-LOADED-TO-TABLE
      PERFORM VARYING TABLE-ROW-SUB FROM 1 BY 1 UNTIL
        CHANNEL-TUNE-RECORD-LOADED-TO-TABLE = "Y"

        IF DEMO-VIEWING-DETAIL-KEY (TABLE-ROW-SUB)  = SPACE
          MOVE CHANNEL-TUNE-RECORD-KEY TO
            DEMO-VIEWING-DETAIL-KEY(TABLE-ROW-SUB)
          DO TALLY-DEMO-VIEWING-COUNT
        ELSE
          IF CHANNEL-TUNE-RECORD-KEY =
            DEMO-VIEWING-DETAIL-KEY(TABLE-ROW-SUB)
            DO TALLY-DEMO-VIEWING-COUNT
          END-IF
        END-IF
      END-PERFORM
    END-READ.


TALLY-DEMO-VIEWING-COUNT.
  PERFORM VARYING SECONDS-SUB
    FROM TUNE-IN-SECOND-OF-DAY BY 1
    UNTIL SECONDS-SUB > TUNE-OUT-SECOND-OF-DAY
      ADD 1 TO DEMO-STB-VIEWED-COUNT (TABLE-ROW-SUB, SECONDS-SUB)
  END-PERFORM.
  MOVE "Y" TO CHANNEL-TUNE-RECORD-LOADED-TO-TABLE.


ANALYTICS-PROCESSING.
  This routine does all the work needed to calculate the various metrics
  using the data that was loaded to the DEMO-VIEWING-DETAIL table in
  memory.  See individual metrics for details.

WRITE-RESULTS.
  This routine does all the work needed to write the calculated metrics to
  appropriate data files.
```

FIG. 10B

```
MAIN-ROUTINE.
  INITIALIZE PROG-VIEWING-DETAIL table in memory.
  MOVE "N" TO CHANNEL-TUNE-FILE-EOF-FLAG
  PERFORM PROCESS-CHANNEL-TUNE-FILE
    UNTIL CHANNEL-TUNE-FILE-EOF-FLAG = "Y"
  END-PERFORM
  PERFORM ANALYTICS-PROCESSING
  PERFORM WRITE-RESULTS
STOP RUN


PROCESS-CHANNEL-TUNE-FILE.
  READ CHANNEL-TUNE-FILE
    AT END
      MOVE "Y" TO CHANNEL-TUNE-FILE-EOF-FLAG
    NOT AT END
      MOVE "N" TO CHANNEL-TUNE-RECORD-LOADED-TO-TABLE
      PERFORM VARYING TABLE-ROW-SUB FROM 1 BY 1 UNTIL
        CHANNEL-TUNE-RECORD-LOADED-TO-TABLE = "Y"

        IF PROG-VIEWING-DETAIL-KEY (TABLE-ROW-SUB)  = SPACE
          MOVE CHANNEL-TUNE-RECORD-KEY TO
            PROG-VIEWING-DETAIL-KEY(TABLE-ROW-SUB)
          DO TALLY-PROG-VIEWING-COUNT
        ELSE
          IF CHANNEL-TUNE-RECORD-KEY =
            PROG-VIEWING-DETAIL-KEY(TABLE-ROW-SUB)
            DO TALLY-PROG-VIEWING-COUNT
          END-IF
        END-IF
      END-PERFORM
    END-READ.


TALLY-PROG-VIEWING-COUNT.
  PERFORM VARYING SECONDS-SUB
    FROM TUNE-IN-SECOND-OF-DAY BY 1
    UNTIL SECONDS-SUB > TUNE-OUT-SECOND-OF-DAY
      ADD 1 TO PROG-STB-VIEWED-COUNT (TABLE-ROW-SUB, SECONDS-SUB)
  END-PERFORM.
  MOVE "Y" TO CHANNEL-TUNE-RECORD-LOADED-TO-TABLE.


ANALYTICS-PROCESSING.
  This routine does all the work needed to calculate the various metrics
  using the data that was loaded to the PROG-VIEWING-DETAIL table in
  memory.  See individual metrics for details.

WRITE-RESULTS.
  This routine does all the work needed to write the calculated metrics to
  appropriate data files.
```

FIG. 11A

| | 1000 | 1002 | 1004 | 1006 |
|---|---|---|---|---|
| | NAME | TYPE | SIZE | DESCRIPTION |
| 1010~ | SET-TOP-BOX-ID | CHAR | 20 | Unique identifier of set-top box. May be provided in encrypted format. |
| 1020~ | TUNER-INDEX | CHAR | 1 | Identifies which tuner on the set-top box performed the channel change. Typically: 0 = primary tuner 1 = secondary tuner |
| 1030~ | MARKET | CHAR | 4 | Identifier of market code in cable company's network hierarchy. |
| 1040~ | SERVICE-GROUP | CHAR | 6 | Identifier of service group in cable company's network hierarchy. |
| 1050~ | HUB | CHAR | 4 | Identifier of hub in cable company's network hierarchy. |
| 1060~ | HEADEND | CHAR | 4 | Identifier of headend in cable company's network hierarchy. |
| 1070~ | TUNE-IN-DATE-TIME | CHAR | 22 | Tune in date and time. Format is typically: YYYY-MM-DD HH:MM:SS AM/PM |
| 1080~ | TUNE-OUT-DATE-TIME | CHAR | 22 | Tune out date and time. Format is typically: YYYY-MM-DD HH:MM:SS AM/PM |
| 1090~ | CHANNEL-CALL-SIGN | CHAR | 6 | Channel call sign or short name of the channel. |
| 1100~ | CHANNEL-SOURCE-ID | CHAR | 5 | Channel source id which is a numeric identifier of the channel. |
| 1110~ | BIT-RATE | CHAR | 5 | Bit rate identifies the rate in megabits per second required to deliver the channel. Used in capacity calculations. Typical format: 3.75 for standard definition 15 for high definition Coded as PIC 999V99. Ex: 00375 |
| 1120~ | SDV-OR-BROADCAST-CODE | CHAR | 3 | Identifies whether the channel being tuned to is a broadcast channel or a switched channel in a switched digital video configuration. Typical values: B = Broadcast SDV = Switched Digital Video |
| 1130~ | HIGH-DEF-OR-STD-DEF | CHAR | 2 | High definition or standard definition code. Typical values: HD = High Definition SD = Standard Definition |

FIG. 11B

1003
Record 1:
00:01:02:03:04:05|0|DENV|SG-01|HUB1|HE01|2010-06-01 07:02:03 AM|2010-06-01 07:29:44 AM|FOX|201|3.75|SDV|SD 1005
Record 2:
00:AB:02:CD:04:EF|1|BOST|SG-05|HUB2|HE02|2010-06-01 05:13:03 PM|2010-06-01 05:25:08 PM|DISC|305|15|B|HD

FIG. 11C

| | 1000 | 1003 | 1005 |
|---|---|---|---|
| | **NAME** | **Record 1** | **Record 2** |
| 1010~ | SET~TOP~BOX~ID | 00:01:02:03:04:05 | 00:AB:02:CD:04:EF |
| 1020~ | TUNER~INDEX | 0 | 1 |
| 1030~ | MARKET | DENV | BOST |
| 1040~ | SERVICE~GROUP | SG-01 | SG-05 |
| 1050~ | HUB | HUB1 | HUB2 |
| 1060~ | HEADEND | HE01 | HE02 |
| 1070~ | TUNE~IN~DATE~TIME | 2010-06-01 07:02:03 AM | 2010-06-01 05:13:03 PM |
| 1080~ | TUNE~OUT~DATE~TIME | 2010-06-01 07:29:44 AM | 2010-06-01 05:25:08 PM |
| 1090~ | CHANNEL~CALL~SIGN | FOX | DISC |
| 1100~ | CHANNEL~SOURCE~ID | 201 | 305 |
| 1110~ | BIT~RATE | 3.75<br>Coded as PIC 999V99.<br>Ex: 00375 | 15<br>Coded as PIC 999V99.<br>Ex: 01500 |
| 1120~ | SDV~OR~BROADCAST~CODE | SDV | B |
| 1130~ | HIGH~DEF~OR~STD~DEF | SD | HD |

FIG. 12A

| | 1400 | 1402 | 1404 | 1406 |
|---|---|---|---|---|
| | NAME | TYPE | SIZE | DESCRIPTION |
| 1410~ | MARKET | CHAR | 4 | Identifier of market code in cable company's network hierarchy. |
| 1420~ | SERVICE~GROUP | CHAR | 6 | Identifier of service group in cable company's network hierarchy. Typically unique within a market in the cable company's network hierarchy. |
| 1430~ | SET~TOP~BOX~ID | CHAR | 20 | Unique identifier of set-top box. May be provided in encrypted format. |
| 1440~ | TUNER~INDEX | CHAR | 1 | Identifies which tuner on the set-top box performed the channel change. Typically:<br>0 = primary tuner<br>1 = secondary tuner |
| 1450~ | EVENT~DATE | CHAR | 10 | Identifies the date of the event specified in event code. Can be a tune-in date or a tune-out date depending on the value in event-code. Typical format:<br>YYYY-MM-DD |
| 1460~ | EVENT~TIME | CHAR | 11 | Identifies the time of the event specified in event code. Can be a tune-in time or a tune-out time depending on the value in event-code. Typical format:<br>HH:MM:SS AM/PM |
| 1470~ | EVENT~CODE | CHAR | 1 | Identifies whether the record is a tune-in event or a tune-out event. Typical format:<br>1 = TUNE-IN<br>2 = TUNE-OUT |
| 1480~ | CHANNEL~SOURCE~ID | CHAR | 5 | Channel source id which is a numeric identifier of the channel. |

FIG. 12B

1403
Record 1:
DENV|302|00:01:02:03:04:05|0|2010-06-01|07:02:03 AM|1|201

1405
Record 2:
BOST|405|00:AB:02:CD:04:EF|1|2010-06-01|05:25:08 PM|2|305

FIG. 12C 1400 1403 1405

| | NAME | Record 1 | Record 2 |
|---|---|---|---|
| 1410~ | MARKET | DENV | BOST |
| 1420~ | SERVICE~GROUP | 302 | 405 |
| 1430~ | SET~TOP~BOX~ID | 00:01:02:03:04:05 | 00:AB:02:CD:04:EF |
| 1440~ | TUNER~INDEX | 0 | 1 |
| 1450~ | EVENT~DATE | 2010-06-01 | 2010-06-01 |
| 1460~ | EVENT~TIME | 07:02:03 AM | 05:25:08 PM |
| 1470~ | EVENT~CODE | 1 | 2 |
| 1480~ | CHANNEL~SOURCE~ID | 201 | 305 |

FIG. 13A

| | 1600 | 1602 | 1604 | 1606 |
|---|---|---|---|---|
| | NAME | TYPE | SIZE | DESCRIPTION |
| 1610~ | SET-TOP-BOX-ID | CHAR | 20 | Unique identifier of set-top box. May be provided in encrypted format. |
| 1620~ | TUNER-INDEX | CHAR | 1 | Identifies which tuner on the set-top box performed the channel change. Typically:<br>0 = primary tuner<br>1 = secondary tuner |
| 1630~ | TIME-IN-SECONDS | NUMBER | 15 | Time in seconds of tuning event represented as seconds from some historic date such as January 1, 1990 at midnight. |
| 1640~ | CHANNEL-CALL-SIGN | CHAR | 5 | Channel call sign or short name of the channel being tuned to. |
| 1650~ | CHANNEL-SOURCE-ID | CHAR | 5 | Channel source id which is a numeric identifier of the channel being tuned to. |

FIG. 13B

1603

Record 1:

00:01:02:03:04:05|0|127818437|FOX|201

1605

Record 2:

00:AB:02:CD:04:EF|1|127818655|DISC|305

FIG. 13C

| | 1600 | 1603 | 1605 |
|---|---|---|---|
| | NAME | Record 1 | Record 2 |
| 1610~ | SET-TOP-BOX-ID | 00:01:02:03:04:05 | 00:AB:02:CD:04:EF |
| 1620~ | TUNER-INDEX | 0 | 1 |
| 1630~ | TIME-IN-SECONDS | 127818437 | 127818655 |
| 1640~ | CHANNEL-CALL-SIGN | FOX | DISC |
| 1650~ | CHANNEL-SOURCE-ID | 201 | 305 |

FIG. 14A

| | 1800 | 1802 | 1804 | 1806 |
|---|---|---|---|---|
| | NAME | TYPE | SIZE | DESCRIPTION |
| 1810~ | MARKET | CHAR | 4 | Identifier of market code in cable company's network hierarchy. |
| 1820~ | SERVICE~GROUP | CHAR | 6 | Identifier of service group in cable company's network hierarchy. |
| 1830~ | HUB | CHAR | 4 | Identifier of hub in cable company's network hierarchy. |
| 1840~ | HEADEND | CHAR | 4 | Identifier of headend in cable company's network hierarchy. |
| 1850~ | SET~TOP~BOX~ID | CHAR | 20 | Unique identifier of set-top box. May be provided in encrypted format. |
| 1860~ | TUNER~INDEX | CHAR | 1 | Identifies which tuner on the set-top box performed the channel change. Typically: 0 = primary tuner 1 = secondary tuner |
| 1870~ | CHANNEL~CALL~SIGN | CHAR | 6 | Channel call sign or short name of the channel. |
| 1880~ | CHANNEL~SOURCE~ID | CHAR | 5 | Channel source id which is a numeric identifier of the channel. |
| 1890~ | TUNE~IN~DATE | CHAR | 10 | Tune-in date. Format is: YYYY-MM-DD |
| 1900~ | TUNE~IN~TIME | CHAR | 8 | Tune-in time. Format is: HH:MM:SS |
| 1910~ | TUNE~IN~AM~PM | CHAR | 2 | Tune-in AM/PM indicator. Format is: AM PM |
| 1920~ | TUNE~IN~SECOND~OF~DAY | NUMBER | 5 | Tune-in time in seconds of day since midnight. |
| 1930~ | TUNE~OUT~DATE | CHAR | 10 | Tune-out date. Format is: YYYY-MM-DD |
| 1940~ | TUNE~OUT~TIME | CHAR | 8 | Tune-out time. Format is: HH:MM:SS |
| 1950~ | TUNE~OUT~AM~PM | CHAR | 2 | Tune-out AM/PM indicator. Format is: AM PM |
| 1960~ | TUNE~OUT~SECOND~OF~DAY | NUMBER | 5 | Tune-out time in seconds of day since midnight. |

FIG. 14A – Continued

| | | | | |
|---|---|---|---|---|
| 1970~ | BIT~RATE | CHAR | 5 | Bit rate identifies the rate in megabits per second required to deliver the channel. Used in capacity calculations.<br>Typical format:<br>3.75 for standard definition<br>15 for high definition<br>Coded as PIC 999V99.<br>Ex: 00375 |
| 1980~ | SDV~OR~BROADCAST~CODE | CHAR | 3 | Identifies whether the channel being tuned to is a broadcast channel or a switched channel in a switched digital video configuration. Typical values:<br>B = Broadcast<br>SDV = Switched Digital Video |
| 1990~ | HIGH~DEF~OR~STD~DEF | CHAR | 2 | High definition or standard definition code. Typical values:<br>HD = High Definition<br>SD = Standard Definition |
| 2000~ | PROGRAM~ATTRIBUTE~1 | CHAR | 6 | Identifies a first attribute of the program playing during the tuning event. Typical values:<br>NEWS<br>SPORTS<br>MOVIE<br>SITCOM |
| 2010~ | PROGRAM~ATTRIBUTE~2 | CHAR | 6 | Identifies a second attribute of the program playing during the tuning event. Typical values:<br>G, PG, PG13, R |
| 2020~ | DEMOGRAPHIC~CATEGORY~1 | CHAR | 6 | Identifies a first demographic category provided by the cable company.<br>Typical values:<br>If Income is category:<br>LOW, MID, HIGH<br>If Age is category:<br>CHILD, TEEN, ADULT, SENIOR<br>If Race is category:<br>WHITE, HISPAN |
| 2030~ | DEMOGRAPHIC~CATEGORY~2 | CHAR | 6 | Identifies a second demographic category provided by the cable company.<br>See DEMOGRAPHIC~CATEGORY~1 for typical values. |

FIG. 14B

| | 1800 | 1803 | 1805 |
|---|---|---|---|
| | NAME | Record 1 | Record 2 |
| 1810~ | MARKET | DENV | BOST |
| 1820~ | SERVICE~GROUP | SG-01 | SG-05 |
| 1830~ | HUB | HUB1 | HUB2 |
| 1840~ | HEADEND | HE01 | HE02 |
| 1850~ | SET~TOP~BOX~ID | 00:01:02:03:04:05 | 00:A8:02:CD:04:EF |
| 1860~ | TUNER~INDEX | 0 | 1 |
| 1870~ | CHANNEL~CALL~SIGN | FOX | DISC |
| 1880~ | CHANNEL~SOURCE~ID | 201 | 305 |
| 1890~ | TUNE~IN~DATE | 2010-06-01 | 2010-06-01 |
| 1900~ | TUNE~IN~TIME | 07:02:03 | 05:13:03 |
| 1910~ | TUNE~IN~AM~PM | AM | PM |
| 1920~ | TUNE~IN~SECOND~OF~DAY | 25323 | 18783 |
| 1930~ | TUNE~OUT~DATE | 2010-06-01 | 2010-06-01 |
| 1940~ | TUNE~OUT~TIME | 07:29:44 | 05:25:08 |
| 1950~ | TUNE~OUT~AM~PM | AM | PM |
| 1960~ | TUNE~OUT~SECOND~OF~DAY | 26984 | 19508 |
| 1970~ | BIT~RATE | 3.75<br>Coded as PIC 999V99.<br>Ex: 00375 | 15<br>Coded as PIC 999V99.<br>Ex: 01500 |
| 1980~ | SDV~OR~BROADCAST~CODE | SDV | B |
| 1990~ | HIGH~DEF~OR~STD~DEF | SD | HD |
| 2000~ | PROGRAM~ATTRIBUTE~1 | | |
| 2010~ | PROGRAM~ATTRIBUTE~2 | | |
| 2020~ | DEMOGRAPHIC~CATEGORY~1 | | |
| 2030~ | DEMOGRAPHIC~CATEGORY~2 | | |

FIG. 14C 1800 1807 1809

| | NAME | Record 1 | Record 2 |
|---|---|---|---|
| 1810~ | MARKET | DENV | BOST |
| 1820~ | SERVICE-GROUP | SG-01 | SG-05 |
| 1830~ | HUB | HUB1 | HUB2 |
| 1840~ | HEADEND | HE01 | HE02 |
| 1850~ | SET-TOP-BOX-ID | 00:01:02:03:04:05 | 0D:A8:02:CD:04:EF |
| 1860~ | TUNER-INDEX | 0 | 1 |
| 1870~ | CHANNEL-CALL-SIGN | FOX | DISC |
| 1880~ | CHANNEL-SOURCE-ID | 201 | 305 |
| 1890~ | TUNE-IN-DATE | 2010-06-01 | 2010-06-01 |
| 1900~ | TUNE-IN-TIME | 07:02:03 | 05:13:03 |
| 1910~ | TUNE-IN-AM-PM | AM | PM |
| 1920~ | TUNE-IN-SECOND-OF-DAY | 25323 | 18783 |
| 1930~ | TUNE-OUT-DATE | 2010-06-01 | 2010-06-01 |
| 1940~ | TUNE-OUT-TIME | 07:29:44 | 05:25:08 |
| 1950~ | TUNE-OUT-AM-PM | AM | PM |
| 1960~ | TUNE-OUT-SECOND-OF-DAY | 26984 | 19508 |
| 1970~ | BIT-RATE | 3.75<br>Coded as PIC 999V99.<br>Ex: 00375 | 15<br>Coded as PIC 999V99.<br>Ex: 01500 |
| 1980~ | SDV-OR-BROADCAST-CODE | SDV | B |
| 1990~ | HIGH-DEF-OR-STD-DEF | SD | HD |
| 2000~ | PROGRAM-ATTRIBUTE-1 | NEWS | SPORT |
| 2010~ | PROGRAM-ATTRIBUTE-2 | G | G |
| 2020~ | DEMOGRAPHIC-CATEGORY-1 | ADULT | TEEN |
| 2030~ | DEMOGRAPHIC-CATEGORY-2 | MID | WHITE |

FIG. 15A

| 3000 | 3002 NAME | 3004 TYPE | 3006 SIZE | 3008 DESCRIPTION |
|---|---|---|---|---|
| 3010~ | STB-CVD-MARKET | CHAR | 4 | For set-top box channel viewing detail, identifier of market code in cable company's network hierarchy in which the tuning activity occurred. |
| 3020~ | STB-CVD-SERVICE-GROUP | CHAR | 6 | For set-top box channel viewing detail, identifier of service group in cable company's network hierarchy in which the tuning activity occurred. |
| 3030~ | STB-CVD-HUB | CHAR | 4 | For set-top box channel viewing detail, identifier of hub in cable company's network hierarchy in which the tuning activity occurred. |
| 3040~ | STB-CVD-HEADEND | CHAR | 4 | For set-top box channel viewing detail, identifier of headend in cable company's network hierarchy in which the tuning activity occurred. |
| 3050~ | STB-CVD-CHANNEL-CALL-SIGN | CHAR | 6 | For set-top box channel viewing detail, channel call sign or short name of the channel involved in the tuning activity. |
| 3060~ | STB-CVD-CHANNEL-SOURCE-ID | NUMBER | 5 | For set-top box channel viewing detail, channel source id which is a numeric identifier of the channel involved in the tuning activity. |
| 3070~ | STB-CVD-STB-ID | CHAR | 20 | For set-top box channel viewing detail, unique identifier of set-top box. The provider of the tuning data may or may not provide this in an encrypted format. |
| 3080~ | STB-CVD-TUNER-INDEX | CHAR | 1 | For set-top box channel viewing detail, identifies which tuner on the set-top box performed the tuning activity. Typically:<br>0 = primary tuner<br>1 = secondary tuner |
| 3090~ | STB-CHANNEL-VIEWING-SECONDS | NUMBER | 5 | For each set-top box + channel combination in the set-top box channel viewing detail, count of the number of seconds the set top box was tuned to the channel during the day. |
| 3100~ | STB-CHANNEL-TUNE-INS | NUMBER | 5 | For each set-top box + channel combination in the set-top box channel viewing detail, count of the number of times the set-top box tuned to that channel during the day. |

These fields occur 3000 times.

FIG. 15A Continued

| | | | | | |
|---|---|---|---|---|---|
| 3110~ | These fields occur 3000 times. | STB~CHAN~AVG~VIEWING~DURATION | NUMBER | 5 | In the set-top box channel viewing detail, set-top box + channel average viewing duration measures the average length of time in seconds that the set-top box was tuned to that channel. |
| 3120~ | | STB~CHAN~STAY~AWAY~SECS~TOTAL | NUMBER | 5 | For each set-top box + channel combination in the set-top box channel viewing detail, count the number of seconds the STB stays away from the channel, but include only those tune-away events where the STB returns to the channel soon thereafter, and total this for the day. |
| 3130~ | | STB~CHAN~STAY~AWAY~TUNE~COUNT | NUMBER | 5 | For each set-top box + channel combination in the set-top box channel viewing detail, count of the number of times the set top box goes away from the channel and then returns soon thereafter, totaled for the day. |
| 3140~ | | STB~CHAN~AVG~STAY~AWAY~SECS | NUMBER | 5 | For each set-top box + channel combination in the set-top box channel viewing detail, this is a measure of the average stay away seconds, for those channel changes on the STB that qualify as stay-away channel changes. |
| 3150~ | | STB~CHAN~VIEWED~FLAG<br><br>OCCURS 86400 TIMES | NUMBER | 1 | For each set-top box + channel combination in the set-top box channel viewing detail, this is a flag to indicate whether or not the STB + Tuner was tuned to the indicated channel during that second of the day. There are 86,400 buckets to represent each second of the day. Values:<br>1 = tuned<br>0 = not tuned |

FIG. 15B

| | 3000 | 3002 | 3003 | 3005 |
|---|---|---|---|---|
| | | NAME | Row 1 | Row 2 |
| 3010~ | These fields occur 3000 times. | STB~CVD~MARKET | DENV | BOST |
| 3020~ | | STB~CVD~SERVICE~GROUP | SG-01 | SG-05 |
| 3030~ | | STB~CVD~HUB | HUB1 | HUB2 |
| 3040~ | | STB~CVD~HEADEND | HE01 | HE02 |
| 3050~ | | STB~CVD~CHANNEL~CALL~SIGN | FOX | DISC |
| 3060~ | | STB~CVD~CHANNEL~SOURCE~ID | 201 | 305 |
| 3070~ | | STB~CVD~STB~ID | 00:01:02:03:04:05 | 00:AB:02:CD:04:EF |
| 3080~ | | STB~CVD~TUNER~INDEX | 0 | 1 |
| 3090~ | | STB~CHANNEL~VIEWING~SECONDS | 7652 | 15429 |
| 3100~ | | STB~CHANNEL~TUNE~INS | 12 | 48 |
| 3110~ | | STB~CHAN~AVG~VIEWING~DURATION | 638 | 321 |
| 3120~ | | STB~CHAN~STAY~AWAY~SECS~TOTAL | 106 | 658 |
| 3130~ | | STB~CHAN~STAY~AWAY~TUNE~COUNT | 2 | 8 |
| 3140~ | | STB~CHAN~AVG~STAY~AWAY~SECS | 53 | 82 |
| 3150~ | | STB~CHAN~VIEWED~FLAG | 0 0 1 1 1 ... 1 ... 1 | 0 ... 1 1 1 ... 0 0 ... |
| | | OCCURS 86400 TIMES See Note 1 below | 1 1 0 0 1 1 .. 1 ... | 0 ... 1 1 1 ... 0 1 ... |

Note 1: This cell contains 86,400 buckets, one for each second of the day. When the STB is tuned to the channel during that second of the day, the bucket is assigned a '1'.

FIG 16-A

| | 3200 | 3202 NAME | 3204 TYPE | 3206 SIZE | 3208 DESCRIPTION |
|---|---|---|---|---|---|
| 3210~ | These fields occur 600 times. | STB~VD~MARKET | CHAR | 4 | For set-top box viewing detail, identifier of market code in cable company's network hierarchy in which the tuning activity occurred. |
| 3220~ | | STB~VD~SERVICE~GROUP | CHAR | 6 | For set-top box viewing detail, identifier of service group in cable company's network hierarchy in which the tuning activity occurred. |
| 3230~ | | STB~VD~HUB | CHAR | 4 | For set-top box viewing detail, identifier of hub in cable company's network hierarchy in which the tuning activity occurred. |
| 3240~ | | STB~VD~HEADEND | CHAR | 4 | For set-top box viewing detail, identifier of headend in cable company's network hierarchy in which the tuning activity occurred. |
| 3250~ | | STB~VD~STB~ID | CHAR | 20 | For set-top box viewing detail, unique identifier of set-top box. The provider of the tuning data may or may not provide this in an encrypted format. |
| 3260~ | | STB~VD~TUNER~INDEX | CHAR | 1 | For set-top box viewing detail, identifies which tuner on the set-top box performed the tuning activity. Typically: 0 = primary tuner, 1 = secondary tuner |
| 3270~ | | STB~VIEWING~SECONDS | NUMBER | 5 | For each set-top box in the set-top box viewing detail, this is a count of the number of seconds the set top box was tuned to some channel during the day. |
| 3280~ | | STB~TUNE~INS | NUMBER | 5 | For each set-top box in the set-top box viewing detail, count of the number of times the set-top box tuned to any channel during the day. |
| 3290~ | | STB~AVERAGE~VIEWING~DURATION | NUMBER | 5 | In the set-top box viewing detail, set-top box average viewing duration measures the average length of time in seconds that the set-top box was tuned to a channel. |

FIG. 16A Continued

| | | | | | |
|---|---|---|---|---|---|
| 3300~ | | STB-VIEWED-FLAG<br>OCCURS 86400 TIMES<br>See Note 1 below | NUMBER | 1 | For each set-top box in the set-top box viewing detail, this is a flag to indicate whether or not the STB + Tuner was tuned to a channel during that second of the day. There are 86,400 buckets to represent each second of the day. Values:<br>1 = tuned, 0 = not tuned |
| 3310~ | | STB-TUNE-IN-FLAG<br>OCCURS 86400 TIMES<br>See Note 2 below | NUMBER | 1 | For each set-top box in the set-top box viewing detail, this is a flag to indicate whether or not there was a tune-in event for the STB + Tuner was during that second of the day. There are 86,400 buckets to represent each second of the day. Values:<br>1 = tune-in event, 0 = not tune-in event. |

FIG. 16B 3000 3202 3203 3205

| | | NAME | Row 1 | Row 2 |
|---|---|---|---|---|
| 3210~ | These fields occur 600 times. | STB~VD~MARKET | DENV | BOST |
| 3220~ | | STB~VD~SERVICE~GROUP | SG-01 | SG-05 |
| 3230~ | | STB~VD~HUB | HUB1 | HUB2 |
| 3240~ | | STB~VD~HEADEND | HE01 | HE02 |
| 3250~ | | STB~VD~STB~ID | 00:01:02:03:04:05 | 00:AB:02:CD:04:EF |
| 3260~ | | STB~VD~TUNER~INDEX | 0 | 1 |
| 3270~ | | STB~VIEWING~SECONDS | 9582 | 14853 |
| 3280~ | | STB~TUNE~INS | 22 | 36 |
| 3290~ | | STB~AVERAGE~VIEWING~DURATION | 436 | 413 |
| 3300~ | | STB~VIEWED~FLAG | 0 0 1 1 1 ... 1 ... 1 | 0 ... 1 1 1 ... 0 0 ... |
| | | OCCURS 86400 TIMES<br>See Note 1 below | 1 1 0 0 1 1 ... 1 ... 0 | ... 1 1 1 ... 0 1 ... |
| 3310~ | | STB~TUNE~IN~FLAG | 0 0 1 0 0 ... 1 ... 1 | 0 ... 1 0 0 ... 0 0 ... |
| | | OCCURS 86400 TIMES<br>See Note 2 below | 1 0 0 0 1 0 ... 1 ... 0 | ... 1 0 0 ... 0 1 ... |

Note 1: This cell contains 86,400 buckets, one for each second of the day. When the STB is tuned to any channel during that second of the day, the bucket is assigned a '1'.

Note 2: This cell contains 86,400 buckets, one for each second of the day. When the STB tunes to any channel during that second of the day (a tune-in event), the bucket is assigned a '1'.

FIG. 17A

| | 3400 | 3402 NAME | 3404 TYPE | 3406 SIZE | 3408 DESCRIPTION |
|---|---|---|---|---|---|
| 3410~ | These fields occur 300 times. | CHAN-VD-MARKET | CHAR | 4 | For channel viewing detail, identifier of market code in cable company's network hierarchy in which the tuning activity occurred. |
| 3420~ | | CHAN-VD-SERVICE-GROUP | CHAR | 6 | For channel viewing detail, identifier of service group in cable company's network hierarchy in which the tuning activity occurred. |
| 3430~ | | CHAN-VD-HUB | CHAR | 4 | For channel viewing detail, identifier of hub in cable company's network hierarchy in which the tuning activity occurred. |
| 3440~ | | CHAN-VD-HEADEND | CHAR | 4 | For channel viewing detail, identifier of headend in cable company's network hierarchy in which the tuning activity occurred. |
| 3450~ | | CHAN-VD-CHANNEL-CALL-SIGN | CHAR | 6 | For channel viewing detail, channel call sign or short name of the channel involved in the tuning activity. |
| 3460~ | | CHAN-VD-CHANNEL-SOURCE-ID | CHAR | 5 | For channel viewing detail, channel source id which is a numeric identifier of the channel involved in the tuning activity. |
| 3470~ | | CHAN-BIT-RATE | NUMBER | 999V99 | For channel viewing detail, channel bit rate which is bandwidth in megabits per second required to deliver the channel. Typically:<br>3.75 is Standard Definition<br>15.00 is High Definition<br>Coded as: PIC 999V99.<br>Ex: 00375 |
| 3480~ | | SDV-OR-BROADCAST-CODE | CHAR | 3 | For channel viewing detail, SDV or Broadcast code indicates if the channel is a Switched Channel or a Broadcast channel in a Switched Digital Video environment. Typically:<br>SDV = Switched Digital Video<br>B = Broadcast |
| 3490~ | | HIGH-DEF-OR-STD-DEF | CHAR | 2 | For channel viewing detail, High Definition or Standard Definition code indicates if the channel is delivered in high definition format or standard definition format. Typically:<br>HD = High Definition<br>SD = Standard Definition |

FIG. 17A Continued

| | | | | | |
|---|---|---|---|---|---|
| 3500~ | These fields occur 300 times. | CHANNEL~VIEWING~SECONDS | NUMBER | 5 | For channel viewing detail, channel viewing seconds measures at a channel level the number of seconds during the day that at least one set-top box was viewing the channel. |
| 3510~ | | CHANNEL~NON~VIEWING~SECONDS | NUMBER | 5 | For channel viewing detail, channel non-viewing seconds measures at a channel level the number of seconds during the day that no set-top box was viewing the channel. |
| 3520~ | | CHANNEL~ONE~STB~VIEWING~SECONDS | NUMBER | 5 | For channel viewing detail, channel one STB viewing seconds measures at a channel level the number of seconds during the day that only one set-top box was viewing the channel. |
| 3530~ | | AGG~CHANNEL~VIEWING~SECONDS | NUMBER | 9 | For channel viewing detail, aggregate channel viewing seconds measures at a channel level the number of seconds of viewing of the channel during the day. |
| 3540~ | | PCT~OF~DAY~ONLY~ONE~STB~VIEWG~CHAN | NUMBER | 999 | For channel viewing detail, percent of the day when only one STB is viewing the channel is calculated as Channel-one-STB-Viewing-seconds / seconds-in-day. |
| 3550~ | | PCT~OF~DAY~NO~STB~VIEWING~CHANNEL | NUMBER | 999 | For channel viewing detail, percent of the day when no STB is viewing the channel is calculated as Channel-Non-Viewing-seconds / seconds-in-day. |
| 3560~ | | PCT~OF~DAY~VIEWING~CHANNEL | NUMBER | 999 | For channel viewing detail, percent of the day when the channel is being viewed is calculated as Channel-Viewing-seconds / seconds-in-day. |
| 3570~ | | PEAK~VIEWING~COUNT~FOR~CHANNEL | NUMBER | 5 | For channel viewing detail, peak viewing count for channel measures how many STB's are tuned to the channel during its peak viewing second. |
| 3580~ | | PEAK~VIEWING~SECOND~FOR~CHAN | NUMBER | 5 | For channel viewing detail, peak viewing second for channel measures the second of the day when the most STB's are tuned to this channel. |
| 3590~ | | AGG~VIEWING~AT~THIS~CHAN~PEAK | NUMBER | 9 | For channel viewing detail, aggregate channel viewing at this channel's peak measures how much aggregate viewing is happening when this channel is at its peak. |

FIG. 17A Continued

| | | | | | |
|---|---|---|---|---|---|
| 3600~ | These fields occur 300 times. | PCT~OF~PEAK~VIEW~BY~THIS~CHANPEAK | NUMBER | 999 | For channel viewing detail, percent of peak viewership by this channel's peak measures what part of the total viewing audience is tuned to this channel during this channel's peak viewing period. |
| 3610~ | | PCT~OF~PEAK~VIEW~BY~STB~VIEWNG | NUMBER | 999 | For channel viewing detail, percent of peak viewership measures what part of the viewing audience is tuned to this channel during the peak viewing second for all the channels when peak second is the most active second based on all the STB's viewing. |
| 3620~ | | CHAN~VIEWED~DURING~PEAK~FLAG | CHAR | 1 | For channel viewing detail, channel viewed during peak flag identifies the channels that were viewed during the peak second of the day when peak second is the most active second based on all the STB's viewing. |
| 3630~ | | PEAK~PERIOD~DURATION~IN~SECONDS | NUMBER | 5 | For channel viewing detail, peak duration in seconds is an input variable that is used to specify the length of the peak viewing period. For example, 30 minutes would be 1,800 seconds. |
| 3640~ | | CHAN~VIEWED~SECS~DURING~PEAK | NUMBER | 5 | For channel viewing detail, channel viewed seconds during peak identifies the number of seconds during the peak viewing window that this channel was viewed by at least one STB. |
| 3650~ | | AGG~CHAN~VIEWED~SECS~DURING~PEAK | NUMBER | 9 | For channel viewing detail, aggregate channel viewed seconds during peak identifies the number of aggregate viewing seconds that this channel captured during the peak viewing window. |
| 3660~ | | PCT~OF~PEAK~PERIOD~CHAN~WAS~VIEWED | NUMBER | 999 | For channel viewing detail, percent of time the channel was viewed during peak period measures how much of the time during the peak viewing period that at least one STB was tuned to the channel. |
| 3670~ | | CHAN~STB~VIEWED~CHANNEL~COUNT<br><br>OCCURS 86400 TIMES<br>See Note 1 below | NUMBER | 5 | For each channel this is a count of the number of set-top boxes tuned to that channel during this second of the day. There are 86,400 buckets to represent each second of the day. |

Note 1: This cell contains 86,400 buckets, one for each second of the day. For each channel this is a count of the number of set-top boxes tuned to that channel during this second of the day.

FIG. 17B

| | 3400 | 3402 | 3403 | 3405 |
|---|---|---|---|---|
| | | NAME | Row 1 | Row 2 |
| 3410~ | These fields occur 300 times. | CHAN-VD-MARKET | DENV | BOST |
| 3420~ | | CHAN-VD-SERVICE-GROUP | SG-01 | SG-05 |
| 3430~ | | CHAN-VD-HUB | HUB1 | HUB2 |
| 3440~ | | CHAN-VD-HEADEND | HE01 | HE02 |
| 3450~ | | CHAN-VD-CHANNEL-CALL-SIGN | FOX | DISC |
| 3460~ | | CHAN-VD-CHANNEL-SOURCE-ID | 201 | 305 |
| 3470~ | | CHAN-BIT-RATE | 3.75<br>Coded as PIC 999V99.<br>Ex: 00375 | 15<br>Coded as PIC 999V99.<br>Ex: 01500 |
| 3480~ | | SDV-OR-BROADCAST-CODE | B | SDV |
| 3490~ | | HIGH-DEF-OR-STD-DEF | SD | HD |
| 3500~ | | CHANNEL-VIEWING-SECONDS | 32400 | 7200 |
| 3510~ | | CHANNEL-NON-VIEWING-SECONDS | 54000 | 79200 |
| 3520~ | | CHANNEL-ONE-STB-VIEWING-SECONDS | 4378 | 685 |
| 3530~ | | AGG-CHANNEL-VIEWING-SECONDS | 225798 | 27007 |
| 3540~ | | PCT-OF-DAY-ONLY-ONE-STB-VIEWG-CHAN | 5 | 1 |
| 3550~ | | PCT-OF-DAY-NO-STB-VIEWING-CHANNEL | 63 | 92 |
| 3560~ | | PCT-OF-DAY-VIEWING-CHANNEL | 38 | 8 |
| 3570~ | | PEAK-VIEWING-COUNT-FOR-CHANNEL | 12 | 3 |
| 3580~ | | PEAK-VIEWING-SECOND-FOR-CHAN | 64800 | 69400 |
| 3590~ | | AGG-VIEWING-AT-THIS-CHAN-PEAK | 29 | 32 |
| 3600~ | | PCT-OF-PEAK-VIEW-BY-THIS-CHANPEAK | 33 | 25 |
| 3610~ | | PCT-OF-PEAK-VIEW-BY-STB-VIEWNG | 27 | 23 |
| 3620~ | | CHAN-VIEWED-DURING-PEAK-FLAG | Y | N |
| 3630~ | | PEAK-PERIOD-DURATION-IN-SECONDS | 1800 | 1800 |

FIG. 17B Continued

| | | | | | | | | | | | | | | | | | | |
|---|---|---|---|---|---|---|---|---|---|---|---|---|---|---|---|---|---|---|
| 3640~ | These fields occur 300 times. | CHAN-VIEWED-SECS-DURING-PEAK | 1800 | | | | | | | | 0 | | | | | | | |
| 3650~ | | AGG-CHAN-VIEWED-SECS-DURING-PEAK | 39600 | | | | | | | | 0 | | | | | | | |
| 3660~ | | PCT-OF-PEAK-PERIOD-CHAN-WAS-VIEWED | 100 | | | | | | | | 0 | | | | | | | |
| 3670~ | | CHAN-STB-VIEWED-CHANNEL-COUNT | ... | 5 | 7 | 6 | ... | 12 | 11 | ... | 0 | ... | 1 | 1 | 2 | 2 | ... | 0 |
| | | OCCURS 86400 TIMES See Note 1 below | 9 | ... | 8 | 6 | ... | 0 | 0 | ... | 0 | 2 | 3 | 3 | ... | 2 | ... | 1 |

Note 1: This cell contains 86,400 buckets, one for each second of the day. For each channel this is a count of the number of set-top boxes tuned to that channel during this second of the day.

FIG. 18A

| | 3800 | 3802 NAME | 3804 TYPE | 3806 SIZE | 3808 DESCRIPTION |
|---|---|---|---|---|---|
| 3810~ | | CHAN~SOD~MARKET | CHAR | 4 | For channel second-of-day summary, identifier of market code in cable company's network hierarchy in which the tuning activity occurred. |
| 3820~ | | CHAN~SOD~SERVICE~GROUP | CHAR | 6 | For channel second-of-day summary, identifier of service group in cable company's network hierarchy in which the tuning activity occurred. |
| 3830~ | | CHAN~SOD~HUB | CHAR | 4 | For channel second-of-day summary, identifier of hub in cable company's network hierarchy in which the tuning activity occurred. |
| 3840~ | | CHAN~SOD~HEADEND | CHAR | 4 | For channel second-of-day summary, identifier of headend in cable company's network hierarchy in which the tuning activity occurred. |
| 3850~ | | CHAN~SOD~SUMMARY~STATS~PER~SECOND<br>The following fields OCCUR 86400 TIMES, once for each second of the day. | | | |
| 3860~ | These fields occur 86400 times. | BY~SEC~CHAN~VIEWED~COUNT | NUMBER | 5 | For channel second-of-day summary, by second, channel viewed count is for each second of the day, a count of the number of channels that had viewing activity of at least one STB tuned to the channel. |
| 3870~ | | BY~SEC~NO~CHAN~VIEWED~COUNT | NUMBER | 5 | For channel second-of-day summary, by second, no channel viewed count is for each second of the day, count the number of channels that had no viewing activity. |
| 3880~ | | BY~SEC~AGG~CHAN~VIEWED~COUNT | NUMBER | 5 | For channel second-of-day summary, by second, aggregate channel viewed count is for each second of the day, count the number of different set-top boxes that were tuned to all the channels combined. |

FIG. 18A Continued

| | | | | | |
|---|---|---|---|---|---|
| 3890~ | These fields occur 86400 times. | BY-SEC-BANDWIDTH-REQD-QUANTITY | NUMBER | 9(5) v99 | For channel second-of-day summary, by second of the day, bandwidth required quantity is for each second of the day, a count of the amount of bandwidth required to service the channels being viewed, with bandwidth measured in megabits per second. |
| 3900~ | | BY-SEC-SDV-CHAN-VIEWED-COUNT | NUMBER | 5 | For channel second-of-day summary, by second, SDV channel viewed count is for each second of the day, a count of the number of Switched Digital Video channels that had viewing activity. |
| 3910~ | | BY-SEC-BCAST-CHAN-VIEWED-COUNT | NUMBER | 5 | For channel second-of-day summary, by second, Broadcast channel viewed count is for each second of the day, a count of the number of Broadcast channels that had viewing activity. |
| 3920~ | | BY-SEC-STD-DEF-CHAN-VIEWED-CNT | NUMBER | 5 | For channel second-of-day summary, by second, Standard Definition channel viewed count is for each second of the day, a count of the number of Standard Definition channels that had viewing activity. |
| 3930~ | | BY-SEC-HIGH-DEF-CHAN-VIEW-CNT | NUMBER | 5 | For channel second-of-day summary, by second, High Definition channel viewed count is for each second of the day, a count of the number of High Definition channels that had viewing activity. |
| 3940~ | | TUNE-INS-PER-SECOND-COUNT | NUMBER | 5 | For channel second-of-day summary, tune-ins per second count is the number of tune-in's that occurred in this market + service group + hub + headend combination. |

FIG. 18B

| | 3800 | 3802 | 3803 | 3805 |
|---|---|---|---|---|
| | | NAME | Row 1 | Row 2 |
| 3810~ | | CHAN~SOD~MARKET | DENV | BOST |
| 3820~ | | CHAN~SOD~SERVICE~GROUP | SG-01 | SG-05 |
| 3830~ | | CHAN~SOD~HUB | HUB1 | HUB2 |
| 3840~ | | CHAN~SOD~HEADEND | HE01 | HE02 |
| 3850~ | | CHAN~SOD~SUMMARY~STATS~PER~SECOND<br>The following fields OCCUR 86400 TIMES, once for each second of the day. | | |
| 3860~ | These fields occur 86400 times. | BY~SEC~CHAN~VIEWED~COUNT | ... 2 5 9 ... 7 ... 6 | ... 7 7 1 4 ... 10 ... |
| 3870~ | | BY~SEC~NO~CHAN~VIEWED~COUNT | ... 5 9 12 ... 14 ... 26 | ... 12 12 18 15 ... 9 ... |
| 3880~ | | BY~SEC~AGG~CHAN~VIEWED~COUNT | ... 9 15 85 ... 26 ... 34 | ... 22 15 1 6 ... 14 ... |
| 3890~ | | BY~SEC~BANDWIDTH~REQD~QUANTITY | ... 7.5 19 34 ... 49 ... 45 | ... 60 49 4 26 ... 83 ... |
| 3900~ | | BY~SEC~SDV~CHAN~VIEWED~COUNT | ... 0 1 2 ... 0 ... 1 | ... 2 1 1 2 ... 4 ... |
| 3910~ | | BY~SEC~BCAST~CHAN~VIEWED~COUNT | ... 2 4 7 ... 7 ... 5 | ... 5 6 0 2 ... 6 ... |
| 3920~ | | BY~SEC~STD~DEF~CHAN~VIEWED~CNT | ... 2 5 7 ... 5 ... 5 | ... 4 5 1 3 ... 6 ... |
| 3930~ | | BY~SEC~HIGH~DEF~CHAN~VIEW~CNT | ... 0 0 2 ... 2 ... 1 | ... 3 2 0 1 ... 4 ... |
| 3940~ | | TUNE~INS~PER~SECOND~COUNT | ... 1 3 4 ... 3 ... 1 | ... 1 0 1 2 ... 2 ... |

FIG. 19A

| | 4202 NAME | 4204 TYPE | 4206 SIZE | 4208 DESCRIPTION |
|---|---|---|---|---|
| 4210~ | CHAN~CDS~MARKET | CHAR | 4 | For channel daily summary, identifier of market code in cable company's network hierarchy in which the tuning activity occurred. |
| 4220~ | CHAN~CDS~SERVICE~GROUP | CHAR | 6 | For channel daily summary, identifier of service group in cable company's network hierarchy in which the tuning activity occurred. |
| 4230~ | CHAN~CDS~HUB | CHAR | 4 | For channel daily summary, identifier of hub in cable company's network hierarchy in which the tuning activity occurred. |
| 4240~ | CHAN~CDS~HEADEND | CHAR | 4 | For channel daily summary, identifier of headend in cable company's network hierarchy in which the tuning activity occurred. |
| 4250~ | PEAK~DURATION~AND~PEAK~WINDOW | | | |
| 4260~ | PEAK~PERIOD~DURATION~IN~SECONDS | NUMBER | 5 | For channel daily summary, peak period duration in seconds records the duration of the peak period in seconds. This is a user chosen value such as 30 minutes which would be 1800 seconds. |
| 4270~ | PEAK~PERIOD~MOST~CHAN~VIEW~BEG~SEC | NUMBER | 5 | For channel daily summary, peak period (measured in) most channels viewed beginning second records the second which marks the beginning of the peak viewing window when peak is based on largest number of channels viewed. |
| 4280~ | PEAK~PERIOD~MOST~CHAN~VIEW~END~SEC | NUMBER | 5 | For channel daily summary, peak period (measured in) most channels viewed ending second records the second which marks the ending of the peak viewing window when peak is based on largest number of channels viewed. |
| 4290~ | PEAK~PERIOD~MOST~STB~ACTIV~BEG~SEC | NUMBER | 9(5) v99 | For channel daily summary, peak period (measured in) most set-top boxes active beginning second records the second which marks the beginning of the peak viewing window when peak is based on largest number of active set-top boxes. |

FIG. 19A Continued

| | | | | |
|---|---|---|---|---|
| 4300~ | PEAK~PERIOD~MOST~STB~ACTIV~END~SEC | NUMBER | S | For channel daily summary, peak period (measured in) most set-top boxes active ending second records the second which marks the ending of the peak viewing window when peak is based on largest number of active set-top boxes. |
| 4310~ | NETWORK~DEMAND~PEAK~FIELD | | | |
| 4320~ | PEAK~USAGE~IN~MBITS~PER~SEC | NUMBER | S | For channel daily summary, peak usage in megabits per second is the highest bandwidth usage in megabits per second that was recorded during the day. |
| 4330~ | PEAK~USAGE~SECOND~IN~MBITS~PER | NUMBER | S | For channel daily summary, peak usage second in megabits per records the second of the day when bandwidth usage measured in megabits per second was highest. |
| 4340~ | PCT~OF~PEAK~TO~BE~NEAR~THRESHOLD | NUMBER | S | For channel daily summary, percent of peak to be near threshold is a system defined variable. It allows the analyst to specify a percentage of the peak usage that is considered to be near the threshold of system capacity. |
| 4350~ | NEAR~PEAK~THRESHOLD~IN~MBITS~PER | NUMBER | S | For channel daily summary, near peak threshold in megabits per second is the threshold value that is used to determine whether the network usage during any particular second is near the peak. |
| 4360~ | COUNT~OF~SEC~MBITS~NEAR~PEAK | NUMBER | S | For channel daily summary, count of seconds megabit near peak is a count of the number of seconds in the day when the megabits per second needed to deliver the channels being viewed is near the peak where peak is calculated as being within x percent of the peak usage for the day, measured in megabits per second. |
| 4370~ | PCT~OF~DAY~MBITS~NEAR~PEAK | NUMBER | S | For channel daily summary, percent of day megabits near peak is a calculated value that tells the percentage of the day that the bandwidth usage in megabits per second is near the peak. |

FIG. 19A Continued

| | | | | |
|---|---|---|---|---|
| 4380~ | MAX~TUNE~IN~FIELDS | | | |
| 4390~ | MAX~TUNE~INS~PER~SECOND | NUMBER | 5 | For channel daily summary, maximum tune-in's per second measures the number of tune-in events on the busiest second of the day when busy is measured by number of tune-in's. |
| 4400~ | MAX~TUNE~INS~SEC~OF~DAY | NUMBER | 5 | For channel daily summary, maximum tune-in's second of the day records the second of the day during which the maximum number of tune-in's occurred. |
| 4410~ | VIEWING~DEMAND~PEAK~FIELDS | | | |
| 4420~ | PEAK~USAGE~BY~CHAN~VIEWED~CNT | NUMBER | 5 | For channel daily summary, peak usage by channel viewed count measures the number of different channels being viewed on the busiest second of the day when busy is measured by number of channels viewed. |
| 4430~ | PEAK~USAGE~SECOND~BY~CHAN~VIEW | NUMBER | 5 | For channel daily summary, peak usage second (of the day) by channels being viewed records second of the day during which the maximum number of channels are being viewed. |
| 4440~ | PEAK~USAGE~BY~STB~VIEWING~CNT | NUMBER | 5 | For channel daily summary, peak usage by STB viewing count measures the number of different set-top boxes tuned to the system during the busiest second of the day when busy is measured by number of active set-top boxes tuned to the system. |
| 4450~ | PEAK~USAGE~SECOND~BY~STB~VIEW | NUMBER | 5 | For channel daily summary, peak usage second (of the day) by set-top boxes being viewed records the second of the day during which the maximum number of different set-top boxes are tuned to the system. |
| 4460~ | AGG~STB~VIEW~AT~PEAK~SEC~OFDAY | NUMBER | 5 | For channel daily summary, aggregate seconds viewed at the peak second of the day measures how many different STB's were tuned to all the channels combined during the peak second of the day when peak is measured by STB count. |

FIG. 19B

| | 4202 | 4203 | 4205 |
|---|---|---|---|
| | NAME | Row 1 | Row 2 |
| 4210~ | CHAN~CDS~MARKET | DENV | BOST |
| 4220~ | CHAN~CDS~SERVICE~GROUP | SG-01 | SG-05 |
| 4230~ | CHAN~CDS~HUB | HUB1 | HUB2 |
| 4240~ | CHAN~CDS~HEADEND | HE01 | HE02 |
| 4260~ | PEAK~PERIOD~DURATION~IN~SECONDS | 1800 | 1800 |
| 4270~ | PEAK~PERIOD~MOST~CHAN~VIEW~BEG~SEC | 77400 | 71100 |
| 4280~ | PEAK~PERIOD~MOST~CHAN~VIEW~END~SEC | 79200 | 72900 |
| 4290~ | PEAK~PERIOD~MOST~STB~ACTIV~BEG~SEC | 57600 | 24300 |
| 4300~ | PEAK~PERIOD~MOST~STB~ACTIV~END~SEC | 59400 | 26100 |
| 4320~ | PEAK~USAGE~IN~MBITS~PER~SEC | 124 | 105 |
| 4330~ | PEAK~USAGE~SECOND~IN~MBITS~PER | 78500 | 25504 |
| 4340~ | PCT~OF~PEAK~TO~BE~NEAR~THRESHOLD | 90 | 90 |
| 4350~ | NEAR~PEAK~THRESHOLD~IN~MBITS~PER | 112 | 95 |
| 4360~ | COUNT~OF~SEC~MBITS~NEAR~PEAK | 452 | 385 |
| 4370~ | PCT~OF~DAY~MBITS~NEAR~PEAK | 1 | 1 |
| 4390~ | MAX~TUNE~INS~PER~SECOND | 22 | 26 |
| 4400~ | MAX~TUNE~INS~SEC~OF~DAY | 58455 | 25385 |
| 4420~ | PEAK~USAGE~BY~CHAN~VIEWED~CNT | 78302 | 71585 |
| 4430~ | PEAK~USAGE~SECOND~BY~CHAN~VIEW | 58500 | 58500 |
| 4440~ | PEAK~USAGE~BY~STB~VIEWING~CNT | 28 | 31 |
| 4450~ | PEAK~USAGE~SECOND~BY~STB~VIEW | 58651 | 70200 |
| 4460~ | AGG~STB~VIEW~AT~PEAK~SEC~OFDAY | 54 | 48 |

FIG. 20A

| | 4800 | 4802 NAME | 4804 TYPE | 4806 SIZE | 4808 DESCRIPTION |
|---|---|---|---|---|---|
| 4810~ | These fields occur 100 times. | DEMO~VD~MARKET | CHAR | 4 | For demographic viewing detail, identifier of market code in cable company's network hierarchy in which the tuning activity occurred. |
| 4820~ | | DEMO~VD~SERVICE~GROUP | CHAR | 6 | For demographic viewing detail, identifier of service group in cable company's network hierarchy in which the tuning activity occurred. |
| 4830~ | | DEMO~VD~HUB | CHAR | 4 | For demographic viewing detail, identifier of hub in cable company's network hierarchy in which the tuning activity occurred. |
| 4840~ | | DEMO~VD~HEADEND | CHAR | 4 | For demographic viewing detail, identifier of headend in cable company's network hierarchy in which the tuning activity occurred. |
| 4850~ | | DEMO~VD~DEMOGRAPHIC~CAT~1 | CHAR | 6 | For demographic viewing detail, specifies the first demographic category as provided by the data provider. Example: An income range. |
| 4860~ | | DEMO~VD~DEMOGRAPHIC~CAT~2 | CHAR | 6 | For demographic viewing detail, specifies the second demographic category as provided by the data provider. Example: A marital status code. |
| 4870~ | | DEMO~VD~VIEWING~STATISTICS | | | |
| 4880~ | | DEMO~VIEWING~SECONDS | NUMBER | 5 | Demographic viewing seconds measures at a demographic level the number of seconds during the day that at least one set-top box having this demographic was tuned-in. |
| 4890~ | | DEMO~NON~VIEWING~SECONDS | NUMBER | 5 | Demographic non-viewing seconds measures at a demographic level the number of seconds during the day that no set-top box having this demographic was tuned-in. |
| 4900~ | | DEMO~ONE~STB~VIEWING~SECONDS | NUMBER | 5 | Demographic one STB viewing seconds measures at a demographic level the number of seconds during the day that only one set-top box having this demographic was tuned-in. |

FIG. 20A Continued

| | | | | | |
|---|---|---|---|---|---|
| 4910~ | These fields occur 100 times. | AGG~DEMO~VIEWING~SECONDS | NUMBER | 9 | Aggregate demographic viewing seconds measures at a demographic level the number of total viewing seconds during the day that STB's having this demographic were tuned-in. |
| 4920~ | | PCT~OF~DAY~ONLY~ONE~STB~VIEWG~DEMO | NUMBER | 999 | Percent of the day when only one STB having this demographic is tuned-in (viewing television) is calculated as Demo-one-STB-Viewing-seconds / seconds-in-day. |
| 4930~ | | PCT~OF~DAY~NO~STB~VIEWING~DEMO | NUMBER | 999 | Percent of the day when no STB having this demographic is tuned-in (viewing television) is calculated as Demo-Non-Viewing-seconds / seconds-in-day. |
| 4940~ | | PCT~OF~DAY~VIEWING~DEMO | NUMBER | 999 | Percent of the day when this demographic is viewing television is is calculated as Demo-Viewing-seconds / seconds-in-day. |
| 4950~ | | DEMO~VD~PEAK~VIEW~THIS~DEMO~STATS | | | |
| 4960~ | | PEAK~VIEWING~COUNT~FOR~DEMO | NUMBER | 5 | Peak viewing count for demo measures how many STB's from this demographic are tuned-in during its peak viewing second. |
| 4970~ | | PEAK~VIEWING~SECOND~FOR~DEMO | NUMBER | 5 | Peak viewing second for demographic measures the second of the day when the most STB's having this demographic are tuned-in. |
| 4980~ | | AGG~VIEWING~AT~THIS~DEMO~PEAK | NUMBER | 5 | Aggregate demographic viewing at this demographic's peak measures how much aggregate viewing is happening when this demographic is at its peak. |
| 4990~ | | PCT~OF~PEAK~VIEW~BY~THIS~DEMOPEAK | NUMBER | 999 | Percent of peak viewership by this demographic's peak measures what part of the total viewing audience is from this demographic during this demographic's peak viewing period. |

FIG. 20A Continued

| | | | | | |
|---|---|---|---|---|---|
| 5000~ | These fields occur 100 times. | DEMO~VD~PEAK~VIEW~DEMO~VS~ALL | | | |
| 5010~ | | PCT~OF~PEAK~VIEW~BY~STB~VIEWNG | NUMBER | 999 | Percent of peak viewership measures what part of the viewing audience is from this demographic during the peak viewing second for all the demographic groups when peak second is the most active second based on all the STB's viewing. |
| 5020~ | | DEMO~VIEWED~DURING~PEAK~FLAG | CHAR | 1 | Demographic viewed during peak flag identifies the demographic segments that were viewing during the peak second of the day when peak second is the most active second based on all the STB's viewing. |
| 5030~ | | PEAK~PERIOD~DURATION~IN~SECONDS | NUMBER | 5 | Peak duration in seconds is an input variable that is used to specify the length of the peak viewing period. For example, 30 minutes would be 1,800 seconds. |
| 5040~ | | DEMO~VIEWED~SECS~DURING~PEAK | NUMBER | 5 | Demographic viewed seconds during peak identifies the number of seconds during the peak viewing window that at least one STB having this demographic was tuned-in. |
| 5050~ | | AGG~DEMO~VIEWED~SECS~DURING~PEAK | NUMBER | 9 | Aggregate Demographic viewed seconds during peak identifies the number of aggregate viewing seconds captured by STB's having this demographic, during the peak viewing window. |
| 5060~ | | PCT~OF~PEAK~PERIOD~DEMO~VIEWED | NUMBER | 999 | Percent of time the demographic was viewed during peak period measures how much of the time during the peak viewing window that at least one STB having this demographic was tuned-in. |
| 5070~ | | DEMO~STB~VIEWED~COUNT<br>OCCURS 86400 TIMES | NUMBER | 7 | For each demographic combination in the demographic viewing detail, this is a count of how many STB's having this demographic were tuned in during this second of the day. There are 86,400 buckets to represent each second of the day. |

FIG. 20B 4800 4802 4803 4805

| | NAME | Row 1 | Row 2 |
|---|---|---|---|
| 4810 | DEMO-VD-MARKET | DENV | BOST |
| 4820 | DEMO-VD-SERVICE-GROUP | SG-01 | SG-05 |
| 4830 | DEMO-VD-HUB | HUB1 | HUB2 |
| 4840 | DEMO-VD-HEADEND | HE01 | HE02 |
| 4850 | DEMO-VD-DEMOGRAPHIC-CAT-1 | ADULT | TEEN |
| 4860 | DEMO-VD-DEMOGRAPHIC-CAT-2 | MID | WHITE |
| 4880 | DEMO-VIEWING-SECONDS | 25226 | 50400 |
| 4890 | DEMO-NON-VIEWING-SECONDS | 61174 | 36000 |
| 4900 | DEMO-ONE-STB-VIEWING-SECONDS | 9436 | 2988 |
| 4910 | AGG-DEMO-VIEWING-SECONDS | 151336 | 352800 |
| 4920 | PCT-OF-DAY-ONLY-ONE-STB-VIEWG-DEMO | 11 | 3 |
| 4930 | PCT-OF-DAY-NO-STB-VIEWING-DEMO | 71 | 4 |
| 4940 | PCT-OF-DAY-VIEWING-DEMO | 29 | 58 |
| 4960 | PEAK-VIEWING-COUNT-FOR-DEMO | 12 | 15 |
| 4970 | PEAK-VIEWING-SECOND-FOR-DEMO | 65226 | 58365 |
| 4980 | AGG-VIEWING-AT-THIS-DEMO-PEAK | 26 | 31 |
| 4990 | PCT-OF-PEAK-VIEW-BY-THIS-DEMOPEAK | 46 | 48 |
| 5010 | PCT-OF-PEAK-VIEW-BY-STB-VIEWNG | 37 | 41 |
| 5020 | DEMO-VIEWED-DURING-PEAK-FLAG | Y | Y |
| 5030 | PEAK-PERIOD-DURATION-IN-SECONDS | 1800 | 1800 |
| 5040 | DEMO-VIEWED-SECS-DURING-PEAK | 1798 | 1800 |
| 5050 | AGG-DEMO-VIEWED-SECS-DURING-PEAK | 43200 | 48600 |
| 5060 | PCT-OF-PEAK-PERIOD-DEMO-VIEWED | 100 | 100 |
| 5070 | DEMO-STB-VIEWED-COUNT OCCURS 86400 TIMES See Note 1 below | ... 4 5 7 ... 26 25 ... ... 8 9 11 ... 31 ... 28<br>17 ... 18 19 ... 8 7 ... 27 ... 19 17 ... 11 9 ... | |

These fields occur 100 times.

FIG. 21A

| | 5200 | 5202 NAME | 5204 TYPE | 5206 SIZE | 5208 DESCRIPTION |
|---|---|---|---|---|---|
| 5210~ | These fields occur 100 times. | PROG-VD-MARKET | CHAR | 4 | For program attribute viewing detail, identifier of market code in cable company's network hierarchy in which the tuning activity occurred. |
| 5220~ | | PROG-VD-SERVICE-GROUP | CHAR | 6 | For program attribute viewing detail, identifier of service group in cable company's network hierarchy in which the tuning activity occurred. |
| 5230~ | | PROG-VD-HUB | CHAR | 4 | For program attribute viewing detail, identifier of hub in cable company's network hierarchy in which the tuning activity occurred. |
| 5240~ | | PROG-VD-HEADEND | CHAR | 4 | For program attribute viewing detail, identifier of headend in cable company's network hierarchy in which the tuning activity occurred. |
| 5250~ | | PROG-VD-PROGRAM-ATTRIBUTE-1 | CHAR | 6 | For program attribute viewing detail, specifies the first program attribute as provided by the data provider. Example: NEWS. |
| 5260~ | | PROG-VD-PROGRAM-ATTRIBUTE-2 | CHAR | 6 | For program attribute viewing detail, specifies the second program attribute as provided by the data provider. Example: G. |
| 5270~ | | PROG-VD-VIEWING-STATISTICS | | | |
| 5280~ | | PROG-VIEWING-SECONDS | NUMBER | 5 | Program viewing seconds measures at a program level the number of seconds during the day that at least one set-top box was tuned to a program having this program attribute. |
| 5290~ | | PROG-NON-VIEWING-SECONDS | NUMBER | 5 | Program non-viewing seconds measures at a program level the number of seconds during the day that no set-top box was tuned to a program having this program attribute. |

FIG. 21A Continued

| | | | | | |
|---|---|---|---|---|---|
| 5300~ | | PROG-ONE-STB-VIEWING-SECONDS | NUMBER | 5 | Program one STB viewing seconds measures at a program level the number of seconds during the day that only one set-top box was tuned to a program having this program attribute. |
| 5310~ | These fields occur 100 times. | AGG-PROG-VIEWING-SECONDS | NUMBER | 9 | Aggregate program viewing seconds measures at a program level the number of seconds during the day that programs having this program attribute were being viewed. |
| 5320~ | | PCT-OF-DAY-ONLY-ONE-STB-VIEWG-PROG | NUMBER | 999 | Percent of the day when only one STB is viewing programs having this program attribute is calculated as Prog-one-STB-Viewing-seconds / seconds-in-day. |
| 5340~ | | PCT-OF-DAY-NO-STB-VIEWING-PROG | NUMBER | 999 | Percent of the day when no STB is viewing programs having this program attribute is calculated as Prog-Non-Viewing-seconds / seconds-in-day. |
| 5350~ | | PCT-OF-DAY-VIEWING-PROG | NUMBER | 999 | Percent of the day viewing programs having this program attribute is calculated as Prog-Viewing-seconds / seconds-in-day. |
| 5360~ | | PROG-VD-PEAK-VIEW-THIS-PROG-STATS | | | |
| 5370~ | | PEAK-VIEWING-COUNT-FOR-PROG | NUMBER | 5 | Peak viewing count for program measures how many STB's from are tuned to programs having this program attribute during the program attributes's peak viewing second. |
| 5380~ | | PEAK-VIEWING-SECOND-FOR-PROG | NUMBER | 5 | Peak viewing second for program measures the second of the day when programs having this program attribute are viewed the most. |
| 5390~ | | AGG-VIEWING-AT-THIS-PROG-PEAK | NUMBER | 5 | Aggregate program attribute viewing at this program attributes's peak measures how much aggregate viewing is happening when this program attribute is at its peak. |
| 5400~ | | PCT-OF-PEAK-VIEW-BY-THIS-PROGPEAK | NUMBER | 999 | Percent of peak viewership by this program attributes's peak measures what part of the total active STB's were tuned to programs having this program attribute during this program attribute's peak viewing period. |

FIG. 21A Continued

| | | | | | |
|---|---|---|---|---|---|
| 5410~ | These fields occur 100 times. | PROG-VD-PEAK-VIEW-PROG-VS-ALL | | | |
| 5420~ | | PCT-OF-PEAK-VIEW-BY-STB-VIEWNG | NUMBER | 999 | Percent of peak viewership measures what part of the total active STB's were tuned to programs having this program attribute during the peak viewing period for all the programs when peak second is the most active second based on all the STB's viewing. |
| 5430~ | | PROG-VIEWED-DURING-PEAK-FLAG | CHAR | 1 | Program viewed during peak flag identifies the attributes of the programs to which the active STB's were tuned during the peak second of the day when peak second is the most active second based on all the STB's viewing. |
| 5440~ | | PEAK-PERIOD-DURATION-IN-SECONDS | NUMBER | 5 | Peak duration in seconds is an input variable that is used to specify the length of the peak viewing period. For example, 30 minutes would be 1,800 seconds. |
| 5450~ | | PROG-VIEWED-SECS-DURING-PEAK | NUMBER | 5 | Program viewed seconds during peak identifies the number of seconds during the peak viewing window that at least one STB was tuned to programs having this program attribute. |
| 5460~ | | AGG-PROG-VIEWED-SECS-DURING-PEAK | NUMBER | 9 | Aggregate program viewed seconds during peak identifies the number of aggregate viewing seconds from STB's tuned to programs having this program attribute during the peak viewing window. |
| 5470~ | | PCT-OF-PEAK-PERIOD-PROG-VIEWED | NUMBER | 999 | Percent of time the program attribute was viewed during peak period measures how much of the time during the peak viewing period that at least one STB was tuned to programs having this program attribute. |
| 5480~ | | PROG-STB-VIEWED-COUNT OCCURS 86400 TIMES | NUMBER | 7 | For each program attribute combination in the program viewing detail, this is a count of how many STB's viewing programs having this program attribute were tuned in during this second of the day. There are 86,400 buckets to represent each second of the day. |

FIG. 21B

| | 5200 | 5202 | 5203 | 5205 |
|---|---|---|---|---|
| | | NAME | Row 1 | Row 2 |
| 5210~ | These fields occur 100 times. | PROG~VD~MARKET | DENV | BOST |
| 5220~ | | PROG~VD~SERVICE~GROUP | SG-01 | SG-05 |
| 5230~ | | PROG~VD~HUB | HUB1 | HUB2 |
| 5240~ | | PROG~VD~HEADEND | HE01 | HE02 |
| 5250~ | | PROG~VD~PROGRAM~ATTRIBUTE~1 | NEWS | SPORT |
| 5260~ | | PROG~VD~PROGRAM~ATTRIBUTE~2 | G | G |
| 5280~ | | PROG~VIEWING~SECONDS | 29458 | 48732 |
| 5290~ | | PROG~NON~VIEWING~SECONDS | 55142 | 35868 |
| 5300~ | | PROG~ONE~STB~VIEWING~SECONDS | 7449 | 9456 |
| 5310~ | | AGG~PROG~VIEWING~SECONDS | 339851 | 452658 |
| 5320~ | | PCT~OF~DAY~ONLY~ONE~STB~VIEWG~PROG | 9 | 11 |
| 5340~ | | PCT~OF~DAY~NO~STB~VIEWING~PROG | 64 | 42 |
| 5350~ | | PCT~OF~DAY~VIEWING~PROG | 35 | 58 |
| 5370~ | | PEAK~VIEWING~COUNT~FOR~PROG | 32 | 43 |
| 5380~ | | PEAK~VIEWING~SECOND~FOR~PROG | 65213 | 66589 |
| 5390~ | | AGG~VIEWING~AT~THIS~PROG~PEAK | 47 | 51 |
| 5400~ | | PCT~OF~PEAK~VIEW~BY~THIS~PROGPEAK | 68 | 84 |
| 5420~ | | PCT~OF~PEAK~VIEW~BY~STB~VIEWNG | 56 | 72 |
| 5430~ | | PROG~VIEWED~DURING~PEAK~FLAG | Y | Y |
| 5440~ | | PEAK~PERIOD~DURATION~IN~SECONDS | 1800 | 1800 |
| 5450~ | | PROG~VIEWED~SECS~DURING~PEAK | 1800 | 1800 |
| 5460~ | | AGG~PROG~VIEWED~SECS~DURING~PEAK | 42152 | 68521 |
| 5470~ | | PCT~OF~PEAK~PERIOD~PROG~VIEWED | 100 | 100 |
| 5480~ | | PROG~STB~VIEWED~COUNT OCCURS 86400 TIMES | ... \| 5 \| 9 \| ... \| 22 \| 23 \| ... \| 47 | ... \| 3 \| 5 \| ... \| 18 \| 24 \| 26 \| ... |
| | | | ... \| 38 \| 33 \| ... \| 26 \| ... \| 8 \| ... | 19 \| ... \| 51 \| 50 \| 48 \| ... \| 21 \| ... |

FIG. 22A

| | 5602 | 5604 | 5606 | 5608 |
|---|---|---|---|---|
| | NAME | TYPE | SIZE | DESCRIPTION |
| 5609~ | TUNING~ACTIVITY~DATE | DATE | 8 | The date in which the tuning activity occurred in YYYYMMDD format. |
| 5610~ | STB~CVD~MARKET | CHAR | 4 | See corresponding field in Fig 15A. |
| 5620~ | STB~CVD~SERVICE~GROUP | CHAR | 6 | See corresponding field in Fig 15A. |
| 5630~ | STB~CVD~HUB | CHAR | 4 | See corresponding field in Fig 15A. |
| 5640~ | STB~CVD~HEADEND | CHAR | 4 | See corresponding field in Fig 15A. |
| 5650~ | STB~CVD~CHANNEL~CALL~SIGN | CHAR | 6 | See corresponding field in Fig 15A. |
| 5660~ | STB~CVD~CHANNEL~SOURCE~ID | NUMBER | 5 | See corresponding field in Fig 15A. |
| 5670~ | STB~CVD~STB~ID | CHAR | 20 | See corresponding field in Fig 15A. |
| 5680~ | STB~CVD~TUNER~INDEX | CHAR | 1 | See corresponding field in Fig 15A. |
| 5690~ | STB~CHANNEL~VIEWING~SECONDS | NUMBER | 5 | See corresponding field in Fig 15A. |
| 5700~ | STB~CHANNEL~TUNE~INS | NUMBER | 5 | See corresponding field in Fig 15A. |
| 5710~ | STB~CHAN~AVG~VIEWING~DURATION | NUMBER | 5 | See corresponding field in Fig 15A. |
| 5720~ | STB~CHAN~STAY~AWAY~SECS~TOTAL | NUMBER | 5 | See corresponding field in Fig 15A. |
| 5730~ | STB~CHAN~STAY~AWAY~TUNE~COUNT | NUMBER | 5 | See corresponding field in Fig 15A. |
| 5740~ | STB~CHAN~AVG~STAY~AWAY~SECS | NUMBER | 5 | See corresponding field in Fig 15A. |

FIG. 22B

| | 5602 | 5603 | 5605 |
|---|---|---|---|
| | NAME | Record 1 | Record 2 |
| 5609~ | TUNING~ACTIVITY~DATE | 20100601 | 20100601 |
| 5610~ | STB~CVD~MARKET | DENV | BOST |
| 5620~ | STB~CVD~SERVICE~GROUP | SG-01 | SG-05 |
| 5630~ | STB~CVD~HUB | HUB1 | HUB2 |
| 5640~ | STB~CVD~HEADEND | HE01 | HE02 |
| 5650~ | STB~CVD~CHANNEL~CALL~SIGN | FOX | DISC |
| 5660~ | STB~CVD~CHANNEL~SOURCE~ID | 201 | 305 |
| 5670~ | STB~CVD~STB~ID | 00:01:02:03:04:05 | 00:A8:02:CD:04:EF |
| 5680~ | STB~CVD~TUNER~INDEX | 0 | 1 |
| 5690~ | STB~CHANNEL~VIEWING~SECONDS | 7652 | 15429 |
| 5700~ | STB~CHANNEL~TUNE~INS | 12 | 48 |
| 5710~ | STB~CHAN~AVG~VIEWING~DURATION | 638 | 321 |
| 5720~ | STB~CHAN~STAY~AWAY~SECS~TOTAL | 106 | 658 |
| 5730~ | STB~CHAN~STAY~AWAY~TUNE~COUNT | 2 | 8 |
| 5740~ | STB~CHAN~AVG~STAY~AWAY~SECS | 53 | 82 |

FIG 23-A

| | 5802 NAME | 5804 TYPE | 5806 SIZE | 5808 DESCRIPTION |
|---|---|---|---|---|
| 5809~ | TUNING~ACTIVITY~DATE | DATE | 8 | The date in which the tuning activity occurred in YYYYMMDD format. |
| 5810~ | STB~VD~MARKET | CHAR | 4 | See corresponding field in Fig 16A. |
| 5820~ | STB~VD~SERVICE~GROUP | CHAR | 6 | See corresponding field in Fig 16A. |
| 5830~ | STB~VD~HUB | CHAR | 4 | See corresponding field in Fig 16A. |
| 5840~ | STB~VD~HEADEND | CHAR | 4 | See corresponding field in Fig 16A. |
| 5850~ | STB~VD~STB~ID | CHAR | 20 | See corresponding field in Fig 16A. |
| 5860~ | STB~VD~TUNER~INDEX | CHAR | 1 | See corresponding field in Fig 16A. |
| 5870~ | STB~VIEWING~SECONDS | NUMBER | 5 | See corresponding field in Fig 16A. |
| 5880~ | STB~TUNE~INS | NUMBER | 5 | See corresponding field in Fig 16A. |
| 5890~ | STB~AVERAGE~VIEWING~DURATION | NUMBER | 5 | See corresponding field in Fig 16A. |

FIG. 23B

| | 5802 NAME | 5803 Record 1 | 5805 Record 2 |
|---|---|---|---|
| 5809~ | TUNING~ACTIVITY~DATE | 20100601 | 20100601 |
| 5810~ | STB~VD~MARKET | DENV | BOST |
| 5820~ | STB~VD~SERVICE~GROUP | SG-01 | SG-05 |
| 5830~ | STB~VD~HUB | HUB1 | HUB2 |
| 5840~ | STB~VD~HEADEND | HE01 | HE02 |
| 5850~ | STB~VD~STB~ID | 00:01:02:03:04:05 | 00:AB:02:CD:04:EF |
| 5860~ | STB~VD~TUNER~INDEX | 0 | 1 |
| 5870~ | STB~VIEWING~SECONDS | 9582 | 14853 |
| 5880~ | STB~TUNE~INS | 22 | 36 |
| 5890~ | STB~AVERAGE~VIEWING~DURATION | 436 | 413 |

FIG. 24A

| | 6002 | 6004 | 6006 | 6008 |
|---|---|---|---|---|
| | NAME | TYPE | SIZE | DESCRIPTION |
| 6009~ | TUNING~ACTIVITY~DATE | DATE | 8 | The date in which the tuning activity occurred in YYYYMMDD format. |
| 6010~ | CHAN~VD~MARKET | CHAR | 4 | See corresponding field in Fig 17A. |
| 6020~ | CHAN~VD~SERVICE~GROUP | CHAR | 6 | See corresponding field in Fig 17A. |
| 6030~ | CHAN~VD~HUB | CHAR | 4 | See corresponding field in Fig 17A. |
| 6040~ | CHAN~VD~HEADEND | CHAR | 4 | See corresponding field in Fig 17A. |
| 6050~ | CHAN~VD~CHANNEL~CALL~SIGN | CHAR | 6 | See corresponding field in Fig 17A. |
| 6060~ | CHAN~VD~CHANNEL~SOURCE~ID | CHAR | 5 | See corresponding field in Fig 17A. |
| 6070~ | CHAN~BIT~RATE | NUMBER | 999V99 | See corresponding field in Fig 17A. |
| 6080~ | SDV~OR~BROADCAST~CODE | CHAR | 3 | See corresponding field in Fig 17A. |
| 6090~ | HIGH~DEF~OR~STD~DEF | CHAR | 2 | See corresponding field in Fig 17A. |
| 6100~ | CHANNEL~VIEWING~SECONDS | NUMBER | 5 | See corresponding field in Fig 17A. |
| 6110~ | CHANNEL~NON~VIEWING~SECONDS | NUMBER | 5 | See corresponding field in Fig 17A. |
| 6120~ | CHANNEL~ONE~STB~VIEWING~SECONDS | NUMBER | 5 | See corresponding field in Fig 17A. |
| 6130~ | AGG~CHANNEL~VIEWING~SECONDS | NUMBER | 9 | See corresponding field in Fig 17A. |
| 6140~ | PCT~OF~DAY~ONLY~ONE~STB~VIEWG~CHAN | NUMBER | 999 | See corresponding field in Fig 17A. |
| 6150~ | PCT~OF~DAY~NO~STB~VIEWING~CHANNEL | NUMBER | 999 | See corresponding field in Fig 17A. |
| 6160~ | PCT~OF~DAY~VIEWING~CHANNEL | NUMBER | 999 | See corresponding field in Fig 17A. |
| 6170~ | PEAK~VIEWING~COUNT~FOR~CHANNEL | NUMBER | 5 | See corresponding field in Fig 17A. |
| 6180~ | PEAK~VIEWING~SECOND~FOR~CHAN | NUMBER | 5 | See corresponding field in Fig 17A. |
| 6190~ | AGG~VIEWING~AT~THIS~CHAN~PEAK | NUMBER | 9 | See corresponding field in Fig 17A. |
| 6200~ | PCT~OF~PEAK~VIEW~BY~THIS~CHANPEAK | NUMBER | 999 | See corresponding field in Fig 17A. |
| 6210~ | PCT~OF~PEAK~VIEW~BY~STB~VIEWNG | NUMBER | 999 | See corresponding field in Fig 17A. |
| 6220~ | CHAN~VIEWED~DURING~PEAK~FLAG | CHAR | 1 | See corresponding field in Fig 17A. |
| 6230~ | PEAK~PERIOD~DURATION~IN~SECONDS | NUMBER | 5 | See corresponding field in Fig 17A. |
| 6240~ | CHAN~VIEWED~SECS~DURING~PEAK | NUMBER | 5 | See corresponding field in Fig 17A. |
| 6250~ | AGG~CHAN~VIEWED~SECS~DURING~PEAK | NUMBER | 9 | See corresponding field in Fig 17A. |
| 6260~ | PCT~OF~PEAK~PERIOD~CHAN~WAS~VIEWED | NUMBER | 999 | See corresponding field in Fig 17A. |

FIG. 24B

| | 6002 | 6003 | 6005 |
|---|---|---|---|
| | NAME | Record 1 | Record 2 |
| 6009~ | TUNING~ACTIVITY~DATE | 20100601 | 20100601 |
| 6010~ | CHAN~VD~MARKET | DENV | BOST |
| 6020~ | CHAN~VD~SERVICE~GROUP | SG-01 | SG-05 |
| 6030~ | CHAN~VD~HUB | HUB1 | HUB2 |
| 6040~ | CHAN~VD~HEADEND | HE01 | HE02 |
| 6050~ | CHAN~VD~CHANNEL~CALL~SIGN | FOX | DISC |
| 6060~ | CHAN~VD~CHANNEL~SOURCE~ID | 201 | 305 |
| 6070~ | CHAN~BIT~RATE | 3.75<br>Coded as 00375 | 15<br>Coded as 01500 |
| 6080~ | SDV~OR~BROADCAST~CODE | B | SDV |
| 6090~ | HIGH~DEF~OR~STD~DEF | SD | HD |
| 6100~ | CHANNEL~VIEWING~SECONDS | 32400 | 7200 |
| 6110~ | CHANNEL~NON~VIEWING~SECONDS | 54000 | 79200 |
| 6120~ | CHANNEL~ONE~STB~VIEWING~SECONDS | 4378 | 685 |
| 6130~ | AGG~CHANNEL~VIEWING~SECONDS | 225798 | 27007 |
| 6140~ | PCT~OF~DAY~ONLY~ONE~STB~VIEWG~CHAN | 5 | 1 |
| 6150~ | PCT~OF~DAY~NO~STB~VIEWING~CHANNEL | 63 | 92 |
| 6160~ | PCT~OF~DAY~VIEWING~CHANNEL | 38 | 8 |
| 6170~ | PEAK~VIEWING~COUNT~FOR~CHANNEL | 12 | 3 |
| 6180~ | PEAK~VIEWING~SECOND~FOR~CHAN | 64800 | 69400 |
| 6190~ | AGG~VIEWING~AT~THIS~CHAN~PEAK | 29 | 32 |
| 6200~ | PCT~OF~PEAK~VIEW~BY~THIS~CHANPEAK | 33 | 25 |
| 6210~ | PCT~OF~PEAK~VIEW~BY~STB~VIEWNG | 27 | 23 |
| 6220~ | CHAN~VIEWED~DURING~PEAK~FLAG | Y | N |
| 6230~ | PEAK~PERIOD~DURATION~IN~SECONDS | 1800 | 1800 |
| 6240~ | CHAN~VIEWED~SECS~DURING~PEAK | 1800 | 0 |
| 6250~ | AGG~CHAN~VIEWED~SECS~DURING~PEAK | 39600 | 0 |
| 6260~ | PCT~OF~PEAK~PERIOD~CHAN~WAS~VIEWED | 100 | 0 |

FIG. 25A

| | 6402 | 6404 | 6406 | 6408 |
|---|---|---|---|---|
| | NAME | TYPE | SIZE | DESCRIPTION |
| 6409~ | TUNING~ACTIVITY~DATE | DATE | 8 | The date in which the tuning activity occurred in YYYYMMDD format. |
| 6410~ | CHAN~SOD~MARKET | CHAR | 4 | See corresponding field in Fig 18A. |
| 6420~ | CHAN~SOD~SERVICE~GROUP | CHAR | 6 | See corresponding field in Fig 18A. |
| 6430~ | CHAN~SOD~HUB | CHAR | 4 | See corresponding field in Fig 18A. |
| 6440~ | CHAN~SOD~HEADEND | CHAR | 4 | See corresponding field in Fig 18A. |
| 6448~ | SECOND~OF~DAY | NUMBER | 5 | The second of the day in which the tuning activity occurred. |
| 6460~ | BY~SEC~CHAN~VIEWED~COUNT | NUMBER | 5 | See corresponding field in Fig 18A. |
| 6470~ | BY~SEC~NO~CHAN~VIEWED~COUNT | NUMBER | 5 | See corresponding field in Fig 18A. |
| 6480~ | BY~SEC~AGG~CHAN~VIEWED~COUNT | NUMBER | 5 | See corresponding field in Fig 18A. |
| 6490~ | BY~SEC~BANDWIDTH~REQD~QUANTITY | NUMBER | 9(5) v99 | See corresponding field in Fig 18A. |
| 6500~ | BY~SEC~SDV~CHAN~VIEWED~COUNT | NUMBER | 5 | See corresponding field in Fig 18A. |
| 6510~ | BY~SEC~BCAST~CHAN~VIEWED~COUNT | NUMBER | 5 | See corresponding field in Fig 18A. |
| 6520~ | BY~SEC~STD~DEF~CHAN~VIEWED~CNT | NUMBER | 5 | See corresponding field in Fig 18A. |
| 6530~ | BY~SEC~HIGH~DEF~CHAN~VIEW~CNT | NUMBER | 5 | See corresponding field in Fig 18A. |
| 6540~ | TUNE~INS~PER~SECOND~COUNT | NUMBER | 5 | See corresponding field in Fig 18A. |

FIG. 25B

| | 6402 | 6403 | 6405 |
|---|---|---|---|
| | NAME | Record 1 | Record 2 |
| 6409~ | TUNING~ACTIVITY~DATE | 20100601 | 20100601 |
| 6410~ | CHAN~SOD~MARKET | DENV | BOST |
| 6420~ | CHAN~SOD~SERVICE~GROUP | SG-01 | SG-05 |
| 6430~ | CHAN~SOD~HUB | HUB1 | HUB2 |
| 6440~ | CHAN~SOD~HEADEND | HE01 | HE02 |
| 6448~ | SECOND~OF~DAY | 68452 | 68452 |
| 6460~ | BY~SEC~CHAN~VIEWED~COUNT | 9 | 7 |
| 6470~ | BY~SEC~NO~CHAN~VIEWED~COUNT | 12 | 12 |
| 6480~ | BY~SEC~AGG~CHAN~VIEWED~COUNT | 85 | 15 |
| 6490~ | BY~SEC~BANDWIDTH~REQD~QUANTITY | 34 | 49 |
| 6500~ | BY~SEC~SDV~CHAN~VIEWED~COUNT | 2 | 1 |
| 6510~ | BY~SEC~BCAST~CHAN~VIEWED~COUNT | 7 | 6 |
| 6520~ | BY~SEC~STD~DEF~CHAN~VIEWED~CNT | 7 | 5 |
| 6530~ | BY~SEC~HIGH~DEF~CHAN~VIEW~CNT | 2 | 2 |
| 6540~ | TUNE~INS~PER~SECOND~COUNT | 4 | 0 |

FIG. 26A

| | 6602 | 6604 | 6606 | 6608 |
|---|---|---|---|---|
| | NAME | TYPE | SIZE | DESCRIPTION |
| 6609~ | TUNING~ACTIVITY~DATE | DATE | 8 | The date in which the tuning activity occurred in YYYYMMDD format. |
| 6610~ | CHAN~CDS~MARKET | CHAR | 4 | See corresponding field in Fig 19A. |
| 6620~ | CHAN~CDS~SERVICE~GROUP | CHAR | 6 | See corresponding field in Fig 19A. |
| 6630~ | CHAN~CDS~HUB | CHAR | 4 | See corresponding field in Fig 19A. |
| 6640~ | CHAN~CDS~HEADEND | CHAR | 4 | See corresponding field in Fig 19A. |
| 6650~ | PEAK~DURATION~AND~PEAK~WINDOW | | | |
| 6660~ | PEAK~PERIOD~DURATION~IN~SECONDS | NUMBER | 5 | See corresponding field in Fig 19A. |
| 6670~ | PEAK~PERIOD~MOST~CHAN~VIEW~BEG~SEC | NUMBER | 5 | See corresponding field in Fig 19A. |
| 6680~ | PEAK~PERIOD~MOST~CHAN~VIEW~END~SEC | NUMBER | 5 | See corresponding field in Fig 19A. |
| 6690~ | PEAK~PERIOD~MOST~STB~ACTIV~BEG~SEC | NUMBER | 9(5) v99 | See corresponding field in Fig 19A. |
| 6700~ | PEAK~PERIOD~MOST~STB~ACTIV~END~SEC | NUMBER | 5 | See corresponding field in Fig 19A. |
| 6710~ | NETWORK~DEMAND~PEAK~FIELD | | | |
| 6720~ | PEAK~USAGE~IN~MBITS~PER~SEC | NUMBER | 5 | See corresponding field in Fig 19A. |
| 6730~ | PEAK~USAGE~SECOND~IN~MBITS~PER | NUMBER | 5 | See corresponding field in Fig 19A. |
| 6740~ | PCT~OF~PEAK~TO~BE~NEAR~THRESHOLD | NUMBER | 5 | See corresponding field in Fig 19A. |
| 6750~ | NEAR~PEAK~THRESHOLD~IN~MBITS~PER | NUMBER | 5 | See corresponding field in Fig 19A. |
| 6760~ | COUNT~OF~SEC~MBITS~NEAR~PEAK | NUMBER | 5 | See corresponding field in Fig 19A. |
| 6770~ | PCT~OF~DAY~MBITS~NEAR~PEAK | NUMBER | 5 | See corresponding field in Fig 19A. |
| 6780~ | MAX~TUNE~IN~FIELDS | | | |
| 6790~ | MAX~TUNE~INS~PER~SECOND | NUMBER | 5 | See corresponding field in Fig 19A. |
| 6800~ | MAX~TUNE~INS~SEC~OF~DAY | NUMBER | 5 | See corresponding field in Fig 19A. |
| 6820~ | PEAK~USAGE~BY~CHAN~VIEWED~CNT | NUMBER | 5 | See corresponding field in Fig 19A. |
| 6830~ | PEAK~USAGE~SECOND~BY~CHAN~VIEW | NUMBER | 5 | See corresponding field in Fig 19A. |
| 6840~ | PEAK~USAGE~BY~STB~VIEWING~CNT | NUMBER | 5 | See corresponding field in Fig 19A. |
| 6850~ | PEAK~USAGE~SECOND~BY~STB~VIEW | NUMBER | 5 | See corresponding field in Fig 19A. |
| 6860~ | AGG~STB~VIEW~AT~PEAK~SEC~OFDAY | NUMBER | 5 | See corresponding field in Fig 19A. |

FIG. 26B

| | 6602 | 6603 | 6605 |
|---|---|---|---|
| | NAME | Record 1 | Record 2 |
| 6609~ | TUNING~ACTIVITY~DATE | 20100601 | 20100601 |
| 6610~ | CHAN~CDS~MARKET | DENV | BOST |
| 6620~ | CHAN~CDS~SERVICE~GROUP | SG-01 | SG-05 |
| 6630~ | CHAN~CDS~HUB | HUB1 | HUB2 |
| 6640~ | CHAN~CDS~HEADEND | HE01 | HE02 |
| 6660~ | PEAK~PERIOD~DURATION~IN~SECONDS | 1800 | 1800 |
| 6670~ | PEAK~PERIOD~MOST~CHAN~VIEW~BEG~SEC | 77400 | 71100 |
| 6680~ | PEAK~PERIOD~MOST~CHAN~VIEW~END~SEC | 79200 | 72900 |
| 6690~ | PEAK~PERIOD~MOST~STB~ACTIV~BEG~SEC | 57600 | 24300 |
| 6700~ | PEAK~PERIOD~MOST~STB~ACTIV~END~SEC | 59400 | 26100 |
| 6720~ | PEAK~USAGE~IN~MBITS~PER~SEC | 124 | 105 |
| 6730~ | PEAK~USAGE~SECOND~IN~MBITS~PER | 78500 | 25504 |
| 6740~ | PCT~OF~PEAK~TO~BE~NEAR~THRESHOLD | 90 | 90 |
| 6750~ | NEAR~PEAK~THRESHOLD~IN~MBITS~PER | 112 | 95 |
| 6760~ | COUNT~OF~SEC~MBITS~NEAR~PEAK | 452 | 385 |
| 6770~ | PCT~OF~DAY~MBITS~NEAR~PEAK | 1 | 1 |
| 6790~ | MAX~TUNE~INS~PER~SECOND | 22 | 26 |
| 6800~ | MAX~TUNE~INS~SEC~OF~DAY | 58455 | 25385 |
| 6820~ | PEAK~USAGE~BY~CHAN~VIEWED~CNT | 78302 | 71585 |
| 6830~ | PEAK~USAGE~SECOND~BY~CHAN~VIEW | 58500 | 58500 |
| 6840~ | PEAK~USAGE~BY~STB~VIEWING~CNT | 28 | 31 |
| 6850~ | PEAK~USAGE~SECOND~BY~STB~VIEW | 58651 | 70200 |
| 6860~ | AGG~STB~VIEW~AT~PEAK~SEC~OFDAY | 54 | 48 |

FIG. 27A

| | 7002 | 7004 | 7006 | 7008 |
|---|---|---|---|---|
| | NAME | TYPE | SIZE | DESCRIPTION |
| 7009~ | TUNING~ACTIVITY~DATE | DATE | 8 | The date in which the tuning activity occurred in YYYYMMDD format. |
| 7010~ | DEMO~VD~MARKET | CHAR | 4 | See corresponding field in Fig 20A. |
| 7020~ | DEMO~VD~SERVICE~GROUP | CHAR | 6 | See corresponding field in Fig 20A. |
| 7030~ | DEMO~VD~HUB | CHAR | 4 | See corresponding field in Fig 20A. |
| 7040~ | DEMO~VD~HEADEND | CHAR | 4 | See corresponding field in Fig 20A. |
| 7050~ | DEMO~VD~DEMOGRAPHIC~CAT~1 | CHAR | 6 | See corresponding field in Fig 20A. |
| 7060~ | DEMO~VD~DEMOGRAPHIC~CAT~2 | CHAR | 6 | See corresponding field in Fig 20A. |
| 7070~ | DEMO~VD~VIEWING~STATISTICS | | | |
| 7080~ | DEMO~VIEWING~SECONDS | NUMBER | 5 | See corresponding field in Fig 20A. |
| 7090~ | DEMO~NON~VIEWING~SECONDS | NUMBER | 5 | See corresponding field in Fig 20A. |
| 7100~ | DEMO~ONE~STB~VIEWING~SECONDS | NUMBER | 5 | See corresponding field in Fig 20A. |
| 7110~ | AGG~DEMO~VIEWING~SECONDS | NUMBER | 9 | See corresponding field in Fig 20A. |
| 7120~ | PCT~OF~DAY~ONLY~ONE~STB~VIEWG~DEMO | NUMBER | 999 | See corresponding field in Fig 20A. |
| 7130~ | PCT~OF~DAY~NO~STB~VIEWING~DEMO | NUMBER | 999 | See corresponding field in Fig 20A. |
| 7140~ | PCT~OF~DAY~VIEWING~DEMO | NUMBER | 999 | See corresponding field in Fig 20A. |
| 7160~ | PEAK~VIEWING~COUNT~FOR~DEMO | NUMBER | 5 | See corresponding field in Fig 20A. |
| 7170~ | PEAK~VIEWING~SECOND~FOR~DEMO | NUMBER | 5 | See corresponding field in Fig 20A. |
| 7180~ | AGG~VIEWING~AT~THIS~DEMO~PEAK | NUMBER | 5 | See corresponding field in Fig 20A. |
| 7190~ | PCT~OF~PEAK~VIEW~BY~THIS~DEMOPEAK | NUMBER | 999 | See corresponding field in Fig 20A. |
| 7210~ | PCT~OF~PEAK~VIEW~BY~STB~VIEWNG | NUMBER | 999 | See corresponding field in Fig 20A. |
| 7220~ | DEMO~VIEWED~DURING~PEAK~FLAG | CHAR | 1 | See corresponding field in Fig 20A. |
| 7230~ | PEAK~PERIOD~DURATION~IN~SECONDS | NUMBER | 5 | See corresponding field in Fig 20A. |
| 7240~ | DEMO~VIEWED~SECS~DURING~PEAK | NUMBER | 5 | See corresponding field in Fig 20A. |
| 7250~ | AGG~DEMO~VIEWED~SECS~DURING~PEAK | NUMBER | 9 | See corresponding field in Fig 20A. |
| 7260~ | PCT~OF~PEAK~PERIOD~DEMO~VIEWED | NUMBER | 999 | See corresponding field in Fig 20A. |

FIG. 27B

| | 7002 | 7003 | 7005 |
|---|---|---|---|
| | NAME | Record 1 | Record 2 |
| 7009~ | TUNING~ACTIVITY~DATE | 20100601 | 20100601 |
| 7010~ | DEMO~VD~MARKET | DENV | BOST |
| 7020~ | DEMO~VD~SERVICE~GROUP | SG-01 | SG-05 |
| 7030~ | DEMO~VD~HUB | HUB1 | HUB2 |
| 7040~ | DEMO~VD~HEADEND | HE01 | HE02 |
| 7050~ | DEMO~VD~DEMOGRAPHIC~CAT~1 | ADULT | TEEN |
| 7060~ | DEMO~VD~DEMOGRAPHIC~CAT~2 | MID | WHITE |
| 7080~ | DEMO~VIEWING~SECONDS | 25226 | 50400 |
| 7090~ | DEMO~NON~VIEWING~SECONDS | 61174 | 36000 |
| 7100~ | DEMO~ONE~STB~VIEWING~SECONDS | 9436 | 2988 |
| 7110~ | AGG~DEMO~VIEWING~SECONDS | 151336 | 352800 |
| 7120~ | PCT~OF~DAY~ONLY~ONE~STB~VIEWG~DEMO | 11 | 3 |
| 7130~ | PCT~OF~DAY~NO~STB~VIEWING~DEMO | 71 | 4 |
| 7140~ | PCT~OF~DAY~VIEWING~DEMO | 29 | 58 |
| 7160~ | PEAK~VIEWING~COUNT~FOR~DEMO | 12 | 15 |
| 7170~ | PEAK~VIEWING~SECOND~FOR~DEMO | 65226 | 58365 |
| 7180~ | AGG~VIEWING~AT~THIS~DEMO~PEAK | 28 | 31 |
| 7190~ | PCT~OF~PEAK~VIEW~BY~THIS~DEMOPEAK | 46 | 48 |
| 7210~ | PCT~OF~PEAK~VIEW~BY~STB~VIEWNG | 37 | 41 |
| 7220~ | DEMO~VIEWED~DURING~PEAK~FLAG | Y | Y |
| 7230~ | PEAK~PERIOD~DURATION~IN~SECONDS | 1800 | 1800 |
| 7240~ | DEMO~VIEWED~SECS~DURING~PEAK | 1758 | 1800 |
| 7250~ | AGG~DEMO~VIEWED~SECS~DURING~PEAK | 43200 | 48600 |
| 7260~ | PCT~OF~PEAK~PERIOD~DEMO~VIEWED | 100 | 100 |

FIG. 28A

| | 7402 NAME | 7404 TYPE | 7406 SIZE | 7408 DESCRIPTION |
|---|---|---|---|---|
| 7409~ | TUNING~ACTIVITY~DATE | DATE | 8 | The date in which the tuning activity occurred in YYYYMMDD format. |
| 7410~ | PROG~VD~MARKET | CHAR | 4 | See corresponding field in Fig 21A. |
| 7420~ | PROG~VD~SERVICE~GROUP | CHAR | 6 | See corresponding field in Fig 21A. |
| 7430~ | PROG~VD~HUB | CHAR | 4 | See corresponding field in Fig 21A. |
| 7440~ | PROG~VD~HEADEND | CHAR | 4 | See corresponding field in Fig 21A. |
| 7450~ | PROG~VD~PROGRAM~ATTRIBUTE~1 | CHAR | 6 | See corresponding field in Fig 21A. |
| 7460~ | PROG~VD~PROGRAM~ATTRIBUTE~2 | CHAR | 6 | See corresponding field in Fig 21A. |
| 7480~ | PROG~VIEWING~SECONDS | NUMBER | 5 | See corresponding field in Fig 21A. |
| 7490~ | PROG~NON~VIEWING~SECONDS | NUMBER | 5 | See corresponding field in Fig 21A. |
| 7500~ | PROG~ONE~STB~VIEWING~SECONDS | NUMBER | 5 | See corresponding field in Fig 21A. |
| 7510~ | AGG~PROG~VIEWING~SECONDS | NUMBER | 9 | See corresponding field in Fig 21A. |
| 7520~ | PCT~OF~DAY~ONLY~ONE~STB~VIEWG~PROG | NUMBER | 999 | See corresponding field in Fig 21A. |
| 7540~ | PCT~OF~DAY~NO~STB~VIEWING~PROG | NUMBER | 999 | See corresponding field in Fig 21A. |
| 7550~ | PCT~OF~DAY~VIEWING~PROG | NUMBER | 999 | See corresponding field in Fig 21A. |
| 7570~ | PEAK~VIEWING~COUNT~FOR~PROG | NUMBER | 5 | See corresponding field in Fig 21A. |
| 7580~ | PEAK~VIEWING~SECOND~FOR~PROG | NUMBER | 5 | See corresponding field in Fig 21A. |
| 7590~ | AGG~VIEWING~AT~THIS~PROG~PEAK | NUMBER | 5 | See corresponding field in Fig 21A. |
| 7600~ | PCT~OF~PEAK~VIEW~BY~THIS~PROGPEAK | NUMBER | 999 | See corresponding field in Fig 21A. |
| 7620~ | PCT~OF~PEAK~VIEW~BY~STB~VIEWNG | NUMBER | 999 | See corresponding field in Fig 21A. |
| 7630~ | PROG~VIEWED~DURING~PEAK~FLAG | CHAR | 1 | See corresponding field in Fig 21A. |
| 7640~ | PEAK~PERIOD~DURATION~IN~SECONDS | NUMBER | 5 | See corresponding field in Fig 21A. |
| 7650~ | PROG~VIEWED~SECS~DURING~PEAK | NUMBER | 5 | See corresponding field in Fig 21A. |
| 7660~ | AGG~PROG~VIEWED~SECS~DURING~PEAK | NUMBER | 9 | See corresponding field in Fig 21A. |
| 7670~ | PCT~OF~PEAK~PERIOD~PROG~VIEWED | NUMBER | 999 | See corresponding field in Fig 21A. |

FIG. 28B

| | 7402 | 7403 | 7405 |
|---|---|---|---|
| | NAME | Record 1 | Record 2 |
| 7009~ | TUNING~ACTIVITY~DATE | 20100601 | 20100601 |
| 7410~ | PROG~VD~MARKET | DENV | BOST |
| 7420~ | PROG~VD~SERVICE~GROUP | SG-01 | SG-05 |
| 7430~ | PROG~VD~HUB | HUB1 | HUB2 |
| 7440~ | PROG~VD~HEADEND | HE01 | HE02 |
| 7450~ | PROG~VD~PROGRAM~ATTRIBUTE~1 | NEWS | SPORT |
| 7460~ | PROG~VD~PROGRAM~ATTRIBUTE~2 | G | G |
| 7480~ | PROG~VIEWING~SECONDS | 29458 | 48732 |
| 7490~ | PROG~NON~VIEWING~SECONDS | 55142 | 35868 |
| 7500~ | PROG~ONE~STB~VIEWING~SECONDS | 7449 | 9456 |
| 7510~ | AGG~PROG~VIEWING~SECONDS | 339851 | 452658 |
| 7520~ | PCT~OF~DAY~ONLY~ONE~STB~VIEWG~PROG | 9 | 11 |
| 7540~ | PCT~OF~DAY~NO~STB~VIEWING~PROG | 64 | 42 |
| 7550~ | PCT~OF~DAY~VIEWING~PROG | 35 | 58 |
| 7570~ | PEAK~VIEWING~COUNT~FOR~PROG | 32 | 43 |
| 7580~ | PEAK~VIEWING~SECOND~FOR~PROG | 65213 | 66589 |
| 7590~ | AGG~VIEWING~AT~THIS~PROG~PEAK | 47 | 51 |
| 7600~ | PCT~OF~PEAK~VIEW~BY~THIS~PROGPEAK | 68 | 84 |
| 7620~ | PCT~OF~PEAK~VIEW~BY~STB~VIEWNG | 56 | 72 |
| 7630~ | PROG~VIEWED~DURING~PEAK~FLAG | Y | Y |
| 7640~ | PEAK~PERIOD~DURATION~IN~SECONDS | 1800 | 1800 |
| 7650~ | PROG~VIEWED~SECS~DURING~PEAK | 1800 | 1800 |
| 7660~ | AGG~PROG~VIEWED~SECS~DURING~PEAK | 42152 | 68521 |
| 7670~ | PCT~OF~PEAK~PERIOD~PROG~VIEWED | 100 | 100 |

SYSTEM AND METHOD FOR ANALYZING HUMAN INTERACTION WITH ELECTRONIC DEVICES THAT ACCESS A COMPUTER SYSTEM THROUGH A NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Program Listing

This patent submission contains eleven (11) program listings as shown in the table below. Each of the following program listings is incorporated in this Specification by reference.

| # | Name of the ASCII Text file | Date of Creation | Size in bytes |
|---|---|---|---|
| 1. | 122-Preprocess-Channel-Tune-File.txt | Dec. 28, 2010 | 28,366 |
| 2. | 140-ANALYTICS-ENGINE-Chan.txt | Dec. 28, 2010 | 79,623 |
| 3. | 140-ANALYTICS-ENGINE-Demo.txt | Dec. 28, 2010 | 55,692 |
| 4. | 140-ANALYTICS-ENGINE-Prog.txt | Dec. 28, 2010 | 55,743 |
| 5. | 140-ANALYTICS-ENGINE-STB.txt | Dec. 28, 2010 | 33,414 |
| 6. | 140-ANALYTICS-ENGINE-STB-Chan.txt | Dec. 28, 2010 | 37,189 |
| 7. | 514-SORT-FOR-STB+Chan.txt | Dec. 28, 2010 | 3,509 |
| 8. | 524-SORT-FOR-STB.txt | Dec. 28, 2010 | 3,171 |
| 9. | 534-SORT-FOR-Chan.txt | Dec. 28, 2010 | 3,102 |
| 10. | 544-SORT-FOR-Prog.txt | Dec. 28, 2010 | 3,111 |
| 11. | 554-SORT-FOR-Demo.txt | Dec. 28, 2010 | 3,104 |

BACKGROUND

Prior Art

The following is a tabulation of some prior art that presently appears relevant:

U.S. PATENTS

| U.S Pat. No. | Kind Code | Class | Issue Date | Patentee |
|---|---|---|---|---|
| 7,383,243 | A1 | 707/1 | Jun. 3, 2008 | Conkwright, et al. |
| 7,590,993 | | 725/35 | Sep. 15, 2009 | Hendricks, et al. |

U.S. PATENT APPLICATION PUBLICATIONS

| Publication Number | Kind Code | Class | Publication Date | Applicant |
|---|---|---|---|---|
| 20070074258 | A1 | 725/105 | Mar. 29, 2007 | Wood; Catherine Alexandra |
| 20080127252 | A1 | 725/34 | May 29, 2008 | Eldering; Charles A. |
| 20090077577 | A1 | 725/14 | Mar. 19, 2009 | Allegrezza; Fred J. |
| 20070214483 | A1 | 725/96 | Sep. 13, 2007 | Bou-Abboud; Claude H. |
| 20100145791 | A1 | 705/14.41 | Jun. 10, 2010 | Canning; Brian P.; et al. |

NONPATENT LITERATURE DOCUMENTS

Cisco Systems, Inc., "Channel Viewership Analyzer" http://www.cisco.com/en/US/prod/collateral/video/ps9119/ps9883/7016867.pdf IneoQuest Technologies, Inc., "Switched Digital Video Solutions" http://www.ineoquest.com/switched-digital-video-solutions Motorola, Inc. "Implementing Switched Digital Video Solutions" http://www.motorola.com/staticfiles/Business/Products/_Documents/_Static%20files/SDV%20Implementation%20Solutions%20paper%20-555998-001-a.pdf?localeId=33

Strickland, Jonathan. "How Switched Digital Video Works." 20 Nov. 2007. HowStuffWorks.com. <http://electronics.howstuffworks.com/switched-digital-video.htm>

STB Committee of the Council for Research Excellence. "The State Of Set-Top Box Viewing Data as of December 2009" http://researchexcellence.com/stbstudy.php

BACKGROUND OF THE INVENTION

General Statement of Problem

With the ever increasing levels of consumer interaction with electronic devices of all kinds, it is important for the providers of the systems with which the consumers are interacting to understand the patterns of consumer interaction/device usage.

Cable Television Industry Problem

In the cable television industry, consumer demand for additional viewing choices along with demand for high definition television has put increasing loads on network infrastructure. Cable television providers need tools that provide detailed information on how their customers consume their product. Cable television providers need to provide adequate network capacity to deliver a quality product to consumers.

Cellular Telephony Industry Problem

In the cellular telephony industry, consumer demand for additional communication options has put increasing loads on network infrastructure. Cell phone providers need detailed information on how customers use cell phones and other personal communication devices. Cell phone providers must provide adequate capacity to handle customer interactions of all types including cell phone calls, web browsing, email access, file downloading, gaming, and other activities. When cell tower capacity is exceeded it results in dropped calls, undesired termination of users sessions, and other problems.

Need for Information about the Customer

In addition to these issues, cable companies, cell phone companies, content providers, advertisers, and other interested parties are continually desiring to know more about the customers they serve, the patterns of customer interactions, the content customers find interesting or that keeps their attention, the ads they view, the time of day the services are used, the volume of usage, and numerous other measures.

Fortunately, the advanced technologies do provide raw data that, with proper analysis, can begin to answer many of these questions, and even do so with great specificity. We will now look at some sources of raw data in the cable television industry.

Channel Change Data Sources

Switched Digital Video as a Data Source

One source of raw data is channel change data collected by switched digital video systems.

In the cable television industry, Switched Digital Video (SDV) is one technology that is currently being introduced to better manage cable company network resources. In the web page article "How Switched Digital Video Works" Strickland, Jonathan* provides a detailed explanation of the technology:

* Strickland, Jonathan. "How Switched Digital Video Works" 20 Nov. 2007. HowStuffWorks.com. <http://electronics.howstuffworks.com/switched-digital-video.htm>

> The technologies used in the industry to deliver cable television are well known. In a traditional cable TV system, all of the channels are broadcast to all of the set top boxes all of the time. This is network intensive and wasteful of bandwidth. With the advent of high definition TV and other services that consume large amounts of bandwidth, cable operators have found ways to make more efficient use of the available bandwidth. Switched Digital Video allows the CO to broadcast TV signals of selected channels only upon request by a set top box within a limited geographic area.
>
> SDV is based on the principle that a few TV channels are viewed very heavily and many TV channels are lightly viewed. Rather than sending signals for all the channels all of the time, SDV only sends signals when requested. In an SDV system, once a channel is requested by one of the set top boxes controlled by that system, the channel is available to all of the STB's controlled by that system. This is typically a Service Group that serves 500 to 1,000 homes.

Two of the most widely used Switched Digital Video systems are provided by Motorola, Inc. and Cisco Systems, Inc.

The Motorola system is available from Motorola, Inc. 1303 East Algonquin Road, Schaumburg, Ill. The Motorola configuration is described in the Solutions Paper entitled "Implementing Switched Digital Video Solutions" found on the Motorola web site at:

http://www.motorola.com/staticfiles/Business/Products/_Documents/_Static%20files/SDV%20Implementation%20Solutions%20paper%20-555998-001-a.pdf?localeId=33

The Cisco Systems, Inc. system is available from Cisco Systems, Inc., 170 West Tasman Dr., San Jose, Calif. The CISCO SDV solution was formerly sold by Scientific-Atlanta, Inc.

The CISCO solutions are described at:

http://cisco.com/en/US/products/ps9258/index.html http://cisco.com/en/US/products/ps9258/prod brochure list.html A benefit of SDV systems is that individual set-top box channel change data is collected on the SDV servers as part of normal system operation without any additional actions on the part of the viewer.

One vendor produces channel change data containing fields similar to this (hereinafter SDV Vendor 1 Format):

- Set-top box identifier (optionally scrambled)
- Tuner index (to identifier the tuner in the STB)
- Market identifier
- Headend identifier
- Hub identifier
- Service Group identifier
- Tune-in date and time to the second
- Tune-out date and time to the second
- Channel name
- Channel call sign (acronym for the channel)
- Channel source id (numeric identifier of the channel)
- Bit rate (the megabits per second required to deliver the channel)
- Program type (SDV or Broadcast)
- High definition or standard definition flag Note: The data file is typically created daily. Business rules are applied if the tune-in and tune-out events occur on different days.

The other SDV vendor produces channel change data containing fields similar to this (hereinafter SDV Vendor 2 Format):

- Market
- Service Group
- Set-top box identifier
- Tuner index
- Date
- Time to the second
- Event code (tune-in or tune-out)
- Channel source id—the number of the channel as known to the SDV system.

Note: The data file is typically created daily. Business rules are applied if the tune-in and tune-out events occur on different days.

Those with ordinary skill in the art will recognize that SDV Vendor 2 Format can be transformed into a format similar to SDV Vendor 1 Format by combining the tune-in record and the tune-out record into a single record containing both tune-in date-time and tune-out date-time. This is done by sorting the file in order by Market, Service Group, Set-top box identifier, Tuner index, Date, and Time and then matching each tune-out record to the previous tune-in record using Event code to identify tune-in and tune-out actions. They will also recognize that by adding a lookup table to the process they can enhance the Market+Service group information to also include Hub and Headend. They will also recognize that by adding a second lookup table to the process they can enhance the channel information to also include Channel Name, Channel Call Sign, Bit Rate, Program Type, and High definition or standard definition flag. Enhancing the tuning data with these additional fields allows us to produce valuable analytics to support network engineering, marketing, and programming.

The vendor may generate a tune-out event in the data file when the user turns off the power.

Set-Top Box Data as a Data Source

In a non-SDV configuration, the channel change data can be captured by the set-top box itself.

Set-top box tuning information is widely available for measuring audience viewing habits. For example, on Feb. 24, 2010 the STB Committee of the Council for Research Excellence published a study titled "The State Of Set-Top Box Viewing Data as of December 2009" in which the report reviewed current industry trends in this area and noted that channel tuning data is widely available.

In the case of set-top box data capture, the cable operators have ready access to this data as it is captured on the set-top box by the STB software. The data can then be transferred to central systems at the cable company for analysis. Similarly, satellite broadcasters have access to such data.

A set-top box software application may produce channel change data containing fields similar to this:

Set-top box identifier

Tuner index (to identifier the tuner in the STB)

Time in seconds since some historic date

Channel call sign

Channel source id

Those with ordinary skill in the art will recognize that this file format can be transformed into a format similar to SDV Vendor 1 Format by combining data from consecutive channel tune records into a single record containing both tune-in date-time and tune-out date-time. This is done by sorting the file in order by Set-top box identifier, Tuner index, and Time and then using the Time from the next record (minus 1 second) as the tune-out time of the current record. The result is that the tune-in time comes from the current record and the tune-out time comes from the next record. They will also recognize that it is a simple task to convert the time represented in seconds since some historic date to the current date and time in YYYY-MM-DD HH:MM:SS AM/PM format. They will also recognize that by adding a lookup table to the process they can use the Set-top box identifier to look up the values for Market, Headend, Hub, and Service Group. They will also recognize that by adding a second lookup table to the process they can enhance the channel information to also include Channel Name, High Definition or Standard Definition, Bit Rate, and Program Type.

The vendor may generate a tune-out event in the data file when the user turns off the power.

The vendor may also provide the tune-out time in the data file.

Note the current data collection methods support granularity of tuning data down to the second level.

IPTV Data as a Data Source

In the case of internet protocol television (IPTV), channel changes can be captured at the device level and transmitted to the IPTV provider.

Electronic Device Usage Data Sources

Cell Phone Call Records as a Data Source

In the case of electronic devices such as cell phones, the cell phone provider has ready access to detailed call records which can be prepared in the format needed for processing by the Analytics Engine 140. The communication on the cell phone can be initiated by the device user or it can be a response to another device such as another cell phone calling.

File Transfer to Receive the Data

In this case of channel change data, those with ordinary skill in the art would know how to capture channel change files or tuning data from various source systems and make them available to an analysis engine by reading them from the SDV system and transferring them to the data analysis computer using tools such as secure file transfer protocol. Other methods for receiving channel change data may be used such as Extensible Markup Language (XML) messages or any other computer readable format.

In the case of electronic device usage data, those with ordinary skill in the art would know how to capture such data from various source systems and make them available to an analysis engine using tools such as secure file transfer protocol. Other methods for receiving electronic device usage data may be used such as Extensible Markup Language (XML) messages or any other computer readable format.

Encryption may be applied for data security purposes. Compression may be applied to reduce data transfer volumes.

Summary on Data Sources

As noted, SDV systems capture channel change data in order to support the basic function of providing Switched Digital Video. SDV channel change data is particularly useful because it includes all channel changes, both of broadcast channels and of switched channels.

In a non-SDV configuration, the channel change data can be captured by the set-top box itself.

In all of these cases, the STB activity (both SDV and non-SDV) is collected without the viewer needing to take any special action. The avoids problems of non-response bias and respondent fatigue. STB data provides very large measurement samples. STB data provides the ability to gather data from many geographic areas. STB data can be augmented with demographic data. STB data can be augmented with program attribute data. Once the channel tune data is processed into a standardized format, the Analytics Engine 140 can produce metrics using the data—it does not matter whether the data is from an SDV system or from a STB application.

For other electronic devices, the necessary data can be captured as part of normal operations without any special effort on the part of the user.

SDV Data Quality

The vendors that provide the SDV systems also provide tools that use this data to perform basic analytics for capacity planning. This indicates that there is confidence in the quality of the data. This is important because others have noted that in the current technology environment there are concerns or issues with Set-top box data quality.

A benefit of using SDV data is that for switched channels which are only delivered when requested (as opposed to broadcast channels which are always available), the vendors may include algorithms for reclaiming bandwidth. Generally, when the SDV system detects the lack of activity on the part of the viewer for some period of time the system can force tune the STB to a broadcast channel. The vendor SDV software does this to make the bandwidth that was being used by the switched channel available for other channel tune requests. This has the result of removing false positives (e.g., it appears that someone is watching when no one is) from the data, at least to a certain degree, and thus increasing the quality of the data for analytics.

Data Cleansing—Extended Tune Time

Data cleansing algorithms can be introduced to reduce the implied viewing time when it is reasonable to assume that no one is viewing the television. For example, it is widely known that viewers will often turn off the television while leaving power on to the set-top box. This can make the tuning data appear as though the viewer is watching television, but really they are not. To reduce the incidence of such false positives, the Analytics Engine 140 can examine the duration of the tune when it is being loaded to the data array and adjust tune duration according the business rules. The business rules can include parameters based on demographic modeling, time of day, channel, etc. For example, if the tune duration is 10,800 seconds (3 hours), then stop counting viewing seconds at the half hour mark after 7,200 seconds of viewing time based on the assumption that the viewer is no longer watching the channel.

Data Cleansing—Channel Surfing

Channel surfing can be important to understand. Advertisers and others often need to understand channel surfing behavior. If the analyst needs to eliminate such behavior from the data set, algorithms can be added to the Analytic Engine's 140 data loading process such that any channel tune where the difference between tune-in and tune-out is less than x seconds can be ignored and thus those seconds are not marked or counted as viewed.

On the other hand, from the perspective of managing an SDV system, it may be desirable to include all channel tune events, even channel surfing events, because they created a load on the SDV system. By having the Analytic Engine 140 include such channel tune events in the data array, measurements can be performed to find the average tune duration. The Analytic Engine 140 could count the number of channel tune events per day where duration is less than x seconds.

Switched Digital Video Solutions

We have noted above that there are vendors that supply Switched Digital Video systems. We will now review two such systems paying particular attention to the data analysis part of the product offering.

Existing Tools for Data Analysis

We have seen by way of background that channel change data is readily available. We now turn our attention to the tools presently available for analyzing this data.

Capacity Planning Analysis in a Cable Television Environment

In an SDV environment, capacity planning is critical because when SDV capacity is not adequate, it results in blocked channels leading to customer complaints.

By understanding viewing patterns, the cable operator can make intelligent choices about which channels to deliver as switched channels and which to deliver as broadcast channels. From the perspective of the cable system operator, the fewer the number of viewers viewing the channel, the more suitable the channel is delivery as a switched channel.

Capacity in an SDV environment is typically measured in megabits per second of bandwidth that can be delivered. A standard definition channel usually requires 3.75 Mbits/second. A high definition channel usually requires 15 Mbits/second. The number of channels that can be delivered at any time is dependent on the available megabits per second of bandwidth. When the number of different channels requested by the various set-top boxes approaches the capacity of the network or of the switched digital video server equipment in the service group, the customer is more likely to experience a blocked channel tune request because the system has no more available capacity. Thus the SDV engineers need good tools to understand viewing behavior so that they can effectively manage bandwidth and server capacity, both being scarce resources. They also need to predict future viewing patterns to determine when to add additional capacity.

Both Motorola and CISCO provide tools to manage capacity in an SDV environment, but they do not provide the depth of analysis that would enable cable companies to manage SDV networks most effectively. These tools are reviewed next.

Motorola Tools for Data Analysis

For example, Motorola provides an analysis tool as described in the Solutions Paper entitled "Implementing Switched Digital Video Solutions"

REFERENCE http://www.motorola.com/staticfiles/Business/Products/_Documents/_Static%20files/SDV%20Implementation%20Solutions%20paper%20-555998-001-a.pdf?localeId=33

In this paper, Motorola highlights the importance of "monitoring channel usage" and describes their reporting tool including a report entitled "Channel Usage Pareto". They suggest that "If average usage for a channel turns out to be less than one set-top per service group, the channel is a good candidate for being made available as a switched service." Additionally, the sample "Channel Usage Pareto" report shows only the total number of hours viewed by each channel during a 24 hour period.

Thus we can see that the Motorola reporting tool does not provide in depth analysis of channel usage. It does not show average viewing duration, it does not show stay-away seconds, it does not show viewing or non-viewing seconds, it does not show what percent of the day an activity occurs, it does not show peak viewing second or peak viewing count. These and other measures are very helpful for capacity planning and for choosing switched vs. broadcast channels, and for other purposes such as customer behavioral analysis. But Motorola does not provide them.

CISCO Tools for Data Analysis

As a second example, CISCO provides a "Retriever" product which "Collects viewing data based on the consumer's 'clicks' of the set-top remote each time a new channel is selected".

Reference: http://www.cisco.com/en/US/products/ps9122/index.html

CISCO also provides a "Channel Viewership Analyzer" tool as described on their web site.

Reference: http://www.cisco.com/en/US/prod/collateral/video/ps9119/ps9883/7016867.pdf CISCO's "Channel Viewership Analyzer (CVA) application provides minute-by-minute viewership for all responding set-top boxes in a customer's system." One sample report is "Top Channels by Aggregate Viewing Minutes". This report appears to simply count the tune duration for each channel tune and aggregate this by channel. A second report is "Top Channels by Distinct Tuners". This report appears to simply count the number of different tuners that made a channel change to each channel. A third report is "Top Channels by Viewing Minutes". This report appears to simply divide aggregate viewing minutes by tuners.

Thus we can see that the CISCO reporting tool does not provide in depth analysis of channel usage. It does not show average viewing duration, it does not show stay-away seconds, it does not show viewing or non-viewing seconds, it does not show what percent of the day an activity occurs, it does not show peak viewing second or peak viewing count or whether a channel was viewed during peak or how many seconds it was viewed during the peak window. These and other measures are very helpful for capacity planning and for choosing switched vs. broadcast channels, and for other purposes. But CISCO does not provide them.

Ineoquest Tools for Data Analysis

As a third example, IneoQuest Technologies, Inc. provides "solutions for monitoring, testing and validating SDV components and networks". These solutions are focused on monitoring the SDV application infrastructure rather than understanding viewer behavior. They appear to focus on monitoring system operations rather than viewer behavior.

Reference: http://www.ineoquest.com/switched-digital-video-solutions

Prior Design Work of Robert Alan Orlowski

Before developing this embodiment, I designed a methodology for tabulating set-top box channel tuning data with a granularity of one minute increments. I found this to be inadequate for comprehensive metrics. It did not and could not support many of the metrics taught in this embodiment. It did not and could not adequately track viewer behavior. It was not useful as a foundation for analyzing advertisement viewing or fine-grained program viewing. It had faulty algorithms for determining peak viewership. It had limited value for capacity planning because of the course granularity of the data. It did not include demographic attributes. It did not include program attributes. It did not combine multiple attributes. Based on that work, I determined that a more comprehensive solution was required. The methodology I designed was not implemented. No patents were filed on that methodology. The methodology was not published to the public.

Relevant Patents

Besides the vendor provided solutions, others have used channel change data for various purposes. Examples include:

Conkwright, et al. in U.S. Pat. No. 7,383,243 issued Jun. 3, 2008 teaches about collecting set-top box data for the purpose of predicting what consumers will do, not for the purpose of understanding actual viewer behavior. It appears that he does not teach the loading of a data structure containing buckets representing individual units of time during a window of time of interest for analysis.

Hendricks, et al. in U.S. Pat. No. 7,590,993 Method and apparatus for gathering programs watched data issued Sep. 15, 2009 teaches about collecting tuning data from the set-top box and combining that with other data in a data base to determine the types of programming the STB tunes to. It appears that he does not teach the loading of a data structure containing buckets representing individual units of time during a window of time of interest for analysis or of using such a data structure to determine the duration of program watching.

Relevant Patent Applications

Wood; Catherine Alexandra in U.S. Patent Application 20070074258 dated Mar. 29, 2007 teaches about collecting subscriber activity data, such as channel changes generated by the subscriber while watching video or TV in an IPTV system. It appears that she does not teach the loading of a data structure containing buckets representing individual units of time during a window of time of interest for analysis. It appears instead that she teaches loading the channel tuning data to a relational data base and then performing various SQL based queries against that data base.

Eldering; Charles A.; et al. in U.S. Patent Application 20080127252 dated May 29, 2008 teaches about targeted advertising. He notes that SDV systems have the ability to provide viewership counts. It appears that he does not teach the loading of a data structure containing buckets representing individual units of time during a window of time of interest for analysis.

Allegrezza; Fred J.; et al. in U.S. Patent Application 20090077577 dated Mar. 19, 2009 teaches about aggregating information obtained from the messages to generate channel viewership information identifying a number of subscribers tuned to each broadcast channel over a period of time, but it appears to be based simply on tune-in activity. It appears that he does not teach the loading of a data structure containing buckets representing individual units of time during a window of time of interest for analysis.

Bou-Abboud; Claude H. in U.S. Patent Application 20070214483 dated Sep. 13, 2007 teach about a tool for predicting capacity demands on an electronic system. It appears that they do not teach the loading of a data structure containing buckets representing individual units of time during a window of time of interest for analysis.

Canning; Brian P.; et al. in U.S. Patent Application 20100145791 dated Jun. 10, 2010 teach about storing data in multiple shards and supporting queries against the data. It appears that he does not teach the loading of a data structure containing buckets representing individual units of time during a window of time of interest for analysis.

Summary of Short-Comings in Data Analysis Tools

In general, a short-coming of these methods is that the foundation is a non-procedural language (SQL) used in conjunction with a relational data base which together do not have the detailed processing capability required to perform complex analytics. In such an environment, in order to capture the richness of certain aspects of the channel change data, one would have to explode the data out into individual rows with one row for each second of viewer activity. In such an environment, this is extremely expensive because adding a primary key to each data record simply to record the second (time) multiplies the volume of data many times over because the size of the primary key requires much more storage space than the data being recorded. Thus we see that using a non-procedural language (SQL) in conjunction with a relational data base is very inefficient and requires extremely powerful data base servers to analyze this data. In contrast I am able to produce these complex analytics on a simple personal computer.

As a result of not having the tools to manage the SDV environment adequately, cable companies often mitigate the risk of service disruptions by purchasing and installing excess capacity to ensure that customer demand is satisfied. This is a costly solution to the problem of inadequate analytics.

Also as a result of not being able to perform the detailed analytics required, the behavioral and device usage information contained in the data remains hidden from other interested parties.

In addition to these short-comings, the existing solutions generally do not blend detailed channel change data with demographic data or program attribute data. Thus the solutions provided by Motorola, CISCO and others do not allow the cable companies or service providers to marry demographic or program attribute data with the tuning data to yield increased knowledge of customer behavior.

SUMMARY

In accordance with one embodiment, I disclose a computer-implemented method, executed on a data analysis computer system, of analyzing a plurality of human interactions by a plurality of human beings with a plurality of electronic devices, each interacting with a computer system accessed through a network with the result of being able to (a) provide insight into the amount of resource consumed by the human interaction with the electronic device, (b) provide insight into the electronic device usage patterns, and (c) provide insight into the behavior of the human operator.

ADVANTAGES

In contrast with the methods described above, I have found that the richness of this data can be accessed by using a procedural language to process/manipulate the data to produce various metrics quickly and efficiently. By populating a Data Structure with identifying information, device usage information such as channel tuning data or personal communication device usage data, demographic information on the human beings, and other supporting information I create a foundation upon which a comprehensive set of metrics can be produced. By reviewing the prior art, we can see that loading the tuning data on a second-by-second basis into buckets in a data structure for analytics is not a concept that was suggested or implied by the prior art. By reviewing the prior art, we can see that loading electronic device usage data into buckets representing seconds, or day-parts, or other time periods in a data structure for analytics is not a concept that was suggested or implied by the prior art.

In general, we can see that this methodology is applicable to any problem where there is a need to measure or count the information regarding a series of events which may overlap but which can be characterized by various non-uniform starting times and varying duration.

As nonlimiting examples, STB activity and cell phone activity fit this problem space. In both cases, the start time and the duration of the activity varies, and there are multiple users with each creating a load on the system. The peak load is dependent on concurrent activity, not start time or simply duration. The peak load must be determined by finding the point in time when the most devices are concurrently active. Resource consumption is also dependent on concurrent device activity rather than start time or duration.

The data structure can be populated with any level of detail. In one embodiment it may be populated with very detailed information such as individual device usage for each second of the period being analyzed. In another embodiment it may be populated with highly summarized data such as aggregate device usage for an entire geographic area for each second of the period being analyzed. Another embodiment may aggregate data according to demographics by time period. Yet another embodiment may aggregate data by program attribute and time period. Yet still other embodiments may combine various aspects of geographic area, demographic attribute, and program attribute information. Yet another embodiment may load fractional values into the buckets to represent fast forwarding through a program or an advertisement. Yet another embodiment may load fractional values into various buckets to represent each of several activities occurring concurrently on the electronic device with each activity possibly capturing some amount of the user's attention.

There are multiple dimensions of analysis that are possible:

a. For the dimension of device, it can be one device to an aggregate of many devices.
b. For the dimension of time, it can be seconds, minutes, hours, day, weeks, or custom time periods.
c. For the dimension of demographics, it can be no demographics to multiple demographic attributes.
d. For the dimension of program attribute, it can be no program attribute information to multiple program attributes.

Other dimensions of analysis can readily be envisioned by those skilled in the art. These may include device type or application being run on the device as non-limiting examples.

Once the Data Structure is populated, then a comprehensive set of metrics can be produced. The metrics can then be output as (i) a data file that can be read by a computer program, (ii) a data base table, (iii) an electronic message, or (iv) a spreadsheet.

A person skilled in the art will readily see the benefits of loading the calculated metrics to a relational data base where additional queries and analytics can be run using standard SQL. As nonlimiting examples, daily metrics calculated by the Analytics Engine 140 can be loaded to a data base in support of longer term analysis.

The Analytics Engine 140 presented in this embodiment provides a solution to the shortcomings identified in the vendor solutions, the issued patents, and the patent applications. A sampling of the metrics produced by the Analytics Engine 140 in the context of cable television is presented next:

Set-Top Box+Channel Viewing Metrics

STB channel viewing seconds, STB channel tune-ins, STB channel average viewing duration, STB Channel stay away seconds.

Channel Viewing Metrics

Channel viewing seconds, Channel non-viewing seconds, Aggregate channel viewing seconds, Peak viewing second for channel, Peak viewing count for channel, Percent of peak viewership at this channel's peak, Channel viewed seconds during peak window, Aggregate Channel viewed seconds during peak window.

Capacity Metrics

Peak usage in megabits per second, Percent of day megabits used is near peak, Maximum tune-in's per second, Peak usage by channel viewed count, Aggregate seconds viewed at the peak second of the day.

Demographic Viewing Detail

Demographic viewing seconds, Aggregate demographic viewing seconds, Percent of the day when this demographic is viewing television, Peak viewing second for demographic, Aggregate demographic viewing at this demographic's peak, Percent of peak viewership by this demographic's peak.

Program Viewing Detail

Program viewing seconds, Program one STB viewing seconds, Aggregate program viewing seconds, Percent of the day when only one STB is viewing programs having this attribute, Percent of peak viewership by this program attribute, Program viewed seconds during peak.

Non-Viewing Metrics

In addition to the various viewing metrics described, the Analytics Engine 140 is also able to produce metrics on non-viewing or non-use. Such metrics can be extremely valuable to advertisers since they indicate when not to advertise. Such metrics are useful to content providers because they identify non-viewed content. Such metrics are valuable to capacity planners because they identify potential times for system maintenance and in the case of SDV which channels are good candidates to be switched.

Summary of Metrics Produced

The metrics listed above are representative of those which can be produced by the Analytics Engine 140 in one embodiment. Many additional metrics could be produced once the data is loaded to the Data Structure. It is the extensive processing done by the Analytics Engine 140 which turns the device usage data into valuable information. The Analytics Engine 140 readily allows creation of both viewing and non-viewing metrics.

The metrics shown above all provide information useful for understanding human behavior; understanding various combinations of who uses the devices, when do they use the devices, and the purpose for which they use the devices; and understanding device usage for the benefit of service providers. These and other advantages of one or more aspects will become apparent from a consideration of the ensuing description and accompanying drawings.

Data Encryption

To protect the privacy of the viewer and to comply with various laws and/or regulations, cable companies and other service providers sometimes anonymize and/or encrypt any data that could identify a specific customer or viewer. Within the various embodiments presented herein, if the encryption algorithms applied to the electronic device usage data or channel tuning data are consistent over a period of time, this will allow the Analytics Engine 140 to produce metrics that track the behavior of the device user or set-top box over a period of time while also protecting the privacy of the user.

Furthermore, if the encryption algorithms applied to data are synchronized among the various data sources such as channel tuning data and demographic data, this would allow computer systems to combine channel tuning data and demographic data in support of end-to-end analysis of customer behavior. The same principal applies to cellular telephone call detail records and demographic data.

DEFINITIONS

The following are definitions that will aid in understanding one or more of the embodiments presented herein:

Activity occurring on electronic device means any interaction or activity that may happen as a result of any aspect of a human interaction with an electronic device. Nonlimiting examples include:

(i) tuning activity on a set-top box,
(ii) call activity on a cell phone (initiate call, terminate call, call (talk), check voice mail),
(iii) packet transfer data related to internet activity,
(iv) browsing the internet,
(v) download file, upload file, watch video,
(vi) email usage (check email, send email),
(vii) any activity that generates internet protocol packets or Ethernet packets
(viii) any activity that uses radio frequencies, etc.

Activity occurring on set-top box means any interaction or activity that may happen as a result of any aspect of a human interaction with a set-top box. Nonlimiting examples include:

(i) tuning activity on a set-top box,
(ii) viewing a television program,
(iii) recording a movie, etc.

Amount of resource consumed means a measure of resource consumption. Nonlimiting examples include:

(i) megabits per second of bandwidth,
(ii) radio frequencies,
(iii) channels,
(iv) network capacity, etc.

Bandwidth means a measure of resource consumption to determine how much of the capacity of a communications channel is used in providing a service. In a digital system that capacity is typically measured in megabits per second.

Buckets means individual cells in a Data Structure. Nonlimiting examples include:

(i) addressable fields in a table in a COBOL program,
(ii) addressable fields in an array or similar structures in a 'C' program,
(iii) cells in a spreadsheet, etc.

Cell tower means a station for communicating with cell phones or personal communication devices in a cellular network.

Channel means a radio frequency signal within the frequency spectrum. The radio frequency signal is assigned to an identifier which is called a channel. Within a defined area in the cable providers network, each channel and the radio frequency signal assigned to it is unique. As a nonlimiting example within this embodiment, a channel is typically referred to by the call letters or channel call sign such as: ABC, CBS, NBC, etc. A channel may also refer to the radio frequency used to transmit a cellular telephone call.

Channel tuning events that occur as a result of a previous human action means those interactions with a set-top box which happen later in time because of something a human being did previously. Nonlimiting examples include:

(i) set-top box tuning to a channel and recording a movie based on a human setting a recording,
(ii) a human initiated event which causes the set-top box to 'wake-up' at a later point in time and do something such as record a program.

Circuit means a communication channel in a network or a cellular network or a cable television network. Any communication channel which transmits data or information.

Computer equipment means any computer equipment used to facilitate the interaction of a human being with an electronic device across a network.

Computer system accessed through a network means any computer system, any individual piece of computer equipment or electronic gear, or any combination of computer equipment or electronic gear which enables or facilitates the human interaction with the electronic device. Nonlimiting examples include:

(i) cable television system,
(ii) cable television switched digital video system,
(iii) cellular phone network,
(iv) web server,
(v) any individual piece of computer equipment or electronic gear without limitation,
(vi) any combination of computer equipment or electronic gear without limitation, etc.

Data analysis computer system means a combination of one or more computers on which a Data Analysis Program or Programs can be executed.

Data analysis computer of known type means any commonly available computer system running a commonly known operating system. Nonlimiting examples include:

(i) a standard personal computer running Windows® XP operating system from Microsoft® Corporation,
(ii) a computer running the UNIX operating system,
(iii) a computer running the Linux operating system, etc.

Data analysis program means a computer program or programs containing algorithms that are able to analyze the data that has been loaded to a Data Structure or a combination of Data Structures.

Data base table means any relational data base table structure.

Data file that can be read by a computer program means any computer readable file format. Nonlimiting examples include:

(i) formatted text files,
(ii) pipe delimited text files, etc.

Data structure means a place in a computer program or computer system where data can be stored for analysis in such a manner that formulas and algorithms can be run against the data to produce meaningful metrics. Nonlimiting examples include:
(i) table in a COBOL program,
(ii) array or similar structure in a 'C' program,
(iii) spreadsheet;
such structures may be stored in the memory of the computer, but they could also be stored on electronic disk or other computer hardware.

Electronic device means any electronic device that may be used either directly or indirectly by a human being. Nonlimiting examples include: Gaming station, web browser, MP3 Player, Internet Protocol phone, Internet Protocol television, set-top box, satellite receiver, set-top box in a cable television network, set-top box in a satellite television system, cell phone, personal communication device, cable modem, personal video recorder, etc.

Electronic device usage data means any data that captures any aspect of a human interaction with an electronic device. Nonlimiting examples include:
(i) tuning activity on a set-top box,
(ii) call activity on a cell phone,
(iii) packet transfer data related to any internet activity, etc.

Electronic message means any computer readable output that can be used as input to another computer or read by a human. Nonlimiting examples include:
(i) data output in Extensible Markup Language format,
(ii) data output in Hypertext Markup Language format, etc.

Frequencies means radio frequencies in a cable television system or a cellular network.

Headend means a location in a network where incoming signals are received, prepared, and then transmitted downstream to other parts of the network. Nonlimiting examples include:
In a cable television network the signals are received at the headend, prepared and amplified, and then transmitted to downstream hubs for further distribution. A headend typically serves multiple hubs.

HFC Network means hybrid fiber coax network.

High definition means television channels having high resolution and thus they are delivered using a data transfer rate of approximately 15 megabits per second.

Hub means a location in a network where incoming signals are received, and then transmitted downstream to other parts of the network. Nonlimiting examples include:
In a cable television network the signals are received at the hub and then transmitted to downstream service groups or nodes for further distribution. A hub typically serves multiple service groups.

Human interactions means any interaction with an electronic device interacting with a computer system accessed through a network. Nonlimiting examples include:
(i) any activity involving a set-top box such as tune-in, tune-out, power on, power off, fast forward, reverse, mute, trick plays, etc.
(ii) any activity involving a personal communication device such as placing a call, receiving a call, calling, checking email, downloading data files, surfing the web, etc.
(iii) any activity involving a personal computer that is accessing the internet such as watching a movie, downloading files, surfing the web, etc.

Identifier of cable television system equipment serving said set-top box means any combination of letters, numbers or symbols that can identify equipment in a cable television system that is used to deliver signals to a set-top box. Nonlimiting examples include:
(i) internet protocol address,
(ii) SDV system identifier,
(iii) Service Group identifier,
(iv) Hub identifier,
(v) Headend identifier,
(vi) Market identifier,
(vii) Node identifier,
(viii) Any combination of the above fields, etc.

Identifier of computer system accessed through said network means any combination of letters, numbers or symbols that can identify a computer system that may be access though a network. Nonlimiting examples include:
(i) Internet protocol address,
(ii) Cell tower identifier,
(iii) Router identifier,
(iv) SDV system identifier,
(v) Service Group identifier,
(vi) Hub identifier,
(vii) Headend identifier,
(viii) Market identifier,
(ix) Node identifier,
(x) Any combination of the above fields, etc.

Identifier of electronic device means any combination of letters, numbers or symbols that can identify a device. Nonlimiting examples include:
(i) Set-top box Media Access Control address (MAC address),
(ii) Cell phone Electronic Serial Number (ESN), Mobile Identification Number (MIN), System Identification Code (SIC), phone number,
(iii) Computer internet protocol address, etc.
(iv) Encrypted versions of these values,
(vi) A generic identifier assigned to a multiple electronic devices having a similar demographic profile or viewing profile or usage profile.

Identifier of resource consumed means any combination of letters, numbers or symbols that can identify a Resource. Nonlimiting examples include:
(i) Channel call sign,
(ii) Channel source id,
(iii) Cell tower identifier,
(iv) Frequency,
(v) Radio frequency, etc.

Identifier of set-top box means any combination of letters, numbers or symbols that can identify a set-top box. Nonlimiting examples include:
(i) Set-top box Media Access Control address (MAC address),
(ii) Set-top box serial number, etc.
(iii) Encrypted versions of these values,
(iv) A generic identifier assigned to a multiple set-top boxes having a similar demographic profile or viewing profile or usage profile.

Identifying fields for things of interest for analysis means a field or combination of fields that can be used to identify the buckets in a Data Structure. Nonlimiting examples include:
(i) fields to identify the elements of a network where the network may be sub-divided into regions based on operational, organizational, or geographic areas, one example is Market, Service Group, Headend, Hub;
(ii) fields to identify components in a cellular network such as the cell tower, nodes, ports, circuits, etc.;
(iii) fields to identify the demographics of a person;

(iv) fields to identify activity occurring on an electronic device;
(v) fields to identify resource consumption;
(vi) fields to identify channels on a cable television system;
(vii) fields to identify computer hardware;
Etc.

Individual units of time means any period of time that may be of interest in relation to measuring human interaction with an electronic devices accessed through a network. Nonlimiting examples include:
(i) seconds in a day,
(ii) minutes in a day,
(iii) commercial periods during a television program,
(iv) quarter hours of a day,
(v) hours of a day,
(vi) four hour blocks in a day,
(vii) days,
(viii) time period when a certain program is running,
(ix) user defined day parts,
(x) user defined time periods,
Etc.

Interactions with electronic device that occur as a result of a previous human action means those interactions with an electronic device which happen later in time because of something a human being did previously. Nonlimiting examples include:
(i) set-top box tuning to a channel and recording a movie based on a human setting a recording;
(ii) a human initiated event which causes the set-top box to 'wake-up' at a later point in time and do something such as record a program.
(iii) a personal communication device automatically receiving email;
(iv) a file download process occurring based on a delayed start time setting.

In each example given, the human being did some interaction or set some parameter to cause the electronic device to wake-up and do something and it is occurring at a later time.

Internet protocol packets transferred means a measure of the number of data packets transferred to support the interaction of a human being with an electronic device. This can be internet protocol packets or Ethernet packets. Nonlimiting examples include:
(i) packets of data transferred to show an internet protocol television program,
(ii) packets of data transferred to support a web page access,
(iii) packets of data transferred to support a cell phone call, etc.

Information about location means any information that can be used to identify the place on the earth where an electronic device or a set-top box is. Nonlimiting examples include:
(i) longitude/latitude coordinates,
(ii) physical address,
(iii) a network address,
(iv) a location in a network,
(v) a geographic identifier.

Market means a geographic area within a service providers' network.

Megabits per second of data transferred means a measure of the amount of data transferred to support an electronic service. Nonlimiting examples include:
(i) the amount of data transferred per second to broadcast a standard definition channel,
(ii) the amount of data transferred per second to broadcast a high definition channel.

Network means any computer network. Nonlimiting examples include:
(i) a cable television network,
(ii) a cellular telephony network,
(iii) hybrid fiber coax system,
(iv) any means that supports communication among electronic devices or computers or computer systems without limitation, etc.

Network capacity means a measure of the amount of data that can be transferred during a period of time.

Network equipment means any physical or logical device used in a network. Nonlimiting examples include: hubs, routers, switches, nodes, circuits, port, etc.

Node means a component in a cellular network or a cable television network.

Pipe delimited text files means data files where the fields are separated by the "|" character.

Quadrature amplitude modulation signals means a measure of bandwidth consumption.

Radio frequencies means radio waves of various measures.

Real time channel tuning events means those interactions which occur as the person interacts with a set-top box. Nonlimiting examples include:
(i) set-top box tuning activity.

Real time human interactions means those interactions which occur as the person interacts with an electronic device. Nonlimiting examples include:
(i) set-top box tuning activity,
(ii) placing a cell phone call,
(ii) downloading a file, etc.

Resource means anything that supports or enables the interaction of the human being with an electronic device across a network. Nonlimiting examples include:
(i) channels, frequencies, radio frequencies, bandwidth, megabits per second of data transferred, internet protocol packets transferred, Ethernet packets transferred, computer equipment, network equipment, network capacity, cell towers, hubs, routers, switches, nodes, circuits, devices where each such resource is identifiable;
(ii) channels, quadrature amplitude modulation signals, frequencies, radio frequencies, bandwidth, megabits per second of data transferred, internet protocol packets transferred, Ethernet packets transferred, computer equipment, network equipment, hubs, routers, switches, nodes, circuits, devices and network capacity, switched digital video computer systems, all in a cable television system, where each such resource is identifiable.

Service group means a location in a network where incoming signals are received and then transmitted to set-top boxes. Nonlimiting examples include:
In a cable television network the signals are received at the service group and then transmitted to downstream nodes or to set-top boxes. A service group typically serves 500 to 1000 homes.
In some cable television networks a service group may equate to a Node.

Set-top box means an electronic device that receives external signals and decodes those signals into content that can be viewed on a television screen or similar display device. The signals may come from a cable television system, a satellite television system, a network, or any other suitable means. A set-top box may have one or more tuners. The set-top box allows the user to interact with it to control what is displayed on the screen. The set-top box is able to capture the commands given by the user and the transmit those commands to another computer system.

Spreadsheet means any commonly known electronic worksheet format. Nonlimiting examples include:
(i) Microsoft® Excel® files.

Standard definition means television channels having standard resolution and thus they are delivered using a data transfer rate of approximately 3.75 megabits per second.

STB means Set-top box.

Tune-in date and time means the date and time when the set-top box initiates viewing on the channel. This can be represented in any format that can be used to identify the point in time when the set-top box initiates viewing on the channel. Nonlimiting examples include:
(i) YYYY-MM-DD HH:MM:SS AM/PM,
(ii) YYYY-MM-DD 24HH:MM:SS,
(iii) seconds since some historic date, etc.

Tune-out date and time means the date and time when the set-top box ended viewing on the channel. This can be represented in any format that can be used to identify the point in time when the set-top box ended viewing on the channel. Nonlimiting examples include:
(i) YYYY-MM-DD HH:MM:SS AM/PM,
(ii) YYYY-MM-DD 24HH:MM:SS,
(iii) seconds since some historic date, etc.

Tuner means a tuner in a Set-top box.

Tuner index means an identifier of a tuner in a Set-top box.

Window of time of interest for analysis means any period of time during which it is desired to measure the human interaction with an electronic devices accessed through a network. Nonlimiting examples include:
(i) minutes in a day,
(ii) commercial periods during a television program,
(iii) quarter hours of a day,
(iv) hours of a day,
(v) four hour blocks in a day,
(vi) days,
(vii) any period of time useful for analysis
Etc.

BRIEF DESCRIPTION OF THE DRAWINGS

In the drawings, closely related figures have the same number but different alphabetic suffixes.

FIGS. 4A-B illustrate exemplary flowcharts for preprocessing channel tune data from a Set-top box application software system, according to one embodiment with FIG. 4A showing Part A of the process and FIG. 4B showing Part B of the process.

FIG. 5 illustrates an exemplary flowchart for sorting channel tune data that has been preprocessed into a standardized format so that the channel tune data can be loaded to the Analytics Engine 140 for processing, according to one embodiment.

FIGS. 6A-B illustrate an exemplary process for loading standardized channel tune data into the STB-CHANNEL-VIEWING-DETAIL table in the Analytics Engine 140 in preparation for calculating the various STB+Channel metrics, according to one embodiment with FIG. 6A illustrating a flowchart of the process and FIG. 6B illustrating an exemplary code sample.

FIGS. 7A-B illustrate an exemplary process for loading standardized channel tune data into the STB-VIEWING-DETAIL table in the Analytics Engine 140 in preparation for calculating the various STB metrics, according to one embodiment with FIG. 7A illustrating a flowchart of the process and FIG. 7B illustrating an exemplary code sample.

FIGS. 8A-B illustrate an exemplary process for loading standardized channel tune data into the CHAN-VIEWING-DETAIL table in the Analytics Engine 140 in preparation for calculating the various Channel metrics, according to one embodiment with FIG. 8A illustrating a flowchart of the process and FIG. 8B illustrating an exemplary code sample.

FIGS. 9A-B illustrate an exemplary process for loading standardized channel tune data into the DEMO-VIEWING-DETAIL (DEMOGRAPHIC-VIEWING-DETAIL) table in the Analytics Engine 140 in preparation for calculating the various demographic based metrics, according to one embodiment with FIG. 9A illustrating a flowchart of the process and FIG. 9B illustrating an exemplary code sample.

FIGS. 10A-B illustrate an exemplary process for loading standardized channel tune data into the PROG-VIEWING-DETAIL (PROGRAM-VIEWING-DETAIL) table in the Analytics Engine 140 in preparation for calculating the various program based metrics, according to one embodiment with FIG. 10A illustrating a flowchart of the process and FIG. 10B illustrating an exemplary code sample.

FIGS. 11-A-B-C illustrate an exemplary channel tune file format and data according to one embodiment with FIG. 11-A illustrating the file format, FIG. 11-B illustrating the channel tune data as it is received from the source in pipe delimited format, and FIG. 11-C illustrating the channel tune data formatted into a table for human readability. This represents SDV Vendor 1 Format.

FIGS. 12-A-B-C illustrate another exemplary channel tune file format and data according to one embodiment with FIG. 12-A illustrating the file format, FIG. 12-B illustrating the channel tune data as it is received from the source in pipe delimited format, and FIG. 12-C illustrating the channel tune data formatted into a table for human readability. This represents SDV Vendor 2 Format.

FIGS. 13-A-B-C illustrate an exemplary channel tune file format and data from a Set-top box system according to one embodiment with FIG. 13-A illustrating the file format, FIG. 13-B illustrating the channel tune data as it is received from the source in pipe delimited format, and FIG. 13-C illustrating the channel tune data formatted into a table for human readability.

FIGS. 14-A-B-C illustrate an exemplary channel tune file formatted for use as input to the Analytics Engine 140 with FIG. 14-A illustrating the file format, and FIG. 14-B illustrating sample data without program attribute, or demographics, and FIG. 14-C illustrating sample data with program attribute, and demographics, according to one embodiment.

FIGS. 15-A-B illustrate an exemplary Data Structure for use by the Analytics Engine 140 when processing channel tune records where the analytics require Market+Service-Group+Hub+Headend+Channel Call Sign+Channel Source Id+Set-top box+Tuner detail where the granularity is second of day, according to one embodiment. FIG. 15-A illustrates the Data Structure, and FIG. 15-B illustrates sample data in this Data Structure, according to one embodiment.

FIGS. 16-A-B illustrate an exemplary Data Structure for use by the Analytics Engine 140 when processing channel tune records where the analytics require Market+Service-Group+Hub+Headend+Set-top box+Tuner detail where the granularity is second of day, according to one embodiment. FIG. 16-A illustrates the Data Structure, and FIG. 16-B illustrates sample data in this Data Structure, according to one embodiment.

FIGS. 17-A-B illustrate an exemplary Data Structure for use by the Analytics Engine 140 when processing channel tune records where the analytics require Market+Service-Group+Hub+Headend+Channel Call Sign+Channel Source Id detail where the granularity is second of day, according to one embodiment. FIG. 17-A illustrates the Data Structure, and FIG. 17-B illustrates sample data in this Data Structure, according to one embodiment.

FIGS. 18-A-B illustrate an exemplary Data Structure for use by the Analytics Engine 140 when processing channel tune records where the analytics require Market+Service-Group+Hub+Headend detail where the granularity is second of day, according to one embodiment. FIG. 18-A illustrates the Data Structure, and FIG. 18-B illustrates sample data in this Data Structure, according to one embodiment.

FIGS. 19-A-B illustrate an exemplary Data Structure for use by the Analytics Engine 140 when processing channel tune records where the analytics require Market+Service-Group+Hub+Headend summary statistics where the granularity is daily, according to one embodiment. FIG. 19-A illustrates the Data Structure, and FIG. 19-B illustrates sample data in this Data Structure, according to one embodiment.

FIGS. 20-A-B illustrate an exemplary Data Structure for use by the Analytics Engine 140 when processing channel tune records where the analytics require Market+Service-Group+Hub+Headend+Demographic Category 1+Demographic Category 2 detail where the granularity is second of day, according to one embodiment. FIG. 20-A illustrates the Data Structure, and FIG. 20-B illustrates sample data in this Data Structure, according to one embodiment.

FIGS. 21-A-B illustrate an exemplary Data Structure for use by the Analytics Engine 140 when processing channel tune records where the analytics require Market+Service-Group+Hub+Headend+Program Attribute 1+Program Attribute 2 detail where the granularity is second of day, according to one embodiment.

FIG. 21-A illustrates the Data Structure, and FIG. 21-B illustrates sample data in this Data Structure, according to one embodiment.

FIGS. 22-A-B illustrate an exemplary output record format for the flat file which contains the metrics calculated by the Analytics Engine 140 using the channel tune records that were aggregated to the level of Market+Service-Group+Hub+Headend+Channel Call Sign+Channel Source Id+Set-top box+Tuner, according to one embodiment. FIG. 22-A illustrates the record format, and FIG. 22-B illustrates sample data in this record format, according to one embodiment. This record format can be readily imported into a relational database or into a spreadsheet for further analytical processing. This is the detail of part 152.

FIGS. 23-A-B illustrate an exemplary output record format for the flat file which contains the metrics calculated by the Analytics Engine 140 using the channel tune records that were aggregated to the level of Market+Service-Group+Hub+Headend+Set-top box+Tuner, according to one embodiment. FIG. 23-A illustrates the record format, and FIG. 23-B illustrates sample data in this record format, according to one embodiment. This record format can be readily imported into a relational database or into a spreadsheet for further analytical processing. This is the detail of part 154.

FIGS. 24-A-B illustrate an exemplary output record format for the flat file which contains the metrics calculated by the Analytics Engine 140 using the channel tune records that were aggregated to the level of Market+Service-Group+Hub+Headend+Channel Call Sign+Channel Source Id, according to one embodiment. FIG. 24-A illustrates the record format, and FIG. 24-B illustrates sample data in this record format, according to one embodiment. This record format can be readily imported into a relational database or into a spreadsheet for further analytical processing. This is the detail of part 156.

FIGS. 25-A-B illustrate an exemplary output record format for the flat file which contains the metrics calculated by the Analytics Engine 140 using the channel tune records that were aggregated to the level of Market+Service-Group+Hub+Headend+Second-of-day, according to one embodiment. FIG. 25-A illustrates the record format, and FIG. 25-B illustrates sample data in this record format, according to one embodiment. This record format can be readily imported into a relational database or into a spreadsheet for further analytical processing. This is the detail of part 162.

FIGS. 26-A-B illustrate an exemplary output record format for the flat file which contains the metrics calculated by the Analytics Engine 140 using the channel tune records that were aggregated to the level of daily activity for the Market+Service-Group+Hub+Headend, according to one embodiment. FIG. 26-A illustrates the record format, and FIG. 26-B illustrates sample data in this record format, according to one embodiment. This record format can be readily imported into a relational database or into a spreadsheet for further analytical processing. This is the detail of part 164.

FIGS. 27-A-B illustrate an exemplary output record format for the flat file which contains the metrics calculated by the Analytics Engine 140 using the channel tune records that were aggregated to the level of Market+Service-Group+Hub+Headend+Demographic Category 1+Demographic Category 2, according to one embodiment. FIG. 27-A illustrates the record format, and FIG. 27-B illustrates sample data in this record format, according to one embodiment. This record format can be readily imported into a relational database or into a spreadsheet for further analytical processing. This is the detail of part 166.

FIGS. 28-A-B illustrate an exemplary output record format for the flat file which contains the metrics calculated by the Analytics Engine 140 using the channel tune records that were aggregated to the level of Market+Service-Group+Hub+Headend+Program Attribute 1+Program Attribute 2, according to one embodiment. FIG. 28-A illustrates the record format, and FIG. 28-B illustrates sample data in this record format, according to one embodiment. This record format can be readily imported into a relational database or into a spreadsheet for further analytical processing. This is the detail of part 168.

DETAILED DESCRIPTION OF THE DRAWINGS

When reading the information below, it can be appreciated that these are merely samples of table layouts, format and content, and many aspects of these tables may be varied or expanded within the scope of the embodiment. This table layouts, field formats and content, algorithms, and other aspects are what I presently contemplate for this embodiment, but other table layouts, field formats and content, algorithms, etc. can be used. The algorithms are samples and various aspects of the algorithms may be varied or expanded within the scope of the embodiment.

For many of the metrics shown below, I have suggested what the metric indicates. This is not to limit the purpose of the metric to that one usage, but simply to indicate one of potentially many valuable uses for the metric.

In one embodiment the Analytics Engine 140 can be implemented on processors provided by the Intel® Corporation under the trademark PENTIUM® using single or multiple processor configurations. The operating system offered by Microsoft® Corporation under the trademark Windows® XP Professional can be used as the basis for the platform. The Analytics Engine 140 can be implemented in a number of programming languages, including but not limited to, COBOL, C and C++.

I have implemented the Analytics Engine 140 and supporting code in Fujitsu® NetCOBOL® for Windows® version 10.1 developed by Fujitsu® and distributed by Alchemy Solutions Inc. This product is available at http://www.alchemysolutions.com or http://www.netcobol.com. The Analytics Engine 140 and all of the supporting processes have been developed and run on a Dell® WORKSTATION PWS360 with Intel® Pentium® 4 CPU 2.60 Ghz with 2.25 GB of RAM running Microsoft® Windows® XP Professional Version 2002 Service Pack 3. The computer was purchased from Dell Computer Corporation. The operating system is from Microsoft.

Although the embodiments described herein enable one of ordinary skill in the art to implement (i.e. build) the Analytics Engine 140 and supporting software, it in no way restricts the method of implementation, the Analytics Engine 140 and supporting software being capable of being implemented on a variety of hardware/software platforms with a variety of development languages, databases, communication protocols and frameworks as will be evident to those of ordinary skill in the art.

Figure 1:
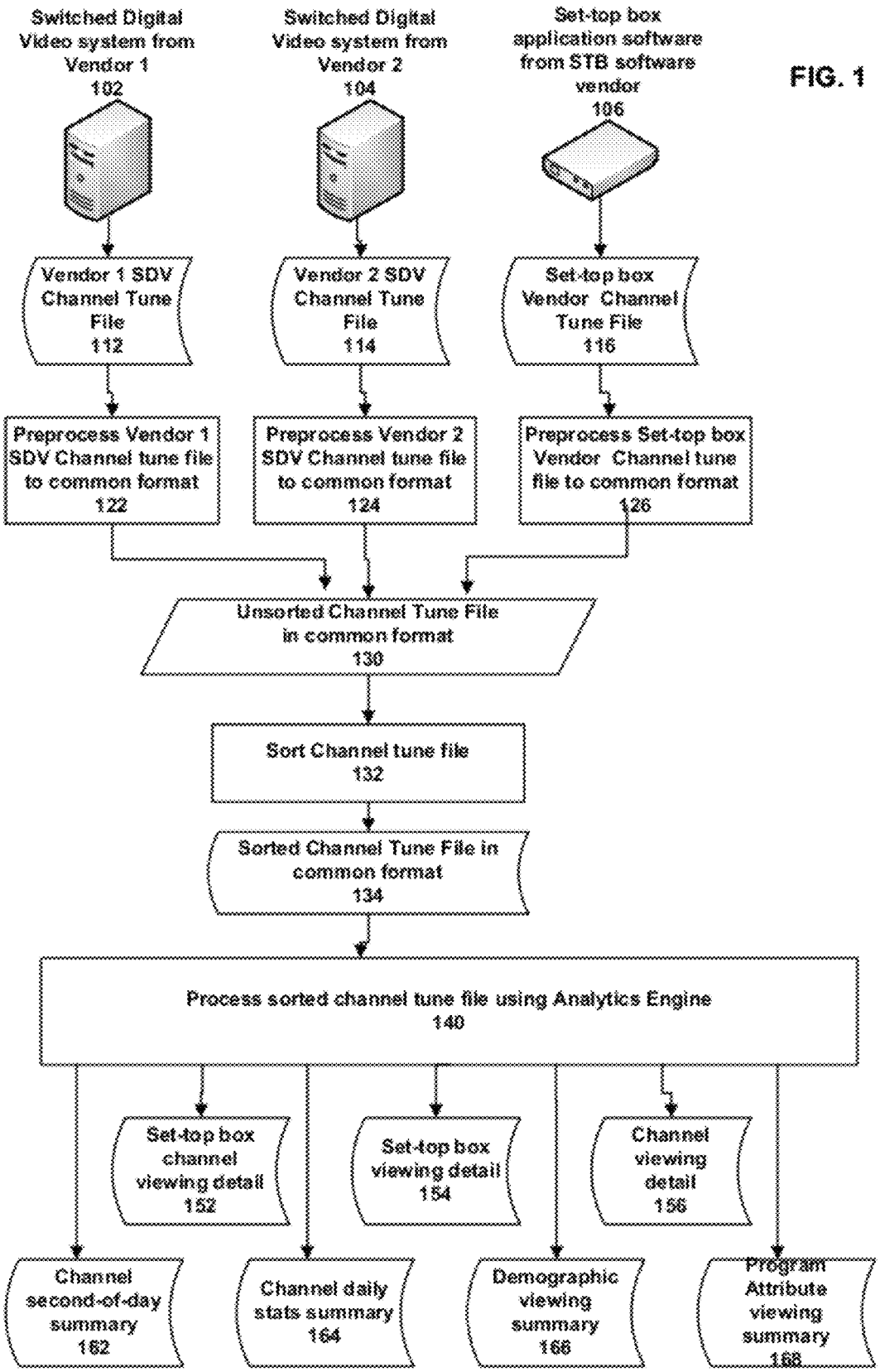
FIG. 1 illustrates an overview of an exemplary process for receiving and processing channel tune data from various sources, according to one embodiment.

FIG. 1 is a flowchart illustrating an overview of an exemplary process for receiving and processing channel tune data from various sources, according to one embodiment.

A cable television company operating a Switched Digital Video system using the SDV platform of a first vendor 102 collects channel tune data 112 in the format provided by Vendor 1's SDV system as part of the normal operation of said Switched Digital Video system. Channel tune data 112 is then preprocessed using a computer program 122 which reformats said SDV vendor's channel tune data into a common format, performs data enrichments, and applies business rules as data quality checks all in preparation for passing an unsorted channel tune file in a common or standardized format 130 into a sort function 132 which then sorts the data producing Sorted Channel Tune File in common format 134 in preparation for processing by an Analytics Engine 140.

A cable television company operating a Switched Digital Video system using the SDV platform of a second vendor 104 collects channel tune data in the format provided by Vendor 2's SDV system as part of the normal operation of said Switched Digital Video system. Channel tune data 114 is then preprocessed using a computer program 124 which reformats said SDV vendor's channel tune data into a common format, performs data enrichments, and applies business rules as data quality checks all in preparation for passing an unsorted channel tune file in a common or standardized format 130 into a sort function 132 which then sorts the data producing Sorted Channel Tune File in common format 134 in preparation for processing by an Analytics Engine 140.

A cable television company or satellite television broadcasting company provides Set-top box application software 106 for its customers to use to operate their set-top box. Such software may be developed in-house or by a third party. The STB software 106 collects channel tune data 116 as part of the normal operation of said Set-top box application software system. STB Channel tune data 116 is then preprocessed using a computer program 126 which reformats the STB Channel tune data 116 into a common format, performs data enrichments, and applies business rules as data quality checks all in preparation for passing an unsorted channel tune file in a common or standardized format 130 into a sort function 132 which then sorts the data producing Sorted Channel Tune File in common format 134 in preparation for processing by an Analytics Engine 140.

Analytics Engine 140 then loads the preprocessed channel tune data into the memory of a computer performing various aggregations, calculations and analytics which are then exported (written) to one or more files to make the analytics available for further reporting and analysis or for loading to downstream systems. The files produced include: STB-Channel-viewing-detail 152, STB-viewing-detail 154, Channel-viewing-detail 156, Channel-Second-of-day-summary 162, Channel-daily-statistics-summary 164, Demographic-viewing-summary 166, Program-attribute-viewing-summary 168 each containing metrics that have used data collected in the channel tuning file 112 to (i) provide insight into the amount of resource consumed by said human interaction with said set-top boxes interacting with said cable television system, (ii) provide insight into the set-top box usage pattern of said human, and (iii) provide insight into the behavior of said human.

Figure 2:
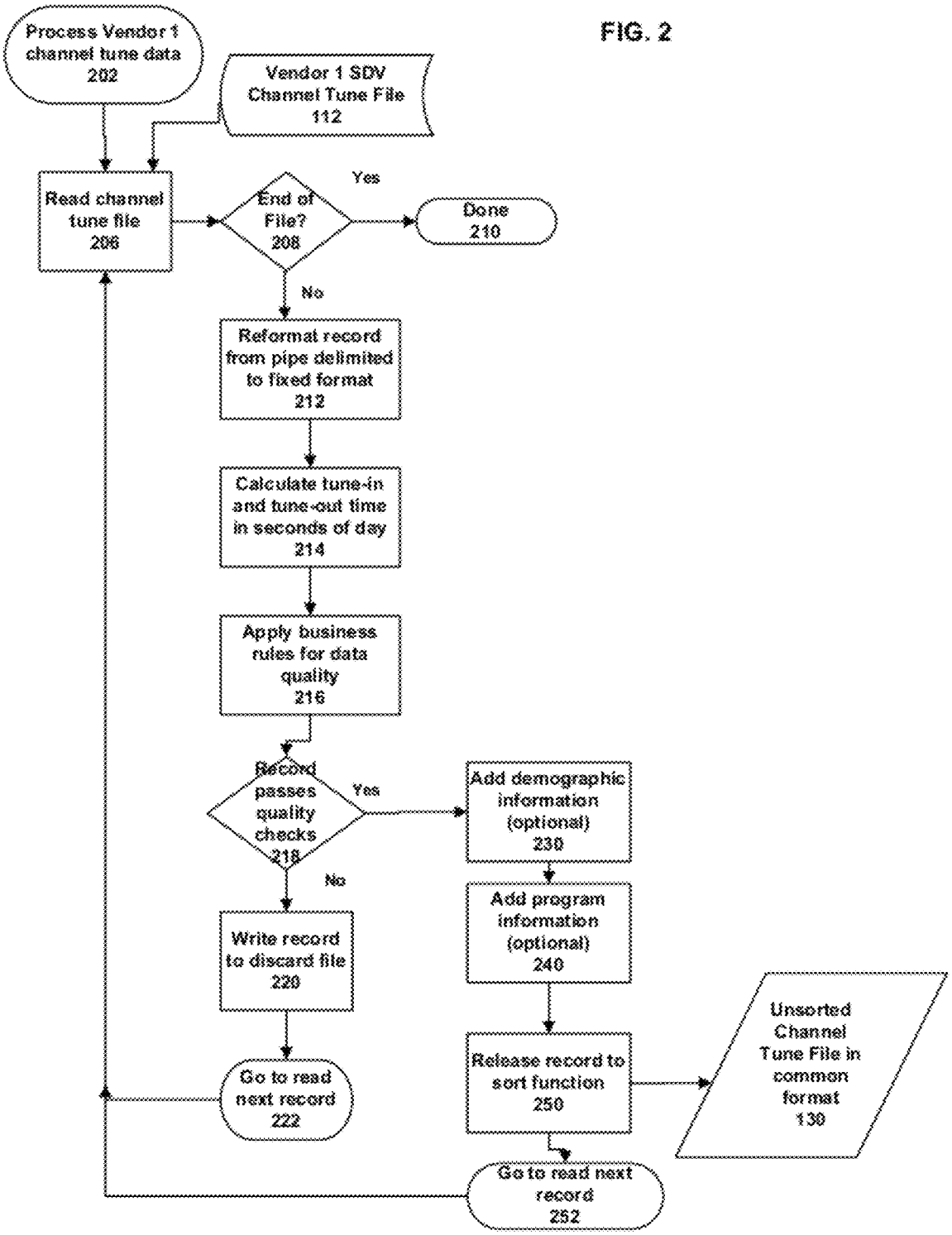
FIG. 2 illustrates an exemplary flowchart for preprocessing channel tune data from a Switched Digital Video system, according to one embodiment.

FIG. 2 is a flowchart which illustrates an exemplary process using a computer for preprocessing channel tune data from a Switched Digital Video system, according to one embodiment.

FIG. 2 provides the detail of 122 Preprocess Vendor 1 SDV Channel tune file to common format. The process begins with 202. A Read channel tune file 206 process reads each record in the file. The program checks for end of file 208 and stops when done 210.

For each record the program Reformats the record from the pipe-delimited format in which it was received to a fixed format 212.

The program then calculates 214 the tune-in and tune-out time in seconds of the day resulting in a values between 1 and 86,400. The calculations performed vary depending on the input format of the date and time.

The program then applies business rules 216 for data quality. For example, if the duration between tune-in and tune-out is more than 7,200 seconds (2 hours) the program terminates the session at the top of the next hour by assigning that second of the day as the tune-out time. Another business rule assigns default tune-in or tune-out times as needed to account for sessions that are missing a tune-in or tune-out time because the events occurred on different dates. The business rules to be applied vary depending on the what rules the SDV Vendor has applied to the file.

After the business rules 216 have been applied, the program checks to see if the record passes the quality checks 218.

For records that pass the quality checks 218, the program then optionally performs function Add demographic information 230 to the tuning record. This is done by using the Set-top box identifier to lookup various demographic values associated with the Set-top box user and then including those values as fields in the tuning record. The cable company or satellite provider or a third party could provide a file of demographic values (not shown) to associate with the Set-top box identifier. The Set-top box identifier may or may not be encrypted as long as the value of the STB identifier matches the values used in the demographic file.

Additionally, for records that pass the quality checks 218, the program then optionally performs function Add program attribute information 240 to the tuning record. This is done by using the Channel Source Id and the tune-in time of the tuning activity, along with Market+Headend+Hub as needed to locate the programming schedule relevant to the STB. Once the programming schedule information is located, the program can then access various program attribute values such as program type (sports, news, movie, advertisement), program genre, program rating, etc. and include these values as fields in the tuning record. The cable company or satellite provider or a third party could provide a file of program attributes to associate with the tuning data. This would measure the program attribute information at the time of tune-in event. Depending upon the type of measurement desired, one could systematically generate additional tuning records as the program attributes change in order to capture viewing behavior as program attributes change. The SDV vendor may be able to include this information in the data file.

At the completion of these steps, the record is Released to the sort function 250.

At this point the process proceeds to go to read the next record in the file 252.

If a tuning record fails the quality checks 218, the record is written to the discard file 220. From here the process proceeds to go to read next record in the file 222.

Figure 3A:
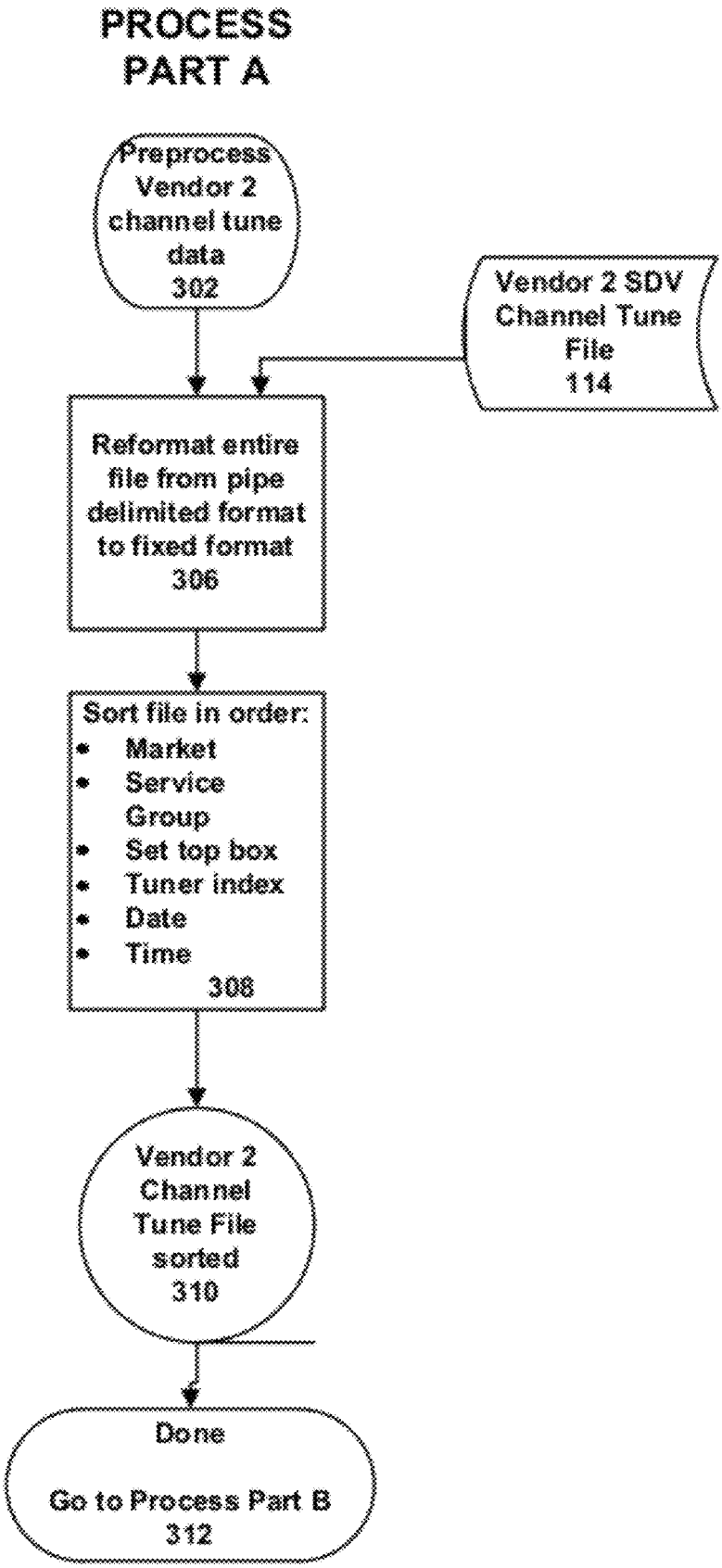
FIGS. 3A-B illustrate exemplary flowcharts for preprocessing channel tune data from another Switched Digital Video system, according to one embodiment with FIG. 3A showing Part A of the process and FIG. 3B showing Part B of the process.
Figure 3B:
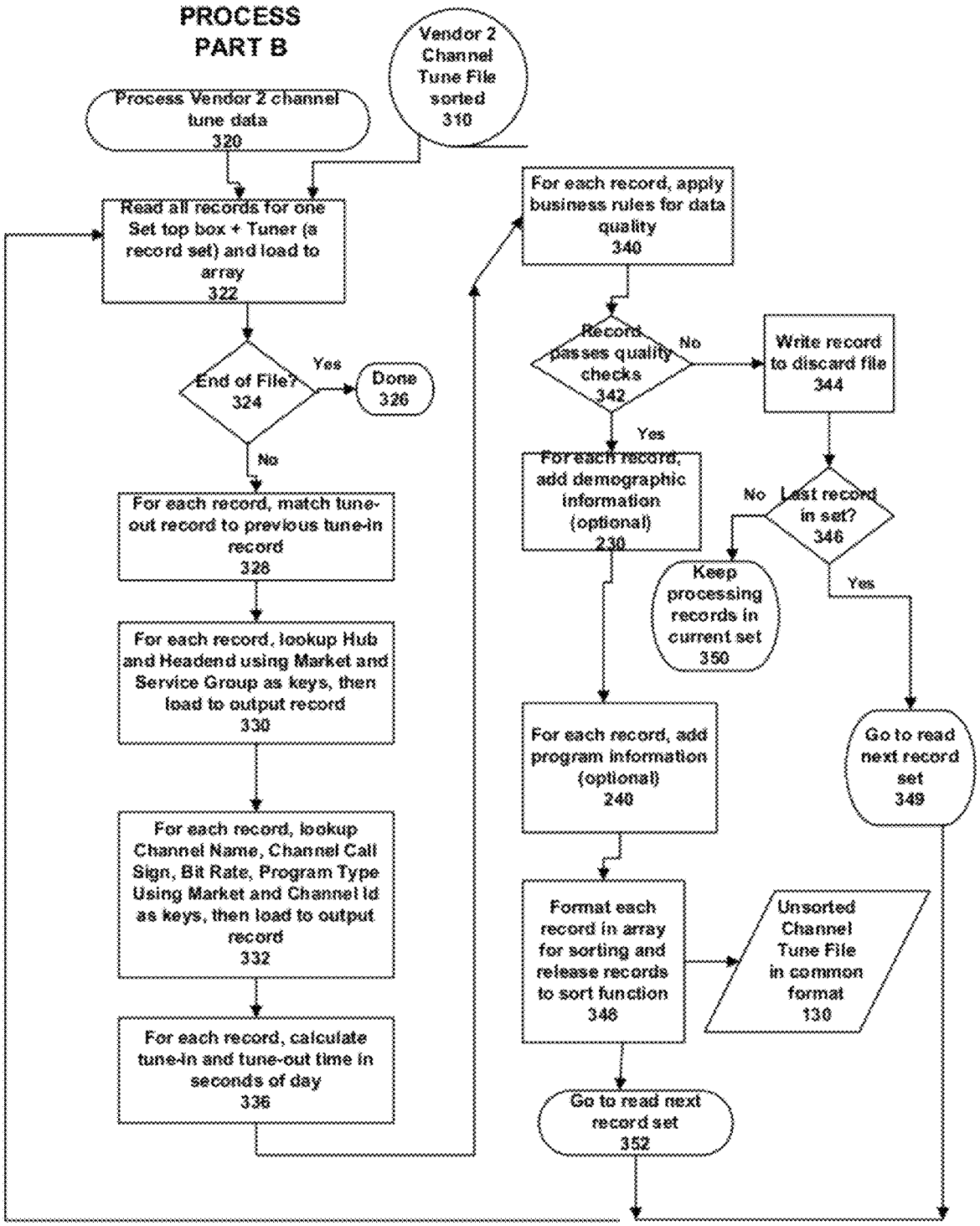

FIG. 3A is a flowchart which illustrates an exemplary process using a computer for preprocessing channel tune data from a Switched Digital Video system, according to one embodiment. FIGS. 3A-B provide the detail of 124 Preprocess Vendor 2 SDV Channel tune file to common format. In the case of Vendor 2's Channel Tuning File, each tuning record has a date+time and an event type such as tune-in or tune-out. The tune-in and tune-out are NOT on the same record.

Thus Preprocess 124 requires an initial step Process Part A to prepare to reformat the file such that the tune-in and tune-out appear on the same record. This Preprocess computer program begins with 302. The program first Reformats 306 the entire Vendor 2 SDV Channel Tune File 114 file from pipe delimited format to fixed format. The program then Sorts 308 the file in order Market, Service Group, Set-top box id, Tuner index, Date, and Time. The sort output is 310 Vendor 2 Channel Tune File Sorted. The program is now Done with Process Part A and can proceed to Part B 312.

FIG. 3B describes the second part of the preprocessing activity which must be done on Vendor 2's Channel Tuning File to prepare it for the Analytics Engine 140. Process Part B begins with 320 Process Vendor 2 channel tune data. Using the sorted file Vendor 2 Channel Tune File sorted 310 as input, process 322 reads all the records for one Set-top box+Tuner (a record set or the group of records having the same Set-top box+Tuner) and loads this record set to an array in the memory of a computer.

Step 324 is to identify end of file which indicates that file processing is Done 326.

For each record set, the program processes each record 328 in the set as follows: It loads the record set to an array in the memory of the computer. The program then matches the tune-out record to the previous tune-in record building a complete tuning record (one containing both a tune-in and a tune-out time).

The program then proceeds to 330 where for each record we enrich it by looking up the Hub and Headend using Market and Service Group as keys. When we find these values we include them in the tuning record.

The program then proceeds to 332 where for each record it is enriched by looking up the Channel Name, Channel Call Sign, Bit Rate, Program Type (SDV or Broadcast) using Market and Channel Id as keys. These values are then loaded to the tuning record.

The program then proceeds to 336 where for each record it is enriched by calculating the tune-in and tune-out time in seconds of day resulting in values between 1 and 86,400. The calculations performed vary depending on the input format of the date and time. These values are then loaded to the tuning record.

The program then proceeds to apply business rules 340 for data quality. For example, if the duration between tune-in and tune-out is more than 7,200 seconds (2 hours) the program terminates the session at the top of the next hour by assigning that second of the day as the tune-out time. Another business rule assigns default tune-in or tune-out times as needed to account for sessions that are missing a tune-in or tune-out time because the events occurred on different dates. Because of differences between the data from SDV Vendor 1 and SDV Vendor 2, the business rules may vary.

After the business rules 340 have been applied, the program checks to see if the record passes the quality checks 342.

For records that pass the quality checks 340, the program then optionally performs function Add demographic information 230 to the tuning record in the same manner as was done for SDV Vendor 1 data.

Additionally, for records that pass the quality checks 342, the program then optionally performs Add program attribute information 240 to the tuning record in the same manner as was done for SDV Vendor 1 data.

At the completion of these steps, the final formatting rules are applied and all the records in the record set are Released to the sort function 348.

At this point the program proceeds to go to read next record set 352. If a tuning record fails the quality checks 342, the record is written to the discard file 344.

Step 346 checks to see if it is the last record in the set.

If there are additional records in the set, step 350 continues processing records in the set.

If the record was the last record in the set 349, the program proceeds to read the next record set in the file 322.

Figure 4A:
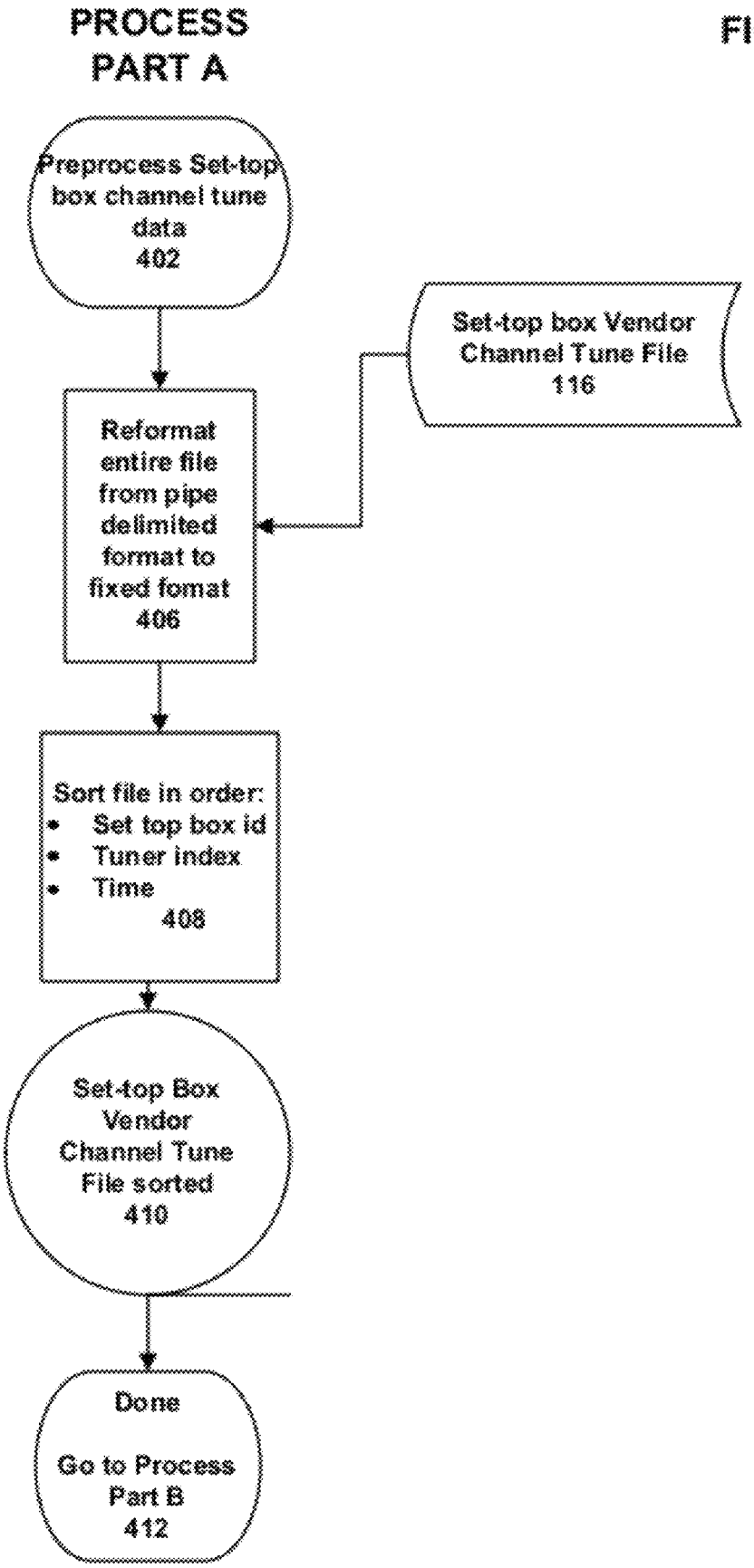

FIG. 4A is a flowchart which illustrates an exemplary process using a computer for preprocessing channel tune data from a Set-top box application system, according to one embodiment. FIGS. 4A-B provide the detail of 126 Preprocess Set-top box Vendor Channel tune file to common format. In the case of the Set-top box Channel Tuning File, each tuning record has a Set-top box identifier, a Tuner index, a time in seconds from some historic date such as EPOCH time (Jan. 1, 1970), and Channel information. The tune-in and tune-out are NOT on the same record.

Thus Preprocess 124 requires an initial step Process Part A to prepare to reformat the file such that the tune-in and tune-out appear on the same record. This Preprocess computer program begins with 402. The program first Reformats 406 the entire Set-top Box Channel Tune File 116 file from pipe delimited format to fixed format. The program then Sorts 408 the file in order Set-top box id, Tuner index, and Time (which is in seconds from some historic date). The sort output is 410 Set-top Box Vendor Channel Channel Tune File Sorted. The program is now Done with Process Part A and can proceed to Part B 412.

FIG. 4B describes the second part of the preprocessing activity which must be done on Set-top Box Channel Tuning File to prepare it for the Analytics Engine 140. Process Part B begins with 420 Process Set-top Box Channel tune data. Using the sorted file Set-top Box Vendor Channel Tune File sorted 410 as input, process 422 reads all the records for one Set-top box+Tuner (a record set or the group of records having the same Set-top box+Tuner) and loads this record set to an array in the memory of a computer.

Step 424 is to identify end of file which indicates that file processing is Done 426.

For each record set, the program processes each record 428 in the set as follows: It loads the record set to an array in the memory of the computer. The program then matches the tune-out record to the previous tune-in record building a complete tuning record (one containing both a tune-in and a tune-out time). The tune-out time of a record is the tune-in time of the next (subsequent) record minus 1 second. When the next activity is a power off, the tune-out time can be set as the time of the power off minus 1 second.

The program then proceeds to 430 where for each record it converts the tune-in time in seconds from the historic date to the actual tune-in date in YYYY-MM-DD HH:MM:SS AM/PM format.

The program then proceeds to 432 where for each record it converts the tune-out time in seconds from the historic date to the actual tune-out date in YYYY-MM-DD HH:MM:SS AM/PM format.

The program then proceeds to 434 where each record is enriched by looking up the Market, Service Group, Hub, and Headend using Set-top box identifier as the key to a lookup table. These values are then loaded to the tuning record.

The program then proceeds to 436 where each record is enriched by looking up the Channel Call Sign, Channel Source Id, Bit Rate, High Def or Standard Def code, and SDV or Broadcast code using Market and channel information as the keys to a lookup table. These values are then loaded to the tuning record.

The program then proceeds to 438 where for each record it is enriched by calculating the tune-in and tune-out time in seconds of day resulting in values between 1 and 86,400. These values are then loaded to the tuning record.

The program then proceeds to 440 where it applies business rules for data quality. For example, if the duration between tune-in and tune-out is more than 7,200 seconds (2 hours) the program terminates the session at the top of the next hour by assigning that second of the day as the tune-out time. Another business rule assigns default tune-in or tune-out times as needed to account sessions that are missing a tune-in or tune-out time because the events occurred on different dates. Based on the particulars of the Set-top box application and the quality checks it applies to the data, the business rules may vary.

After the program has applied business rules 440, it checks to see if the record passes the quality checks 442.

For records that pass the quality checks 442, the program then optionally performs function 230 to Add demographic information to the tuning record in the same manner as was done for SDV Vendor 1 data.

Additionally, for records that pass the quality checks 442, the program then optionally performs function 240 to Add program attribute information to the tuning record in the same manner as was done for SDV Vendor 1 data. The STB vendor may add program attribute information to the tuning file.

At the completion of these steps, the program then applies final formatting rules and releases the record to sort function 448.

At this point the program proceeds to read next record set 452.

If a tuning record fails the quality checks 442, the record is written to the discard file 444.

If there are additional records in the set, step 450 continues processing records in the set.

If the record was the last record in the set 449, the program proceeds to read the next record set in the file 422.

FIG. 5 is a flowchart which illustrates an exemplary process using a computer for sorting the Unsorted Channel Tune File 130, according to one embodiment. FIG. 5 provide the detail of 132 Sort Channel tune file.

FIGS. 14A-B-C provide the detail of the record that is being sorted in this step.

The process begins with Sort Preprocessed Channel Tune File 502. The program first Determines run type 504. Depending on the type of analytics to be produced, the system will sort the file that is used as input in a particular order.

In one embodiment, the run type is Set-top box+Channel Viewing detail 510. In this case, the Unsorted Channel Tune File in common format 130 is Sort by 514 into order: Market, Service Group, Hub, Headend, Set-top box id, Tuner Index, Channel Call Sign, Channel Source Id, and Tune-in second of day. The resulting file from this computer sort is File sorted for Set-top box+Channel viewing Analytics 518 which is a particular instance of part 134.

In another embodiment, the run type is Set-top box Viewing detail 520. In this case, the Unsorted Channel Tune File in common format 130 is Sort by 524 into order: Market, Service Group, Hub, Headend, Set-top box id, Tuner Index, and Tune-in second of day. The resulting file from this computer sort is File sorted for Set-top box viewing Analytics 528 which is a particular instance of part 134.

In another embodiment, the run type is Channel Viewing detail 530. In this case, the Unsorted Channel Tune File in common format 130 is Sort by 534 into order: Market, Service Group, Hub, Headend, Channel Call Sign, Channel Source Id, and Tune-in second of day. The resulting file from this computer sort is File sorted for Channel viewing Analytics 538 which is a particular instance of part 134.

In another embodiment, the run type is Program Attribute Aggregation 540. In this case, the Unsorted Channel Tune File in common format 130 is Sort by 544 into order: Market, Service Group, Hub, Headend, Program Attribute 1, Program Attribute 2, and Tune-in second of day. The resulting file from this computer sort is File sorted for Program Attribute Analytics 548 which is a particular instance of part 134.

In another embodiment, the run type is Demographic Category Aggregation 550. In this case, the Unsorted Channel Tune File in common format 130 is Sort by 554 into order: Market, Service Group, Hub, Headend, Demographic Category 1, Demographic Category 2, and Tune-in second of day. The resulting file from this computer sort is File sorted for Demographic Category Analytics 558 which is a particular instance of part 134.

Figure 6A:
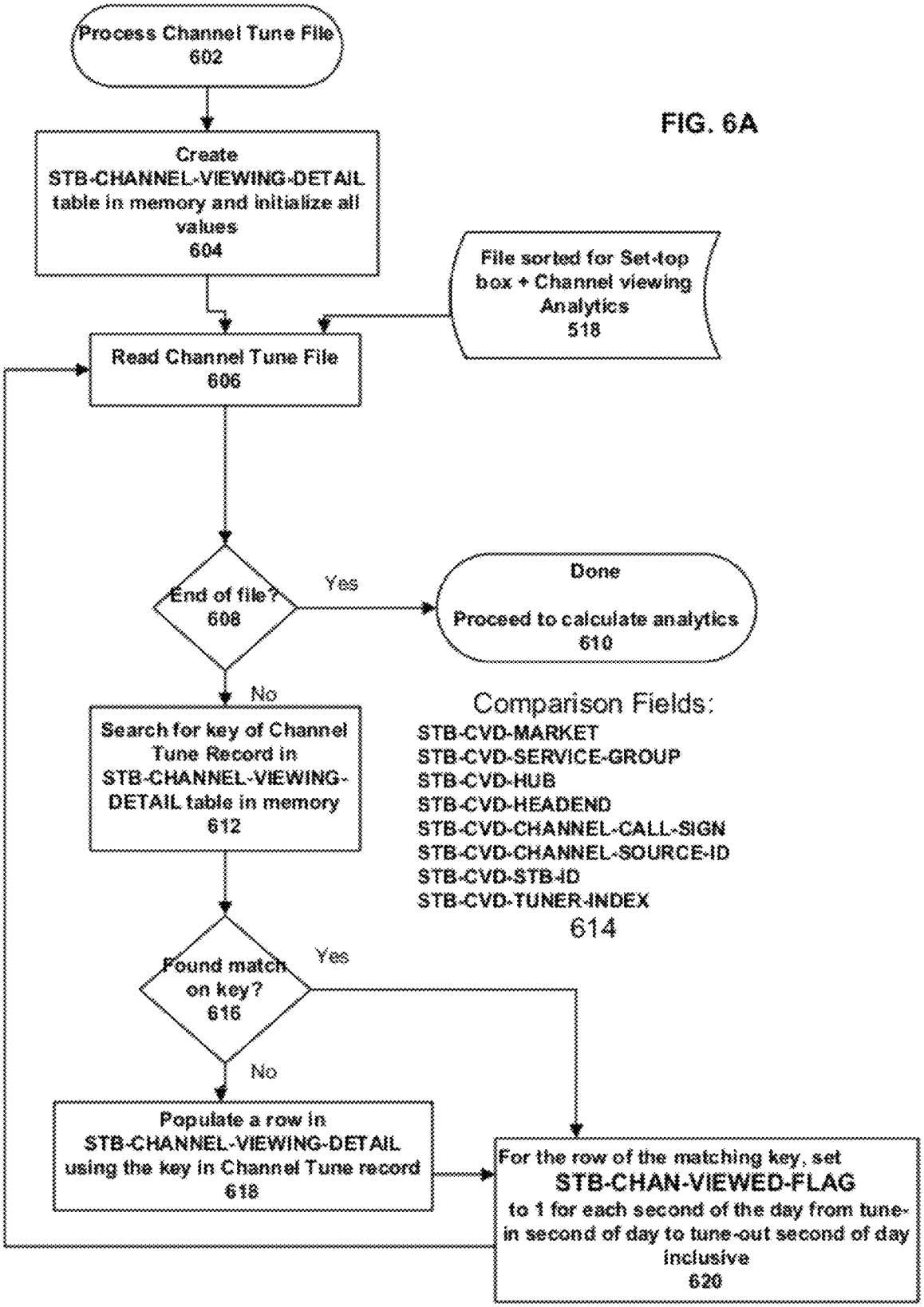

FIGS. 6A-B illustrate an exemplary process for loading standardized channel tune data into the STB-CHANNEL-VIEWING-DETAIL Data Structure (table) in the memory of the computer that is running the Analytics Engine 140, according to one embodiment. The data is being loaded to this Data Structure so that the Analytics Engine 140 can then calculate the various STB+Channel metrics. The STB-CHANNEL-VIEWING-DETAIL Data Structure is described in detail in FIGS. 15-A-B with FIG. 15-A illustrating the Data Structure, and FIG. 15-B illustrating sample data in this Data Structure, according to one embodiment.

FIG. 6A illustrates a flowchart of the process which begins with Process Channel Tune File 602. The computer program first creates the STB-CHANNEL-VIEWING-DETAIL Data Structure (table) FIGS. 15-A-B in the memory of the computer and initializes all the values 604 to space or zero depending on the data type. The program next Reads Channel Tune File 606 using File sorted for Set-top box+ Channel viewing Analytics 518 as input. This input file format is described in FIGS. 14A-B-C. The program checks for End of file 608. When true, the loading of the Data Structure is Done 610 and the program proceeds to calculate analytics.

When it is not end of file, the program Searches for key of Channel Tune record in STB-CHANNEL-VIEWING-DETAIL Data Structure (table) in the memory 612. The Comparison fields for this search are STB-CVD-MARKET, STB-CVD-SERVICE-GROUP, STB-CVD-HUB, STB-CVD-HEADEND, STB-CVD-CHANNEL-CALL-SIGN, STB-CVD-CHANNEL-SOURCE-ID, STB-CVD-STB-ID, STB-CVD-TUNER-INDEX 614. When Found match on key 616 is Yes/true, the program proceeds to set STB-CHAN-VIEWED-FLAG to 1 for each second of the day from tune-in second of day to tune-out second of day inclusive 620.

When Found match on key 616 is No/false, the program Populate a row in STB-CHANNEL-VIEWING-DETAIL using the key in Channel Tune record 618. It then proceeds to 620 where populates the STB-CHAN-VIEWED-FLAG.

After the program has completed step 620, it proceeds to 606 to read the next record in the file.

FIG. 6B illustrates an exemplary code sample for loading the STB-CHANNEL-VIEWING-DETAIL table FIGS. 15-A-B in the memory of the computer, according to one embodiment. The code follows the pattern of the flowchart in FIG. 6A.

Figure 7A:
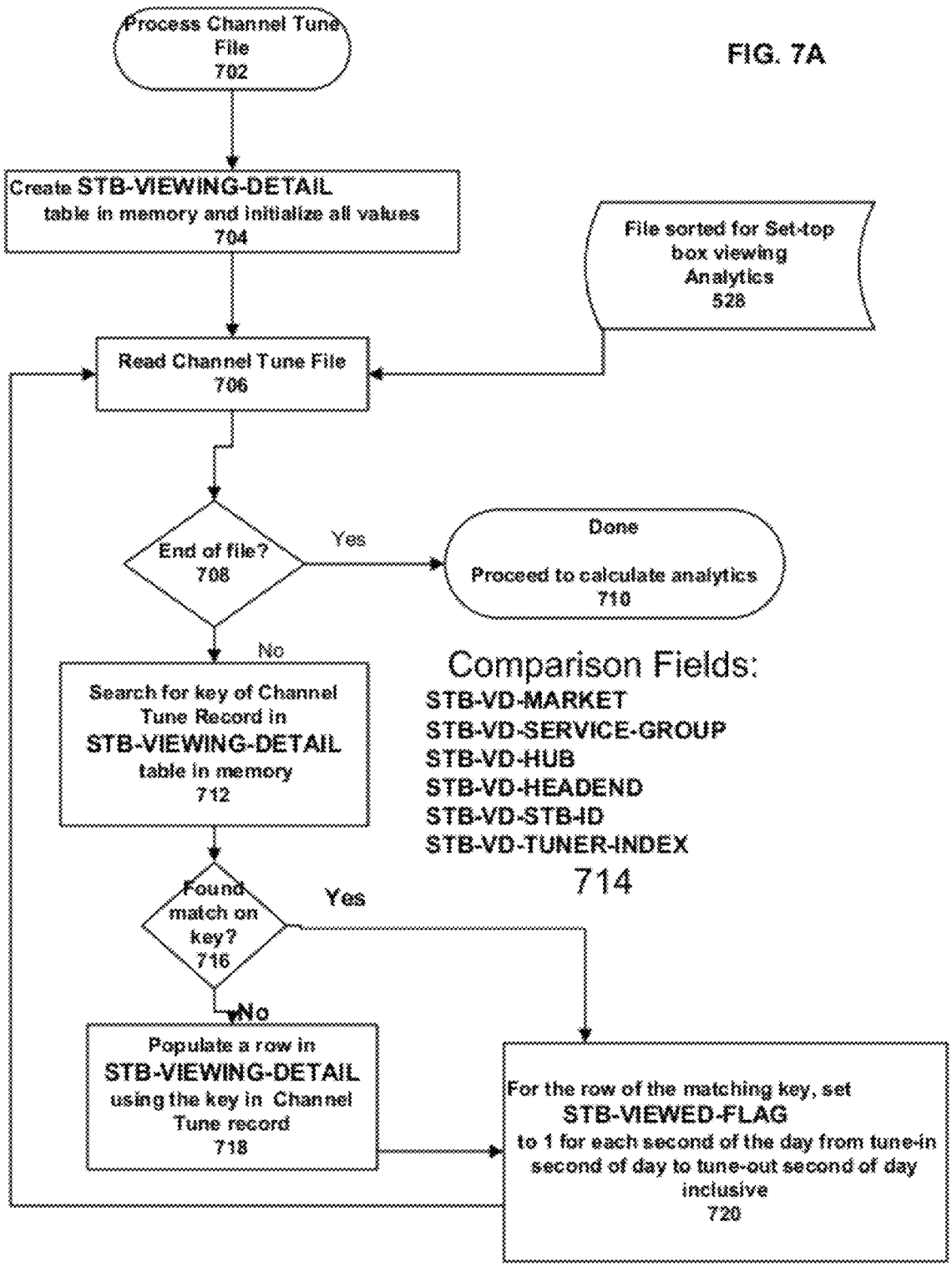

FIGS. 7A-B illustrate an exemplary process for loading standardized channel tune data into the STB-VIEWING-DETAIL Data Structure (table) in the memory of the computer that is running the Analytics Engine 140, according to one embodiment. The data is being loaded to this table so that the Analytics Engine 140 can then calculate the various STB metrics. The STB-VIEWING-DETAIL Data Structure is described in detail in FIGS. 16-A-B with FIG. 16-A illustrating the Data Structure, and FIG. 16-B illustrating sample data in this Data Structure, according to one embodiment.

FIG. 7A illustrates a flowchart of the process which begins with Process Channel Tune File 702. The computer program first creates the STB-VIEWING-DETAIL Data Structure FIGS. 16-A-B in the memory of the computer and initializes all the values 704 to space or zero depending on the data type. The program next Reads Channel Tune File 706 using File sorted for Set-top box viewing Analytics 528 as input. This input file format is described in FIGS. 14A-B-C. The program checks for End of file 708. When true, the loading of the array is Done 710 and the program proceeds to calculate analytics.

When it is not end of file, the program Searches for key of Channel Tune record in STB-VIEWING-DETAIL table in the memory 712. The Comparison fields for this search are STB-VD-MARKET, STB-VD-SERVICE-GROUP, STB-VD-HUB, STB-VD-HEADEND, STB-VD-STB-ID, STB-VD-TUNER-INDEX 714. When Found match on key 716 is Yes/true, the program proceeds to set STB-VIEWED-FLAG to 1 for each second of the day from tune-in second of day to tune-out second of day inclusive 720.

When Found match on key 716 is No/false, the program Populate a row in STB-VIEWING-DETAIL using the key in Channel Tune record 718. It then proceeds to 720 where it populates the STB-VIEWED-FLAG.

After the program has set the completed step 720, it proceeds to 706 to read the next record in the file.

FIG. 7B illustrates an exemplary code sample for loading the STB-VIEWING-DETAIL table FIGS. 16-A-B in the memory of the computer, according to one embodiment. The code follows the pattern of the flowchart in FIG. 7A.

Figure 8A:
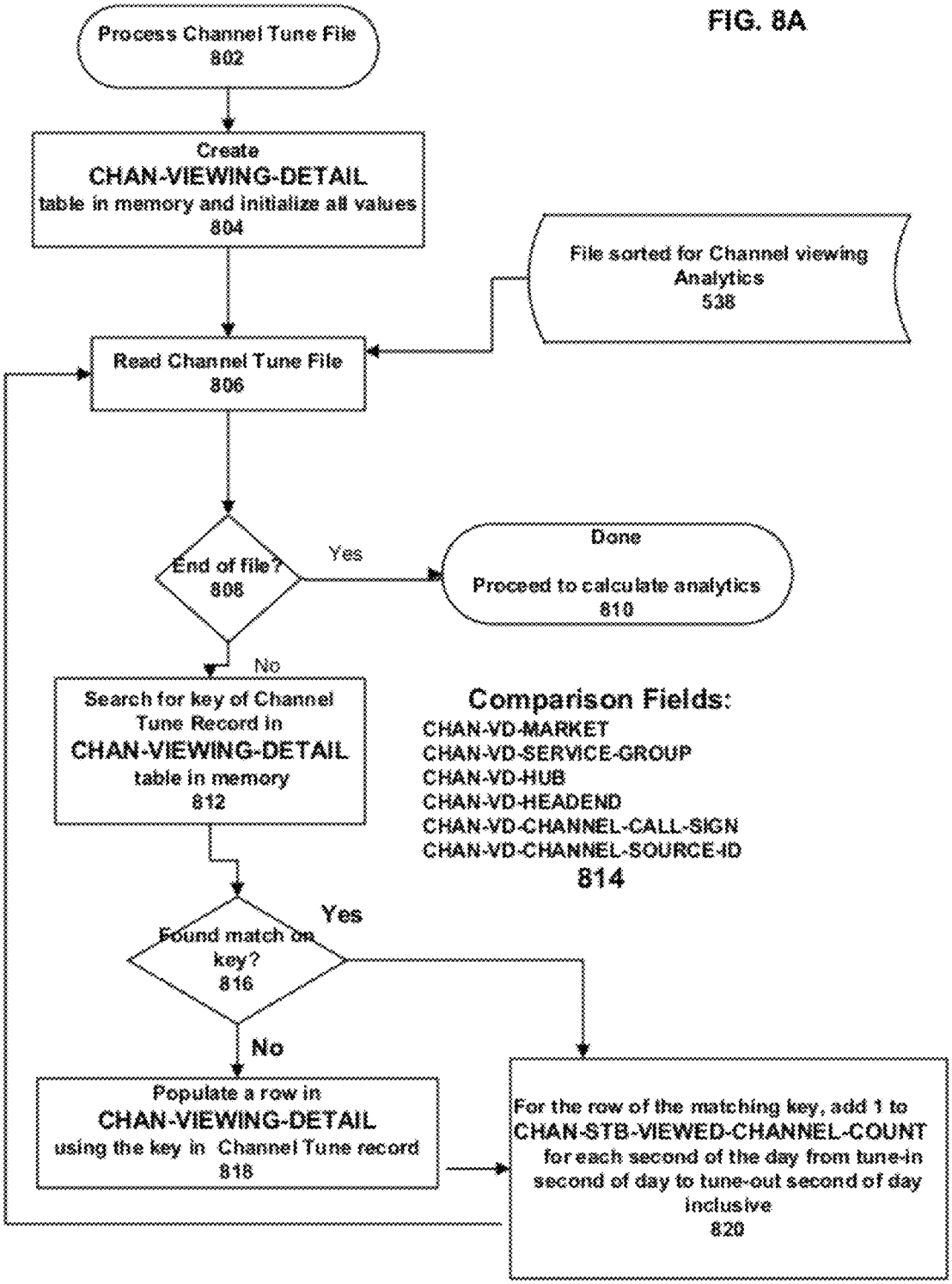

FIGS. 8A-B illustrate an exemplary process for loading standardized channel tune data into the CHAN-VIEWING-DETAIL Data Structure (table) in the memory of the computer that is running the Analytics Engine 140, according to one embodiment. The data is being loaded to this Data Structure so that the Analytics Engine 140 can then calculate the various Channel metrics. The CHAN-VIEWING-DETAIL Data Structure is described in detail in FIGS. 17-A-B with FIG. 17-A illustrating the Data Structure, and FIG. 17-B illustrating sample data in this Data Structure, according to one embodiment.

FIG. 8A illustrates a flowchart of the process which begins with Process Channel Tune File 802. The computer program first creates the CHAN-VIEWING-DETAIL Data Structure FIGS. 17-A-B in the memory of the computer and initializes all the values 804 to space or zero depending on the data type. The program next Reads Channel Tune File 806 using File sorted for Channel viewing Analytics 538 as input. This input file format is described in FIGS. 14A-B-C. The program checks for End of file 808. When true, the loading of the array is Done 810 and the program proceeds to calculate analytics.

When it is not end of file, the program Searches for key of Channel Tune record in CHAN-VIEWING-DETAIL Data Structure in the memory 812. The Comparison fields for this search are CHAN-VD-MARKET, CHAN-VD-SERVICE- GROUP, CHAN-VD-HUB, CHAN-VD-HEADEND, CHAN-VD-CHANNEL-CALL-SIGN, CHAN-VD-CHANNEL-SOURCE-ID 814. When Found match on key 816 is Yes/true, the program proceeds to add 1 to CHAN-STB-VIEWED-CHANNEL-COUNT for each second of the day from tune-in second of day to tune-out second of day inclusive 820.

When Found match on key 816 is No/false, the program Populate a row in CHAN-VIEWING-DETAIL using the key in Channel Tune record 818. It then proceeds to 820 where the program does add 1 to CHAN-STB-VIEWED-CHANNEL-COUNT as before.

The program also tallies tune-ins-per-second 3940 at this time by adding 1 to the second of the day in which the tune-in occurs. See program for details.

After the program has completed step 820, it proceeds to 806 to read the next record in the file.

FIG. 8B illustrates an exemplary code sample for loading the CHAN-VIEWING-DETAIL Data Structure FIGS. 17-A-B in the memory of the computer, according to one embodiment. The code follows the pattern of the flowchart in FIG. 8A.

Figure 9A:
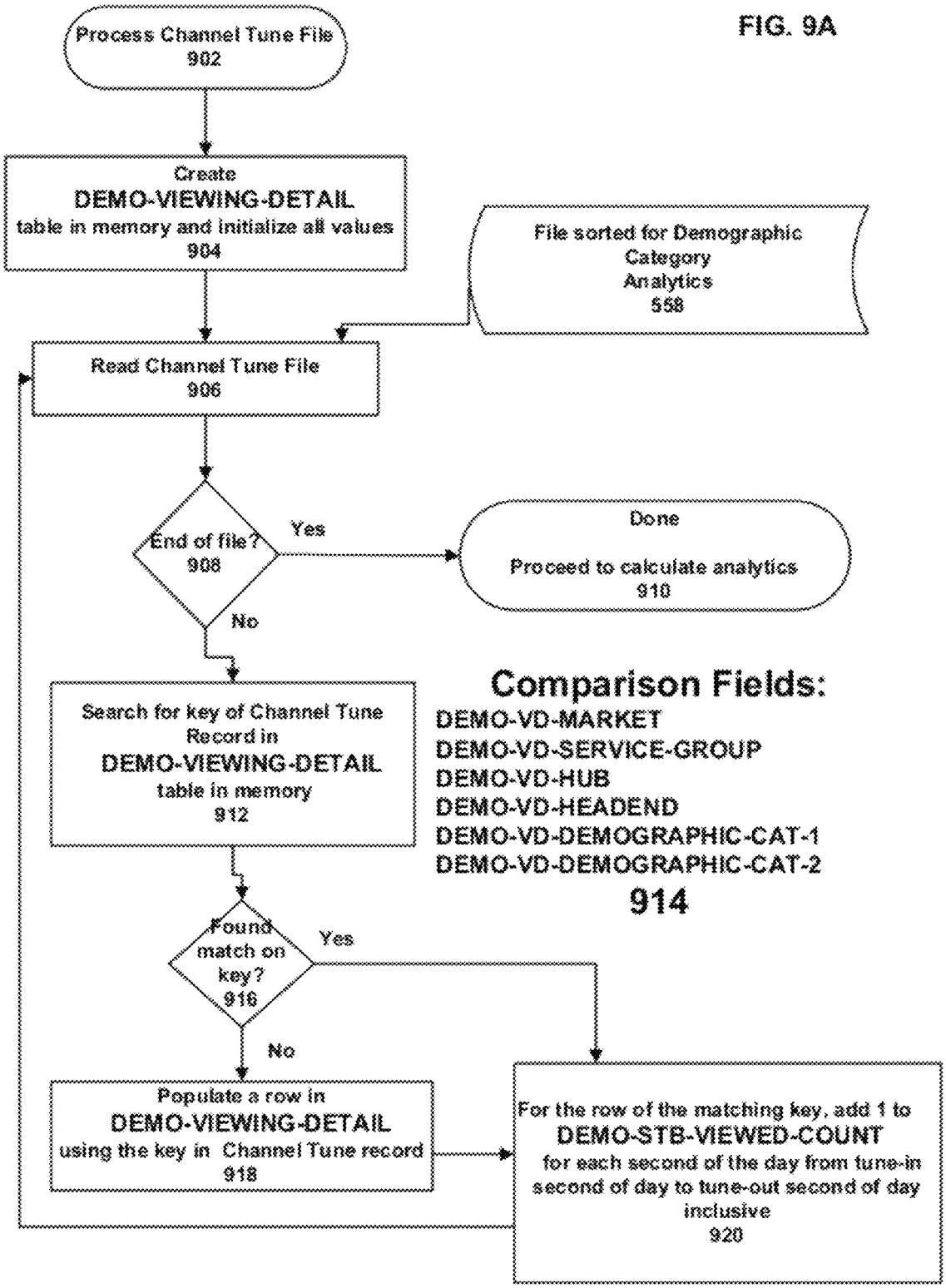

FIGS. 9A-B illustrate an exemplary process for loading standardized channel tune data into the DEMO-VIEWING-DETAIL Data Structure (table) in the memory of the computer that is running the Analytics Engine 140, according to one embodiment. The data is being loaded to this Data Structure so that the Analytics Engine 140 can then calculate the various Demographic metrics. The DEMO-VIEWING-DETAIL Data Structure is described in detail in FIGS. 20-A-B with FIG. 20-A illustrating the Data Structure, and FIG. 20-B illustrating sample data in this Data Structure, according to one embodiment.

FIG. 9A illustrates a flowchart of the process which begins with Process Channel Tune File 902. The computer program first creates the DEMO-VIEWING-DETAIL Data Structure FIGS. 20-A-B in the memory of the computer and initializes all the values 904 to space or zero depending on the data type. The program next Reads Channel Tune File 906 using File sorted for Demographic Category Analytics 558 as input. This input file format is described in FIGS. 14A-B-C. The program checks for End of file 908. When true, the loading of the Data Structure is Done 910 and the program proceeds to calculate analytics.

When it is not end of file, the program Searches for key of Channel Tune record in DEMO-VIEWING-DETAIL Data Structure in the memory 912. The Comparison fields for this search are DEMO-VD-MARKET, DEMO-VD-SERVICE-GROUP, DEMO-VD-HUB, DEMO-VD-HEADEND, DEMO-VD-DEMOGRAPHIC-CAT-1, DEMO-VD-DEMOGRAPHIC-CAT-2 914. When Found match on key 916 is Yes/true, the program proceeds to add 1 to DEMO-STB-VIEWED-COUNT for each second of the day from tune-in second of day to tune-out second of day inclusive 920.

When Found match on key 916 is No/false, the program Populate a row in DEMO-VIEWING-DETAIL using the key in Channel Tune record 918. It then proceeds to 920 where add 1 to DEMO-STB-VIEWED-COUNT as before.

After the program has set the completed step 920, it proceeds to 906 to read the next record in the file.

FIG. 9B illustrates an exemplary code sample for loading the DEMO-VIEWING-DETAIL table FIGS. 20-A-B in the memory of the computer, according to one embodiment. The code follows the pattern of the flowchart in FIG. 9A.

Figure 10A:
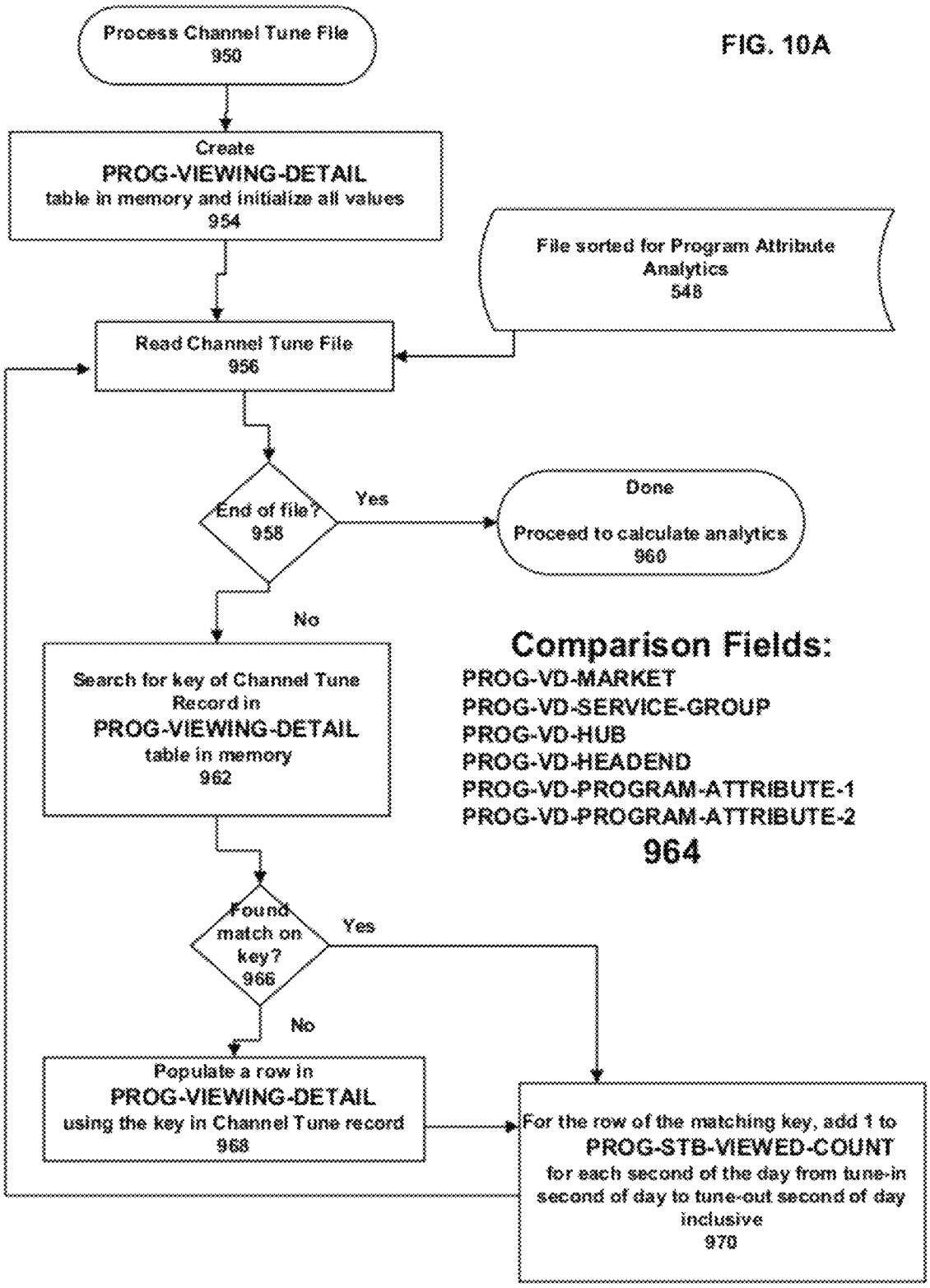

FIGS. 10A-B illustrate an exemplary process for loading standardized channel tune data into the PROG-VIEWING-DETAIL Data Structure (table) in the memory of the computer that is running the Analytics Engine 140, according to one embodiment. The data is being loaded to this Data Structure so that the Analytics Engine 140 can then calculate the various Program Attribute metrics. The PROG-VIEWING-DETAIL Data Structure is described in detail in FIGS. 21-A-B with FIG. 21-A illustrating the Data Structure, and FIG. 21-B illustrating sample data in this Data Structure, according to one embodiment.

FIG. 10A illustrates a flowchart of the process which begins with Process Channel Tune File 950. The computer program first creates the PROG-VIEWING-DETAIL Data Structure FIGS. 21-A-B in the memory of the computer and initializes all the values 954 to space or zero depending on the data type. The program next Reads Channel Tune File 956 using File sorted for Program Attribute Analytics 548 as input. This input file format is described in FIGS. 14A-B-C. The program checks for End of file 958. When true, the loading of the Data Structure is Done 960 and the program proceeds to calculate analytics.

When it is not end of file, the program Searches for key of Channel Tune record in PROG-VIEWING-DETAIL Data Structure in the memory 962. The Comparison fields for this search are PROG-VD-MARKET, PROG-VD-SERVICE-GROUP, PROG-VD-HUB, PROG-VD-HEADEND, PROG-VD-PROGRAM-ATTRIBUTE-1, PROG-VD-PROGRAM-ATTRIBUTE-2 964. When Found match on key 966 is Yes/true, the program proceeds to add 1 to PROG-STB-VIEWED-COUNT for each second of the day from tune-in second of day to tune-out second of day inclusive 970.

When Found match on key 966 is No/false, the program Populate a row in PROG-VIEWING-DETAIL using the key in Channel Tune record 968. It then proceeds to 970 where add 1 to PROG-STB-VIEWED-COUNT as before.

After the program has completed step 970, it proceeds to 956 to read the next record in the file.

FIG. 10B illustrates an exemplary code sample for loading the PROG-VIEWING-DETAIL table FIGS. 21-A-B in the memory of the computer, according to one embodiment. The code follows the pattern of the flowchart in FIG. 10A.

FIGS. 11-A-B-C illustrate an exemplary channel tune file format and data according to one embodiment.

FIG. 11-A illustrates the file format in which Switched Digital Video channel tuning data 112 from Vendor 1 may arrive.

FIG. 11-B illustrates two sample records 1003 and 1005 containing Switched Digital Video channel tuning data 112 from Vendor 1. Note that these records arrive as variable length records in pipe delimited format.

FIG. 11-C illustrates these two sample records 1003 and 1005 formatted into a table for human readability.

FIGS. 12-A-B-C illustrate another exemplary channel tune file format and data according to one embodiment.

FIG. 12-A illustrates the file format in which Switched Digital Video channel tuning data 114 from Vendor 2 may arrive.

FIG. 12-B illustrates two sample records 1403 and 1405 containing Switched Digital Video channel tuning data 114 from Vendor 2. Note that these records arrive as variable length records in pipe delimited format.

FIG. 12-C illustrates these two sample records 1403 and 1405 formatted into a table for human readability.

FIGS. 13-A-B-C illustrate an exemplary channel tune file format and data from a Set-top box system according to one embodiment.

FIG. 13-A illustrates the file format in which Set-top box channel tuning data 116 from Set-top box application software may arrive.

FIG. 13-B illustrates two sample records 1603 and 1605 containing Set-top box channel tuning data 116 from a Set-top box system. Note that these records arrive as variable length records in pipe delimited format.

FIG. 13-C illustrates these two sample records 1603 and 1605 formatted into a table for human readability.

FIGS. 14-A-B-C illustrate an exemplary channel tune file formatted for use by the Analytics Engine 140.

FIG. 14-A illustrates the record layout of both the Unsorted Channel Tune File 130 and the Sorted Channel Tune File in common format 134.

FIG. 14-B illustrates sample data in these record layouts without program attribute, or demographics values populated.

FIG. 14-C illustrates sample data in these record layouts with program attribute, and demographics values populated. Process 230 adds the demographic data to the file. Process 240 add the program attribute information to the file.

FIGS. 15-A-B illustrate an exemplary Data Structure for use by the Analytics Engine 140 when processing channel tune records where the analytics require Market+Service-Group+Hub+Headend+Channel Call Sign+Channel Source Id+Set-top box+Tuner detail where the granularity is second of day, according to one embodiment.

FIG. 15-A illustrates the Data Structure, according to one embodiment. Fields 3010-3150 occur multiple times with the number of occurrences large enough to hold all of the combinations of Set-top box and Channel that normally occur within a Service Group in one day. A typical value may be 400 STB's in a Service Group*1.5 tuners per STB*5 channel changes per day which results in 400*1.5*5=3,000 rows. Also note that for each row, the field STB-CHAN-VIEWED-FLAG occurs 86400 times, or once for each second of the day.

In order to reduce the size of this Data Structure, the program can limit the period of analysis to a part of the day such as prime time viewing hours.

FIG. 15-B illustrates sample data in this Data Structure, according to one embodiment. Note that for each second of the day, the program simply sets a 0 or 1 flag to indicate whether or not the STB was tuned to that channel during that second of the day. A 0 means not tuned, a 1 means tuned.

The Analytics Engine 140 populates each of the fields as follows:

STB-CVD-MARKET 3010 is populated from MARKET 1810 in input file 518.

STB-CVD-SERVICE-GROUP 3020 is populated from SERVICE-GROUP 1820 in input file 518.

STB-CVD-HUB 3030 is populated from HUB 1830 in input file 518.

STB-CVD-HEADEND 3040 is populated from HEADEND 1840 in input file 518.

STB-CVD-CHANNEL-CALL-SIGN 3050 is populated from CHANNEL-CALL-SIGN 1870 in input file 518.

STB-CVD-CHANNEL-SOURCE-ID 3060 is populated from CHANNEL-SOURCE-ID 1880 in input file 518.

STB-CVD-STB-ID 3070 is populated from SET-TOP-BOX-ID 1850 in input file 518.

STB-CVD-TUNER-INDEX 3080 is populated from TUNER-INDEX 1860 in input file 518.

The following fields require more complex processing to populate.

STB-CHANNEL-VIEWING-SECONDS 3090 has this definition:

For each set-top box+channel combination, count of the number of seconds the set top box was tuned to the channel during the day. This measures how much time the STB was tuned to each channel.

The Analytics Engine 140 performs the following algorithm to populate this field:

```
Perform varying stb-chan-sub
  From 1 by 1
  Until stb-chan-sub>stb-chan-in-array
  Move zero to
    STB-Channel-Viewing-seconds (stb-chan-sub)
  Perform varying second-sub
    From 1 by 1 until
    Second-sub>seconds-in-array
    If STB-CHAN-VIEWED-FLAG (stb-chan-sub, second-sub)=1
      Compute

        STB-Channel-Viewing-seconds(stb-chan-sub)=STB-
            Channel-Viewing-seconds(stb-chan-sub)+1

    End-if
  End-perform
  End-perform
```

STB-CHANNEL-TUNE-INS 3100 has this definition:

For each set-top box+channel combination, count of the number of times the set-top box tuned to that channel during the day. This measures the propensity of the viewer to gravitate back to a channel after leaving it. A tune-in is identified in the table by a STB channel viewed flag of 1 that was immediately preceded by a STB channel viewed flag of 0. If the channel was tuned at the first second of the day, we count that as a tune in.

The Analytics Engine 140 performs the following algorithm to populate this field:

```
  Perform varying stb-chan-sub
  From 1 by 1
  Until stb-chan-sub>stb-chan-in-array
  Move zero to
    STB-Channel-tune-ins (stb-chan-sub)
  If STB-CHAN-VIEWED-FLAG (stb-chan-sub, 1)=1
    Compute

      STB-Channel-tune-ins(stb-chan-sub)=STB-Channel-
          tune-ins(stb-chan-sub)+1

  End-if
  Perform varying second-sub
    From 2 by 1 until
    Second-sub>seconds-in-array
    If STB-CHAN-VIEWED-FLAG (stb-chan-sub, second-sub)=1
    And
    STB-CHAN-VIEWED-FLAG (stb-chan-sub, second-sub−1)=0
      Compute

        STB-Channel-tune-ins(stb-chan-sub)=STB-Channel-
            tune-ins(stb-chan-sub)+1

    End-if
  End-perform
  End-perform
```

STB-CHAN-AVG-VIEWING-DURATION 3110 has this definition:

Set-top box+Channel average viewing duration measures the average length of time that the set-top box was tuned to that channel.

The Analytics Engine 140 performs the following algorithm to populate this field:

```
Perform varying stb-chan-sub
From 1 by 1
Until stb-chan-sub>stb-chan-in-array
  If STB-Channel-tune-ins (stb-chan-sub)>0
    Compute
      STB-Chan-Avg-viewing-duration(stb-chan-sub)=
        STB-Channel-Viewing-seconds(stb-chan-sub)/
        STB-Channel-tune-ins(stb-chan-sub)
  End-if
End-perform
```

STB-CHAN-STAY-AWAY-SECS-TOTAL 3120 has this definition:

For each set-top box+channel combination, count the number of seconds the STB stays away from the channel, but include only those tune-away events where the STB returns to the channel soon thereafter, such as within 300 seconds or five minutes, and total this for the day. This measures the propensity of the viewer to return to the channel after leaving it.

The Analytics Engine 140 performs an algorithm to populate this field. The algorithm is shown in the source code.

STB-CHAN-STAY-AWAY-TUNE-COUNT 3130 has this definition:

For each set-top box+channel combination, count of the number of times the set top box goes away from the channel and then returns soon thereafter, totaled for the day. This measures how often the viewer leaves the channel only to return soon thereafter (for example, within 300 seconds).

The Analytics Engine 140 performs an algorithm to populate this field. The algorithm is shown in the source code.

STB-CHAN-AVG-STAY-AWAY-SECS 3140 has this definition:

For each set-top box+channel combination, this is a measure of the average stay away seconds, for those channel changes on the STB that qualify as stay-away channel changes. This produces an average of how long the viewer stays away when the viewer leaves the channel only to return soon thereafter.

The Analytics Engine 140 performs the following algorithm to populate this field:

```
If Stb-chan-stay-away-tune-count (stb-chan-sub)>0
    Compute Stb-chan-avg-stay-away-secs(stb-chan-
        sub)= Stb-chan-stay-away-secs-total(stb-chan-
        sub)/Stb-chan-stay-away-tune-count(stb-chan-
        sub)
End-if
```

FIGS. 16-A-B illustrate an exemplary Data Structure for use by the Analytics Engine 140 when processing channel tune records where the analytics require Market+Service-Group+Hub+Headend+Set-top box+Tuner detail where the granularity is second of day, according to one embodiment.

FIG. 16-A illustrates the Data Structure, according to one embodiment. Fields 3210-3310 occur multiple times with the number of occurrences large enough to hold all of the combinations of Set-top box and Tuner that normally occur within a Service Group in one day. A typical value may be 400 STB's in a Service Group with perhaps tuning data from 1.5 tuners per box on average which results in 400*1.5=600 rows. For each row, the field STB-VIEWED-FLAG occurs 86400 times, or once for each second of the day. Also, for each row, the field STB-TUNE-IN-FLAG occurs 86400 times, or once for each second of the day.

In order to reduce the size of this Data Structure, the program can limit the period of analysis to a part of the day such as prime time viewing hours.

FIG. 16-B illustrates sample data in this Data Structure, according to one embodiment. Note that for each second of the day, the program simply sets a 0 or 1 flag to indicate whether or not the STB was tuned to any channel during that second of the day. A 0 means not tuned, a 1 means tuned. Also, note that for each second of the day, the program simply sets a 0 or 1 flag to indicate whether or not the STB had a tune-in event during that second of the day.

The Analytics Engine 140 populates each of the fields as follows:

STB-VD-MARKET 3210 is populated from MARKET 1810 in input file 528.

STB-VD-SERVICE-GROUP 3220 is populated from SERVICE-GROUP 1820 in input file 528.

STB-VD-HUB 3230 is populated from HUB 1830 in input file 528.

STB-VD-HEADEND 3240 is populated from HEADEND 1840 in input file 528.

STB-VD-STB-ID 3250 is populated from SET-TOP-BOX-ID 1850 in input file 528.

STB-VD-TUNER-INDEX 3260 is populated from TUNER-INDEX 1860 in input file 528.

The following fields require more complex processing to populate.

STB-Viewing-seconds 3270 has this definition:

For each set-top box, count of the number of seconds the set top box was tuned to some channel during the day. This measures the quantity of viewing activity on the STB.

The Analytics Engine 140 performs the following algorithm to populate this field:

```
Perform varying stb-sub
From 1 by 1
Until stb-sub>stb-in-array
Move zero to
  STB-Viewing-seconds (stb-sub)
Perform varying second-sub
  From 1 by 1 until
  Second-sub>seconds-in-array
  If STB-Viewed-flag (stb-sub, second-sub)=1
    Compute
      STB-Viewing-seconds(stb-sub)=STB-Viewing-sec-
        onds(stb-sub)+1
  End-if
End-perform
End-perform
```

STB-tune-ins 3280 has this definition:

For each set-top box, count of the number of times the set-top box tuned to any channel during the day. This measures the propensity of the viewer to change channels.

The Analytics Engine 140 performs the following algorithm to populate this field:

```
PERFORM VARYING STB-SUB
FROM 1 BY 1
UNTIL STB-SUB>STB-IN-ARRAY
MOVE ZERO TO
  STB-TUNE-INS (STB-SUB)
IF STB-TUNE-IN-FLAG (STB-SUB, SECOND-
  SUB)=1
  COMPUTE
    STB-TUNE-INS(STB-SUB)=STB-TUNE-INS(STB-
      SUB)+1
END-IF
END-PERFORM.
```

STB-Average-viewing-duration 3290 has this definition:

Set-top box average viewing duration measures the average length of time that the STB is tuned to a channel.

The Analytics Engine 140 performs the following algorithm to populate this field:

```
Perform varying stb-sub
From 1 by 1
Until stb-sub>stb-in-array
  Compute
    STB-Average-viewing-duration(stb-sub)=STB-View-
      ing-seconds(stb-sub)+/STB-tune-ins(stb-sub)
End-perform
```

FIGS. 17-A-B illustrate an exemplary Data Structure for use by the Analytics Engine 140 when processing channel tune records where the analytics require Market+Service-Group+Hub+Headend+Channel Call Sign+Channel Source Id detail where the granularity is second of day, according to one embodiment.

FIG. 17-A illustrates the Data Structure, according to one embodiment. Fields 3410-3670 occur multiple times with the number of occurrences large enough to hold all of the Channels that could be tuned to within a Service Group in one day. A typical value may be 300 Channels available in a Service Group resulting in 300 rows. Also note that for each row, the field CHAN-STB-VIEWED-CHANNEL-COUNT occurs 86400 times, or once for each second of the day.

FIG. 17-B illustrates sample data in this Data Structure, according to one embodiment. Note that for each second of the day, the program is tallying the number of Set-top boxes in the Service Group that were tuned to that channel.

At the end of the tallying process, a 0 means that no STB tuned to that channel during that second. A 1 means that only one STB tuned to the channel during that second of the day. A number greater than 1 indicates the count of how many STB's tuned to that channel during that second of the day.

The Analytics Engine 140 populates each of the fields as follows:

CHAN-VD-MARKET 3410 is populated from MARKET 1810 in input file 538.

CHAN-VD-SERVICE-GROUP 3420 is populated from SERVICE-GROUP 1820 in input file 538.

CHAN-VD-HUB 3430 is populated from HUB 1830 in input file 538.

CHAN-VD-HEADEND 3440 is populated from HEAD-END 1840 in input file 538.

CHAN-VD-CHANNEL-CALL-SIGN 3450 is populated from CHANNEL-CALL-SIGN 1870 in input file 538.

CHAN-VD-CHANNEL-SOURCE-ID 3460 is populated from CHANNEL-SOURCE-ID 1880 in input file 538.

CHAN-BIT-RATE 3470 is populated from BIT-RATE 1970 in input file 538

SDV-OR-BROADCAST-CODE 3480 is populated from SDV-OR-BROADCAST-CODE 1980 in input file 538

HIGH-DEF-OR-STD-DEF 3490 is populated from HIGH-DEF-OR-STD-DEF 1990 in input file 538.

The following fields require more complex processing to populate.

CHANNEL-VIEWING-SECONDS 3500 has this definition:

Channel viewing seconds measures at a channel level the number of seconds during the day that at least one set-top box was viewing the channel. When this value is low, it indicates that this channel may be a good candidate to be a switched channel in a Switched Digital Video environment. When this value is high it indicates that the channel may be a good candidate to be a broadcast channel in a Switched Digital Video environment. While this embodiment shows at least one STB viewing the channel, this value could be set to any desired variable. As a non-limiting example, count seconds where greater than ten STB's are viewing the channel.

The Analytics Engine 140 performs the following algorithm to populate this field:

```
Perform varying chan-sub
From 1 by 1
Until chan-sub>chan-in-array
Move zero to
  Channel-Viewing-seconds (chan-sub)
Perform varying second-sub
  From 1 by 1 until
Second-sub>seconds-in-array
  If CHAN-STB-VIEWED-CHANNEL-COUNT (chan-
    sub, second-sub)>0
    Compute
      Channel-Viewing-seconds(chan-sub)=Channel-View-
        ing-seconds(chan-sub)+1
  End-if
End-perform
End-perform
```

CHANNEL-NON-VIEWING-SECONDS 3510 has this definition:

Channel non-viewing seconds measures at a channel level the number of seconds during the day that no set-top box was viewing the channel. When this value is high, it indicates that this channel may be a good candidate to be a switched channel in a Switched Digital Video environment.

The Analytics Engine 140 performs the following algorithm to populate this field:

```
Perform varying chan-sub
From 1 by 1
Until chan-sub>chan-in-array
Move zero to
  Channel-Non-Viewing-seconds (chan-sub)
Perform varying second-sub
  From 1 by 1 until
  Second-sub>seconds-in-array
  If CHAN-STB-VIEWED-CHANNEL-COUNT (chan-
    sub, second-sub)=0
    Compute
      Channel-Non-Viewing-seconds(chan-sub)=Channel-
        Non-Viewing-seconds(chan-sub)+1
  End-if
End-perform
End-perform
```

CHANNEL-ONE-STB-VIEWING-SECONDS 3520 has this definition:

Channel one STB viewing seconds measures at a channel level the number of seconds during the day that only one set-top box was viewing the channel. While this embodiment shows one STB viewing the channel, this value could be set to any desired variable. As a non-limiting example, count seconds where greater than ten STB's are viewing the channel.

The Analytics Engine 140 performs the following algorithm to populate this field:

```
Perform varying chan-sub
From 1 by 1
Until chan-sub>chan-in-array
Move zero to
  Channel-one-STB-Viewing-seconds (chan-sub)
```

Perform varying second-sub
From 1 by 1 until
Second-sub>seconds-in-array
If CHAN-STB-VIEWED-CHANNEL-COUNT (chan-sub, second-sub)=1
Compute Channel-one-STB-Viewing-seconds(chan-sub)=Channel-one-STB-Viewing-seconds(chan-sub)+1

End-if
End-perform
End-perform

AGG-CHANNEL-VIEWING-SECONDS 3530 has this definition:

Aggregate channel viewing seconds measures at a channel level the number of seconds of viewing of the channel during the day. When more STB's that are concurrently tuned to the channel then this value is higher. The higher this value the more popular the channel is. Advertisers would want to know this.

When this value is high it indicates that the channel may be a good candidate to be a broadcast channel in a Switched Digital Video environment.

The Analytics Engine 140 performs the following algorithm to populate this field:

Perform varying chan-sub
From 1 by 1
Until chan-sub>chan-in-array
Move zero to
Agg-Channel-Viewing-seconds (chan-sub)
Perform varying second-sub
From 1 by 1 until
Second-sub>seconds-in-array
If CHAN-STB-VIEWED-CHANNEL-COUNT (chan-sub, second-sub)>0
Compute Agg-Channel-Viewing-seconds(chan-sub)=Agg-Channel-Viewing-seconds(chan-sub)+CHAN-STB-VIEWED-CHANNEL-COUNT(chan-sub, second-sub)

End-if
End-perform
End-perform

PCT-OF-DAY-ONLY-ONE-STB-VIEWG-CHAN 3540 has this definition:

Percent of the day when only one STB is viewing the channel is calculated as Channel-one-STB-Viewing-seconds/seconds-in-day. When this value is high, it indicates that this channel may be a good candidate to be a switched channel in a Switched Digital Video environment. When this value is high it indicates that the advertising reach is low. While this embodiment shows one STB viewing the channel, this value could be set to any desired variable as described for field CHANNEL-ONE-STB-VIEWING-SECONDS 3520.

The Analytics Engine 140 performs the following algorithm to populate this field:

Perform varying chan-sub
From 1 by 1
Until chan-sub>chan-in-array
Compute

Pct-of-day-only-one-stb-viewg-chan(chan-sub)=Channel-one-STB-Viewing-seconds(chan-sub)/Seconds-in-day*100

End-perform

PCT-OF-DAY-NO-STB-VIEWING-CHANNEL 3550 has this definition:

Percent of the day when no STB is viewing the channel is calculated as Channel-Non-Viewing-seconds/seconds-in-day. When this value is high, it indicates that this channel may be a good candidate to be a switched channel in a Switched Digital Video environment. When this value is high it indicates that for much of the day no one is watching the channel thus advertising during those times would yield no benefit.

The Analytics Engine 140 performs the following algorithm to populate this field:

Perform varying chan-sub
From 1 by 1
Until chan-sub>chan-in-array
Compute

Pct-of-day-no-stb-viewing-channel(chan-sub)=Channel-Non-Viewing-seconds(chan-sub)/Seconds-in-day*100

End-perform

PCT-OF-DAY-VIEWING-CHANNEL 3560 has this definition:

Percent of the day when the channel is being viewed is calculated as Channel-Viewing-seconds/seconds-in-day. When this value is high, it indicates that this channel may be a good candidate to be a broadcast channel in a Switched Digital Video environment.

The Analytics Engine 140 performs the following algorithm to populate this field:

Perform varying chan-sub
From 1 by 1
Until chan-sub>chan-in-array
Compute

Pct-of-day-viewing-channel(chan-sub)=Channel-Viewing-seconds(chan-sub)/Seconds-in-day*100

End-perform

PEAK-VIEWING-COUNT-FOR-CHANNEL 3570 has this definition:

Peak viewing count for channel measures how many STB's are tuned to the channel during its peak viewing second.

Peak-viewing-second-for-chan can be compared with Peak-usage-second-by-STB-view which measures the peak viewing second based on the number of STB's viewing all the channels combined. This will tell whether the peak for this channel is significantly different from the peak viewing second for all the channels together. When the peak for this channel occurs near the peak for all the channels, it indicates that the program being aired on this channel draws strong viewership ratings even in a crowd.

PEAK-VIEWING-SECOND-FOR-CHAN 3580 has this definition:

Peak viewing second for channel measures the second of the day when the most STB's are tuned to this channel. This measures the time of day when the most people are tuned to this channel. Advertisers would like to know this.

The Analytics Engine 140 performs the following algorithm to populate both of these fields:

Perform varying chan-sub
From 1 by 1
Until chan-sub>chan-in-array
Move zero to
Peak-viewing-count-for-channel (chan-sub)
Move zero to
Peak-viewing-second-for-channel (chan-sub)
Move zero to peak-chan-viewed-temp
Move zero to peak-chan-viewed-sec-temp

```
Perform varying second-sub
  From 1 by 1 until
  Second-sub>seconds-in-array
  If CHAN-STB-VIEWED-CHANNEL-COUNT (chan-
    sub, second-sub)>peak-chan-viewed-temp
    Move CHAN-STB-VIEWED-CHANNEL-COUNT
      (chan-sub, second-sub) to peak-chan-viewed-
      temp
    move second-sub to peak-chan-viewed-sec-temp
  End-if
End-perform
Move peak-chan-viewed-sec-temp to
  Peak-viewing-second-for-channel (chan-sub)
Move peak-chan-viewed-temp to
  Peak-viewing-count-for-channel (chan-sub)
End-perform
```

AGG-VIEWING-AT-THIS-CHAN-PEAK 3590 has this definition:

Aggregate channel viewing at this channel's peak measures how much aggregate viewing is happening when this channel is at its peak. This allows us to measure how this channel stacks up to other channels when this channel is at its best.

The Analytics Engine 140 performs the following algorithm to populate this field:

```
Perform varying chan-sub
From 1 by 1
Until chan-sub>chan-in-array
Move Peak-viewing-second-for-channel (chan-sub) to
  peak-second-temp
Move zero to Agg-viewing-at-this-chan-peak (chan-sub)
Do calc-other-viewing
End-perform
calc-other-viewing.
Perform varying chan-sub-for-peak
From 1 by 1
Until chan-sub-for-peak>chan-in-array
  Compute

    Agg-viewing-at-this-chan-peak(chan-sub)=Agg-view-
      ing-at-this-chan-peak(chan-sub)+CHAN-STB-
      VIEWED-CHANNEL-COUNT(chan-sub-for-
      peak,peak-second-temp)

End-perform
```

PCT-OF-PEAK-VIEW-BY-THIS-CHANPEAK 3600 has this definition:

Percent of peak viewership by this channel's peak measures what part of the total viewing audience is tuned to this channel during this channel's peak viewing period. This measures the popularity of this channel's best program compared to other programs running at the same time.

The Analytics Engine 140 performs the following algorithm to populate this field:

```
Perform varying chan-sub
From 1 by 1
Until chan-sub>chan-in-array
  If Agg-viewing-at-this-chan-peak (chan-sub)>0
    Compute

      Pct-of-peak-view-by-this-chanpeak(chan-sub)=Peak-
        viewing-count-for-channel(chan-sub)/Agg-view-
        ing-at-this-chan-peak(chan-sub)*100

  End-if
End-perform
```

PCT-OF-PEAK-VIEW-BY-STB-VIEWNG 3610 has this definition:

Percent of peak viewership by STB Viewing measures what part of the viewing audience is tuned to this channel during the peak viewing period for all the channels when peak second is the most active second based on all the STB's viewing. This measures the viewing strength of this channel compared to the other channels during the peak viewing second.

The Analytics Engine 140 performs the following algorithm to populate this field:

```
Perform varying chan-sub
From 1 by 1
Until chan-sub>chan-in-array

    Compute Pct-of-peak-view-by-STB-viewng(chan-
      sub)=CHAN-STB-VIEWED-CHANNEL-
      COUNT(chan-sub,Peak-usage-second-by-STB-
      view)/By-sec-agg-chan-viewed-count(Peak-
      usage-second-by-STB-view)*100

End-perform
```

CHAN-VIEWED-DURING-PEAK-FLAG 3620 has this definition:

Channel viewed during peak flag identifies the channels that were viewed during the peak second of the day when peak second is the most active second based on all the STB's viewing.

For this channel, this identifies whether or not any STB was tuned to it during the peak viewing second.

The Analytics Engine 140 performs the following algorithm to populate this field:

```
Perform varying chan-sub
From 1 by 1
Until chan-sub>chan-in-array
  If CHAN-STB-VIEWED-CHANNEL-COUNT (chan-
    sub, Peak-usage-second-by-STB-view)>0
    Move "Y" to Chan-viewed-during-peak-flag (chan-
      sub)
  Else
    Move "N" to Chan-viewed-during-peak-flag (chan-
      sub)
  End-if
End-perform
```

PEAK-PERIOD-DURATION-IN-SECONDS 3630 has this definition:

Peak duration in seconds is an input variable that is used to specify the length of the peak viewing period. For example, 30 minutes would be 1,800 seconds.

The Analytics Engine 140 assigns the value to this field.

CHAN-VIEWED-SECS-DURING-PEAK 3640 has this definition:

Channel viewed seconds during peak identifies the number of seconds during the peak viewing window that this channel was viewed by at least one STB. This metric is useful for capacity planning to identify the amount of time during the peak period that this channel is viewed.

The Analytics Engine 140 performs the following algorithm to populate this field:

```
Perform varying chan-sub
From 1 by 1
Until chan-sub>chan-in-array
Move zero to Chan-viewed-secs-during-peak (chan-sub)
Perform varying second-sub
  From Peak-period-most-STB-activ-beg-sec by 1 until
  Second-sub>=Peak-period-most-STB-activ-end-sec
```

If CHAN-STB-VIEWED-CHANNEL-COUNT (chan-sub, second-sub)>0

Compute Chan-viewed-secs-during-peak(chan-sub)= Chan-viewed-secs-during-peak(chan-sub)+1

End-if
End-perform
End-perform

AGG-CHAN-VIEWED-SECS-DURING-PEAK 3650 has this definition:

Aggregate Channel viewed seconds during peak identifies the number of aggregate viewing seconds that this channel captured during the peak viewing window. When multiple STB's are all tuned to the same channel for all or most of the peak viewing window, this measures that. This is a measure of channel popularity during the peak viewing window. As the number of viewers increases this number increases.

From a capacity planning perspective, when this value is high, it indicates that this channel may be a good candidate to be a broadcast channel in a Switched Digital Video environment.

The Analytics Engine 140 performs the following algorithm to populate this field:

Perform varying chan-sub
From 1 by 1
Until chan-sub>chan-in-array
Move zero to Agg-Chan-viewed-secs-during-peak (chan-sub)
Perform varying second-sub
From Peak-period-most-STB-activ-beg-sec by 1 until Second-sub>=Peak-period-most-STB-activ-end-sec
If CHAN-STB-VIEWED-CHANNEL-COUNT (chan-sub, second-sub)>0
Compute Agg-Chan-viewed-secs-during-peak(chan-sub)=Agg-Chan-viewed-secs-during-peak(chan-sub)+ CHAN-STB-VIEWED-CHANNEL-COUNT (chan-sub,second-sub)

End-if
End-perform
End-perform

PCT-OF-PEAK-PERIOD-CHAN-WAS-VIEWED 3660 has this definition:

Percent of time the channel was viewed during peak period measures how much of the time during the peak viewing period that at least one STB was tuned to the channel.

The Analytics Engine 140 performs the following algorithm to populate this field:

Perform varying chan-sub
From 1 by 1
Until chan-sub>chan-in-array
Compute

Pct-of-peak-period-chan-viewed(chan-sub)=Chan-viewed-secs-during-peak(chan-sub)/Peak-period-duration-in-seconds*100

End-perform

FIGS. 18-A-B illustrate an exemplary Data Structure for use by the Analytics Engine 140 when processing channel tune records where the analytics require Market+Service-Group+Hub+Headend detail where the granularity is second of day, according to one embodiment.

FIG. 18-A illustrates the Data Structure, according to one embodiment. Fields 3810-3940 hold data for one Service Group in a Market. Also note that for each row, the fields 3860-3940 occur 86400 times, or once for each second of the day as described in field 3850. The fields 3860-3940 are used to record second-of-day summaries.

FIG. 18-B illustrates sample data in this Data Structure, according to one embodiment. CHAN-SOD-MARKET 3810 is populated from MARKET 1810 in input file 538.

CHAN-SOD-SERVICE-GROUP 3820 is populated from SERVICE-GROUP 1820 in input file 538.

CHAN-SOD-HUB 3830 is populated from HUB 1830 in input file 538.

CHAN-SOD-HEADEND 3840 is populated from HEAD-END 1840 in input file 538.

The following fields require more complex processing to populate.

BY-SEC-CHAN-VIEWED-COUNT 3860 has this definition:

By second, channel viewed count is for each second of the day, a count of the number of channels that had viewing activity of at least one STB tuned to the channel. While this embodiment shows at least one STB viewing the channel, this value could be set to any desired variable. As a non-limiting example, count seconds where greater than ten STB's are viewing the channel.

The Analytics Engine 140 performs the following algorithm to populate this field:

Perform varying second-sub
From 1 by 1
Until second-sub>seconds-in-array
Move zero to By-sec-chan-viewed-count (second-sub)
Perform varying chan-sub
From 1 by 1 until
chan-sub>chan-in-array
If CHAN-STB-VIEWED-CHANNEL-COUNT (chan-sub, second-sub)>0
Compute By-sec-chan-viewed-count(second-sub)=By-sec-chan-viewed-count(second-sub)+1

End-if
End-perform
End-perform

BY-SEC-NO-CHAN-VIEWED-COUNT 3870 has this definition:

By second, no channel viewed count is for each second of the day, count the number of channels that had no viewing activity.

The Analytics Engine 140 performs the following algorithm to populate this field:

Perform varying second-sub
From 1 by 1
Until second-sub>seconds-in-array
Move zero to By-sec-no-chan-viewed-count (second-sub)
Perform varying chan-sub
From 1 by 1 until
chan-sub>chan-in-array
If CHAN-STB-VIEWED-CHANNEL-COUNT (chan-sub, second-sub)=0
Compute By-sec-no-chan-viewed-count(second-sub)=By-sec-no-chan-viewed-count(second-sub)+1

End-if
End-perform
End-perform

BY-SEC-AGG-CHAN-VIEWED-COUNT 3880 has this definition:

By second, aggregate channel viewed count is for each second of the day, count the number of different set-top boxes that were tuned to all the channels combined.

This is the second of the day when the most people are tuned to the system. The is the time when the demand on system capacity is greatest.

The Analytics Engine 140 performs the following algorithm to populate this field:

```
Perform varying second-sub
From 1 by 1
Until second-sub>seconds-in-array
Move zero to
  By-sec-agg-chan-viewed-count (second-sub)
Perform varying chan-sub
  From 1 by 1 until
  chan-sub>chan-in-array
  If CHAN-STB-VIEWED-CHANNEL-COUNT (chan-
    sub, second-sub)>0
    Compute
      By-sec-agg-chan-viewed-count(second-sub)=By-sec-
        agg-chan-viewed-count(second-sub)+CHAN-
        STB-VIEWED-CHANNEL-COUNT(chan-sub,
        second-sub)
  End-if
End-perform
End-perform
```

BY-SEC-BANDWIDTH-REQD-QUANTITY 3890 has this definition:

By second of the day, bandwidth required quantity is for each second of the day, a count of the amount of bandwidth required to service the channels being viewed, with bandwidth measured in megabits per second. Capacity planners would need to monitor this value to ensure that the system can meet the demand. If this value rarely approaches the installed capacity in the system, it may indicate that there is excess capacity.

The Analytics Engine 140 performs the following algorithm to populate this field:

```
Perform varying second-sub
From 1 by 1
Until second-sub>seconds-in-array
Move zero to
  By-sec-bandwidth-reqd-quantity (second-sub)
Perform varying chan-sub
  From 1 by 1 until
  chan-sub>chan-in-array
  If CHAN-STB-VIEWED-CHANNEL-COUNT (chan-
    sub, second-sub)>0
    Compute
      By-sec-bandwidth-reqd-quantity(second-sub)=By-
        sec-bandwidth-reqd-quantity(second-sub)+
        CHAN-BIT-RATE(chan-sub)
  End-if
End-perform
End-perform
```

BY-SEC-SDV-CHAN-VIEWED-COUNT 3900 has this definition:

By second, SDV channel viewed count is for each second of the day, a count of the number of Switched Digital Video channels that had viewing activity. In a Switched Digital Video environment when this value is consistently low it may indicate an opportunity to add additional switched channels.

The Analytics Engine 140 performs the following algorithm to populate this field:

```
Perform varying second-sub
From 1 by 1
Until second-sub>seconds-in-array
Move zero to
  By-sec-SDV-chan-viewed-count (second-sub)
Perform varying chan-sub
  From 1 by 1 until
  chan-sub>chan-in-array
  If CHAN-STB-VIEWED-CHANNEL-COUNT (chan-
    sub, second-sub)>0
  And SDV-OR-BROADCAST-CODE (chan-sub)='B'
    Compute
      By-sec-SDV-chan-viewed-count(second-sub)=By-sec-
        SDV-chan-viewed-count(second-sub)+1
  End-if
End-perform
End-perform
```

BY-SEC-BCAST-CHAN-VIEWED-COUNT 3910 has this definition:

By second, Broadcast channel viewed count is for each second of the day, a count of the number of Broadcast channels that had viewing activity.

The Analytics Engine 140 performs the following algorithm to populate this field:

```
Perform varying second-sub
From 1 by 1
Until second-sub>seconds-in-array
Move zero to
  By-sec-bcast-chan-viewed-count (second-sub)
Perform varying chan-sub
  From 1 by 1 until
  chan-sub>chan-in-array
  If CHAN-STB-VIEWED-CHANNEL-COUNT (chan-
    sub, second-sub)>0
  And SDV-OR-BROADCAST-CODE (chan-sub)='B'
    Compute
      By-sec-bcast-chan-viewed-count(second-sub)=By-
        sec-bcast-chan-viewed-count(second-sub)+1
  End-if
End-perform
End-perform
```

BY-SEC-STD-DEF-CHAN-VIEWED-CNT 3920 has this definition:

By second, Standard Definition channel viewed count is for each second of the day, a count of the number of Standard Definition channels that had viewing activity. This number is useful from a network engineering perspective.

The Analytics Engine 140 performs the following algorithm to populate this field:

```
Perform varying second-sub
From 1 by 1
Until second-sub>seconds-in-array
Move zero to
  By-sec-Std-Def-chan-viewed-cnt (second-sub)
Perform varying chan-sub
  From 1 by 1 until
  chan-sub>chan-in-array
  If CHAN-STB-VIEWED-CHANNEL-COUNT (chan-
    sub, second-sub)>0
  And HIGH-DEF-OR-STD-DEF (chan-sub)='SD'
    Compute
      By-sec-Std-Def-chan-viewed-cnt(second-sub)=By-
        sec-Std-Def-chan-viewed-cnt(second-sub)+1
  End-if
End-perform
End-perform
```

BY-SEC-HIGH-DEF-CHAN-VIEW-CNT 3930 has this definition:

By second, High Definition channel viewed count is for each second of the day, a count of the number of High Definition channels that had viewing activity. This number is useful from a network engineering perspective.

The Analytics Engine 140 performs the following algorithm to populate this field:

```
Perform varying second-sub
From 1 by 1
Until second-sub>seconds-in-array
Move zero to
  By-sec-High-Def-chan-view-cnt (second-sub)
Perform varying chan-sub
  From 1 by 1 until
  chan-sub>chan-in-array
  If CHAN-STB-VIEWED-CHANNEL-COUNT (chan-
    sub, second-sub)>0
  And HIGH-DEF-OR-STD-DEF (chan-sub)='HD'
Compute
    By-sec-High-Def-chan-view-cnt(second-sub)=By-sec-
      High-Def-chan-view-cnt(second-sub)+1
  End-if
End-perform
End-perform
```

TUNE-INS-PER-SECOND-COUNT 3940 has this definition:

The Analytics Engine 140 performs the following algorithm to populate this field:

Tune-in's per second are tallied at the time of loading the data array so no additional calculations are needed at this point.

FIGS. 19-A-B illustrate an exemplary Data Structure for use by the Analytics Engine 140 when processing channel tune records where the analytics require Market+Service-Group+Hub+Headend summary statistics where the granularity is daily, according to one embodiment.

FIG. 19-A illustrates the Data Structure, and FIG. 19-B illustrates sample data in this Data Structure, according to one embodiment. Fields 4210-4460 require one record to hold all of the data for one Service Group in a Market.

FIG. 19-B illustrates sample data in this Data Structure, according to one embodiment.

CHAN-CDS-MARKET 4210 is populated from MARKET 1810 in input file 538.

CHAN-CDS-SERVICE-GROUP 4220 is populated from SERVICE-GROUP 1820 in input file 538.

CHAN-CDS-HUB 4230 is populated from HUB 1830 in input file 538.

CHAN-CDS-HEADEND 4240 is populated from HEADEND 1840 in input file 538.

The following fields require more complex processing to populate.

PEAK-PERIOD-DURATION-IN-SECONDS 4260 has this definition:

Peak period duration in seconds records the duration of the peak period in seconds. This is a user chosen value such as 30 minutes which would be 1800 seconds.

PEAK-PERIOD-MOST-CHAN-VIEW-BEG-SEC 4270 has this definition:

Peak period (measured in) most channels viewed beginning second records the second which marks the beginning of the peak viewing window when peak is based on largest number of channels viewed.

The Analytics Engine 140 performs the following algorithm to populate this field:

```
Compute Peak-period-most-chan-view-beg-sec=Peak-
  usage-second-by-chan-view−(Peak-period-dura-
  tion-in-seconds/2)
```

Note: If the beginning of the peak period would fall in the previous day, then set it to the first second of the day, since we only process the current day.

PEAK-PERIOD-MOST-CHAN-VIEW-END-SEC 4280 has this definition:

Peak period (measured in) most channels viewed ending second records the second which marks the ending of the peak viewing window when peak is based on largest number of channels viewed.

The Analytics Engine 140 performs the following algorithm to populate this field:

```
Compute Peak-period-most-chan-view-end-sec=Peak-
  usage-second-by-chan-view+(Peak-period-dura-
  tion-in-seconds/2)
```

Note: If the end of the peak period would fall in the next day, then set it to the last second of the day, since we only process the current day.

PEAK-PERIOD-MOST-STB-ACTIV-BEG-SEC 4290 has this definition:

Peak period (measured in) most set-top boxes active beginning second records the second which marks the beginning of the peak viewing window when peak is based on largest number of active set-top boxes.

The Analytics Engine 140 performs the following algorithm to populate this field:

```
Compute Peak-period-most-STB-activ-beg-sec=Peak-
  usage-second-by-STB-view−(Peak-period-dura-
  tion-in-seconds/2)
```

Note: If the beginning of the peak period would fall in the previous day, then set it to the first second of the day, since we only process the current day.

PEAK-PERIOD-MOST-STB-ACTIV-END-SEC 4300 has this definition:

Peak period (measured in) most set-top boxes active ending second records the second which marks the ending of the peak viewing window when peak is based on largest number of active set-top boxes.

The Analytics Engine 140 performs the following algorithm to populate this field:

```
Compute Peak-period-most-STB-activ-end-sec=Peak-
  usage-second-by-STB-view+(Peak-period-dura-
  tion-in-seconds/2)
```

Note: If the end of the peak period would fall in the next day, then set it to the last second of the day, since we only process the current day.

PEAK-USAGE-IN-MBITS-PER-SEC 4320 has this definition:

Peak usage in megabits per second is the highest bandwidth usage in megabits per second that was recorded during the day.

This measures the capacity in Megabits per second required to deliver the channels being viewed during the peak second of the day. If this value rarely approaches the installed capacity in the system, it may indicate that there is excess capacity.

PEAK-USAGE-SECOND-IN-MBITS-PER 4330 has this definition:

Peak usage second captures the second of the day when this peak usage occurred.

The Analytics Engine 140 performs the following algorithm to populate both of these fields:

Move zero to Peak-usage-in-mbits-per-sec
Move zero to Peak-usage-in-mbits-per-sectmp
Move zero to Peak-usage-second-in-mbits-per
Move zero to Peak-usage-second-in-mbits-tmp
Perform varying second-sub
From 1 by 1 until
Second-sub>seconds-in-array
If BY-SEC-BANDWIDTH-REQD-QUANTITY (second-sub)>Peak-usage-in-mbits-per-sectmp
Move BY-SEC-BANDWIDTH-REQD-QUANTITY (second-sub) to
Peak-usage-in-mbits-per-sectmp
move second-sub to Peak-usage-second-in-mbits-tmp
End-if
End-perform
Move Peak-usage-second-in-mbits-tmp to
Peak-usage-second-in-mbits-per
Move Peak-usage-in-mbits-per-sectmp to
Peak-usage-in-mbits-per-sec PCT-OF-PEAK-TO-BE-NEAR-THRESHOLD 4340 has this definition:

Percent of peak to be near threshold is a system defined variable. It allows the analyst to specify a percentage of the peak usage that is considered to be near the threshold of system capacity.

The Analytics Engine 140 assigns a value as follows:

Move 0.90 to Pct-of-peak-to-be-near-threshold

NEAR-PEAK-THRESHOLD-IN-MBITS-PER 4350 has this definition:

Near peak threshold in megabits per second is the threshold value that is used to determine whether the network usage during any particular second is near the peak. For example, is the usage during any second of the day >90% of the peak usage second of the day?

The Analytics Engine 140 performs the following algorithm to populate this field:

Compute Near-peak-threshold-in-mbits-per=Peak-usage-in-mbits-per-sec*Pct-of-peak-to-be-near-threshold [e.g.: 0.90]

COUNT-OF-SEC-MBITS-NEAR-PEAK 4360 has this definition:

Count of seconds megabit near peak is a count of the number of seconds in the day when the megabits per second needed to deliver the channels being viewed is near the peak where peak is calculated as being within x percent of the peak usage for the day, measured in megabits per second. This measures the load on the system and tells how sustained that load is. For network capacity planning we can tell whether the load is a short spike or a sustained high volume.

The Analytics Engine 140 performs the following algorithm to populate this field:

Move zero to Count-of-sec-mbits-near-peak
Perform varying second-sub
From 1 by 1 until
Second-sub>seconds-in-array
If BY-SEC-BANDWIDTH-REQD-QUANTITY (second-sub)>
Near-peak-threshold-in-mbits-per Compute Count-of-sec-mbits-near-peak=Count-of-sec-mbits-near-peak+1

End-if
End-perform

PCT-OF-DAY-MBITS-NEAR-PEAK 4370 has this definition:

Percent of day megabits near peak is a calculated value that tells the percentage of the day that the bandwidth usage in megabits per second is near the peak.

The Analytics Engine 140 performs the following algorithm to populate this field:

Compute Pct-of-day-mbits-near-peak=Count-of-sec-mbits-near-peak/seconds-in-array*100

MAX-TUNE-INS-PER-SECOND 4390 has this definition:

Maximum tune-in's per second measures the number of tune-in events on the busiest second of the day when busy is measured by number of tune-in's. This is useful from a capacity planning perspective to be sure that the SDV system has capacity to handle the volume of tune requests with a proper amount of spare capacity.

MAX-TUNE-INS-SEC-OF-DAY 4400 has this definition:

Maximum tune-in's second of the day records the second of the day during which the maximum number of tune-in's occurred.

The Analytics Engine 140 performs the following algorithm to populate both of these fields:

Move zero to Max-tune-ins-per-second
Move zero to Max-tune-ins-per-second-temp
Move zero to Max-tune-ins-sec-of-day
Move zero to Max-tune-ins-sec-of-day-temp
Perform varying second-sub
From 1 by 1 until
Second-sub>seconds-in-array
If tune-ins-per-second-count (second-sub)>Max-tune-ins-per-second-temp
Move tune-ins-per-second-count (second-sub) to
Max-tune-ins-per-second-temp
move second-sub to Max-tune-ins-sec-of-day-temp
End-if
End-perform
Move Max-tune-ins-per-second-temp to
Max-tune-ins-per-second
Move Max-tune-ins-sec-of-day-temp to
Max-tune-ins-sec-of-day PEAK-USAGE-BY-CHAN-VIEWED-CNT 4420 has this definition:

Peak usage by channel viewed count measures the number of different channels being viewed on the busiest second of the day when busy is measured by number of channels viewed.

PEAK-USAGE-SECOND-BY-CHAN-VIEW 4430 has this definition:

Peak usage second (of the day) by channels being viewed records second of the day during which the maximum number of channels are being viewed.

This is the second of the day when the viewers are tuned to the most different channels. This is important from an advertiser's perspective to see when the viewing audience is most distributed. This is important from a capacity planning perspective to be sure that the SDV system has capacity to handle the volume of channels being viewed with a proper amount of spare capacity.

The Analytics Engine 140 performs the following algorithm to populate both of these fields:

Move zero to Peak-usage-by-chan-viewed-cnt
Move zero to Peak-usage-by-chan-viewed-cnt-tmp
Move zero to Peak-usage-second-by-chan-view
Move zero to Peak-usage-second-by-chan-view-tmp

```
Perform varying second-sub
From 1 by 1 until
Second-sub>seconds-in-array
If BY-SEC-CHAN-VIEWED-COUNT (second-sub)>
  Peak-usage-by-chan-viewed-cnt-tmp
  Move BY-SEC-CHAN-VIEWED-COUNT (second-
    sub) to
    Peak-usage-by-chan-viewed-cnt-tmp
  move second-sub to
    Peak-usage-second-by-chan-view-tmp
End-if
End-perform
Move Peak-usage-by-chan-viewed-cnt-tmp to
Peak-usage-by-chan-viewed-cnt
Move Peak-usage-second-by-chan-view-tmp to
Peak-usage-second-by-chan-view
```

PEAK-USAGE-BY-STB-VIEWING-CNT 4440 has this definition:

Peak usage by STB viewing count measures the number of different set-top boxes tuned to the system during the busiest second of the day.

PEAK-USAGE-SECOND-BY-STB-VIEW 4450 has this definition:

Peak usage second (of the day) by set-top boxes being viewed records the second of the day during which the maximum number of different set-top boxes are tuned to the system.

This is important from an advertisers perspective to see when the viewing audience is largest.

The Analytics Engine 140 performs the following algorithm to populate both of these fields:

```
Move zero to Peak-usage-by-STB-viewing-cnt
Move zero to Peak-usage-by-STB-viewing-tmp
Move zero to Peak-usage-second-by-STB-view
Move zero to Peak-usage-second-by-STB-tmp
Perform varying second-sub
From 1 by 1 until
Second-sub>seconds-in-array
If BY-SEC-AGG-CHAN-VIEWED-COUNT (second-
  sub)>
  Peak-usage-by-STB-viewing-tmp
  Move BY-SEC-AGG-CHAN-VIEWED-COUNT (sec-
    ond-sub) to
    Peak-usage-by-STB-viewing-tmp
  move second-sub to
    Peak-usage-second-by-STB-tmp
End-if
End-perform
Move Peak-usage-by-STB-viewing-tmp to
Peak-usage-by-STB-viewing-cnt
Move Peak-usage-second-by-STB-tmp to
Peak-usage-second-by-STB-view
```

AGG-STB-VIEW-AT-PEAK-SEC-OFDAY 4460 has this definition:

Aggregate STB viewing at the peak second of the day measures how many different STB's were tuned to all the channels combined during the peak second of the day when peak is measured by STB count.

The Analytics Engine 140 performs the following algorithm to populate both of these fields:

```
Move zero to Agg-STB-view-at-peak-sec-ofday
Perform varying chan-sub
From 1 by 1
Until chan-sub>chan-in-array
Compute
  Agg-STB-view-at-peak-sec-ofday=Agg-STB-view-at-
    peak-sec-ofday+CHAN-STB-VIEWED-CHAN-
    NEL-COUNT(chan-sub,Peak-usage-second-by-
    STB-view)
End-perform
```

FIGS. 20-A-B illustrate an exemplary Data Structure for use by the Analytics Engine 140 when processing channel tune records where the analytics require Market+Service-Group+Hub+Headend+Demographic Category 1+Demographic Category 2 detail where the granularity is second of day, according to one embodiment.

FIG. 20-A illustrates the Data Structure, according to one embodiment. Fields 4810-5070 occur multiple times with the number of occurrences large enough to hold all of the Demographic Category combinations that could be tuned to within a Service Group in one day. A typical value may be 100 Demographic Category combinations in a Service Group resulting in 100 rows. Also note that for each row, the field DEMO-STB-VIEWED-COUNT occurs 86400 times, or once for each second of the day.

FIG. 20-B illustrates sample data in this Data Structure, according to one embodiment. Note that for each second of the day, the program is tallying the number of Set-top boxes having the indicated Demographic Category in the Service Group that were tuned to any channel.

At the end of the tallying process, a 0 means that no STB having that Demographic Category tuned-in during that second. A 1 means that only one STB having that Demographic Category tuned-in during that second of the day. A number greater than 1 indicates the count of how many STB's having that Demographic Category tuned-in tuned-in during that second of the day.

DEMO-VD-MARKET 4810 is populated from MARKET 1810 in input file 558.

DEMO-VD-SERVICE-GROUP 4820 is populated from SERVICE-GROUP 1820 in input file 558.

DEMO-VD-HUB 4830 is populated from HUB 1830 in input file 558.

DEMO-VD-HEADEND 4840 is populated from HEADEND 1840 in input file 558.

DEMO-VD-DEMOGRAPHIC-CAT-1 4850 is populated from DEMOGRAPHIC-CATEGORY-1 2020 in input file 166.

DEMO-VD-DEMOGRAPHIC-CAT-2 4860 is populated from DEMOGRAPHIC-CATEGORY-2 2030 in input file 166.

The following fields require more complex processing to populate.

DEMO-VIEWING-SECONDS 4880 has this definition:

Demographic viewing seconds measures at a demographic level the number of seconds during the day that at least one set-top box having this demographic was tuned-in. When this value is low, it indicates that people in this demographic are not watching television. While this embodiment shows at least one STB with the demographic viewing, this value could be set to any desired variable. As a non-limiting example, count seconds where greater than ten STB's having the demographic are viewing.

The Analytics Engine 140 performs the following algorithm to populate this field:

```
Perform varying demo-sub
From 1 by 1
Until demo-sub>demo-in-array
Move zero to
  Demo-Viewing-seconds (demo-sub)
```

```
Perform varying second-sub
  From 1 by 1 until
  Second-sub>seconds-in-array
  If DEMO-STB-VIEWED-COUNT (demo-sub, second-sub)>0
Compute
    Demo-Viewing-seconds(demo-sub)=Demo-Viewing-seconds(demo-sub)+1
  End-if
End-perform
End-perform
```

DEMO-NON-VIEWING-SECONDS 4890 has this definition:

Demographic non-viewing seconds measures at a demographic level the number of seconds during the day that no set-top box having this demographic was tuned-in. When this value is high, it indicates that people in this demographic are not watching television.

The Analytics Engine 140 performs the following algorithm to populate this field:

```
Perform varying demo-sub
From 1 by 1
Until demo-sub>demo-in-array
Move zero to
  Demo-Non-Viewing-seconds (demo-sub)
Perform varying second-sub
  From 1 by 1 until
  Second-sub>seconds-in-array
  If DEMO-STB-VIEWED-COUNT (demo-sub, second-sub)=0
    Compute
      Demo-Non-Viewing-seconds(demo-sub)=Demo-Non-Viewing-seconds(demo-sub)+1
  End-if
End-perform
End-perform
```

DEMO-ONE-STB-VIEWING-SECONDS 4900 has this definition:

Demographic one STB viewing seconds measures at a demographic level the number of seconds during the day that only one set-top box having this demographic was tuned-in. While this embodiment shows at least one STB with the demographic viewing, this value could be set to any desired variable. As a non-limiting example, count seconds where greater than ten STB's having the demographic are viewing.

The Analytics Engine 140 performs the following algorithm to populate this field:

```
Perform varying demo-sub
From 1 by 1
Until demo-sub>demo-in-array
Move zero to
  Demo-one-STB-Viewing-seconds (demo-sub)
Perform varying second-sub
  From 1 by 1 until
  Second-sub>seconds-in-array
  If DEMO-STB-VIEWED-COUNT (demo-sub, second-sub)=1
    Compute
      Demo-one-STB-Viewing-seconds(demo-sub)=Demo-one-STB-Viewing-seconds(demo-sub)+1
  End-if
End-perform
End-perform
```

AGG-DEMO-VIEWING-SECONDS 4910 has this definition:

Aggregate demographic viewing seconds measures at a demographic level the number of total viewing seconds during the day that STB's having this demographic were tuned-in. When more STB's in this demographic are concurrently tuned to any channel then this value is higher. The higher this value the more this demographic watches television. Advertisers would want to know this.

The Analytics Engine 140 performs the following algorithm to populate this field:

```
Perform varying demo-sub
From 1 by 1
Until demo-sub>demo-in-array
Move zero to
  Agg-Demo-Viewing-seconds (demo-sub)
Perform varying second-sub
  From 1 by 1 until
  Second-sub>seconds-in-array
  If DEMO-STB-VIEWED-COUNT (demo-sub, second-sub)>0
    Compute
      Agg-Demo-Viewing-seconds(demo-sub)=Agg-Demo-Viewing-seconds(demo-sub)+DEMO-STB-VIEWED-COUNT(demo-sub,second-sub)
  End-if
End-perform
End-perform
```

PCT-OF-DAY-ONLY-ONE-STB-VIEWG-DEMO 4920 has this definition:

Percent of the day when only one STB having this demographic is tuned-in (viewing television) is calculated as Demo-one-STB-Viewing-seconds/seconds-in-day. When this value is high it indicates that the advertising reach is low.

The Analytics Engine 140 performs the following algorithm to populate this field:

```
Perform varying demo-sub
From 1 by 1
Until demo-sub>demo-in-array
  Compute
    Pct-of-day-only-one-stb-viewg-demo(demo-sub)=Demo-one-STB-Viewing-seconds(demo-sub)/Seconds-in-day*100
End-perform
```

PCT-OF-DAY-NO-STB-VIEWING-DEMO 4930 has this definition:

Percent of the day when no STB having this demographic is tuned-in (viewing television) is calculated as Demo-Non-Viewing-seconds/seconds-in-day. When this value is high it indicates that for much of the day no one from this demographic is watching television thus advertising during those times would yield no benefit.

The Analytics Engine 140 performs the following algorithm to populate this field:

```
Perform varying demo-sub
From 1 by 1
Until demo-sub>demo-in-array
  Compute
    Pct-of-day-no-stb-viewing-demo(demo-sub)=Demo-Non-Viewing-seconds(demo-sub)/Seconds-in-day*100
End-perform
```

PCT-OF-DAY-VIEWING-DEMO 4940 has this definition:

Percent of the day when this demographic is viewing television is calculated as Demo-Viewing-seconds/seconds-in-day. When this value is high, it indicates that STB's having this demographic view a lot of television.

The Analytics Engine 140 performs the following algorithm to populate this field:

Perform varying demo-sub
From 1 by 1
Until demo-sub>demo-in-array
Compute

Pct-of-day-viewing-demo(demo-sub)=Demo-Viewing-seconds(demo-sub)/Seconds-in-day*100

End-perform

PEAK-VIEWING-COUNT-FOR-DEMO 4960 has this definition:

Peak viewing count for demo measures how many STB's from this demographic are tuned-in during its peak viewing second.

PEAK-VIEWING-SECOND-FOR-DEMO 4970 has this definition:

Peak viewing second for demographic measures the second of the day when the most STB's having this demographic are tuned-in. This measures the time of day when the most STB's having this demographic are tuned-in. Advertisers would like to know this.

The Analytics Engine 140 performs the following algorithm to populate this field:

Perform varying demo-sub
From 1 by 1
Until demo-sub>demo-in-array
Move zero to
Peak-viewing-count-for-demo (demo-sub)
Move zero to
Peak-viewing-second-for-demo (demo-sub)
Move zero to peak-demo-viewed-temp
Move zero to peak-demo-viewed-sec-temp
Perform varying second-sub
From 1 by 1 until
Second-sub>seconds-in-array
If DEMO-STB-VIEWED-COUNT (demo-sub, second-sub)>peak-demo-viewed-temp
Move DEMO-STB-VIEWED-COUNT
(demo-sub, second-sub) to
peak-demo-viewed-temp
move second-sub to peak-demo-viewed-sec-temp
End-if
End-perform
Move peak-demo-viewed-sec-temp to
Peak-viewing-second-for-demo (demo-sub)
Move peak-demo-viewed-temp to
Peak-viewing-count-for-demo (demo-sub)
End-perform AGG-VIEWING-AT-THIS-DEMO-PEAK 4980 has this definition:

Aggregate demographic viewing at this demographic's peak measures how much aggregate viewing is happening when this demographic is at its peak. This allows us to measure how this demographic stacks up to other demographics when this demographic is at its best.

The Analytics Engine 140 performs the following algorithm to populate this field:

Perform varying demo-sub
From 1 by 1
Until demo-sub>demo-in-array
Move Peak-viewing-second-for-demo (demo-sub)
to peak-second-temp
Move zero to
agg-viewing-at-this-demo-peak (demo-sub)
Do calc-other-viewing
End-perform
calc-other-viewing.
Perform varying demo-sub-for-peak
From 1 by 1
Until demo-sub-for-peak>demo-in-array
Compute agg-viewing-at-this-demo-peak(demo-sub)=agg-viewing-at-this-demo-peak(demo-sub)+DEMO-STB-VIEWED-COUNT(demo-sub-for-peak,peak-second-temp)

End-perform

PCT-OF-PEAK-VIEW-BY-THIS-DEMOPEAK 4990 has this definition:

Percent of peak viewership by this demographic's peak measures what part of the total viewing audience is from this demographic during this demographic's peak viewing period. This measures the popularity of this demographic's best program compared to programs from other demographics running at the same time.

The Analytics Engine 140 performs the following algorithm to populate this field:

Perform varying demo-sub
From 1 by 1
Until demo-sub>demo-in-array
If Agg-viewing-at-this-demo-peak (demo-sub)>0
Compute Pct-of-peak-view-by-this-demopeak(demo-sub)=Peak-viewing-count-for-demo(demo-sub)/Agg-viewing-at-this-demo-peak(demo-sub)*100

End-if
End-perform

PCT-OF-PEAK-VIEW-BY-STB-VIEWNG 5010 has this definition:

Percent of peak viewership by STB viewing measures what part of the viewing audience is from this demographic during the peak viewing second for all the demographic groups when peak second is the most active second based on all the STB's viewing. This measures the viewing strength of this demographic compared to the other demographic groups during the peak viewing second.

The Analytics Engine 140 performs the following algorithm to populate this field:

Perform varying demo-sub
From 1 by 1
Until demo-sub>demo-in-array
If By-sec-agg-demo-viewed-count (Peak-usage-second-by-STB-view)>0

Compute Pct-of-peak-view-by-STB-viewng(demo-sub)=DEMO-STB-VIEWED-COUNT(demo-sub,Peak-usage-second-by-STB-view)/By-sec-agg-demo-viewed-count(Peak-usage-second-by-STB-view)*100

End-if
End-perform

DEMO-VIEWED-DURING-PEAK-FLAG 5020 has this definition:

Demographic viewed during peak flag identifies the demographic segments that were viewing during the peak second of the day when peak second is the most active second based on all the STB's viewing. For this demographic, this identifies whether or not any STB identified by this demographic was tuned-in during the peak viewing second.

The Analytics Engine 140 performs the following algorithm to populate this field:

```
Perform varying demo-sub
From 1 by 1
Until demo-sub>demo-in-array
  If DEMO-STB-VIEWED-COUNT (demo-sub, Peak-usage-second-by-STB-view)>0
    Move "Y" to Demo-viewed-during-peak-flag (demo-sub)
  Else
    Move "N" to Demo-viewed-during-peak-flag (demo-sub)
End-if
End-perform
```

PEAK-PERIOD-DURATION-IN-SECONDS 5030 has this definition:

Peak duration in seconds is an input variable that is used to specify the length of the peak viewing period. For example, 30 minutes would be 1,800 seconds.

DEMO-VIEWED-SECS-DURING-PEAK 5040 has this definition:

Demographic viewed seconds during peak identifies the number of seconds during the peak viewing window that at least one STB having this demographic was tuned-in. This metric measures whether or not people having this demographic view television during the peak viewing period.

The Analytics Engine 140 performs the following algorithm to populate this field:

```
Perform varying demo-sub
From 1 by 1
Until demo-sub>demo-in-array
Move zero to
  Demo-viewed-secs-during-peak (demo-sub)
Perform varying second-sub
  From Peak-period-most-STB-activ-beg-sec by 1 until
  Second-sub>Peak-period-most-STB-activ-end-sec
If DEMO-STB-VIEWED-COUNT (demo-sub, second-sub)>0

    Compute Demo-viewed-secs-during-peak(demo-sub)= Demo-viewed-secs-during-peak(demo-sub)+1

  End-if
End-perform
End-perform
```

AGG-DEMO-VIEWED-SECS-DURING-PEAK 5050 has this definition:

Aggregate Demographic viewed seconds during peak identifies the number of aggregate viewing seconds captured by STB's having this demographic, during the peak viewing window. When multiple STB's all having the same demographic are all tuned to any channel for all or most of the peak viewing window, this measures that. This metric measures how many STB's having this demographic are tuned-in during the peak viewing period. As the number of viewers increases this number increases.

The Analytics Engine 140 performs the following algorithm to populate this field:

```
Perform varying demo-sub
From 1 by 1
Until demo-sub>demo-in-array
Move zero to
  Agg-demo-viewed-secs-during-peak (demo-sub)
Perform varying second-sub
  From Peak-period-most-STB-activ-beg-sec by 1 until
  Second-sub>Peak-period-most-STB-activ-end-sec
  If DEMO-STB-VIEWED-COUNT (demo-sub, second-sub)>0
    Compute

    Agg-demo-viewed-secs-during-peak(demo-sub)= Agg-demo-viewed-secs-during-peak(demo-sub)+ DEMO-STB-VIEWED-COUNT(demo-sub,second-sub)

  End-if
End-perform
End-perform
```

PCT-OF-PEAK-PERIOD-DEMO-VIEWED 5060 has this definition:

Percent of time the demographic was viewed during peak period measures how much of the time during the peak viewing window that at least one STB having this demographic was tuned-in.

The Analytics Engine 140 performs the following algorithm to populate this field:

```
Perform varying demo-sub
From 1 by 1
Until demo-sub>demo-in-array
  Compute

  Pct-of-peak-period-demo-was-viewed(demo-sub)= demo-viewed-secs-during-peak(demo-sub)/Peak-period-duration-in-seconds*100

End-perform
```

FIGS. 21-A-B illustrate an exemplary Data Structure for use by the Analytics Engine 140 when processing channel tune records where the analytics require Market+Service-Group+Hub+Headend+Program Attribute 1+Program Attribute 2 detail where the granularity is second of day, according to one embodiment.

FIG. 21-A illustrates the Data Structure, according to one embodiment. Fields 5210-5450 occur multiple times with the number of occurrences large enough to hold all of the Program Attribute 1 and Program Attribute 2 combinations that could be tuned to within a Service Group in one day. A typical value may be 100 Program Attribute 1 and Program Attribute 2 combinations in a Service Group resulting in 100 rows. Also note that for each row, the field PROG-STB-VIEWED-COUNT occurs 86400 times, or once for each second of the day.

FIG. 21-B illustrates sample data in this Data Structure, according to one embodiment. Note that for each second of the day, the program is tallying the number of Set-top boxes tuned to any program having that Program Attribute 1 and Program Attribute 2 combinations in the Service Group.

At the end of the tallying process, a 0 means that no STB tuned to any program having that Program Attribute 1 and Program Attribute 2 combination during that second. A 1 means that only one STB tuned to any program having that Program Attribute 1 and Program Attribute 2 combination during that second. A number greater than 1 indicates the count of how many STB's tuned to any program having that Program Attribute 1 and Program Attribute 2 combination during that second of the day.

The Analytics Engine 140 populates each of the fields as follows:

PROG-VD-MARKET 5210 is populated from MARKET 1810 in input file 548.

PROG-VD-SERVICE-GROUP 5220 is populated from SERVICE-GROUP 1820 in input file 548.

PROG-VD-HUB 5230 is populated from HUB 1830 in input file 548.

PROG-VD-HEADEND 5240 is populated from HEAD-END 1840 in input file 548.

PROG-VD-PROGRAM-ATTRIBUTE-1 5250 is populated from PROGRAM-ATTRIBUTE-1 2000 in input file 134/548.

PROG-VD-PROGRAM-ATTRIBUTE-2 5260 is populated from PROGRAM-ATTRIBUTE-2 2010 in input file 134/548.

The following fields require more complex processing to populate.

PROG-VIEWING-SECONDS 5280 has this definition:

Program viewing seconds measures at a program attribute level the number of seconds during the day that at least one set-top box was tuned to a program having this program attribute. When this value is low, it indicates that programs having this program attribute are not being viewed very much. While this embodiment shows one STB viewing programs having this program attribute, this value could be set to any desired variable. As a non-limiting example, count seconds where greater than ten STB's are viewing programs having this program attribute.

The Analytics Engine 140 performs the following algorithm to populate this field:

```
Perform varying prog-sub
From 1 by 1
Until prog-sub>prog-in-array
Move zero to
  Prog-Viewing-seconds (prog-sub)
Perform varying second-sub
  From 1 by 1 until
  Second-sub>seconds-in-array  If PROG-STB-
    VIEWED-COUNT (prog-sub, second-sub)>0
Compute
    Prog-Viewing-seconds(prog-sub)=Prog-Viewing-sec-
      onds(prog-sub)+1
  End-if
End-perform
End-perform
```

PROG-NON-VIEWING-SECONDS 5290 has this definition:

Program non-viewing seconds measures at a program attribute level the number of seconds during the day that no set-top box was tuned to a program having this program attribute. When this value is high, it indicates that people do not watch programs having this program attribute very much.

The Analytics Engine 140 performs the following algorithm to populate this field:

```
Perform varying prog-sub
From 1 by 1
Until prog-sub>prog-in-array
Move zero to
  Prog-Non-Viewing-seconds (prog-sub)
Perform varying second-sub
  From 1 by 1 until
  Second-sub>seconds-in-array
  If PROG-STB-VIEWED-COUNT (prog-sub, second-
    sub)=0
Compute
    Prog-Non-Viewing-seconds(prog-sub)=Prog-Non-
      Viewing-seconds(prog-sub)+1
  End-if
End-perform
End-perform
```

PROG-ONE-STB-VIEWING-SECONDS 5300 has this definition:

Program one STB viewing seconds measures at a program attribute level the number of seconds during the day that only one set-top box was tuned to a program having this program attribute.

The Analytics Engine 140 performs the following algorithm to populate this field:

```
Perform varying prog-sub
From 1 by 1
Until prog-sub>prog-in-array
Move zero to
  Prog-one-STB-Viewing-seconds (prog-sub)
Perform varying second-sub
  From 1 by 1 until
  Second-sub>seconds-in-array
  If PROG-STB-VIEWED-COUNT (prog-sub, second-
    sub)=1
Compute
    Prog-one-STB-Viewing-seconds(prog-sub)=Prog-one-
      STB-Viewing-seconds(prog-sub)+1
  End-if
End-perform
End-perform
```

AGG-PROG-VIEWING-SECONDS 5310 has this definition:

Aggregate program attribute viewing seconds measures at a program attribute level the number of seconds during the day that programs having this program attribute were being viewed. When more STB's are concurrently tuned to programs having this program attribute then this value is higher. The higher this value the more popular the programs having this program attribute are. Advertisers would want to know this.

The Analytics Engine 140 performs the following algorithm to populate this field:

```
Perform varying prog-sub
From 1 by 1
Until prog-sub>prog-in-array
Move zero to
  Agg-Prog-Viewing-seconds (prog-sub)
Perform varying second-sub
  From 1 by 1 until
  Second-sub>seconds-in-array
  If PROG-STB-VIEWED-COUNT (prog-sub, second-
    sub)>0
    Compute
      Agg-Prog-Viewing-seconds(prog-sub)=Agg-Prog-
        Viewing-seconds(prog-sub)+PROG-STB-
        VIEWED-COUNT(prog-sub,second-sub)
  End-if
End-perform
End-perform
```

PCT-OF-DAY-ONLY-ONE-STB-VIEWG-PROG 5320 has this definition:

Percent of the day when only one STB is viewing programs having this program attribute is calculated as Prog-one-STB-Viewing-seconds/seconds-in-day. When this value is high it indicates that the advertising reach is low.

The Analytics Engine 140 performs the following algorithm to populate this field:

Perform varying prog-sub
From 1 by 1
Until prog-sub>prog-in-array
Compute

P Pct-of-day-only-one-stb-viewg-prog(prog-sub) =Prog-one-STB-Viewing-seconds(prog-sub)/ Seconds-in-day*100

End-perform

PCT-OF-DAY-NO-STB-VIEWING-PROG 5340 has this definition:

Percent of the day when no STB is viewing programs having this program attribute is calculated as Prog-Non-Viewing-seconds/seconds-in-day. When this value is high it indicates that for much of the day no one is viewing programs having this program attribute thus advertising during those times would yield no benefit.

The Analytics Engine 140 performs the following algorithm to populate this field:

Perform varying prog-sub
From 1 by 1
Until prog-sub>prog-in-array
Compute

Pct-of-day-no-stb-viewing-prog(prog-sub)=Prog-Non-Viewing-seconds(prog-sub)/Seconds-in-day*100

End-perform

PCT-OF-DAY-VIEWING-PROG 5350 has this definition:

Percent of the day viewing programs having this program attribute is calculated as Prog-Viewing-seconds/seconds-in-day. When this value is high, it indicates that the STB's are often tuned to programs having this program attribute.

The Analytics Engine 140 performs the following algorithm to populate this field:

Perform varying prog-sub
From 1 by 1
Until prog-sub>prog-in-array
Compute

Pct-of-day-viewing-prog(prog-sub)=Prog-Viewing-seconds(prog-sub)/Seconds-in-day*100

End-perform

PEAK-VIEWING-COUNT-FOR-PROG 5370 has this definition:

Peak viewing count for program attribute measures how many STB's are tuned to programs having this program attribute during the program attribute's peak viewing second.

PEAK-VIEWING-SECOND-FOR-PROG 5380 has this definition:

Peak viewing second for program attribute measures the second of the day when programs having this program attribute are viewed the most. This measures the time of day when the most STB's are tuned to programs having this program attribute. Advertisers would like to know this.

The Analytics Engine 140 performs the following algorithm to populate these fields:

Perform varying prog-sub
From 1 by 1
Until prog-sub>prog-in-array
Move zero to
Peak-viewing-count-for-prog (prog-sub)
Move zero to
Peak-viewing-second-for-prog (prog-sub)
Move zero to peak-prog-viewed-temp
Move zero to peak-prog-viewed-sec-temp
Perform varying second-sub
From 1 by 1 until
Second-sub>seconds-in-array
If PROG-STB-VIEWED-COUNT (prog-sub, second-sub)>peak-prog-viewed-temp
Move PROG-STB-VIEWED-COUNT (prog-sub, second-sub) to peak-prog-viewed-temp
move second-sub to peak-prog-viewed-sec-temp
End-if
End-perform
Move peak-prog-viewed-sec-temp to
Peak-viewing-second-for-prog (prog-sub)
Move peak-prog-viewed-temp to
Peak-viewing-count-for-prog (prog-sub)
End-perform AGG-VIEWING-AT-THIS-PROG-PEAK 5390 has this definition:

Aggregate program attribute viewing at this program attribute's peak measures how much aggregate viewing is happening when viewing of programs having this program attribute is at its peak. This allows us to measure how programs having this program attribute stack up to programs with other attributes when programs having this program attribute are at their best.

The Analytics Engine 140 performs the following algorithm to populate this field:

Perform varying prog-sub
From 1 by 1
Until prog-sub>prog-in-array
Move Peak-viewing-second-for-prog (prog-sub)
to peak-second-temp
Move zero to
Agg-other-view-at-this-prog-pk (prog-sub)
Do calc-other-viewing
End-perform
calc-other-viewing.
Perform varying prog-sub-for-peak
From 1 by 1
Until prog-sub-for-peak>prog-in-array
Compute Agg-other-view-at-this-prog-pk(prog-sub)=Agg-other-view-at-this-prog-pk(prog-sub)+PROG-STB-VIEWED-COUNT(prog-sub-for-peak, peak-second-temp)

End-perform

PCT-OF-PEAK-VIEW-BY-THIS-PROGPEAK 5400 has this definition:

Percent of peak viewership by this program attribute's peak measures what part of the total active STB's were tuned to programs having this program attribute during its peak viewing period. This measures the popularity of this program attribute's best program compared to programs having other program attributes running at the same time.

The Analytics Engine 140 performs the following algorithm to populate this field:

Perform varying prog-sub
From 1 by 1
Until prog-sub>prog-in-array
If Agg-viewing-at-this-prog-peak (prog-sub)>0
Compute Pct-of-peak-view-by-this-progpeak(prog-sub)=Peak-viewing-count-for-prog(prog-sub)/Agg-viewing-at-this-prog-peak(prog-sub)*100

End-if
End-perform

PCT-OF-PEAK-VIEW-BY-STB-VIEWNG 5420 has this definition:

Percent of peak viewership by STB viewing measures what part of the total active STB's were tuned to programs having this program attribute during the peak viewing second for all the programs when peak second is the most active second based on all the STB's viewing. This measures the viewing strength of programs having this program attribute compared to the other programs during the peak viewing second.

The Analytics Engine 140 performs the following algorithm to populate this field:

```
Perform varying prog-sub
From 1 by 1
Until prog-sub>prog-in-array
    Compute Pct-of-peak-view-by-STB-viewng(prog-sub)=PROG-STB-VIEWED-COUNT(prog-sub, Peak-usage-second-by-STB-view)/By-sec-agg-prog-viewed-count(Peak-usage-second-by-STB-view)*100
End-perform
```

PROG-VIEWED-DURING-PEAK-FLAG 5430 has this definition:

Program viewed during peak flag identifies the attributes of the programs to which the active STB's were tuned during the peak second of the day when peak second is the most active second based on all the STB's viewing. For programs having this program attribute, this identifies whether or not any STB was tuned to them during the peak viewing second.

The Analytics Engine 140 performs the following algorithm to populate this field:

```
Perform varying prog-sub
From 1 by 1
Until prog-sub>prog-in-array
  If PROG-STB-VIEWED-COUNT (prog-sub, Peak-usage-second-by-STB-view)>0
    Move "Y" to
      Prog-viewed-during-peak-flag (prog-sub)
  Else
    Move "N" to
      Prog-viewed-during-peak-flag (prog-sub)
  End-if
End-perform
```

PEAK-PERIOD-DURATION-IN-SECONDS 5440 has this definition:

Peak duration in seconds is an input variable that is used to specify the length of the peak viewing period. For example, 30 minutes would be 1,800 seconds.

PROG-VIEWED-SECS-DURING-PEAK 5450 has this definition:

Program viewed seconds during peak identifies the number of seconds during the peak viewing window that at least one STB was tuned to programs having this program attribute. This metric measures whether or not people view programs having this program attribute during the peak viewing period.

The Analytics Engine 140 performs the following algorithm to populate this field:

```
Perform varying prog-sub
From 1 by 1
Until prog-sub>prog-in-array
Move zero to
  Prog-viewed-secs-during-peak (prog-sub)
Perform varying second-sub
  From Peak-period-most-STB-activ-beg-sec by 1 until
  Second-sub>Peak-period-most-STB-activ-end-sec
  If PROG-STB-VIEWED-COUNT (prog-sub, second-sub)>0
    Compute Prog-viewed-secs-during-peak(prog-sub)=Prog-viewed-secs-during-peak(prog-sub)+1
  End-if
End-perform
End-perform
```

AGG-PROG-VIEWED-SECS-DU RING-PEAK 5460 has this definition:

Aggregate Program viewed seconds during peak identifies the number of aggregate viewing seconds from STB's tuned to programs having this program attribute during the peak viewing window. When multiple STB's are all tuned to programs having this program attribute for all or most of the peak viewing window, this measures that. This metric measures how many STB's are tuned to programs having this program attribute during the peak viewing period. As the number of viewers viewing programs having this program attribute increases, this number increases.

The Analytics Engine 140 performs the following algorithm to populate this field:

```
Perform varying prog-sub
From 1 by 1
Until prog-sub>prog-in-array
Move zero to
  Agg-prog-viewed-secs-during-peak (prog-sub)
Perform varying second-sub
  From Peak-period-most-STB-activ-beg-sec by 1 until
  Second-sub>Peak-period-most-STB-activ-end-sec
  If PROG-STB-VIEWED-COUNT (prog-sub, second-sub)>0
    Compute
      Agg-prog-viewed-secs-during-peak(prog-sub)=Agg-prog-viewed-secs-during-peak(prog-sub)+PROG-STB-VIEWED-COUNT(prog-sub,second-sub)
  End-if
End-perform
End-perform
```

PCT-OF-PEAK-PERIOD-PROG-VIEWED 5470 has this definition:

Percent of time the program attribute was viewed during peak period measures how much of the time during the peak viewing period that at least one STB was tuned to programs having this program attribute.

The Analytics Engine 140 performs the following algorithm to populate this field:

```
Perform varying prog-sub
From 1 by 1
Until prog-sub>prog-in-array
  Compute
    Pct-of-peak-period-prog-was-viewed(prog-sub)=prog-viewed-secs-during-peak(prog-sub)/Peak-period-duration-in-seconds*100
End-perform
```

FIGS. 22-A-B illustrate an exemplary output record format for the flat file which contains the metrics calculated by the Analytics Engine 140 using the channel tune records that were aggregated to the level of Market+Service-Group+Hub+Headend+Channel Call Sign+Channel Source Id+Set-top box+Tuner, according to one embodiment.

FIG. 22-A illustrates the record format, according to one embodiment. Note that TUNING-ACTIVITY-DATE 5609 has been included in the record format so that when the data is subsequently loaded to some downstream analytical process, the system can identify the date of the tuning activity. Also note that the individual second-of-the-day activity is not included in the file. If a downstream application required that level of detail, the record layout could be changed to include it.

FIG. 22-B illustrates sample data in this record format, according to one embodiment. This record format can be readily imported into a relational database or into a spreadsheet for further analytical processing.

This is the detail of part 152.

The Analytics Engine 140 is moving data from the Data Structure defined in FIG. 15A to the output record format defined in FIG. 22A using an algorithm similar to this:

Perform varying stb-chan-sub
From 1 by 1
Until stb-chan-sub>stb-chan-in-array
Move TUNE-IN-DATE 1890 to TUNING-ACTIVITY-DATE 5609
Move STB-CVD-MARKET (stb-chan-sub) 3010 to STB-CVD-MARKET 5610
Move STB-CVD-SERVICE-GROUP (stb-chan-sub) 3020 to STB-CVD-SERVICE-GROUP 5620
Move STB-CVD-HUB (stb-chan-sub) 3030 to STB-CVD-HUB 5630
Move STB-CVD-HEADEND (stb-chan-sub) 3040 to STB-CVD-HEADEND 5640
Move STB-CVD-CHANNEL-CALL-SIGN (stb-chan-sub) 3050 to STB-CVD-CHANNEL-CALL-SIGN 5650
Move STB-CVD-CHANNEL-SOURCE-ID (stb-chan-sub) 3060 to STB-CVD-CHANNEL-SOURCE-ID 5660
Move STB-CVD-STB-ID (stb-chan-sub) 3070 to STB-CVD-STB-ID 5670
Move STB-CVD-TUNER-INDEX (stb-chan-sub) 3080 to STB-CVD-TUNER-INDEX 5680
Move STB-CHANNEL-VIEWING-SECONDS (stb-chan-sub) 3090 to STB-CHANNEL-VIEWING-SECONDS 5690
Move STB-CHANNEL-TUNE-INS (stb-chan-sub) 3100 to STB-CHANNEL-TUNE-INS 5700
Move STB-CHAN-AVG-VIEWING-DURATION (stb-chan-sub) 3110 to STB-CHAN-AVG-VIEWING-DURATION 5710
Move STB-CHAN-STAY-AWAY-SECS-TOTAL (stb-chan-sub) 3120 to STB-CHAN-STAY-AWAY-SECS-TOTAL 5720
Move STB-CHAN-STAY-AWAY-TUNE-COUNT (stb-chan-sub) 3130 to STB-CHAN-STAY-AWAY-TUNE-COUNT 5730
Move STB-CHAN-AVG-STAY-AWAY-SECS (stb-chan-sub) 3140 to STB-CHAN-AVG-STAY-AWAY-SECS 5740
Write record
End-perform FIGS. 23-A-B illustrate an exemplary output record format for the flat file which contains the metrics calculated by the Analytics Engine 140 using the channel tune records that were aggregated to the level of Market+Service-Group+Hub+Headend+Set-top box+Tuner, according to one embodiment.

FIG. 23-A illustrates the record format, according to one embodiment. Note that TUNING-ACTIVITY-DATE 5809 has been included in the record format so that when the data is subsequently loaded to some downstream analytical process, the system can identify the date of the tuning activity. Also note that the individual second-of-the-day activity is not included in the file. If a downstream application required that level of detail, the record layout could be changed to include it.

FIG. 23-B illustrates sample data in this record format, according to one embodiment. This record format can be readily imported into a relational database or into a spreadsheet for further analytical processing.

This is the detail of part 154.

The Analytics Engine 140 is moving data from the Data Structure defined in FIG. 16A to the output record format defined in FIG. 23A using an algorithm similar to this:

Perform varying stb-sub
From 1 by 1
Until stb-sub>stb-in-array
MOVE TUNE-IN-DATE 1890 to TUNING-ACTIVITY-DATE 5809
MOVE STB-VD-MARKET (stb-sub) 3210 to STB-VD-MARKET 5810
MOVE STB-VD-SERVICE-GROUP (stb-sub) 3220 to STB-VD-SERVICE-GROUP 5820
MOVE STB-VD-HUB (stb-sub) 3230 to STB-VD-HUB 5830
MOVE STB-VD-HEADEND (stb-sub) 3240 to STB-VD-HEADEND 5840
MOVE STB-VD-STB-ID (stb-sub) 3250 to STB-VD-STB-ID 5850
MOVE STB-VD-TUNER-INDEX (stb-sub) 3260 to STB-VD-TUNER-INDEX 5860
MOVE STB-VIEWING-SECONDS (stb-sub) 3270 to STB-VIEWING-SECONDS 5870
MOVE STB-TUNE-INS (stb-sub) 3280 to STB-TUNE-INS 5880
MOVE STB-AVERAGE-VIEWING-DURATION (stb-sub) 3290 to STB-AVERAGE-VIEWING-DURATION 5890
Write record
End-perform FIGS. 24-A-B illustrate an exemplary output record format for the flat file which contains the metrics calculated by the Analytics Engine 140 using the channel tune records that were aggregated to the level of Market+Service-Group+Hub+Headend+Channel Call Sign+Channel Source Id, according to one embodiment.

FIG. 24-A illustrates the record format, according to one embodiment. Note that TUNING-ACTIVITY-DATE 6009 has been included in the record format so that when the data is subsequently loaded to some downstream analytical process, the system can identify the date of the tuning activity. Also note that the individual second-of-the-day activity is not included in the file. If a downstream application required that level of detail, the record layout could be changed to include it.

FIG. 24-B illustrates sample data in this record format, according to one embodiment. This record format can be readily imported into a relational database or into a spreadsheet for further analytical processing.

This is the detail of part 156.

The Analytics Engine 140 is moving data from the Data Structure defined in FIG. 17A to the output record format defined in FIG. 24A using an algorithm similar to this:

Perform varying chan-sub
From 1 by 1
Until chan-sub>chan-in-array
MOVE TUNE-IN-DATE 1890 to TUNING-ACTIVITY-DATE 6009
MOVE CHAN-VD-MARKET (chan-sub) 3410 to CHAN-VD-MARKET 6010

MOVE CHAN-VD-SERVICE-GROUP (chan-sub) 3420 to CHAN-VD-SERVICE-GROUP 6020

MOVE CHAN-VD-HUB (chan-sub) 3430 to CHAN-VD-HUB 6030

MOVE CHAN-VD-HEADEND (chan-sub) 3440 to CHAN-VD-HEADEND 6040

MOVE CHAN-VD-CHANNEL-CALL-SIGN (chan-sub) 3450 to CHAN-VD-CHANNEL-CALL-SIGN 6050

MOVE CHAN-VD-CHANNEL-SOURCE-ID (chan-sub) 3460 to CHAN-VD-CHANNEL-SOURCE-ID 6060

MOVE CHAN-BIT-RATE (chan-sub) 3470 to CHAN-BIT-RATE 6070

MOVE SDV-OR-BROADCAST-CODE (chan-sub) 3480 to SDV-OR-BROADCAST-CODE 6080

MOVE HIGH-DEF-OR-STD-DEF (chan-sub) 3490 to HIGH-DEF-OR-STD-DEF 6090

MOVE CHANNEL-VIEWING-SECONDS (chan-sub) 3500 to CHANNEL-VIEWING-SECONDS 6100

MOVE CHANNEL-NON-VIEWING-SECONDS (chan-sub) 3510 to CHANNEL-NON-VIEWING-SECONDS 6110

MOVE CHANNEL-ONE-STB-VIEWING-SECONDS (chan-sub) 3520 to CHANNEL-ONE-STB-VIEWING-SECONDS 6120

MOVE AGG-CHANNEL-VIEWING-SECONDS (chan-sub) 3530 to AGG-CHANNEL-VIEWING-SECONDS 6130

MOVE PCT-OF-DAY-ONLY-ONE-STB-VIEWG-CHAN (chan-sub) 3540 to PCT-OF-DAY-ONLY-ONE-STB-VIEWG-CHAN 6140

MOVE PCT-OF-DAY-NO-STB-VIEWING-CHANNEL (chan-sub) 3550 to PCT-OF-DAY-NO-STB-VIEWING-CHANNEL 6150

MOVE PCT-OF-DAY-VIEWING-CHANNEL (chan-sub) 3560 to PCT-OF-DAY-VIEWING-CHANNEL 6160

MOVE PEAK-VIEWING-COUNT-FOR-CHANNEL (chan-sub) 3570 to PEAK-VIEWING-COUNT-FOR-CHANNEL 6170

MOVE PEAK-VIEWING-SECOND-FOR-CHAN (chan-sub) 3580 to PEAK-VIEWING-SECOND-FOR-CHAN 6180

MOVE AGG-VIEWING-AT-THIS-CHAN-PEAK (chan-sub) 3590 to AGG-VIEWING-AT-THIS-CHAN-PEAK 6190

MOVE PCT-OF-PEAK-VIEW-BY-THIS-CHANPEAK (chan-sub) 3600 to PCT-OF-PEAK-VIEW-BY-THIS-CHANPEAK 6200

MOVE PCT-OF-PEAK-VIEW-BY-STB-VIEWNG (chan-sub) 3610 to PCT-OF-PEAK-VIEW-BY-STB-VIEWNG 6210

MOVE CHAN-VIEWED-DURING-PEAK-FLAG (chan-sub) 3620 to CHAN-VIEWED-DURING-PEAK-FLAG 6220

MOVE PEAK-PERIOD-DURATION-IN-SECONDS (chan-sub) 3630 to PEAK-PERIOD-DURATION-IN-SECONDS 6230

MOVE CHAN-VIEWED-SECS-DURING-PEAK (chan-sub) 3640 to CHAN-VIEWED-SECS-DURING-PEAK 6240

MOVE AGG-CHAN-VIEWED-SECS-DURING-PEAK (chan-sub) 3650 to AGG-CHAN-VIEWED-SECS-DURING-PEAK 6250

MOVE PCT-OF-PEAK-PERIOD-CHAN-WAS-VIEWED (chan-sub) 3660 to PCT-OF-PEAK-PERIOD-CHAN-WAS-VIEWED 6260

Write record

End-perform

FIGS. 25-A-B illustrate an exemplary output record format for the flat file which contains the metrics calculated by the Analytics Engine 140 using the channel tune records that were aggregated to the level of Market+Service-Group+Hub+Headend+Second-of-day, according to one embodiment.

FIG. 25-A illustrates the record format, according to one embodiment. Note that TUNING-ACTIVITY-DATE 6409 has been included in the record format so that when the data is subsequently loaded to some downstream analytical process, the system can identify the date of the tuning activity. Also note that SECOND-OF-DAY 6448 is included in the file. The result is that is the program has processed a full day of day (86400 seconds) as opposed to a day part, then this file will contain 86,400 records for one day of activity.

FIG. 25-B illustrates sample data in this record format, according to one embodiment. This record format can be readily imported into a relational database or into a spreadsheet for further analytical processing.

This is the detail of part 162.

The Analytics Engine 140 is moving data from the Data Structure defined in FIG. 18A to the output record format defined in FIG. 25A using an algorithm similar to this:

Perform varying second-sub

From 1 by 1

Until second-sub>seconds-in-array

MOVE TUNE-IN-DATE 1890 to TUNING-ACTIVITY-DATE 6409

MOVE CHAN-SOD-MARKET 3810 to CHAN-SOD-MARKET 6410

MOVE CHAN-SOD-SERVICE-GROUP 3820 to CHAN-SOD-SERVICE-GROUP 6420

MOVE CHAN-SOD-HUB 3830 to CHAN-SOD-HUB 6430

MOVE CHAN-SOD-HEADEND 3840 to CHAN-SOD-HEADEND 6440

MOVE SECOND-SUB TO SECOND-OF-DAY 6448

MOVE BY-SEC-CHAN-VIEWED-COUNT (second-sub) 3860 to BY-SEC-CHAN-VIEWED-COUNT 6460

MOVE BY-SEC-NO-CHAN-VIEWED-COUNT (second-sub) 3870 to BY-SEC-NO-CHAN-VIEWED-COUNT 6470

MOVE BY-SEC-AGG-CHAN-VIEWED-COUNT (second-sub) 3880 to BY-SEC-AGG-CHAN-VIEWED-COUNT 6480

MOVE BY-SEC-BANDWIDTH-REQD-QUANTITY (second-sub) 3890 to BY-SEC-BANDWIDTH-REQD-QUANTITY 6490

MOVE BY-SEC-SDV-CHAN-VIEWED-COUNT (second-sub) 3900 to BY-SEC-SDV-CHAN-VIEWED-COUNT 6500

MOVE BY-SEC-BCAST-CHAN-VIEWED-COUNT (second-sub) 3910 to BY-SEC-BCAST-CHAN-VIEWED-COUNT 6510

MOVE BY-SEC-STD-DEF-CHAN-VIEWED-CNT (second-sub) 3920 to BY-SEC-STD-DEF-CHAN-VIEWED-CNT 6520

MOVE BY-SEC-HIGH-DEF-CHAN-VIEW-CNT (second-sub) 3930 to BY-SEC-HIGH-DEF-CHAN-VIEW-CNT 6530

MOVE TUNE-INS-PER-SECOND-COUNT (second-sub) 3940 to TUNE-INS-PER-SECOND-COUNT 6540

Write record

End-perform

FIGS. 26-A-B illustrate an exemplary output record format for the flat file which contains the metrics calculated by the Analytics Engine 140 using the channel tune records that were aggregated to the level of daily activity for the Market+Service-Group+Hub+Headend, according to one embodiment.

FIG. 26-A illustrates the record format, according to one embodiment. Note that TUNING-ACTIVITY-DATE 6609 has been included in the record format so that when the data is subsequently loaded to some downstream analytical process, the system can identify the date of the tuning activity.

FIG. 26-B illustrates sample data in this record format, according to one embodiment. This record format can be readily imported into a relational database or into a spreadsheet for further analytical processing.

This is the detail of part 164.

The Analytics Engine 140 is moving data from the Data Structure defined in FIG. 19A to the output record format defined in FIG. 26A using an algorithm similar to this:

MOVE TUNE-IN-DATE 1890 to TUNING-ACTIVITY-DATE 6609

MOVE CHAN-CDS-MARKET 4210 to CHAN-CDS-MARKET 6610

MOVE CHAN-CDS-SERVICE-GROUP 4220 to CHAN-CDS-SERVICE-GROUP 6620

MOVE CHAN-CDS-HUB 4230 to CHAN-CDS-HUB 6630

MOVE CHAN-CDS-HEADEND 4240 to CHAN-CDS-HEADEND 6640

MOVE PEAK-PERIOD-DURATION-IN-SECONDS 4260 to PEAK-PERIOD-DURATION-IN-SECONDS 6660

MOVE PEAK-PERIOD-MOST-CHAN-VIEW-BEG-SEC 4270 to PEAK-PERIOD-MOST-CHAN-VIEW-BEG-SEC 6670

MOVE PEAK-PERIOD-MOST-CHAN-VIEW-END-SEC 4280 to PEAK-PERIOD-MOST-CHAN-VIEW-END-SEC 6680

MOVE PEAK-PERIOD-MOST-STB-ACTIV-BEG-SEC 4290 to PEAK-PERIOD-MOST-STB-ACTIV-BEG-SEC 6690

MOVE PEAK-PERIOD-MOST-STB-ACTIV-END-SEC 4300 to PEAK-PERIOD-MOST-STB-ACTIV-END-SEC 6700

MOVE PEAK-USAGE-IN-MBITS-PER-SEC 4320 to PEAK-USAGE-IN-MBITS-PER-SEC 6720

MOVE PEAK-USAGE-SECOND-IN-MBITS-PER 4330 to PEAK-USAGE-SECOND-IN-MBITS-PER 6730

MOVE PCT-OF-PEAK-TO-BE-NEAR-THRESHOLD 4340 to PCT-OF-PEAK-TO-BE-NEAR-THRESHOLD 6740

MOVE NEAR-PEAK-THRESHOLD-IN-MBITS-PER 4350 to NEAR-PEAK-THRESHOLD-IN-MBITS-PER 6750

MOVE COUNT-OF-SEC-MBITS-NEAR-PEAK 4360 to COUNT-OF-SEC-MBITS-NEAR-PEAK 6760

MOVE PCT-OF-DAY-MBITS-NEAR-PEAK 4370 to PCT-OF-DAY-MBITS-NEAR-PEAK 6770

MOVE MAX-TUNE-INS-PER-SECOND 4390 to MAX-TUNE-INS-PER-SECOND 6790

MOVE MAX-TUNE-INS-SEC-OF-DAY 4400 to MAX-TUNE-INS-SEC-OF-DAY 6800

MOVE PEAK-USAGE-BY-CHAN-VIEWED-CNT 4420 to PEAK-USAGE-BY-CHAN-VIEWED-CNT 6820

MOVE PEAK-USAGE-SECOND-BY-CHAN-VIEW 4430 to PEAK-USAGE-SECOND-BY-CHAN-VIEW 6830

MOVE PEAK-USAGE-BY-STB-VIEWING-CNT 4440 to PEAK-USAGE-BY-STB-VIEWING-CNT 6840

MOVE PEAK-USAGE-SECOND-BY-STB-VIEW 4450 to PEAK-USAGE-SECOND-BY-STB-VIEW 6850

MOVE AGG-STB-VIEW-AT-PEAK-SEC-OFDAY 4460 to AGG-STB-VIEW-AT-PEAK-SEC-OFDAY 6860

FIGS. 27-A-B illustrate an exemplary output record format for the flat file which contains the metrics calculated by the Analytics Engine 140 using the channel tune records that were aggregated to the level of Market+Service-Group+Hub+Headend+Demographic Category 1+Demographic Category 2, according to one embodiment.

FIG. 27-A illustrates the record format, according to one embodiment. Note that TUNING-ACTIVITY-DATE 7009 has been included in the record format so that when the data is subsequently loaded to some downstream analytical process, the system can identify the date of the tuning activity. Also note that the individual second-of-the-day activity is not included in the file. If a downstream application required that level of detail, the record layout could be changed to include it.

FIG. 27-B illustrates sample data in this record format, according to one embodiment. This record format can be readily imported into a relational database or into a spreadsheet for further analytical processing.

This is the detail of part 166.

The Analytics Engine 140 is moving data from the Data Structure defined in FIG. 20A to the output record format defined in FIG. 27A using an algorithm similar to this:

Perform varying demo-sub

From 1 by 1

Until demo-sub>demo-in-array

MOVE TUNE-IN-DATE 1890 to TUNING-ACTIVITY-DATE 7009

MOVE DEMO-VD-MARKET (demo-sub) 4810 to DEMO-VD-MARKET 7010

MOVE DEMO-VD-SERVICE-GROUP (demo-sub) 4820 to DEMO-VD-SERVICE-GROUP 7020

MOVE DEMO-VD-HUB (demo-sub) 4830 to DEMO-VD-HUB 7030

MOVE DEMO-VD-HEADEND (demo-sub) 4840 to DEMO-VD-HEADEND 7040

MOVE DEMO-VD-DEMOGRAPHIC-CAT-1 (demo-sub) 4850 to DEMO-VD-DEMOGRAPHIC-CAT-1 7050

MOVE DEMO-VD-DEMOGRAPHIC-CAT-2 (demo-sub) 4860 to DEMO-VD-DEMOGRAPHIC-CAT-2 7060

MOVE DEMO-VIEWING-SECONDS (demo-sub) 4880 to DEMO-VIEWING-SECONDS 7080

MOVE DEMO-NON-VIEWING-SECONDS (demo-sub) 4890 to DEMO-NON-VIEWING-SECONDS 7090

MOVE DEMO-ONE-STB-VIEWING-SECONDS (demo-sub) 4900 to DEMO-ONE-STB-VIEWING-SECONDS 7100

MOVE AGG-DEMO-VIEWING-SECONDS (demo-sub) 4910 to AGG-DEMO-VIEWING-SECONDS 7110

MOVE PCT-OF-DAY-ONLY-ONE-STB-VIEWG-DEMO (demo-sub) 4920 to PCT-OF-DAY-ONLY-ONE-STB-VIEWG-DEMO 7120

MOVE PCT-OF-DAY-NO-STB-VIEWING-DEMO (demo-sub) 4930 to PCT-OF-DAY-NO-STB-VIEWING-DEMO 7130

MOVE PCT-OF-DAY-VIEWING-DEMO (demo-sub) 4940 to PCT-OF-DAY-VIEWING-DEMO 7140

MOVE PEAK-VIEWING-COUNT-FOR-DEMO (demo-sub) 4960 to PEAK-VIEWING-COUNT-FOR-DEMO 7160

MOVE PEAK-VIEWING-SECOND-FOR-DEMO (demo-sub) 4970 to PEAK-VIEWING-SECOND-FOR-DEMO 7170

MOVE AGG-VIEWING-AT-THIS-DEMO-PEAK (demo-sub) 4980 to AGG-VIEWING-AT-THIS-DEMO-PEAK 7180

MOVE PCT-OF-PEAK-VIEW-BY-THIS-DEMO-PEAK (demo-sub) 4990 to PCT-OF-PEAK-VIEW-BY-THIS-DEMOPEAK 7190

MOVE PCT-OF-PEAK-VIEW-BY-STB-VIEWNG (demo-sub) 5010 to PCT-OF-PEAK-VIEW-BY-STB-VIEWNG 7210

MOVE DEMO-VIEWED-DURING-PEAK-FLAG (demo-sub) 5020 to DEMO-VIEWED-DURING-PEAK-FLAG 7220

MOVE PEAK-PERIOD-DURATION-IN-SECONDS (demo-sub) 5030 to PEAK-PERIOD-DURATION-IN-SECONDS 7230

MOVE DEMO-VIEWED-SECS-DURING-PEAK (demo-sub) 5040 to DEMO-VIEWED-SECS-DURING-PEAK 7240

MOVE AGG-DEMO-VIEWED-SECS-DURING-PEAK (demo-sub) 5050 to AGG-DEMO-VIEWED-SECS-DURING-PEAK 7250

MOVE PCT-OF-PEAK-PERIOD-DEMO-VIEWED (demo-sub) 5060 to PCT-OF-PEAK-PERIOD-DEMO-VIEWED 7260

Write record

End-perform

FIGS. 28-A-B illustrate an exemplary output record format for the flat file which contains the metrics calculated by the Analytics Engine 140 using the channel tune records that were aggregated to the level of Market+Service-Group+Hub+Headend+Program Attribute 1+Program Attribute 2, according to one embodiment.

FIG. 28-A illustrates the record format, according to one embodiment. Note that TUNING-ACTIVITY-DATE 7409 has been included in the record format so that when the data is subsequently loaded to some downstream analytical process, the system can identify the date of the tuning activity. Also note that the individual second-of-the-day activity is not included in the file. If a downstream application required that level of detail, the record layout could be changed to include it.

FIG. 28-B illustrates sample data in this record format, according to one embodiment. This record format can be readily imported into a relational database or into a spreadsheet for further analytical processing.

This is the detail of part 168.

The Analytics Engine 140 is moving data from the Data Structure defined in FIG. 21A to the output record format defined in FIG. 28A using an algorithm similar to this:

Perform varying prog-sub

From 1 by 1

Until prog-sub>prog-in-array

MOVE TUNE-IN-DATE 1890 to TUNING-ACTIVITY-DATE 7409

MOVE PRO-VD-MARKET (prog-sub) 5210 to PROG-VD-MARKET 7410

MOVE PROG-VD-SERVICE-GROUP (prog-sub) 5220 to PROG-VD-SERVICE-GROUP 7420

MOVE PROG-VD-HUB (prog-sub) 5230 to PROG-VD-HUB 7430

MOVE PROG-VD-HEAD END (prog-sub) 5240 to PROG-VD-HEAD END 7440

MOVE PROG-VD-PROGRAM-ATTRIBUTE-1 (prog-sub) 5250 to PROG-VD-PROGRAM-ATTRIBUTE-1 7450

MOVE PROG-VD-PROGRAM-ATTRIBUTE-2 (prog-sub) 5260 to PROG-VD-PROGRAM-ATTRIBUTE-2 7460

MOVE PROG-VIEWING-SECONDS (prog-sub) 5280 to PROG-VIEWING-SECONDS 7480

MOVE PROG-NON-VIEWING-SECONDS (prog-sub) 5290 to PROG-NON-VIEWING-SECONDS 7490

MOVE PROG-ONE-STB-VIEWING-SECONDS (prog-sub) 5300 to PROG-ONE-STB-VIEWING-SECONDS 7500

MOVE AGG-PROG-VIEWING-SECONDS (prog-sub) 5310 to AGG-PROG-VIEWING-SECONDS 7510

MOVE PCT-OF-DAY-ONLY-ONE-STB-VIEWG-PROG (prog-sub) 5320 to PCT-OF-DAY-ONLY-ONE-STB-VIEWG-PROG 7520

MOVE PCT-OF-DAY-NO-STB-VIEWING-PROG (prog-sub) 5340 to PCT-OF-DAY-NO-STB-VIEWING-PROG 7540

MOVE PCT-OF-DAY-VIEWING-PROG (prog-sub) 5350 to PCT-OF-DAY-VIEWING-PROG 7550

MOVE PEAK-VIEWING-COUNT-FOR-PROG (prog-sub) 5370 to PEAK-VIEWING-COUNT-FOR-PROG 7570

MOVE PEAK-VIEWING-SECOND-FOR-PROG (prog-sub) 5380 to PEAK-VIEWING-SECOND-FOR-PROG 7580

MOVE AGG-VIEWING-AT-THIS-PROG-PEAK (prog-sub) 5390 to AGG-VIEWING-AT-THIS-PROG-PEAK 7590

MOVE PCT-OF-PEAK-VIEW-BY-THIS-PROG-PEAK (prog-sub) 5400 to PCT-OF-PEAK-VIEW-BY-THIS-PROGPEAK 7600

MOVE PCT-OF-PEAK-VIEW-BY-STB-VIEWNG (prog-sub) 5420 to PCT-OF-PEAK-VIEW-BY-STB-VIEWNG 7620

MOVE PROG-VIEWED-DURING-PEAK-FLAG (prog-sub) 5430 to PROG-VIEWED-DURING-PEAK-FLAG 7630

MOVE PEAK-PERIOD-DURATION-IN-SECONDS (prog-sub) 5440 to PEAK-PERIOD-DURATION-IN-SECONDS 7640

MOVE PROG-VIEWED-SECS-DURING-PEAK (prog-sub) 5450 to PROG-VIEWED-SECS-DURING-PEAK 7650

MOVE AGG-PROG-VIEWED-SECS-DURING-PEAK (prog-sub) 5460 to AGG-PROG-VIEWED-SECS-DURING-PEAK 7660

MOVE PCT-OF-PEAK-PERIOD-PROG-VIEWED (prog-sub) 5470 to PCT-OF-PEAK-PERIOD-PROG-VIEWED 7670

Write record

End-perform

Figure 29:
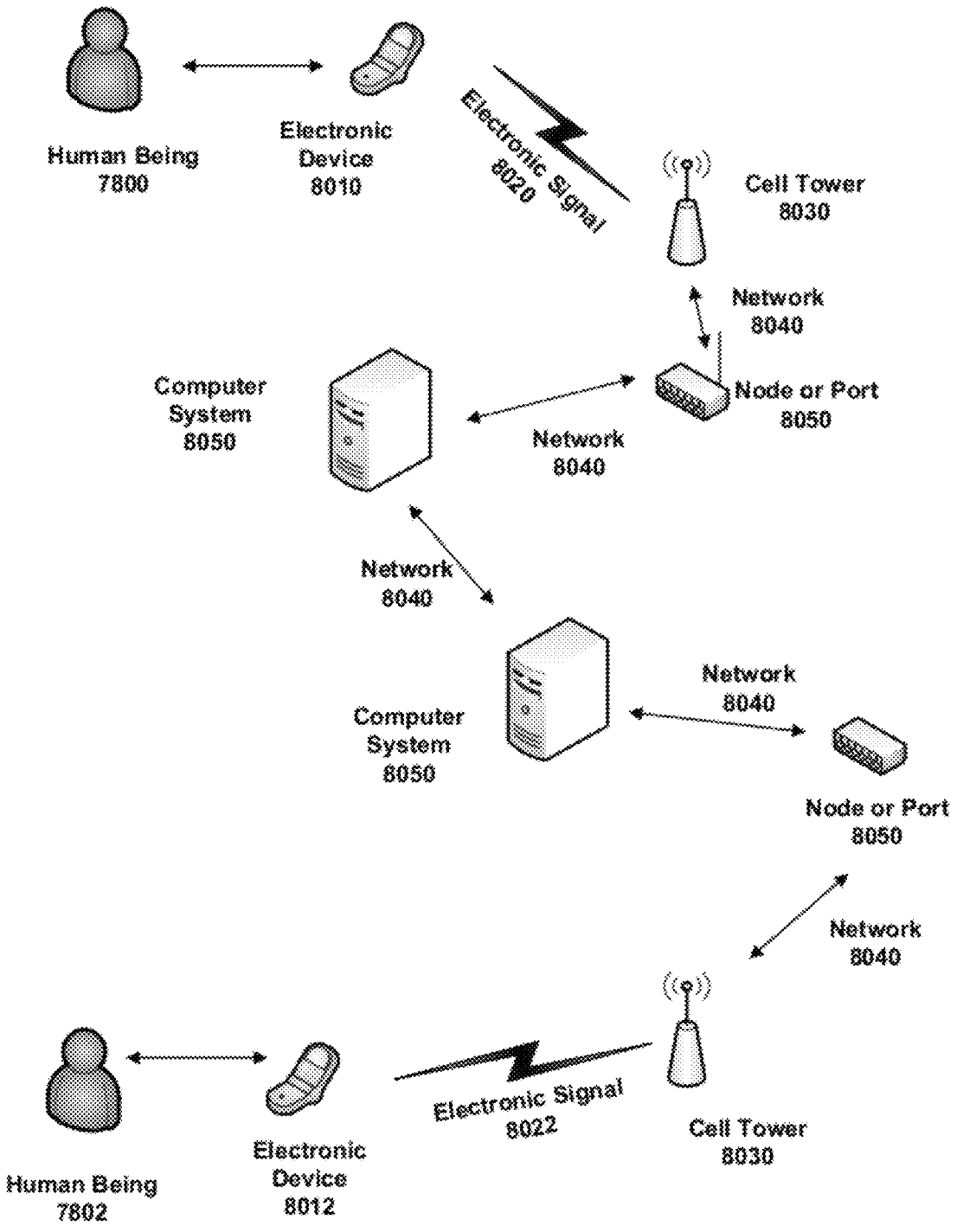
FIG. 29 illustrates a human being interacting with an electronic device which is interacting with a computer system accessed through a network.

FIG. 29 illustrates a human being 7800 interacting with an electronic device 8010 which is interacting with a computer system 8050 accessed through a network 8040, according to one embodiment.

In this nonlimiting example, the purpose is not to describe in detail the operations of a cellular network, but to simply show that the human being 7800 is interacting with an electronic device 8010 which is interacting with a computer system 8050 accessed through a network 8040.

To follow the chain of interactions in this nonlimiting example, the human being 7800 is using an electronic device 8010 such as a cell phone or a personal communication device or any similar electronic device. The electronic device 8010 uses a radio wave or electronic signal 8020 to communicate with a cell tower 8030 which then communicates via a network 8040 to reach a computer system such as a node or port 8050 which then communicates via a another network segment 8040 to access a computer system 8050 which uses another network segment 8040 to communicate with another computer system 8050 which uses another network segment 8040 to communicate with another node or port 8050 which users another network segment 8040 to communicate with another cell tower 8030 which sends out an electronic signal 8022 to communicate with a second electronic device 8012 which is being used by a second human being 7802.

Figure 30:
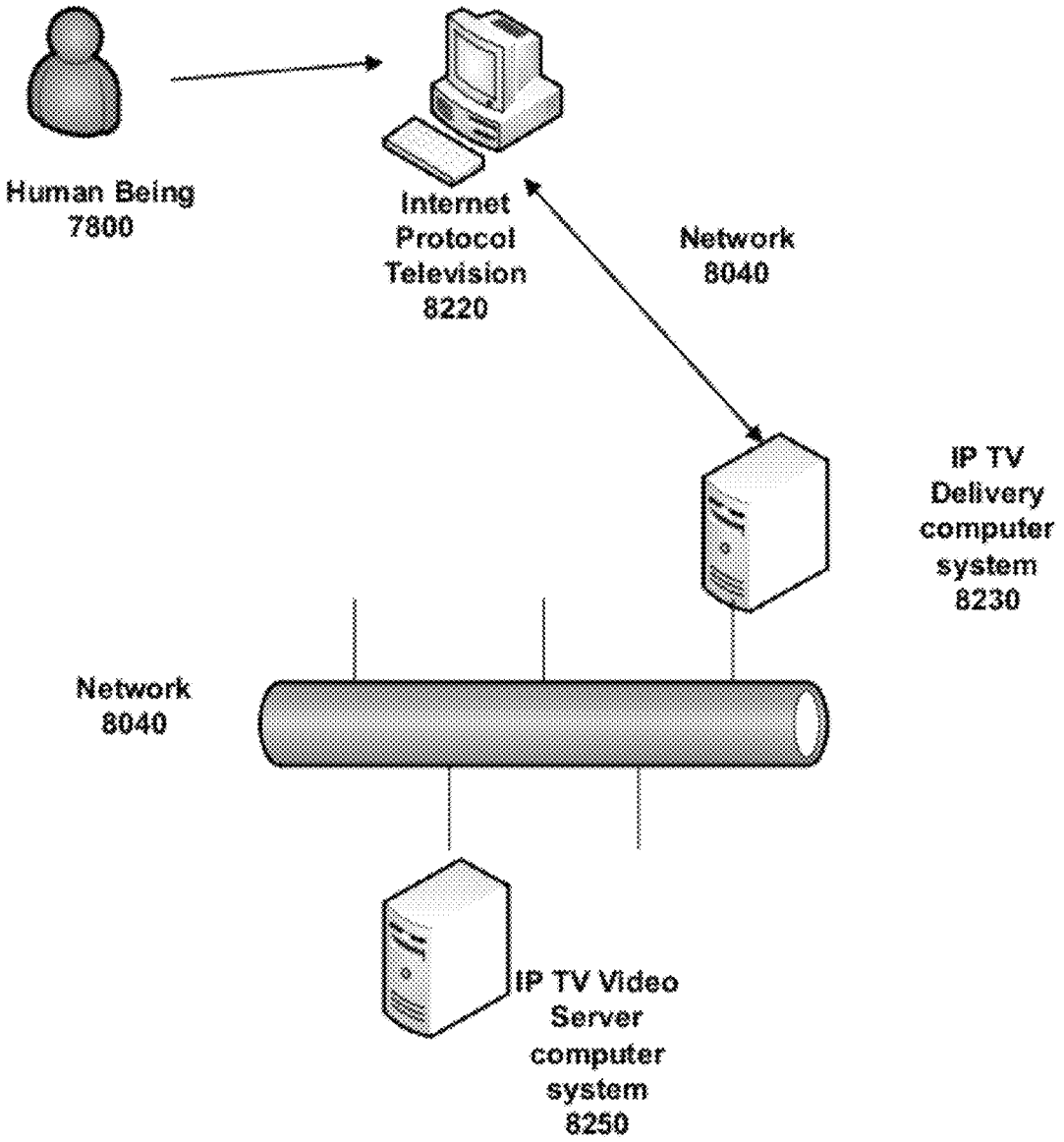
FIG. 30 illustrates an alternative version of a human being interacting with an electronic device which is interacting with a computer system accessed through a network.

FIG. 30 illustrates an alternative version of a human being 7800 interacting with an electronic device 8220 which is interacting with a computer system 8230 accessed through a network 8040, according to one embodiment.

In this nonlimiting example, the purpose is not to describe in detail the operations of an internet protocol network, but to simply show that the human being 7800 is interacting with an electronic device 8220 which is interacting with a computer system 8230 accessed through a network 8040.

To follow the chain of interactions in this nonlimiting example, the human being 7800 is using an electronic device 8220 such as an internet protocol television or any similar electronic device. The electronic device 8220 uses a network 8040 to communicate with an IP TV Delivery computer system 8230 which provides video the IP TV. IP TV Delivery computer system 8230 itself also uses a network 8040 to communicate with an IP TV Video Server computer system 8250.

Figure 31:
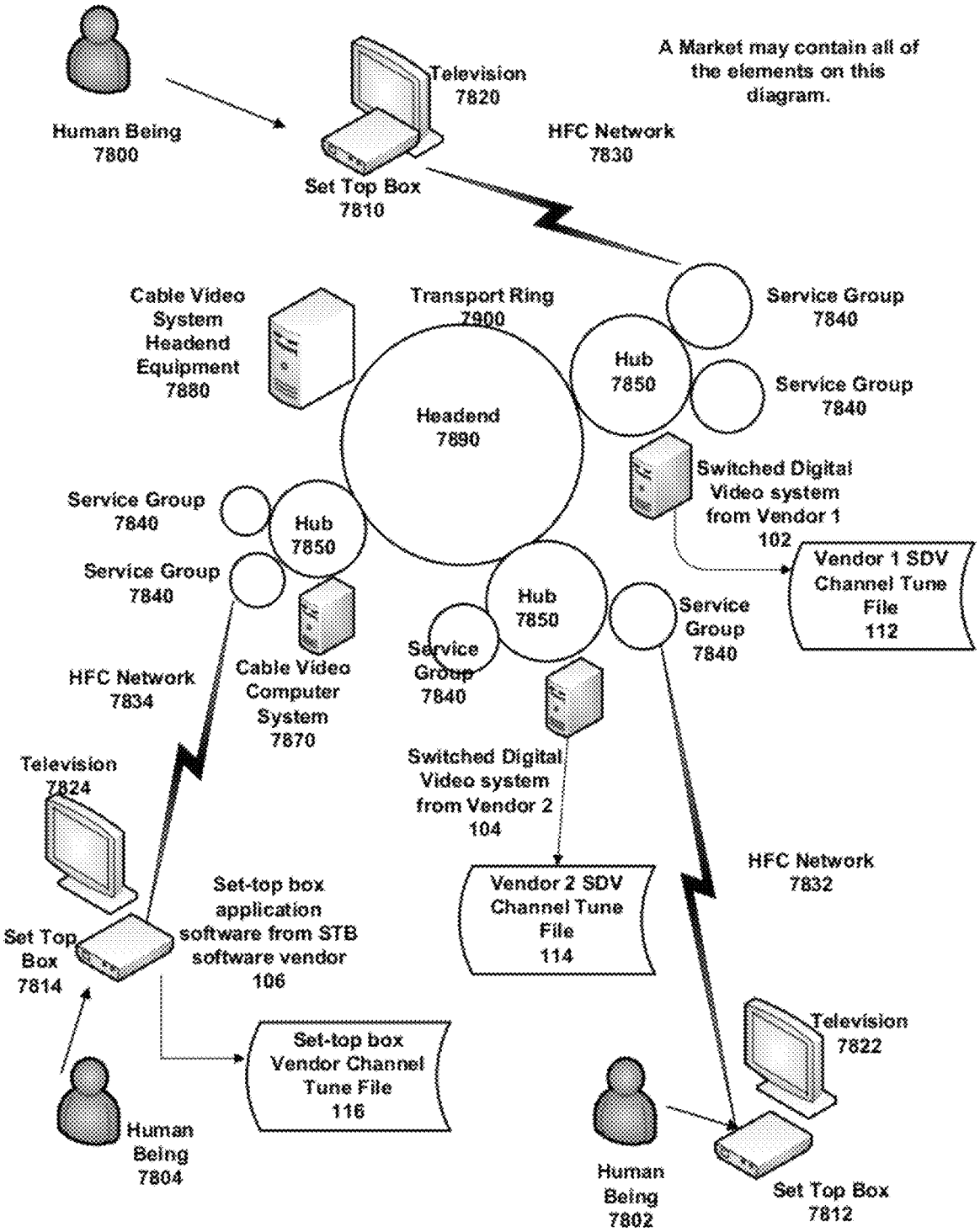
FIG. 31 illustrates a second alternative version of a human being interacting with an electronic device which is interacting with a computer system accessed through a network.

FIG. 31 illustrates three different human beings 7800, 7802, 7804 interacting with three different set-top boxes 7810, 7812, 7814 which are each interacting with a computer system 102, 104, 7870 accessed through a network 7830 or 7832 or 7834, according to one embodiment.

In these nonlimiting examples, the purpose is not to describe in detail the operations of a cable television network or a switched digital video system, but to simply show that the human being 7800 or 7802 or 7804 is interacting with a set-top box 7810 or 7812 or 7814 which is interacting with a computer system 102 or 104 or 7870 accessed through a network 7830 or 7832 or 7834 and that the overall network includes various components such as SDV systems, Cable Video systems, STB systems, Service Groups, Hubs, and Headends which are all part of a Market in a cable television system.

To follow the chain of interactions in this nonlimiting example, in the first Switched Digital Video part of this Figure, the human being 7800 is using a set-top box 7810 or any similar electronic device attached to a television 7820. The signal produced by the set-top box 7810 is viewed on a television 7820. The set-top box 7810 uses a HFC network segment 7830 to communicate with Switched Digital Video system from Vendor 1 102 which is accessed via a Service Group 7840 and a Hub 7850. The Hub 7850 is linked to a Headend 7890 via a transport ring 7900. Switched Digital Video system from Vendor 1 102 produces the file Vendor 1 SDV Channel Tune File 112 which can then be made available for preprocessing in preparation for processing by the Analytics Engine 140 as explained in other Figures.

To continue following the chain of interactions in this nonlimiting example, in the second Switched Digital Video part of this Figure, the human being 7802 is using a set-top box 7812 or any similar electronic device attached to a television 7822. The signal produced by the set-top box 7812 is viewed on a television 7822. The set-top box 7812 uses a HFC network segment 7832 to communicate with Switched Digital Video system from Vendor 2 104 which is accessed via a Service Group 7840 and a Hub 7850. The Hub 7850 is linked to a Headend 7890 via a transport ring 7900. Switched Digital Video system from Vendor 2 104 produces the file Vendor 2 SDV Channel Tune File 114 which can then be made available for preprocessing in preparation for processing by the Analytics Engine 140 as explained in other Figures.

To further continue following the chain of interactions in this nonlimiting example, in the non-Switched Digital Video part of this Figure, a different human being 7804 is using a different set-top box 7814 or any similar electronic device attached to a television. The signal produced by the set-top box 7814 is viewed on a different television 7824. The set-top box 7814 uses a different HFC network segment 7834 to communicate with a Cable Video Computer System 7870 which is accessed via a Service Group 7840 and a Hub 7850. The Hub 7850 is linked to a Headend 7890 via a transport ring 7900. Set-top box 7814 is running Set-top box application software from STB software vendor 106 and said software is collecting channel tuning data which is used to produce Set-top box Vendor Channel Tune File 116.

The following details are not shown: The Set-top box Vendor Channel Tune File 116 from a plurality of set-top boxes is routed back through the HFC Network 7834 where the files are aggregated and can then be made available for preprocessing in preparation for processing by the Analytics Engine 140 as explained in other Figures.

To summarize these nonlimiting examples shown in FIG. 31, in two cases the respective human being is using his set-top box to interact with an SDV Computer system across the network while in another part of the cable company network a third human being may be using his set-top box to interact with a traditional or non-SDV system. In the SDV cases, the system produces SDV channel change logs; in the non-SDV case, the system produces Set-top box tuning files. In all cases Headend Equipment 7880 at the Headend 7890 receives incoming signals, prepares them, and then transmits video streams downstream to other parts of the network. In all cases the tuning files can be used to produce data analytics as shown in other Figures.

Figure 32:
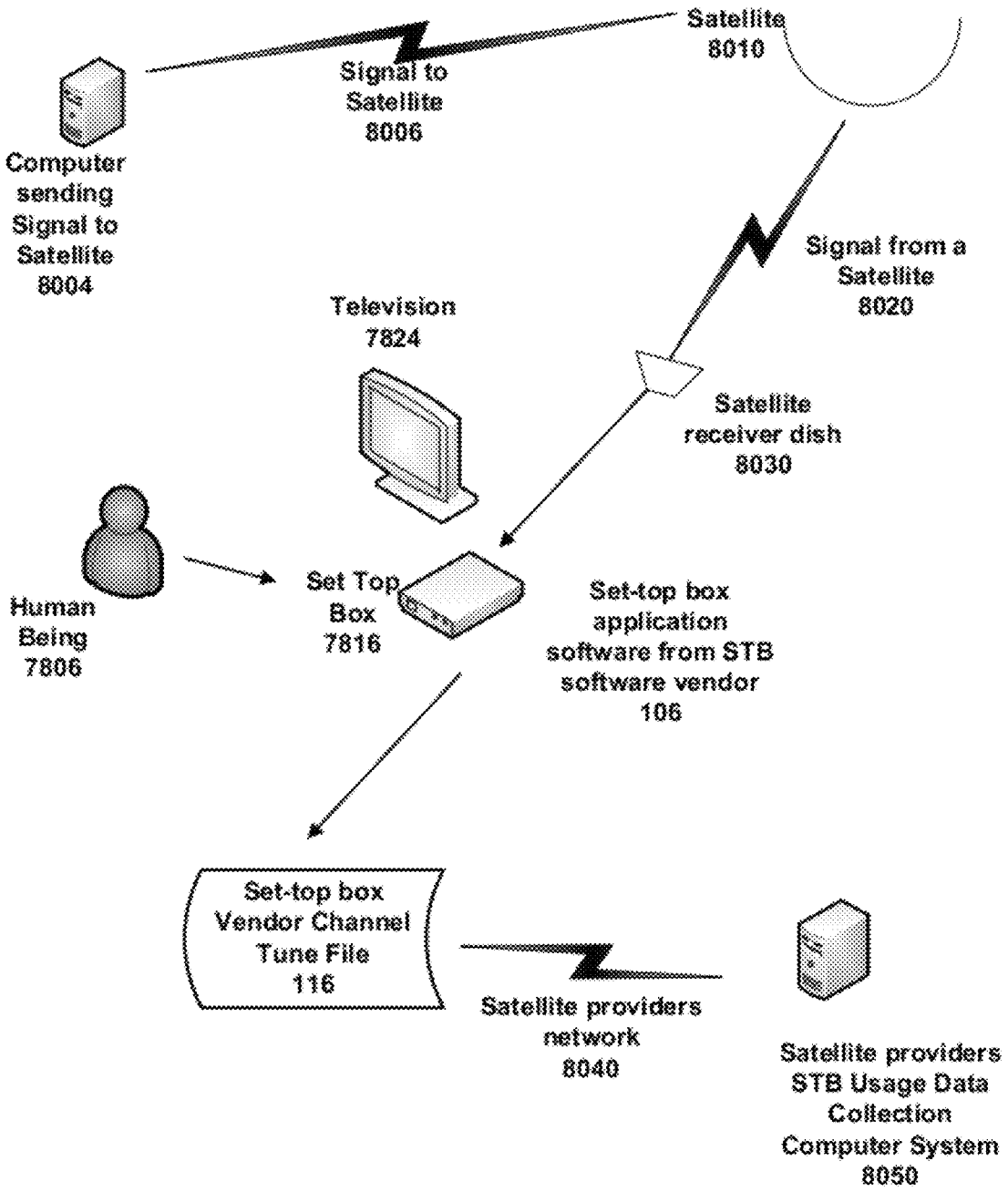
FIG. 32 illustrates a human being interacting with an television system which is part of a satellite television network.

FIG. 32 illustrates a human being 7806 interacting with a set-top box 7816 which is interacting with computer systems 8004 and 8050 accessed through networks 8006 and 8040, according to one embodiment.

In these nonlimiting examples, the purpose is not to describe in detail the operations of a satellite television network, but to simply show that the human being 7806 is interacting with a set-top box 7816 which is interacting with computer systems 8004 and 8050 accessed through networks 8006 and 8040 and that the overall network includes various components such as a Computer that sends signals to a satellite and a computer that receives set-top box activity, both being part of a satellite television system.

To follow the chain of interactions in this nonlimiting example, the video or audio signal is sent by the Computer sending Signal to Satellite 8004 as a Signal to Satellite 8006.

The Satellite 8010 receives the signal and beams it as a Signal from a Satellite 8020 to the Satellite receiver dish 8030 where it is then passed on to the Set-top box 7816. The Human Being 7806 controls the Set-top box 7816 by interacting with it. The Set-top box application software from STB software vendor 106 captures the interactions of the Human Being 7806 and packages them into a file Set-top box Vendor Channel Tune File 116 or other message which is then send to the Satellite providers STB Usage Data Collection Computer System 8050 using or across the Satellite providers network 8040. The file of set-top box activity can then be made available for preprocessing in preparation for processing by the Analytics Engine 140 as explained in other Figures.

Alternative Embodiments

Although the descriptions above contains many specificities, these should not be construed as limiting the scope of the embodiments but as merely providing illustrations of some of several embodiments. As a nonlimiting example, any of the calculations can be done for the day or for any part of the day, additional calculations can be done once the data is loaded to the Data Structure, and/or aggregations can be done to summarize data to minute or day-part.

As a second nonlimiting example, device usage data can reflect multiple concurrent activities such as a set-top box using multiple tuners simultaneously as in multiple pictures on a television screen or one picture on the television screen and one video stream being recorded by a digital video recorder. One can readily envision set-top box applications or personal computer applications or advanced television applications which show multiple windows such as a television program, a TV menu, a sports channel, a weather channel, a traffic cam, a twitter (© 2010 Twitter, Twitter, Inc.) session, an instant message session, a You Tube (© 2010 YouTube, LLC, www.youtube.com) video, an email session, a web browsing session, a Facebook (Facebook© 2010, www.facebook.com) session, etc. Usage data could be collected for each of these activities with perhaps weightings assigned to the activities based on business rules. I presently contemplate device usage data being provided in flat files, but another embodiment may provide this data in any computer readable format including but not limited to data base tables, XML messages, or other messaging constructs.

I presently contemplate using mnemonics for the various identifiers such as market, headend, hub, service group, channel call sign, program attribute data, demographic category, and other similar fields, but another embodiment could use numeric values as identifiers.

I presently contemplate using identifiers such as market, headend, hub, and service group, but another embodiment could use fewer identifiers or different identifiers or no identifiers.

I presently contemplate reading the tuning data from a flat file, but another embodiment could obtain the tuning data directly from a data base as a result of a query or from an XML message. In like manner, Electronic device usage data could also be obtained from a data base or from an XML message instead of a flat file.

I presently contemplate sorting the tuning data as a separate step, but another embodiment could use an "order by" clause in a data base query to sort the result set.

I presently contemplate executing the algorithms described herein separately in some sequence, but another embodiment could combine multiple simple algorithms into fewer complex algorithms.

I presently contemplate sorting the tuning data before loading it to the Data Structure, but another embodiment may load unsorted data to the Data Structure as long as the search algorithms were configured to find matching key values in the Data Structure as the data is being loaded.

In regard to Channel data (FIG. 17), I presently contemplate sorting the tuning data and then loading the Data Structure based on identifiers found in the tuning data, but another embodiment may preload the Data Structure with the most popular channels first and the less view channel later so that the search algorithms will find the popular (most viewed) channels at the top of the Data Structure.

In regard to Demographic data (FIG. 20), I presently contemplate sorting the tuning data and then loading the Data Structure based on identifiers found in the tuning data, but another embodiment may preload the Data Structure with the most popular demographic identifiers first and the less popular ones later so that the search algorithms will find the popular (most frequently occurring) demographic identifiers at the top of the Data Structure.

In regard to Program Attribute data (FIG. 21), I presently contemplate sorting the tuning data and then loading the Data Structure based on identifiers found in the tuning data, but another embodiment may preload the Data Structure with the most popular program attribute identifiers first and the less popular ones later so that the search algorithms will find the popular (most frequently occurring) program attribute identifiers at the top of the Data Structure.

I presently contemplate a separate process to enhance the device usage data with program attribute data and/or demographic category data, but this step could be combined into a single process in which device usage data is retrieved from a data base along with program attribute data and/or demographic category data as part of a larger query process.

I presently contemplate that the tune-in date and time and the tune-out date and time will be presented in YYYY-MM-DD HH:MM:SS AM/PM format. Another embodiment could provide these values in seconds from some historic date such as Epoch time (Jan. 1, 1970) and then subtract the proper number of seconds from the value so as to bring the value into the seconds of the current date. For example, Aug. 1, 2010 at 12:00:00 AM is Epoch time 1280646000. Subtracting this value from any tune-in date and time or tune-out date and time from Aug. 1, 2010, will result in the second of the day that can be used in populating the Data Structure. A tune-in at Aug. 1, 2010 at 12:30:00 AM has Epoch time of 1280647800. Thus we see that 1280647800–1280646000=1800 seconds which would be 30 minutes after midnight. Either embodiment can be used as input to create the metrics.

I presently contemplate that the Analytics Engine will be provided with the tune-in date and time and the tune-out date and time presented in YYYY-MM-DD HH:MM:SS AM/PM format. Another embodiment could provide the tune-in date and time in this format and then provide the Analytics Engine with the duration of the tuning activity in seconds instead of providing the tune-out date and time presented in YYYY-MM-DD HH:MM:SS AM/PM format. In this situation the Analytics Engine would add the tuning duration in seconds to the tune-in time in seconds to arrive at the tune-out time.

I presently contemplate that the analytics engine will be provided with the tune-in date and time and the tune-out date and time presented in YYYY-MM-DD HH:MM:SS AM/PM format. Another embodiment could provide the tune-out date and time in this format and then provide the Analytics Engine with the duration of the tuning activity in seconds instead of providing the tune-in date and time presented in YYYY-MM-DD HH:MM:SS AM/PM format. In this situation the Analytics Engine would subtract the tuning duration in seconds from the tune-out time in seconds to arrive at the tune-in time.

I presently contemplate processing one day's data at a time, but another embodiment may process more than one day of data or a part of a day.

I presently contemplate using variables having the data types and field sizes shown, but another embodiment may use variables with different data types and field sizes to accomplish a similar result. I presently contemplate using Data Structure(s) similar to those defined herein, but another embodiment may use a different Data Structure or Data Structures to accomplish a similar result.

I presently contemplate using the Windows® XP operating system from Microsoft® Corporation, but another embodiment may use a different operating system.

I presently contemplate using Fujitsu® NetCOBOL® for Windows® version 10.1 developed by Fujitsu® and distributed by Alchemy Solutions Inc, but another embodiment may use a different programming language or a different version of COBOL.

It will be apparent to those of ordinary skill in the art that various changes and modifications may be made which clearly fall within the scope of the embodiments revealed herein. In describing an embodiment illustrated in the drawings, specific terminology has been used for the sake of clarity. However, the embodiments are not intended to be limited to the specific terms so selected, and it is to be understood that each specific term includes all technical equivalents which operate in a similar manner to accomplish a similar purpose.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present embodiment. For example, the embodiments described hereinabove may be implemented in computer software using any suitable computer software language type such as, for example, C, C#, or C++ using, for example, conventional or object-oriented techniques. Such software may be stored on any type of suitable computer-readable medium or media such as, for example, a magnetic or optical storage medium. Thus, the operation and behavior of the embodiments are described in COBOL style pseudocode purely as a matter of convenience. It is clearly understood that artisans of ordinary skill would be able to design software and control hardware to implement the embodiments presented in the language of their choice based on the description herein with only a reasonable effort and without undue experimentation.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium.

It can also be appreciated that certain process aspects disclosed herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

In various embodiments disclosed herein, a single component or algorithm may be replaced by multiple components or algorithms, and multiple components or algorithms may be replaced by a single component or algorithm, to perform a given function or functions. Except where such substitution would not be operative to implement the embodiments disclosed herein, such substitution is within the scope presented herein. Thus any element expressed herein as a means for performing a specified function is intended to encompass any way of performing that function including, for example, a combination of elements that performs that function. Therefore, any means that can provide such functionalities may be considered equivalents to the means shown herein.

While I have developed this embodiment on a personal computer, it can be appreciated that the "data analysis computer system" may be, for example, a wireless or wire line variety of a microcomputer, minicomputer, server, mainframe, laptop, personal data assistant (PDA), wireless e-mail device (e.g., "BlackBerry" trade-designated devices), phone, smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

While various embodiments have been described herein, it should be apparent, however, that various modifications, alterations and adaptations to those embodiments may occur to persons skilled in the art with the attainment of some or all of the advantages described herein. The disclosed embodiments are therefore intended to include all such modifications, alterations and adaptations without departing from the scope and spirit of the embodiments presented herein as set forth in the appended claims.

Accordingly, the scope should be determined not by the embodiments illustrated, but by the appended claims and their legal equivalents.

Advantages

From the description above, a number of advantages of some embodiments of my Analytics Engine 140 and its supporting processes become evident:

By loading the device usage data to a data structure with individual buckets (cells in memory) representing individual units of time during a window of time of interest for analysis, and then correlating those buckets (cells) with identifying fields, this produces the result that the Analytics Engine 140 can produce metrics that were not previously possible. This method is contrary to the teaching of those who work with start time and duration (seconds viewed) in a relational data base model. Thus I am able to solve problems previously found insolvable when limited to using the existing techniques.

In regard to television viewing, I have provided numerous metrics showing a level of detailed analytics not previously possible. For example, the Analytics Engine 140 allows us measure detailed viewing behavior of lightly viewed channels for which traditional survey methods do not provide data. The Analytics Engine 140 allows us to provide deeper insight into highly viewed channels. The Analytics Engine 140 is able to provide the detailed information that industry researchers urgently need. There are many other examples contained herein.

In regard to other electronic devices such as cell phones and personal communication devices, the same Analytic Engine 140 can be applied to provide numerous similar metrics.

Set-Top Box Channel Viewership Analysis

The Analytics Engine 140 allows us to produce detailed metrics of individual set-top box behavior. These metrics have multiple uses including capacity planning, resource consumption analysis, understanding electronic device usage patterns, and understanding human behavior. Some of these metrics include:

- STB Channel Viewing seconds which measures for each set-top box+channel combination, the number of seconds the set top box was tuned to the channel during the day. As nonlimiting examples, viewing could also be measured for any part of the day such as viewing during a specific half hour or viewing during a commercial break.
- STB Channel tune-ins which measures for each set-top box+channel combination, the number of times the set-top box tuned to that channel during the day. As a nonlimiting example, it would be just as easy to measure the number of tune-outs that occurred during a specific half hour or viewing during a commercial break.
- STB channel average stay away seconds which measures for each set-top box+channel combination the average time away for tune-away events where the STB returns to the channel soon thereafter.

Channel Viewership Analysis

The Analytics Engine 140 allows us to produce detailed metrics of channel viewing behavior. These metrics have multiple uses including capacity planning, resource consumption analysis, understanding electronic device usage patterns, and understanding human behavior. Some of these metrics include:

- Channel viewing seconds which measures at a channel level the number of seconds during the day that at least one set-top box was viewing the channel.
- Channel Non-Viewing seconds which measures at a channel level the number of seconds during the day that no set-top box was viewing the channel.
- Aggregate Channel Viewing seconds which measures at a channel level the total number of seconds of viewing of the channel during the day.
- Peak viewing count for channel which measures at a channel level how many STB's are tuned to the channel during its peak viewing second.
- Peak viewing second for channel which measures at a channel level the time of day when the most people are tuned to this channel.
- Aggregate viewing at this channel peak which measures at a channel level how much total viewing is happening when this channel is at its peak.
- Percent of peak viewing by this channel at peak which measures at a channel level what part of the total viewing audience is tuned to this channel during this channel's peak viewing period.
- Channel viewed during peak flag which measures at a channel level whether or not the channel was viewed during the peak second of the day when peak second is the most active second based on all the STB's viewing.
- Channel viewed seconds during peak which measures at a channel level the number of seconds during the peak viewing window that this channel was viewed by at least one STB.
- Aggregate Channel viewed seconds during peak which measures at a channel level the number of total viewing seconds that this channel captured during the peak viewing window.
- By second, channel viewed count which measures for each second of the day, the number of channels that had viewing activity of at least one STB tuned to the channel.
- By second, aggregate channel viewed count which measures for each second of the day, the number of different set-top boxes that were tuned to all the channels combined.
- By second of the day, bandwidth required quantity which measures for each second of the day, the amount of bandwidth required to service the channels being viewed, with bandwidth measured in megabits per second.
- Peak usage in megabits per second which measures the highest bandwidth usage in megabits per second that was recorded during the day.
- Peak usage by channel viewed count which measures the number of different channels being viewed on the busiest second of the day when busy is measured by number of channels viewed.
- Peak usage by STB viewing count which measures the number of different set-top boxes tuned to the system during the busiest second of the day.

Demographics Analysis

In addition to the metrics presented above, the Analytics Engine 140 is able to merge demographic data with detailed viewing patterns or detailed device usage patterns. Many in the industry recognize the value of being able to associate demographics with customer activities. Advertisers are continually seeking to better understand various characteristics about both current customers and potential customers. Additionally, service providers such as cable companies and cell phone companies need to better understand their customers in order to provide relevant services to them.

In the case of cable providers, channel change data, whether from the STB or from the SDV system, does not typically contain any demographic data. In the case of STB data, it is common to provide power on/power off, channel change, volume change, trick play, and similar data. In the case of SDV channel change data, it is common to provide Service Group, Channel identifier, STB identifier, tune-in date-time, tune-out date-time, bit rate, and similar fields. In neither case does the vendor provide demographic data.

The problem of missing demographic data can be solved relatively simply by the cable company. The SDV channel change log files contain a Set-top box identifier. This is typically a MAC address. Those with normal skill in the art will readily understand that it would be a relatively simple process for the cable provider to use this MAC address to look up demographic data associated with the MAC address and provide it along with the channel change data.

In the case of cell phone providers, device activity data can be augmented with demographic data. The cell phone company has the phone number or other unique identifier of the device. This could be used to associate the device usage data with demographic data.

In both cases, the demographic information or demographic attributes could include fields such as these as nonlimiting examples:

a. income,
b. ethnicity,
c. gender,
d. age,
e. marital status,
f. location,
g. geographic area,
h. postal code,
i. census data,
j. occupation,
k. social grouping,
l. family status,
m. any proprietary demographic grouping,
n. segmentation,
o. credit score,
P. dwelling type,
q. homeownership status,
r. property ownership status,
s. rental status,
t. vehicle ownership,
u. tax rolls,
v. credit card usage,
w. religious affiliation,
x. sports interest,
y. political party affiliation,
z. cable subscriber type, and
aa. cable subscriber package level
bb. cell phone service level.

For privacy considerations, the cable company could provide a consistent substitute (e.g. a scrambled MAC address) for the set-top box identifier (the MAC address) in the channel change file. By substituting a scrambled MAC address for the actual MAC address, no one would be able to identify the particular household by using the MAC address to look up the customer. By having a consistent substitute (one that does not change over time), the privacy of the viewer is maintained and the Analytics Engine 140 can track the viewer's viewing and usage patterns across multiple channel change events over a period of time. Similarly the cell phone company could take steps to protect the privacy of its customers.

Once the demographic data is available to the Analytics Engine 140, numerous additional metrics can be developed. A few examples related to cable television will suffice for this recap:

a. Demographic viewing seconds measures at a demographic level the number of seconds during the day that at least one set-top box having this demographic was tuned-in.
b. Aggregate demographic viewing seconds measures at a demographic level the number of seconds of during the day that STB's having this demographic were tuned-in.
c. Peak viewing second for demographic measures the second of the day when the most STB's having this demographic are tuned-in.
d. Aggregate demographic viewing at this demographic's peak measures how much aggregate viewing is happening when this demographic is at its peak.

In each of the examples, the demographic attribute could be any two values in the list above. So the metric produced could be:

a. Aggregate viewing seconds for (family status="Families") in (postal code="80001") for the day measures the total viewing seconds of Families in Postal Code 80001.
b. Peak viewing second for (family status="Families") in (postal code="80001") measures the second of the day when the most STB's belonging to Families in postal code 80001 are tuned-in.

The Analytics Engine 140 I have developed will produce metrics based on combining two different demographic attributes. It will produce metrics for all combinations of the two specified attributes. As a nonlimiting example, the same concept that produces metrics for two demographic attributes could be used to produce metrics for more than two demographic attributes.

Program Attribute Analysis

As to identifying the attributes of programming consumed, the channel change data, whether from the STB or from the SDV system, does not typically provide this. A list of program attributes could include any of the following as nonlimiting examples:

a. program type (news, sports, movie, etc.),
b. program genre (action, mystery, romance),
c. program provider,
d. video asset id,
e. video asset name,
f. program rating,
g. producer,
h. script writer,
i. agency name,
j. featured actor,
k. featured actress,
l. featured voice,
m. actor celebrity status,
n. language,
o. informational content code,
p. delivery format,
q. audio track code,
r. audience suitability rating,
s. product category,
t. episode identifier.

Those with normal skill in the art will readily understand that the cable company or data provider could associate any of these program attributes with the channel change data such that the channel change record would also identify some number of these program attributes. The Analytics Engine 140 that I have developed will produce metrics based on combining two different program attributes. The cable company can during preprocessing augment the tuning data with additional tuning records to reflect each change in program attributes. For example, if a channel tune lasts two hours, there may be programs each having different program attributes that occur during this time. The cable company could create tuning records for each of these with the result that the Analytics Engine 140 would then create more detailed metrics based on program attribute.

As a nonlimiting example, the same concept that produces metrics for two program attributes could be used to produce metrics for more than two program attributes.

Benefits of Combining Channel Change Data with Program Attribute Data

By having program attribute data available along with the channel change data, the Analytics Engine 140 can produce metrics based on program attribute. Such metrics could be useful in several areas:

SDV Node Assignment Benefits

In SDV systems, it is helpful from a capacity planning perspective to assign viewers with similar viewing patterns to the same node within a service group or to the same service group. This is because the bulk of the resource consumption related to supplying a switched channel at a point in time is the resource required to service the first requestor of that channel in that service group. Any additional set-top boxes can be given access to the same viewing stream with very minimal extra resource consumption. By analogy, once a train is operating for one passenger, it is a small task to take along additional passengers.

A very simple example of this is that if ten viewers in a service group all typically watch a particular switched history channel during the day and a particular switched nature channel during the evening, then it is more efficient to assign these ten viewers to the same fiber node or service group because once the first viewer causes the SDV system to make the signal available for his STB, it is readily available for all of the other STB's in that fiber node or service group.

The opposite of this case would be to have a fiber node or service group in which every viewer typically watches a different channel. This would require more resources to support.

Thus the goal of data analysis should be to provide insight into how to assign customers to fiber nodes or service groups so that viewers with similar viewing patterns are assigned to the same fiber node or service group. The Analytics Engine 140 I have developed will create the aggregated data that can then be loaded to a statistical analysis package to identify these patterns in support of group assignment.

Advertisement Placement

By combining the channel tuning data with the program attributes, advertisers can see the time of day when programs having certain attributes are typically being viewed. This can be done with fine granularity so as to provided more targeted advertising. A few examples will suffice:

a. Program one STB viewing seconds measures at a program attribute level the number of seconds during the day that only one set-top box was tuned to a program having this program attribute.
b. Aggregate program viewing seconds measures at a program attribute level the number of seconds during the day that programs having this program attribute were being viewed.
c. Percent of the day when only one STB is viewing programs of this attribute tells the percentage of the day when only one STB is viewing programs having this program attribute.
d. Peak viewing second for program measures the second of the day when programs having this program attribute are viewed the most.
e. Percent of peak viewership by this program attribute's peak measures what part of the total active STB's were tuned to programs having this program attribute during the peak viewing period for programs having this program attribute.

In each of the examples, the program attribute could be any two values in the list above. So the metric produced could be:

a. Percent of peak viewership by this program attribute's peak measures what part of the total active STB's were tuned to programs having this program attribute during the peak viewing period for programs having this program attribute could be used as follows: When the Sports (program attribute 1)+Football program (program attribute 2) was at its best for the day, what share of the audience did it get?
b. Aggregate program viewing seconds measures at a program attribute level the number of seconds during the day that programs having this program attribute were being viewed could be used as follows: What was the total number of viewing seconds during the day that Action Movies (program attribute 1=Movie)+(attribute 2=Action) were viewed?

Combinations of Metrics

The methods taught herein can also be applied to combinations of metrics. As non-limiting examples, those with normal skill in the art will see that Channel data can be combined with Demographic data and Program Attribute data to produce metrics such as:

a. Viewing counts on Channel XYZ for Program Attribute 1 'Movie' with Program Attribute 2 'PG' or 'G' by Demographic Category 1 'Families with Children' and Demographic Category 2 'Zip code 12345'.
b. Percent of STB's tuned to Channel 'FOX' with Program Attribute 1 'News' with Demographic Category 1 'Young Marrieds' and Demographic Category 2 'Zip code 80234' compared to Percent of STB's tuned to Channel 'ABC' with Program Attribute 1 'News' with Demographic Category 1 'Young Marrieds' and Demographic Category 2 'Zip code 80234'.

Subsequent Usage of the Metrics

We can see that once the device usage data has been loaded to the Data Structure and processed by the Analytics Engine 140, the foundation has been laid for developing a comprehensive data warehouse including the analytics taught herein along with others that readily fit within the spirit and scope of this embodiment. When loading the data to the Data Structure, it can be very detailed such as device usage for each second in the period of analysis, or highly summarized such as seconds of device usage for an entire market. Such analysis would allow the provider to compare statistics for parts of a market with those for the entire market.

The metrics readily lend themselves to dimensional analysis using contemporary data warehouse methods. A Fact table in such an application may be at the device detail level or an aggregation of many devices. A Dimension table of Time may be at the level of seconds, minutes, hour, day part, days, etc. A Dimension table of Demographics could include any of the demographics described herein. A Dimension table of Program Attribute could include any of the program attribute values described herein. A Dimension table of Device could identify details about the electronic device. A Dimension table of Usage may be used to describe the method in which the device is being used (email, phone call, web browser, etc.).

The metrics produced by the Analytics Engine 140 can be loaded to a data warehouse to support longitudinal analysis. Thus we can readily envision a myriad of uses for the metrics produced by the Analytics Engine 140.

Other Ramifications

We can see that once the device usage data has been loaded to the Data Structure and processed by the Analytics Engine 140, the foundation has been laid for detailed analytics to determine how many set-top boxes were tuned to each channel during any particular day part. By combining this data with data that identifies when a particular program or commercial was playing on a particular channel within a certain geographic area, one could determine the exact number of set-top boxes that were tuned-in when a commercial was aired. Another use of such data is to identify the popularity of a television program. Another use of such data is to determine the point at which viewers tuned away from an ad or television program. For example, one could identify the ability of a show to hold a viewing audience from beginning to end. This could be particularly useful in the case of a new pilot program before developing an entire series.

Other ramifications include the ability to measure commercial viewing based on demographics of the viewer.

Other ramifications include the ability to measure program viewing by program attributes and demographics combined.

Other ramifications include the ability to identify the time of day that is most optimal for airing various types of programs and/or advertisements.

Other ramifications include the ability to place set top boxes into Service Groups in support of Switched Digital Video capacity management.

Besides these ramifications, many additional uses of the data have been described in various parts of this specification.

Numerous other ramifications can be identified. These are simply non-limiting examples.

Electronic Device Comparison

A person with ordinary skill in the art will readily see the similarities between cable television capacity planning and cell phone capacity planning. The methods revealed herein can be readily applied to cellular telephone systems. This will be explained next.

A personal communication device includes any portable, battery-powered device typically capable of sending and receiving telephone calls, sending and receiving email, sending and receiving text messages, interacting with the world wide web, accessing the internet, downloading files, viewing streaming video, viewing internet protocol television, and similar functions. An example would be a cellular telephone.

A cellular telephone system contains many cell towers. The capacity of a cell tower is limited. In order to manage capacity, the cell phone company needs metrics on things such as:

a) Call volume by day or day-part
b) Call frequency by day or day-part
c) Call duration by day or day-part
d) Overlapping call duration by day or day-part
e) Data transfer volumes by day or day-part
f) Overlapping data transfer duration by day or day-part
g) Internet protocol packet volume or Ethernet packet volume by day or day-part.
h) Overlapping internet protocol packet volume or Ethernet packet volume by day or day-part.

Each of these metrics can be provided at a cell tower level or for an aggregation of cell towers. The unique identifier of a cell phone may include any of: Electronic Serial Number (ESN), Mobile Identification Number (MIN), System Identification Code (SIC).

Cell Tower generally equates to Service Group in the embodiment reviewed above. Radio Network Controller which facilitates communication between cell towers generally equates to Hub in the embodiment reviewed above.

ESN, MIN, SIC all generally equate to Set Top Box identifier in the embodiment reviewed above.

Call start time generally equates to tune-in-time.

Call end time generally equates to tune out time.

Radio Frequency/Channel generally equates to to Channel.

IP packet rate generally equates to megabits per second.

Thus we can see that there are numerous similarities between a cellular network and a cable television network. The methods taught herein could be applied to a cellular network.

Ramifications related to electronic device usage include things such as:

a) Ability to track peak usage times
b) Ability to track what parts of the network are most used
c) Ability to track capacity demands
d) Ability to identify demographic characteristics of various users
e) Ability to track the purpose for which subscribers use their devices (talk, browse web, etc.)
f) Ability to combine demographics with usage purpose (teens play games, adults check email)
g) Ability to track web page activity Numerous other ramifications will be apparent to those who work with this data.

I claim:

1. A [computer-implemented method, executed on a data analysis computer system including at least one data analysis computer of known type, of analyzing a plurality of human interactions by a plurality of humans interacting with a plurality of electronic devices, each interacting directly or indirectly with a computer system accessed through a network, said computer-implemented] method comprising[the steps of]:

[a. Providing on said data analysis computer system a data analysis program, b.] *creating, by a computing system, a data structure comprising data records representing discrete time periods associated with video-viewing events;* receiving[in computer readable format electronic device usage], *by the computing system,* data [resulting from said human interaction and making said electronic device usage data available to said data analysis program run on said data analysis computer system,] *indicating a first plurality of video-viewing events, associated with a plurality of devices, during a time range;*

*based on the first plurality of video-viewing events, populating a first set of data records of the data structure with values indicating device usage;*

*for a second plurality of video-viewing events of the first plurality of video-viewing events, populating a second set of data records of the data structure with data indicating one or more program attributes;*

*using the data structure to determine, by the computing system, and based on the second plurality of video-viewing events, a plurality of different video assets, associated with the one or ore program attributes, that were output during a time period, of a plurality of time periods, of the time range;*

*using the data structure to determine, based on the second plurality of video-viewing events and for each time period of the plurality of time periods of the time range, a quantity of devices, of the plurality of devices, that each output a video asset of the plurality of different video assets during the time period;*

*selecting, based on the quantity of devices determined for each time period of the plurality of time periods, a time period, of the plurality of time periods, as a peak time period corresponding to a peak in output of the plurality of different video assets during the time range;*

*determining, based on the peak time period, a video-viewing metric; and*

*outputting, to a computing device, the video-viewing metric*

[c. creating a data structure in said data analysis program run on said data analysis computer system containing identifying fields for things of interest for analysis, d. creating in said data structure buckets representing individual seconds of time during a window of time of interest for analysis wherein said buckets are correlated with said identifying fields, e. receiving in computer readable format and then loading to said identifying fields in said data structure identifying information for at least one member selected from the group of items of interest consisting of:

(i) the identifier of said electronic device, (ii) the identifier of said computer system accessed through said network, (iii) the identifier of a resource consumed by said electronic device, (iv) the amount of said resource consumed by said electronic device, (v) demographic information about said human operating said electronic device, (vi) information about the activity occurring on said electronic device, (vii) information about the location of said electronic device, (viii) program attribute information about the content being delivered to said electronic device, f. using said electronic device usage data to determine the beginning date and time and the ending date and time of each said human interaction between said electronic device and said computer system accessed through said network and making said beginning date and time and said ending date and time available to said data analysis program run on said data analysis computer system, g. loading values that identify second-by-second electronic device usage activity to selected buckets in said data structure based on said beginning date and time and said ending date and time of each said human interaction, where said buckets loaded correspond with said identifying fields in said data structure, and where each said bucket represents a second of time during which said data analysis program is tracking said electronic device usage activity against at least one said item of interest, h. executing algorithms in said data analysis program running on said data analysis computer system to perform analytics on the data in said data structure, i. outputting said analytics in a useful format, whereby said analytics (i) provide insight into the amount of resource consumed by said human interaction with said electronic device interacting with said computer system accessed through said network, (ii) provide insight into the electronic device usage pattern of said human interactions, and (iii) provide insight into the behavior of said human interactions].

[2. The computer-implemented method of claim 1 wherein said human interaction includes both real time human interactions with said electronic device and interactions with said electronic device that occur as a result of a previous human action.]

[3. The computer-implemented method of claim 1 wherein said useful format in which said analytics are output includes at least one member selected from the group consisting of: a data file that can be read by a computer program, a data base table, an electronic message, and a spreadsheet.]

[4. The computer-implemented method of claim 1 wherein said data analysis program performs analytics on said data in said data structure to produce viewing metrics where said viewing metrics include at least one member selected from the group consisting of: STB-Channel-Viewing-seconds, STB-Channel-tune-ins, STB-Chan-Avg-viewing-duration, Stb-chan-stay-away-secs-total, Stb-chan-stay-away-tune-count, Stb-chan-avg-stay-away-secs, STB-Viewing-seconds, STB-tune-ins, STB-Average-viewing-duration, Channel-Viewing-seconds, Channel-Non-Viewing-seconds, Channel-one-STB-Viewing-seconds, Agg-Channel-Viewing-seconds, Pct-of-day-only-one-stb-viewg-chan, Pct-of-day-no-stb-viewing-channel, Pct-of-day-viewing-channel, Peak-viewing-second-for-chan, Peak-viewing-count-for-channel, Agg-viewing-at-this-chan-peak, Pct-of-peak-view-by-this-chanpeak.]

[5. The computer-implemented method of claim 1 wherein said resource consumed includes at least one member selected from the group consisting of: channels, frequencies, radio frequencies, bandwidth, megabits per second of data transferred, internet protocol packets transferred, Ethernet packets transferred, computer equipment, network equipment, network capacity, cell towers, hubs, routers, switches, nodes, circuits, devices, switched digital video computer systems.]

[6. The computer-implemented method of claim 1 wherein said data analysis program performs analytics on said data in said data structure to produce metrics on the resource consumed in supporting said human interaction with said electronic device interacting with said computer system accessed through said network.]

[7. The computer-implemented method of claim 1 wherein said demographic information about said human operating said electronic device includes at least one member selected from the group consisting of: income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable subscriber type, cable subscriber package level, and cell phone service level.]

[8. The computer-implemented method of claim 1 wherein said data analysis program performs analytics on said data in said data structure to produce demographic metrics where said demographic metrics include at least one member selected from the group consisting of: Demo-Viewing-seconds, Demo-Non-Viewing-seconds, Demo-one-STB-Viewing-seconds, Agg-Demo-Viewing-seconds, Pct-of-day-only-one-stb-viewg-demo, Pct-of-day-no-stb-viewing-demo, Pct-of-day-viewing-demo, Peak-viewing-second-for-demo, Peak-viewing-count-for-demo, Agg-viewing-at-this-demo-peak, Pct-of-peak-view-by-this-demopeak, Pct-of-peak-view-by-STB-viewng, Demo-viewed-during-peak-flag, Peak-period-duration-in-seconds, Demo-viewed-secs-during-peak, Agg-Demo-viewed-secs-during-peak, Pct-of-peak-period-demo-was-viewed, Pct-of-peak-view-by-STB-viewng, Chan-viewed-during-pea k-flag, Peak-period-duration-in-second, Chan-viewed-secs-during-peak, Agg-Chan-viewed-secs-during-peak, and Pct-of-peak-period-chan-was-viewed.]

[9. The computer-implemented method of claim 1 wherein said program attribute information includes at least one member selected from the group consisting of: program type, program genre, program provider, video asset id, video asset name, program rating, producer, script writer, agency name, featured actor, featured actress, featured voice, actor celebrity status, language, informational content code, delivery format, audio track code, audience suitability rating, product category, episode identifier.]

[10. A computer-implemented method, executed on a data analysis computer system including at least one data analysis computer of known type, of analyzing a plurality of channel tuning events caused by a plurality of humans interacting with a plurality of set-top boxes, each interacting directly or indirectly with a cable television system, said computer-implemented method comprising the steps of:

a. Providing on said data analysis computer system a data analysis program,
b. receiving in computer readable format channel tuning data resulting from said channel tuning events and making said channel tuning data available to said data analysis program run on said data analysis computer system,
c. creating a data structure in said data analysis program run on said data analysis computer system containing identifying fields for things of interest for analysis,
d. creating in said data structure buckets representing individual seconds of time during a window of time of interest for analysis wherein said buckets are correlated with said identifying fields,
e. receiving in computer readable format and then loading to said identifying fields in said data structure identifying information for at least one member selected from the group of items of interest consisting of:
   (i) the identifier of said set-top box,
   (ii) the identifier of cable television system equipment serving said set-top box,
   (iii) the identifier of a resource consumed by said set-top box,
   (iv) the amount of said resource consumed by said set-top box,
   (v) demographic information about said human operating said set-top box,
   (vi) program attribute information about the content being delivered to said set-top
   (vii) information about the activity occurring on said set-top box,
   (viii) information about the location of said set-top box,
f. using said channel tuning data to determine the tune-in date and time and the tune-out date and time of each said channel tuning event and making said tune-in date and time and said tune-out date and time available to said data analysis program run on said data analysis computer system,
g. loading values that identify second-by-second channel viewing activity to selected buckets in said data structure based on said tune-in date and time and said tune-out date and time of each said channel tuning event, where said buckets loaded correspond with said identifying fields in said data structure, and where each said bucket represents a second of time during which said data analysis program is tracking said channel viewing activity against at least one said item of interest,
h. executing algorithms in said data analysis program running on said data analysis computer system to perform analytics on the data in said data structure,
i. outputting said analytics in a useful format, whereby said analytics (i) provide insight into the amount of resource consumed by said human interaction with said set-top boxes interacting with said cable television system,
(ii) provide insight into the set-top box usage pattern of said human interactions, and
(iii) provide insight into the behavior of said human interactions.]

[11. The computer-implemented method of claim 10 wherein said channel tuning event includes both real time channel tuning events and channel tuning events that occur as a result of a previous human action.]

[12. The computer-implemented method of claim 10 wherein said useful format in which said analytics are output includes at least one member selected from the group consisting of: a data file that can be read by a computer program, a data base table, an electronic message, and a spreadsheet.]

[13. The computer-implemented method of claim 10 wherein said data analysis program performs analytics on said data in said data structure to produce viewing metrics where said viewing metrics include at least one member selected from the group consisting of: STB-Channel-Viewing-seconds, STB-Channel-tune-ins, STB-Chan-Avg-viewing-duration, Stb-chan-stay-away-secs-total, Stb-chan-stay-away-tune-count, Stb-chan-avg-stay-away-secs, STB-Viewing-seconds, STB-tune-ins, STB-Average-viewing-duration, Channel-Viewing-seconds, Channel-Non-Viewing-seconds, Channel-one-STB-Viewing-seconds, Agg-Channel-Viewing-seconds, Pct-of-day-only-one-stb-viewg-chan, Pct-of-day-no-stb-viewing-channel, Pct-of-day-viewing-channel, Peak-viewing-second-for-chan, Peak-viewing-count-for-channel, Agg-viewing-at-this-chan-peak, Pct-of-peak-view-by-this-chanpeak.]

[14. The computer-implemented method of claim 10 wherein said resource consumed includes at least one member selected from the group consisting of: channels, quadrature amplitude modulation signals, frequencies, radio frequencies, bandwidth, megabits per second of data transferred, internet protocol packets transferred, Ethernet packets transferred, computer equipment, network equipment, hubs, routers, switches, nodes, circuits, devices, network capacity, switched digital video computer systems, all in said cable television system.]

[15. The computer-implemented method of claim 10 wherein said data analysis program performs analytics on said data in said data structure to produce resource consumption metrics where said resource consumption metrics include at least one member selected from the group consisting of: Pct-of-peak-view-by-STB-viewng, Chan-viewed-during-peak-flag, Peak-period-duration-in-seconds, Chan-viewed-secs-during-peak, Agg-Chan-viewed-secs-during-peak, Pct-of-pea k-period-chan-was-viewed, By-sec-chan-viewed-count, By-sec-no-chan-viewed-count, By-sec-agg-chan-viewed-count, By-sec-bandwidth-reqd-quantity, By-sec-SDV-chan-viewed-count, By-sec-bcast-chan-viewed-count, By-sec-Std-Def-chan-viewed-cnt, By-sec-High-Def-chan-view-cnt, Peak-usage-in-mbits-per-sec, Peak-usage-second-in-mbits-per, Pct-of-peak-to-be-near-threshold, Near-pea k-threshold-in-mbits-per, Count-of-sec-mbits-near-peak, Pct-of-day-mbits-near-peak, Max-tune-ins-per-second, Max-tune-ins-sec-of-day, Peak-usage-by-chan-viewed-cnt, Peak-usage-second-by-chan-view, Peak-usage-by-STB-viewing-cnt, Peak-usage-second-by-STB-view, Agg-STB-view-at-peak-sec-ofday, Peak-period-duration-in-seconds, Peak-period-most-chan-view-beg-sec, Peak-period-most-chan-view-end-sec, Peak-period-most-STB-activ-beg-sec, Peak-period-most-STB-activ-end-sec.]

[16. The computer-implemented method of claim 10 wherein said demographic information about said human operating said electronic device includes at least one member selected from the group consisting of: income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable subscriber type, and cable subscriber package level.]

[17. The computer-implemented method of claim 10 wherein said data analysis program performs analytics on said data in said data structure to produce demographic metrics where said demographic metrics include at least one member selected from the group consisting of: Demo-Viewing-seconds, Demo-Non-Viewing-seconds, Demo-one-STB-Viewing-seconds, Agg-Demo-Viewing-seconds, Pct-of-day-only-one-stb-viewg-demo, Pct-of-day-no-stb-viewing-demo, Pct-of-day-viewing-demo, Peak-viewing-second-for-demo, Peak-viewing-count-for-demo, Agg-viewing-at-this-demo-peak, Pct-of-peak-view-by-this-demopeak, Pct-of-peak-view-by-STB-viewng, Demo-viewed-during-peak-flag, Peak-period-duration-in-seconds, Demo-viewed-secs-during-peak, Agg-Demo-viewed-secs-during-peak, Pct-of-peak-period-demo-was-viewed, Pct-of-peak-view-by-STB-viewng, Chan-viewed-during-peak-flag, Peak-period-duration-in-second, Chan-viewed-secs-during-peak, Agg-Chan-viewed-secs-during-peak, and Pct-of-peak-period-chan-was-viewed.]

[18. The computer-implemented method of claim 10 wherein said program attribute information includes at least one member selected from the group consisting of: program type, program genre, program provider, video asset id, video asset name, program rating, producer, script writer, agency name, featured actor, featured actress, featured voice, actor celebrity status, language, informational content code, delivery format, audio track code, audience suitability rating, product category, episode identifier.]

[19. The computer-implemented method of claim 10 wherein said data analysis program performs analytics on said data in said data structure to produce program attribute metrics where said program attribute metrics include at least one member selected from the group consisting of: Prog-Viewing-seconds, Prog-Non-Viewing-seconds, Prog-one-STB-Viewing-seconds, Agg-Prog-Viewing-seconds, Pct-of-day-only-one-stb-viewg-prog, Pct-of-day-no-stb-viewing-prog, Pct-of-day-viewing-prog, Peak-viewing-second-for-prog, Peak-viewing-count-for-prog, Agg-viewing-at-this-prog-peak, Pct-of-peak-view-by-STB-viewng, Pct-of-peak-view-by-this-progpeak, Prog-viewed-during-peak-flag, Peak-period-duration-in-seconds, Prog-viewed-secs-during-peak, Agg-Prog-viewed-secs-during-peak, and Pct-of-peak-period-prog-was-viewed.]

[20. The computer-implemented method of claim 1 wherein said data analysis program performs analytics on said data in said data structure to produce program attribute metrics where said program attribute metrics include at least one member selected from the group consisting of: Prog-Viewing-seconds, Prog-Non-Viewing-seconds, Prog-one-STB-Viewing-seconds, Agg-Prog-Viewing-seconds, Pct-of-day-only-one-stb-viewg-prog, Pct-of-day-no-stb-viewing-prog, Pct-of-day-viewing-prog, Peak-viewing-second-for-prog, Pea k-viewing-count-for-prog, Agg-viewing-at-this-prog-peak, Pct-of-peak-view-by-STB-viewng, Pct-of-peak-view-by-this-progpeak, Prog-viewed-during-peak-flag, Peak-period-duration-in-seconds, Prog-viewed-secs-during-peak, Agg-Prog-viewed-secs-during-peak, and Pct-of-peak-period-prog-was-viewed.]

*21. The method of claim 1, wherein the data indicates a time, in the time range, at which a video-viewing event of the first plurality of video-viewing events occurred.*

*22. The method of claim 1, further comprising:*

*determining a second quantity of devices, of the plurality of devices, that each output a video asset of the plurality of different video assets during the plurality of time periods; and*

*determining, based on the second quantity of devices, a video-viewing metric associated with the one or more program attributes.*

*23. The method of claim 1, further comprising:*

*determining a ratio between the quantity of devices determined for the peak time period and a quantity of the plurality of devices.*

*24. The method of claim 1, further comprising:*

*associating, for each video-viewing event of the first plurality of video-viewing events and based on a service associated with the video-viewing event and a start time associated with the video-viewing event, the video-viewing event with one or more second program attributes, wherein the second plurality of video-viewing events is determined based on the one or more second program attributes, and wherein the determining the plurality of different video assets is based on the association.*

*25. The method of claim 1, wherein each time period of the plurality of time periods comprises a same time duration.*

*26. The method of claim 1, further comprising:*

*based on determining that the quantity of devices is greater than a threshold value, incrementing a count of program viewing time.*

*27. The method of claim 26, further comprising:*

*based on adding the quantity of devices determined for each time period of the plurality of time periods, determining a count of total viewing time.*

*28. The method of claim 1, wherein the one or more program attributes comprise one or more of a program type, a program genre, a program provider, a video asset identifier, a video asset name, a program rating, a producer, a script writer, an agency name, a featured actor, a featured actress, a featured voice, an actor celebrity status, a language, an informational content code, a delivery format, an audio track code, an audience suitability rating, a product category, or an episode identifier.*

*29. The method of claim 1, wherein the determining the quantity of devices comprises:*

*based on determining that a first device output, during the time period, a first video asset of the plurality of different video assets, incrementing a count of devices corresponding to the quantity of devices.*

*30. The method of claim 29, wherein the determining the quantity of devices further comprises:*

*based on determining that a second device output, during the time period, a second video asset of the plurality of different video assets while the first device was output-*

*ting the first video asset, incrementing the count of devices corresponding to a second quantity of devices.*

*31. The method of claim 1, wherein the determining the plurality of different video assets further comprises determining, separately for each video-viewing event of the second plurality of video-viewing events, that a video asset indicated in the video-viewing event is associated with the one or more program attributes, and wherein determining the quantity of devices, of the plurality of devices, that each output a video asset of the plurality of different video assets during the time period comprises incrementing, based on each video-viewing event of the second plurality of video-viewing events, a count of devices corresponding to the quantity of devices.*

*32. The method of claim 1, further comprising:*

*determining, for each of the plurality of devices and based on the first plurality of video-viewing events, a number of instances that a device tuned to a first channel.*

*33. The method of claim 32, further comprising:*

*determining, based on the first plurality of video-viewing events, a duration of time the device was tuned to the first channel.*

*34. The method of claim 1, further comprising:*

*determining a quantity of devices that output the video asset during the peak time period; and*

*determining, based on the quantity of devices that output the video asset during the peak time period, a video-viewing metric.*

*35. The method of claim 1, further comprising:*

*determining, based on a quantity of devices that output the video asset via a first channel during the peak time period, a video-viewing metric.*

*36. The method of claim 1, further comprising:*

*selecting a time period, of the plurality of time periods, indicating a highest quantity of active devices of the plurality of devices; and*

*determining, based on the selected time period indicating the highest quantity of active devices, a video-viewing metric.*

*37. The method of claim 1, wherein each data record represents one second of time during which a program was output by a respective video viewing device.*

*38. The method of claim 1, wherein the plurality of time periods is determined based on user input associated with a window of time of interest for video viewing analysis.*

*39. The method of claim 1, wherein each data record indicates aggregate device usage for a first geographic area.*

*40. An apparatus comprising:*

*one or more processors; and*

*memory storing instructions that, when executed by the one or more processors, cause the apparatus to:*

*create a data structure comprising data records representing discrete time periods associated with video-viewing events;*

*receive data indicating a first plurality of video-viewing events, associated with a plurality of devices, during a time range;*

*based on the first plurality of video-viewing events, populate a first set of data records of the data structure with values indicating device usage;*

*for a second plurality of video-viewing events of the first plurality of video-viewing events, populate a second set of data records of the data structure with data indicating one or more program attributes;*

*use the data structure to determine, based on the second plurality of video-viewing events, a plurality of different video assets, associated with the one or more program attributes, that were output during a time period, of a plurality of time periods, of the time range;*

*use the data structure to determine, based on the second plurality of video-viewing events and for each time period of the plurality of time periods of the time range, a quantity of devices, of the plurality of devices, that each output a video asset of the plurality of different video assets during the time period;*

*select, based on the quantity of devices determined for each time period of the plurality of time periods, a time period, of the plurality of time periods, as a peak time period corresponding to a peak in output of the plurality of different video assets during the time range;*

*determine, based on the peak time period, a video-viewing metric; and*

*output, to a computing device, the video-viewing metric.*

*41. The apparatus of claim 40, wherein the instructions, when executed by the one or more processors, further cause the apparatus to:*

*based on determining that the quantity of devices is greater than a threshold value, increment a count of program viewing time.*

*42. The apparatus of claim 41, wherein the instructions, when executed by the one or more processors, further cause the apparatus to:*

*based on adding the quantity of devices determined for each time period of the plurality of time periods, determine a count of total viewing time.*

*43. A system comprising:*

*a first computing device comprising:*

*one or more first processors; and*

*memory storing first instructions that, when executed by the one or more first processors, cause the first computing device to:*

*create a data structure comprising data records representing discrete time periods associated with video-viewing events;*

*receive data indicating a first plurality of video-viewing events, associated with a plurality of devices, during a time range;*

*based on the first plurality of video-viewing events, populate a first set of data records of the data structure with values indicating device usage;*

*for a second plurality of video-viewing events of the first plurality of video-viewing events, populate a second set of data records of the data structure with data indicating one or more program attributes;*

*use the data structure to determine, based on the second plurality of video-viewing events, a plurality of different video assets, associated with the one or more program attributes, there were output during a time period, of a plurality of time periods, of the time range;*

*use the data structure to determine, based on the second plurality of video-viewing events and for each time period of the plurality of time periods of the time range, a quantity of devices, of the plurality of devices, that each output a video asset of the plurality of different video assets during the time period;*

*select, based on the quantity of devices determined for each time period of the plurality of time periods, a time period, of the plurality of time periods, as a*

*peak time period corresponding to a peak in output of the plurality of different video assets during the time range;*

*determine, based on the peak time period, a video-viewing metric; and*

*output, to a third computing device, the video-viewing metric; and*

*a second computing device comprising:*

*one or more second processors; and*

*memory storing second instructions that, when executed by the one or more second processors, cause the second computing device to send at least a portion of the data.*

*44. The system of claim 43, wherein the first instructions, when executed by the one or more first processors, further cause the first computing device to:*

*based on determining that the quantity of devices is greater than a threshold value, increment a count of program viewing time.*

*45. The system of claim 44, wherein the first instructions, when executed by the one or more first processors, further cause the first computing device to:*

*based on adding the quantity of devices determined for each time period of the plurality of time periods, determine a count of total viewing time.*

* * * * *